(12) United States Patent
Kondo

(10) Patent No.: US 7,876,323 B2
(45) Date of Patent: Jan. 25, 2011

(54) DISPLAY APPARATUS AND DISPLAY METHOD, LEARNING APPARATUS AND LEARNING METHOD, AND PROGRAMS THEREFOR

(75) Inventor: Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 1058 days.

(21) Appl. No.: 11/610,233

(22) Filed: Dec. 13, 2006

(65) Prior Publication Data

US 2007/0159661 A1 Jul. 12, 2007

(30) Foreign Application Priority Data

Jan. 6, 2006 (JP) ............... 2006-001579

(51) Int. Cl.
*G06T 17/00* (2006.01)
*H04N 7/01* (2006.01)

(52) U.S. Cl. .................. 345/428; 345/698; 348/441

(58) Field of Classification Search ......... 345/619, 345/698, 428; 348/441
See application file for complete search history.

(56) References Cited

U.S. PATENT DOCUMENTS

| | | | | |
|---|---|---|---|---|
| 4,587,620 A | * | 5/1986 | Niimi et al. ............ | 702/193 |
| 5,054,103 A | * | 10/1991 | Yasuda et al. ............ | 382/250 |
| 5,663,764 A | * | 9/1997 | Kondo et al. ............ | 375/240.14 |
| 5,727,085 A | * | 3/1998 | Toyama et al. ............ | 382/232 |
| 6,571,142 B1 | * | 5/2003 | Kondo et al. ............ | 700/90 |
| 6,900,832 B1 | * | 5/2005 | Yano ............ | 348/222.1 |
| 2003/0063216 A1 | * | 4/2003 | Kondo et al. ............ | 348/441 |
| 2004/0126022 A1 | * | 7/2004 | Kondo et al. ............ | 382/233 |

FOREIGN PATENT DOCUMENTS

| | | |
|---|---|---|
| JP | 10-301537 | 11/1998 |
| JP | 2002-196737 | 7/2002 |
| JP | 2003-052051 | 2/2003 |
| JP | 2003-198970 | 7/2003 |

* cited by examiner

*Primary Examiner*—Michelle K Lay
(74) *Attorney, Agent, or Firm*—Oblon, Spivak, McClelland, Maier & Neustadt, L.L.P.

(57) ABSTRACT

A display apparatus that displays an image includes: an image converting unit converting a photographed image signal, which is an image signal from a photographing unit that photographs an object, into a high-quality image signal of an image higher in quality than an image corresponding to the photographed image signal according to an arithmetic operation between the photographed image signal and a tap coefficient obtained by learning performed in advance; and a display control unit causing a display to display the image corresponding to the high-quality image signal in a display format determined by learning performed using an image higher in quality than the image corresponding to the high-quality image signal.

8 Claims, 58 Drawing Sheets

IMAGE PROCESSING SYSTEM

DISPLAY APPARATUS AND DISPLAY METHOD, LEARNING APPARATUS AND LEARNING METHOD, AND PROGRAMS THEREFOR

CROSS-REFERENCES TO RELATED APPLICATIONS

The present invention contains subject matter related to Japanese Patent Application JP 2006-001579 filed in the Japanese Patent Office on Jan. 6, 2006, the entire contents of which being incorporated herein by reference.

BACKGROUND OF THE INVENTION

1. Field of the Invention

The present invention relates to a display apparatus and a display method, a learning apparatus and a learning method, and programs therefor, and, more particularly to a display apparatus and a display method, a learning apparatus and a learning method, and programs therefor that make it possible to maximize performance of a system including plural apparatuses.

2. Description of the Related Art

For example, a broadcasting system that performs transmission and reception of programs includes plural apparatuses such as a camera (a video camera) that photographs an image, a transmitting apparatus that transmits an image signal outputted by the camera, a receiving apparatus that receives the image signal from the transmitting apparatus, and a display apparatus that displays an image corresponding to the image signal received by receiving apparatus.

In a system including plural apparatuses in this way, a signal is exchanged among the apparatuses. For example, in the broadcasting system, an image signal is transmitted from the camera to the transmitting apparatus and received by the transmitting apparatus. The image signal is transmitted from the transmitting apparatus to the receiving apparatus and received by the receiving apparatus. Moreover, the image signal is transmitted from the receiving apparatus to the display apparatus and received by the display apparatus.

The image signal is exchanged among the apparatuses constituting the broadcasting system as described above. In order to make it possible to exchange the image signal among the apparatuses and, even if the camera, the transmitting apparatus, the receiving apparatus, or the display apparatus constituting the broadcasting system is replaced with another camera, transmitting apparatus, receiving apparatus, or display apparatus, exchange the image signal among the apparatuses, a format of the image signal is normalized or standardized.

As the format of the image signal, there is, for example, a format called D1 (a format with Y:Cb:Cr set as 4:2:2). For example, among apparatuses that have interfaces that can input and output an image signal of the D1 format, it is possible to exchange the image signal regardless of types the apparatuses.

On the other hand, in the camera, the transmitting apparatus, the receiving apparatus, and the display apparatus, processing peculiar to the respective apparatuses is performed.

When the camera is, for example, a 1CCD camera that has one imager (a photoelectric conversion element such as one CCD (Charge Coupled Device) or CMOS (Complementary Metal Oxide Semiconductor) imager), taking into account human visual characteristics, color filters of a Bayer array is adopted. When the color filters of the Bayer array is adopted, an image signal of a format corresponding to the Bayer array (hereinafter referred to as Bayer format as appropriate) that has a large number of G components and a small number of R components and B components among RGB (Red, Green, and Blue) is obtained from the imager. The image signal of the Bayer format has only any one color component among R, G, and B as a pixel value of one pixel and does not have the other two color components. Thus, in the 1CCD camera, processing for interpolating the other two color components for each pixel and determining an image signal having all the three color components of R, G, and B as a pixel value of one pixel is performed.

In the transmitting apparatus, for example, in order to realize coexistence of so-called monochrome broadcast and color broadcast, processing for converting a component signal having a luminance signal and a color signal separately into a composite signal obtained by superimposing the color signal on the luminance signal is performed.

In the receiving apparatus, for example, so-called Y/C separation processing is applied to the composite signal and the composite signal is converted into a component signal.

In the display apparatus, for example, processing for arraying R, G, and B of an RGB component signal is performed in a display format of a display that displays an image, whereby an image is displayed. Examples of the display format for displaying the image on the display, that is, an array of R, G, and B, include a stripe array, a mosaic array, and a delta array.

A color liquid crystal display of a fixed display format such as the stripe array is disclosed in, for example, JP-A-10-301537 (in particular, paragraph 0014).

SUMMARY OF THE INVENTION

As long as the camera, the transmitting apparatus, the receiving apparatus, and the display apparatus constituting the broadcasting system have the interfaces that can input and output an image signal of the normalized or standardized signal format such as the D1 format as described above, it may not be impossible for the camera, the transmitting apparatus, the receiving apparatus, and the display apparatus to exchange the image signal. However, even if a system is constituted using plural apparatuses having such interfaces, it is not always possible to maximize performance of the system.

Various kinds of processing are performed in the respective apparatuses constituting the system. However, those kinds of processing are not performed taking into account performance of the entire system. For example, in the camera constituting the broadcasting system, processing for converting an image signal of the Bayer format having only any one of the color components of R, G, and B as a pixel value of one pixel into an image signal having all the three color components of R, G, and B as a pixel value of one pixel (hereinafter referred to as RGB image signal as appropriate) is performed. This processing affects performance of the camera itself but does not always affect improvement of performance of the entire broadcasting system.

In the camera, if the processing for converting an image signal of the Bayer format into an RGB image signal is, so to speak, enhanced processing, or, for example, if an RGB image signal having high resolution and S/N (Signal to Noise Ratio) is obtained by the processing, it can be said that performance of the camera itself is high.

On the other hand, in the broadcasting system, finally, an image is displayed in the display apparatus and a user views the image. Therefore, for example, if the user who wishes to view the image displayed on the display apparatus feels that the image is a high-quality image, it can be said that performance of the entire broadcasting system is high.

However, even if the camera itself has high performance, or, for example, the camera can output an RGB image signal having high resolution and S/N, after that, in the broadcasting system in which processing is performed by the transmitting apparatus, the receiving apparatus, and the display apparatus, an image that the user feels high in quality is not always finally displayed on the display apparatus.

It is rather likely that an image that the user feels high in quality is displayed on the display apparatus when an image signal of the Bayer format is not converted into an RGB image signal but is outputted as it is and the image signal of the Bayer format is processed in the transmitting apparatus, the receiving apparatus, or the display apparatus at a later stage.

It is desirable to make it possible to improve or, preferably, maximize performance of a system including plural apparatuses.

According to a first embodiment of the invention, there is provided a display apparatus that displays an image. The display apparatus includes: image converting means for converting a photographed image signal, which is an image signal from photographing means for photographing an object, into a high-quality image signal of an image higher in quality than an image corresponding to the photographed image signal according to an arithmetic operation between the photographed image signal and a tap coefficient obtained by learning performed in advance; and display control means for causing display means to display the image corresponding to the high-quality image signal in a display format determined by learning performed using an image higher in quality than the image corresponding to the high-quality image signal.

According to the embodiment of the invention, there is provided a display method of displaying an image or a program for causing a computer to execute display processing for displaying an image. The display method or the display processing includes the steps of: converting a photographed image signal, which is an image signal from photographing means for photographing an object, into a high-quality image signal of an image higher in quality than an image corresponding to the photographed image signal according to an arithmetic operation between the photographed image signal and a tap coefficient obtained by learning performed in advance; and causing display means to display the image corresponding to the high-quality image signal in a display format determined by learning performed using an image higher in quality than the image corresponding to the high-quality image signal.

In the display apparatus, the display method, and the program according to the embodiment, a photographed image signal, which is an image signal from the photographing means for photographing an object, is converted into a high-quality image signal of an image higher in quality than an image corresponding to the photographed image signal according to an arithmetic operation between the photographed image signal and a tap coefficient obtained by learning performed in advance. The image corresponding to the high-quality image signal is displayed on the display means in a display format determined by learning performed using an image higher in quality than the image corresponding to the high-quality image signal.

According to another embodiment of the invention, there is provided a learning apparatus that performs learning for determining a tap coefficient used for performing image conversion processing for converting a photographed image signal, which is an image signal from photographing means for photographing an object, into a high-quality image signal of an image higher in quality than an image corresponding to the photographed image signal according to an arithmetic operation between the photographed image signal and the tap coefficient, the tap coefficient being obtained by learning performed in advance. The learning apparatus includes: determining means for determining a signal format of the photographed image signal, a display format for displaying the image corresponding to the high-quality image signal obtained by the image conversion processing applied to the photographed image signal, and the tap coefficient; pseudo-photographed-image-signal generating means for generating, from an image signal of an image higher in quality than the image corresponding to the high-quality image signal, a pseudo photographed image signal equivalent to the photographed image signal of the signal format determined by the determining means; image converting means for converting the pseudo photographed image signal into the high-quality image signal according to an arithmetic operation between the pseudo photographed image signal and the tap coefficient determined by the determining means; display control means for causing display means to display the image corresponding to the high-quality image signal obtained by the image converting means in the display format determined by the determining means; photo-detecting means for detecting light serving as a display image, which is the image displayed on the display means, and outputting a display image signal that is an electric signal corresponding to the light; and evaluating means for evaluating the display image signal. The determining means repeats the following to determine the tap coefficient used for performing the image conversion processing and determine a signal format of the photographed image signal to be subjected to the image conversion processing performed using the tap coefficient and a display format for displaying the image corresponding to the high-quality image signal obtained by the image conversion processing applied to the photographed image signal of the signal format: the determining means determines plural signal formats and, for each of the plural signal formats, the pseudo-photographed-image-signal generating means generates the pseudo photographed image signal, the image converting means converts the pseudo photographed image signal into the high-quality image signal according to an arithmetic operation between the pseudo photographed image signal and the tap coefficient determined by the determining means, the display control means causes the display means to display the image corresponding to the high-quality image signal in the display format determined by the determining means, the photo-detecting means detects light serving as the display image and outputs a display image signal that is an electric signal corresponding to the light, and the evaluating means evaluates the display image signal, whereby the determining means determines a signal format in which evaluation of the display image signal is the highest out of the plural signal formats; the determining means determines plural display formats, the pseudo-photographed-image-signal generating means generates the pseudo photographed image signal of the signal format determined by the determining means, and the image converting means converts the pseudo photographed image signal into the high-quality image signal according to an arithmetic operation between the pseudo photographed image signal and the tap coefficient determined by the determining means and, for each of the plural display formats, the display control means causes the display means to display the image corresponding to the high-quality image signal in the display format determined by the determining means, the photo-detecting means detects light serving as the display image and outputs a display image signal that is an electric signal corresponding to the light, and the evaluating means evaluates the display image signal, whereby the determining means determines a display format in which evaluation of the display image signal is the highest out of the plural display formats; and the determining means determines plural tap coefficients and the pseudo-photographed-image-signal generating means generates the pseudo photographed image signal of the signal format determined by the determining means and, for each of the plural tap coefficients, the image converting means converts the pseudo photographed image signal into the high-quality image signal, the display control means causes the display means to display the image corresponding to the high-quality image signal in the display format determined by the determining means, the photo-detecting means detects light serving as the display image and outputs a display image signal that is an electric signal corresponding to the light, and the evaluating means evaluates the display image signal, whereby the determining means determines a tap coefficient with which evaluation of the display image signal is the highest out of the plural tap coefficients.

According to the embodiment of the invention, there is provided a learning method for a learning apparatus that performs learning for determining a tap coefficient used for performing image conversion processing for converting a photographed image signal, which is an image signal from photographing means for photographing an object, into a high-quality image signal of an image higher in quality than an image corresponding to the photographed image signal according to an arithmetic operation between the photographed image signal and the tap coefficient, the tap coefficient being obtained by learning performed in advance. The learning apparatus includes: determining means for determining a signal format of the photographed image signal, a display format for displaying the image corresponding to the high-quality image signal obtained by the image conversion processing applied to the photographed image signal, and the tap coefficient; pseudo-photographed-image-signal generating means for generating, from an image signal of an image higher in quality than the image corresponding to the high-quality image signal, a pseudo photographed image signal equivalent to the photographed image signal of the signal format determined by the determining means; image converting means for converting the pseudo photographed image signal into the high-quality image signal according to an arithmetic operation between the pseudo photographed image signal and the tap coefficient determined by the determining means; display control means for causing display means to display the image corresponding to the high-quality image signal obtained by the image converting means in the display format determined by the determining means; photo-detecting means for detecting light serving as a display image, which is the image displayed on the display means, and outputting a display image signal that is an electric signal corresponding to the light; and evaluating means for evaluating the display image signal. The learning method includes a step in which the determining means repeats the following to determine the tap coefficient used for performing the image conversion processing and determine a signal format of the photographed image signal to be subjected to the image conversion processing performed using the tap coefficient and a display format for displaying the image corresponding to the high-quality image signal obtained by the image conversion processing applied to the photographed image signal of the signal format: the determining means determines plural signal formats and, for each of the plural signal formats, the pseudo-photographed-image-signal generating means generates the pseudo photographed image signal, the image converting means converts the pseudo photographed image signal into the high-quality image signal according to an arithmetic operation between the pseudo photographed image signal and the tap coefficient determined by the determining means, the display control means causes the display means to display the image corresponding to the high-quality image signal in the display format determined by the determining means, the photo-detecting means detects light serving as the display image and outputs a display image signal that is an electric signal corresponding to the light, and the evaluating means evaluates the display image signal, whereby the determining means determines a signal format in which evaluation of the display image signal is the highest out of the plural signal formats; the determining means determines plural display formats, the pseudo-photographed-image-signal generating means generates the pseudo photographed image signal of the signal format determined by the determining means, and the image converting means converts the pseudo photographed image signal into the high-quality image signal according to an arithmetic operation between the pseudo photographed image signal and the tap coefficient determined by the determining means and, for each of the plural display formats, the display control means causes the display means to display the image corresponding to the high-quality image signal in the display format determined by the determining means, the photo-detecting means detects light serving as the display image and outputs a display image signal that is an electric signal corresponding to the light, and the evaluating means evaluates the display image signal, whereby the determining means determines a display format in which evaluation of the display image signal is the highest out of the plural display formats; and the determining means determines plural tap coefficients and the pseudo-photographed-image-signal generating means generates the pseudo photographed image signal of the signal format determined by the determining means and, for each of the plural tap coefficients, the image converting means converts the pseudo photographed image signal into the high-quality image signal, the display control means causes the display means to display the image corresponding to the high-quality image signal in the display format determined by the determining means, the photo-detecting means detects light serving as the display image and outputs a display image signal that is an electric signal corresponding to the light, and the evaluating means evaluates the display image signal, whereby the determining means determines a tap coefficient with which evaluation of the display image signal is the highest out of the plural tap coefficients.

According to the embodiment of the invention, there is provided a program that causes a computer to execute learning processing for determining a tap coefficient used for performing image conversion processing for converting a photographed image signal, which is an image signal from photographing means for photographing an object, into a high-quality image signal of an image higher in quality than an image corresponding to the photographed image signal according to an arithmetic operation between the photographed image signal and the tap coefficient, the tap coefficient being obtained by learning performed in advance. The program causes the computer to function as: determining means for determining a signal format of the photographed image signal, a display format for displaying the image corresponding to the high-quality image signal obtained by the image conversion processing applied to the photographed image signal, and the tap coefficient; pseudo-photographed-image-signal generating means for generating, from an image signal of an image higher in quality than the image corresponding to the high-quality image signal, a pseudo photographed image signal equivalent to the photographed image signal of the signal format determined by the determining means; image converting means for converting the pseudo photographed image signal into the high-quality image signal according to an arithmetic operation between the pseudo photographed image signal and the tap coefficient determined by the determining means; display control means for causing display means to display the image corresponding to the high-quality image signal obtained by the image converting means in the display format determined by the determining means; and evaluating means for evaluating the display image signal outputted by photo-detecting means for detecting light serving as a display image, which is the image displayed on the display means, and outputting a display image signal that is an electric signal corresponding to the light. The program causes the computer to execute learning processing including a step in which the determining means repeats the following to determine the tap coefficient used for performing the image conversion processing and determine a signal format of the photographed image signal to be subjected to the image conversion processing performed using the tap coefficient and a display format for displaying the image corresponding to the high-quality image signal obtained by the image conversion processing applied to the photographed image signal of the signal format: the determining means determines plural signal formats and, for each of the plural signal formats, the pseudo-photographed-image-signal generating means generates the pseudo photographed image signal, the image converting means converts the pseudo photographed image signal into the high-quality image signal according to an arithmetic operation between the pseudo photographed image signal and the tap coefficient determined by the determining means, the display control means causes the display means to display the image corresponding to the high-quality image signal in the display format determined by the determining means, and the evaluating means evaluates the display image signal that is an electric signal corresponding to light serving as the display image outputted by the photo-detecting means, whereby the determining means determines a signal format in which evaluation of the display image signal is the highest out of the plural signal formats; the determining means determines plural display formats, the pseudo-photographed-image-signal generating means generates the pseudo photographed image signal of the signal format determined by the determining means, and the image converting means converts the pseudo photographed image signal into the high-quality image signal according to an arithmetic operation between the pseudo photographed image signal and the tap coefficient determined by the determining means and, for each of the plural display formats, the display control means causes the display means to display the image corresponding to the high-quality image signal in the display format determined by the determining means, and the evaluating means evaluates the display image signal that is an electric signal corresponding to light serving as the display image outputted by the photo-detecting means, whereby the determining means determines a display format in which evaluation of the display image signal is the highest out of the plural display formats; and the determining means determines plural tap coefficients and the pseudo-photographed-image-signal generating means generates the pseudo photographed image signal of the signal format determined by the determining means and, for each of the plural tap coefficients, the image converting means converts the pseudo photographed image signal into the high-quality image signal, the display control means causes the display means to display the image corresponding to the high-quality image signal in the display format determined by the determining means, and the evaluating means evaluates the display image signal that is an electric signal corresponding to light serving as the display image outputted by the photo-detecting means, whereby the determining means determines a tap coefficient with which evaluation of the display image signal is the highest out of the plural tap coefficients.

In the display apparatus, the display method, or the program according to the embodiment, the following is repeated: first, the determining means determines plural signal formats and, for each of the plural signal formats, the pseudo-photographed-image-signal generating means generates the pseudo photographed image signal, the image converting means converts the pseudo photographed image signal into the high-quality image signal according to an arithmetic operation between the pseudo photographed image signal and the tap coefficient determined by the determining means, the display control means causes the display means to display the image corresponding to the high-quality image signal in the display format determined by the determining means, and the evaluating means evaluates the display image signal that is an electric signal corresponding to light serving as the display image, whereby the determining means determines a signal format in which evaluation of the display image signal is the highest out of the plural signal formats; second, the determining means determines plural display formats, the pseudo-photographed-image-signal generating means generates the pseudo photographed image signal of the signal format determined by the determining means, and the image converting means converts the pseudo photographed image signal into the high-quality image signal according to an arithmetic operation between the pseudo photographed image signal and the tap coefficient determined by the determining means and, for each of the plural display formats, the display control means causes the display means to display the image corresponding to the high-quality image signal in the display format determined by the determining means, and the evaluating means evaluates the display image signal that is an electric signal corresponding to light serving as the display image, whereby the determining means determines a display format in which evaluation of the display image signal is the highest out of the plural display formats; and, third, the determining means determines plural tap coefficients and the pseudo-photographed-image-signal generating means generates the pseudo photographed image signal of the signal format determined by the determining means and, for each of the plural tap coefficients, the image converting means converts the pseudo photographed image signal into the high-quality image signal, the display control means causes the display means to display the image corresponding to the high-quality image signal in the display format determined by the determining means, and the evaluating means evaluates the display image signal that is an electric signal corresponding to light serving as the display image, whereby the determining means determines a tap coefficient with which evaluation of the display image signal is the highest out of the plural tap coefficients. According to the repetition, a signal format of the photographed image signal to be subjected to the image conversion processing performed using the tap coefficient is determined and a display format for displaying the image corresponding to the high-quality image signal obtained by the image conversion processing applied to the photographed image signal of the signal format is determined.

According to still another embodiment of the invention, there is provided a display apparatus that displays an image. The display apparatus includes: determining means for determining whether an image corresponding to a photographed image signal, which is an image signal from photographing means for photographing an object, should be enlarged; pre-processing means for applying pre-processing to the photographed image signal; image converting means for converting, when it is determined by the determining means that the image should be enlarged, the photographed image signal subjected to the pre-processing into a high-quality image signal of an image higher in quality than the image corresponding to the photographed image signal, which is an image obtained by enlarging the image corresponding to the photographed image signal, according to an arithmetic operation between the photographed image signal and a tap coefficient obtained by learning performed in advance; and display control means for causing the display means to display the image corresponding to the high-quality image signal in a display format determined according to learning performed using an image higher in quality than the image corresponding to the high-quality image signal.

According to the embodiment of the invention, there is provided a display method of displaying an image or a program for causing a computer to execute display processing for displaying an image. The display method or the display processing includes the steps of: determining whether an image corresponding to a photographed image signal, which is an image signal from photographing means for photographing an object, should be enlarged; applying pre-processing to the photographed image signal; converting, when it is determined that the image should be enlarged, the photographed image signal subjected to the pre-processing into a high-quality image signal of an image higher in quality than the image corresponding to the photographed image signal, which is an image obtained by enlarging the image corresponding to the photographed image signal, according to an arithmetic operation between the photographed image signal and a tap coefficient obtained by learning performed in advance; and causing display means to display the image corresponding to the high-quality image signal in a display format determined according to learning performed using an image higher in quality than the image corresponding to the high-quality image signal.

In the display apparatus, the display method, or the program according to the embodiment, it is determined whether an image corresponding to a photographed image signal, which is an image signal from photographing means for photographing an object, should be enlarged. Pre-processing is applied to the photographed image signal and, when it is determined that the image should be enlarged, the photographed image signal subjected to the pre-processing is converted into a high-quality image signal of an image higher in quality than the image corresponding to the photographed image signal, which is an image obtained by enlarging the image corresponding to the photographed image signal. The image corresponding to the high-quality image signal is displayed on the display means in a display format determined according to learning performed using an image higher in quality than the image corresponding to the high-quality image signal.

According to the embodiments of the invention described above, it is possible to improve performance of the system.

DESCRIPTION OF THE PREFERRED EMBODIMENTS

Figure 1:
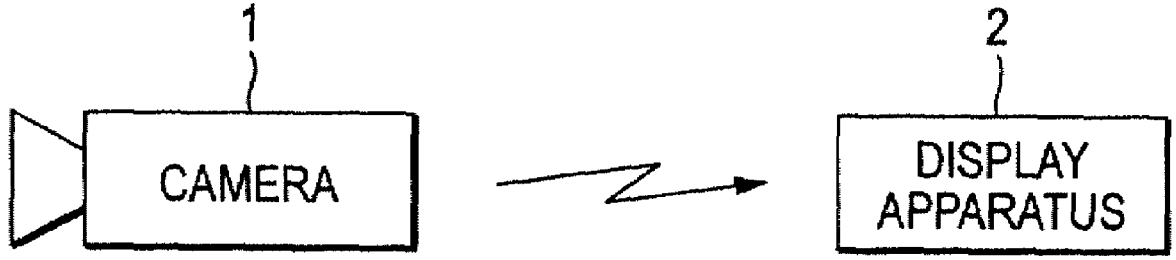
FIG. 1 is a block diagram showing a first example of a structure of an image processing system that performs processing of an image.

Embodiments of the invention will be hereinafter explained. An example of a correspondence relation between elements of the invention and embodiments described or shown in the specification or the drawings is as described below. This description is a description for confirming that the embodiments supporting the invention are described or shown in the specification or the drawings. Therefore, even if there is an embodiment described or shown in the specification or the drawings but not described here as an embodiment corresponding to an element of the invention, this does not means that the embodiment does not correspond to the element. On the other hand, even if an embodiment is described here as an embodiment corresponding to an element, this does not means that the embodiment does not correspond to elements other than the element.

A display apparatus according to a first embodiment of the invention is a display apparatus (e.g., a display apparatus 2 in FIG. 2) that displays an image. The display apparatus includes: image converting means (e.g., an image converting unit 11 in FIG. 2) for converting a photographed image signal, which is an image signal from photographing means for photographing an object, into a high-quality image signal of an image higher in quality than an image corresponding to the photographed image signal according to an arithmetic operation between the photographed image signal and a tap coefficient obtained by learning performed in advance; and display control means (e.g., a display control unit 12 in FIG. 2) for causing display means to display the image corresponding to the high-quality image signal in a display format determined by learning performed using an image higher in quality than the image corresponding to the high-quality image signal.

In the display apparatus according to the embodiment, the image converting means includes: prediction tap extracting means (e.g., a tap extracting unit 41 in FIG. 4) for extracting, from the photographed image signal, prediction taps that are pixel values of plural pixels used for predicting a pixel value of a pixel of interest of the high-quality image signal; class tap extracting means (e.g., a tap extracting unit 42 in FIG. 4) for extracting, from the photographed image signal, class taps that are pixel values of plural pixels used for classification for classifying the pixel of interest into any one of plural classes; classifying means (e.g., a classifying unit 43 in FIG. 4) for performing classification of the pixel of interest on the basis of the class tap; coefficient outputting means (e.g., a coefficient memory 44 in FIG. 4) for outputting a tap coefficient of a class of the pixel of interest out of tap coefficients for the respective plural classes determined by learning in advance; and calculating means (e.g., a predicting unit 45 in FIG. 4) for calculating a pixel value of the pixel of interest according to prediction arithmetic operation in which the tap coefficient of the class of the pixel of interest and the prediction tap are used.

The display apparatus according to the embodiment further includes format acquiring means (e.g., a signal-format detecting unit 114 in FIG. 25) for acquiring a signal format of the photographed image signal. The image converting means converts the photographed image signal into the high-quality image signal according to an arithmetic operation between the photographed image signal and a tap coefficient for the signal format of the photographed image signal among the tap coefficients for the respective plural signal formats.

A display method or a program according to the embodiment is a display method of displaying an image or a program for causing a computer to execute display processing for displaying an image. The display method or the display processing includes the steps of: converting a photographed image signal, which is an image signal from photographing means for photographing an object, into a high-quality image signal of an image higher in quality than an image corresponding to the photographed image signal according to an arithmetic operation between the photographed image signal and a tap coefficient obtained by learning performed in advance (e.g., step S1 in FIG. 3); and causing display means to display the image corresponding to the high-quality image signal in a display format determined by learning performed using an image higher in quality than the image corresponding to the high-quality image signal (e.g., step S2 in FIG. 3).

A learning apparatus according to another embodiment of the invention is a learning apparatus (e.g., a learning apparatus in FIG. 9) that performs learning for determining a tap coefficient used for performing image conversion processing for converting a photographed image signal, which is an image signal from photographing means for photographing an object, into a high-quality image signal of an image higher in quality than an image corresponding to the photographed image signal according to an arithmetic operation between the photographed image signal and the tap coefficient, the tap coefficient being obtained by learning performed in advance. The learning apparatus includes: determining means (e.g., a control unit 72 in FIG. 9) for determining a signal format of the photographed image signal, a display format for displaying the image corresponding to the high-quality image signal obtained by the image conversion processing applied to the photographed image signal, and the tap coefficient; pseudo-photographed-image-signal generating means (e.g., a pseudo-photographed-image generating unit 62 in FIG. 9) for generating, from an image signal of an image higher in quality than the image corresponding to the high-quality image signal, a pseudo photographed image signal equivalent to the photographed image signal of the signal format determined by the determining means; image converting means (e.g., an image converting unit 73 in FIG. 9) for converting the pseudo photographed image signal into the high-quality image signal according to an arithmetic operation between the pseudo photographed image signal and the tap coefficient determined by the determining means; display control means (e.g., a display control unit 68 in FIG. 9) for causing display means to display the image corresponding to the high-quality image signal obtained by the image converting means in the display format determined by the determining means; photo-detecting means (e.g., a photo-detector 70 in FIG. 9) for detecting light serving as a display image, which is the image displayed on the display means, and outputting a display image signal that is an electric signal corresponding to the light; and evaluating means (e.g., an evaluation-value calculating unit 71 in FIG. 9) for evaluating the display image signal. The determining means repeats the following to determine the tap coefficient used for performing the image conversion processing and determine a signal format of the photographed image signal to be subjected to the image conversion processing performed using the tap coefficient and a display format for displaying the image corresponding to the high-quality image signal obtained by the image conversion processing applied to the photographed image signal of the signal format: the determining means determines plural signal formats and, for each of the plural signal formats, the pseudo-photographed-image-signal generating means generates the pseudo photographed image signal, the image converting means converts the pseudo photographed image signal into the high-quality image signal according to an arithmetic operation between the pseudo photographed image signal and the tap coefficient determined by the determining means, the display control means causes the display means to display the image corresponding to the high-quality image signal in the display format determined by the determining means, the photo-detecting means detects light serving as the display image and outputs a display image signal that is an electric signal corresponding to the light, and the evaluating means evaluates the display image signal, whereby the determining means determines a signal format in which evaluation of the display image signal is the highest out of the plural signal formats; the determining means determines plural display formats, the pseudo-photographed-image-signal generating means generates the pseudo photographed image signal of the signal format determined by the determining means, and the image converting means converts the pseudo photographed image signal into the high-quality image signal according to an arithmetic operation between the pseudo photographed image signal and the tap coefficient determined by the determining means and, for each of the plural display formats, the display control means causes the display means to display the image corresponding to the high-quality image signal in the display format determined by the determining means, the photo-detecting means detects light serving as the display image and outputs a display image signal that is an electric signal corresponding to the light, and the evaluating means evaluates the display image signal, whereby the determining means determines a display format in which evaluation of the display image signal is the highest out of the plural display formats; and the determining means determines plural tap coefficients and the pseudo-photographed-image-signal generating means generates the pseudo photographed image signal of the signal format determined by the determining means and, for each of the plural tap coefficients, the image converting means converts the pseudo photographed image signal into the high-quality image signal, the display control means causes the display means to display the image corresponding to the high-quality image signal in the display format determined by the determining means, the photo-detecting means detects light serving as the display image and outputs a display image signal that is an electric signal corresponding to the light, and the evaluating means evaluates the display image signal, whereby the determining means determines a tap coefficient with which evaluation of the display image signal is the highest out of the plural tap coefficients.

In the learning apparatus according to the embodiment, the image converting means includes: prediction tap extracting means (e.g., a tap extracting unit 63 in FIG. 9) for extracting, from the photographed image signal, prediction taps that are pixel values of plural pixels used for predicting a pixel value of a pixel of interest of the high-quality image signal; class tap extracting means (e.g., a tap extracting unit 64 in FIG. 9) for extracting, from the photographed image signal, class taps that are pixel values of plural pixels used for classification for classifying the pixel of interest into any one of plural classes; classifying means (e.g., a classifying unit 65 in FIG. 9) for performing classification of the pixel of interest on the basis of the class tap; coefficient outputting means (e.g., a coefficient memory 66 in FIG. 9) for outputting a tap coefficient of a class of the pixel of interest out of tap coefficients for the respective plural classes determined by the determining means; and calculating means (e.g., a predicting unit 67 in FIG. 9) for calculating a pixel value of the pixel of interest according to prediction arithmetic operation in which the tap coefficient of the class of the pixel of interest and the prediction tap are used.

A learning method according to the embodiment is a learning method for a learning apparatus (e.g., the learning apparatus in FIG. 9) that performs learning for determining a tap coefficient used for performing image conversion processing for converting a photographed image signal, which is an image signal from photographing means for photographing an object, into a high-quality image signal of an image higher in quality than an image corresponding to the photographed image signal according to an arithmetic operation between the photographed image signal and the tap coefficient, the tap coefficient being obtained by learning performed in advance. The learning apparatus includes: determining means (e.g., the control unit 72 in FIG. 9) for determining a signal format of the photographed image signal, a display format for displaying the image corresponding to the high-quality image signal obtained by the image conversion processing applied to the photographed image signal, and the tap coefficient; pseudo-photographed-image-signal generating means (e.g., the pseudo-photographed-image generating unit 62 in FIG. 9) for generating, from an image signal of an image higher in quality than the image corresponding to the high-quality image signal, a pseudo photographed image signal equivalent to the photographed image signal of the signal format determined by the determining means; image converting means (e.g., the image converting unit 73 in FIG. 9) for converting the pseudo photographed image signal into the high-quality image signal according to an arithmetic operation between the pseudo photographed image signal and the tap coefficient determined by the determining means; display control means (e.g., the display control unit 68 in FIG. 9) for causing display means to display the image corresponding to the high-quality image signal obtained by the image converting means in the display format determined by the determining means; photo-detecting means (e.g., the photo-detector 70 in FIG. 9) for detecting light serving as a display image, which is the image displayed on the display means, and outputting a display image signal that is an electric signal corresponding to the light; and evaluating means (e.g., the evaluation-value calculating unit 71 in FIG. 9) for evaluating the display image signal. The learning method includes a step in which the determining means repeats the following to determine the tap coefficient used for performing the image conversion processing and determine a signal format of the photographed image signal to be subjected to the image conversion processing performed using the tap coefficient and a display format for displaying the image corresponding to the high-quality image signal obtained by the image conversion processing applied to the photographed image signal of the signal format: the determining means determines plural signal formats (e.g., step S71 in FIG. 21) and, for each of the plural signal formats, the pseudo-photographed-image-signal generating means generates the pseudo photographed image signal (e.g., step S73 in FIG. 21), the image converting means converts the pseudo photographed image signal into the high-quality image signal according to an arithmetic operation between the pseudo photographed image signal and the tap coefficient determined by the determining means (e.g., step S74 in FIG. 21), the display control means causes the display means to display the image corresponding to the high-quality image signal in the display format determined by the determining means (e.g., step S75 in FIG. 21), the photo-detecting means detects light serving as the display image and outputs a display image signal that is an electric signal corresponding to the light (e.g., step S76 in FIG. 21), and the evaluating means evaluates the display image signal (e.g., step S77 in FIG. 21), whereby the determining means determines a signal format in which evaluation of the display image signal is the highest out of the plural signal formats (e.g., step S79 in FIG. 21); the determining means determines plural display formats (e.g., step S91 in FIG. 22), the pseudo-photographed-image-signal generating means generates the pseudo photographed image signal of the signal format determined by the determining means (e.g., step S92 in FIG. 22), and the image converting means converts the pseudo photographed image signal into the high-quality image signal according to an arithmetic operation between the pseudo photographed image signal and the tap coefficient determined by the determining means (e.g., step S93 in FIG. 22) and, for each of the plural display formats, the display control means causes the display means to display the image corresponding to the high-quality image signal in the display format determined by the determining means (e.g., step S95 in FIG. 22), the photo-detecting means detects light serving as the display image and outputs a display image signal that is an electric signal corresponding to the light (e.g., step S96 in FIG. 22), and the evaluating means evaluates the display image signal (e.g., step S97 in FIG. 22), whereby the determining means determines a display format in which evaluation of the display image signal is the highest out of the plural display formats (e.g., step S99 in FIG. 22); and the determining means determines plural tap coefficients (e.g., step S111 in FIG. 23) and the pseudo-photographed-image-signal generating means generates the pseudo photographed image signal of the signal format determined by the determining means (e.g., step S112 in FIG. 23) and, for each of the plural tap coefficients, the image converting means converts the pseudo photographed image signal into the high-quality image signal (e.g., step S114 in FIG. 23), the display control means causes the display means to display the image corresponding to the high-quality image signal in the display format determined by the determining means (e.g., step S115 in FIG. 23), the photo-detecting means detects light serving as the display image and outputs a display image signal that is an electric signal corresponding to the light (e.g., step S116 in FIG. 23), and the evaluating means evaluates the display image signal (e.g., step S117 in FIG. 23), whereby the determining means determines a tap coefficient with which evaluation of the display image signal is the highest out of the plural tap coefficients (e.g., step S119 in FIG. 23).

A program according to the embodiment is a program that causes a computer to execute learning processing for determining a tap coefficient used for performing image conversion processing for converting a photographed image signal, which is an image signal from photographing means for photographing an object, into a high-quality image signal of an image higher in quality than an image corresponding to the photographed image signal according to an arithmetic operation between the photographed image signal and the tap coefficient, the tap coefficient being obtained by learning performed in advance. The program causes the computer to function as: determining means (e.g., the control unit 72 in FIG. 9) for determining a signal format of the photographed image signal, a display format for displaying the image corresponding to the high-quality image signal obtained by the image conversion processing applied to the photographed image signal, and the tap coefficient; pseudo-photographed-image-signal generating means (e.g., the pseudo-photographed-image generating unit 62 in FIG. 9) for generating, from an image signal of an image higher in quality than the image corresponding to the high-quality image signal, a pseudo photographed image signal equivalent to the photographed image signal of the signal format determined by the determining means; image converting means (e.g., the image converting unit 73 in FIG. 9) for converting the pseudo photographed image signal into the high-quality image signal according to an arithmetic operation between the pseudo photographed image signal and the tap coefficient determined by the determining means; display control means (e.g., the display control unit 68 in FIG. 9) for causing display means to display the image corresponding to the high-quality image signal obtained by the image converting means in the display format determined by the determining means; and evaluating means (e.g., the evaluation-value calculating unit 71 in FIG. 9) for evaluating the display image signal outputted by photo-detecting means (e.g., the photo-detector 70 in FIG. 9) for detecting light serving as a display image, which is the image displayed on the display means, and outputting a display image signal that is an electric signal corresponding to the light. The program causes the computer to execute learning processing including a step in which the determining means repeats the following to determine the tap coefficient used for performing the image conversion processing and determine a signal format of the photographed image signal to be subjected to the image conversion processing performed using the tap coefficient and a display format for displaying the image corresponding to the high-quality image signal obtained by the image conversion processing applied to the photographed image signal of the signal format: the determining means determines plural signal formats (e.g., step S71 in FIG. 21) and, for each of the plural signal formats, the pseudo-photographed-image-signal generating means generates the pseudo photographed image signal (e.g., step S73 in FIG. 21), the image converting means converts the pseudo photographed image signal into the high-quality image signal according to an arithmetic operation between the pseudo photographed image signal and the tap coefficient determined by the determining means (e.g., step S74 in FIG. 21), the display control means causes the display means to display the image corresponding to the high-quality image signal in the display format determined by the determining means (e.g., step S75 in FIG. 21), and the evaluating means evaluates the display image signal that is an electric signal corresponding to light serving as the display image outputted by the photo-detecting means (e.g., step S77 in FIG. 21), whereby the determining means determines a signal format in which evaluation of the display image signal is the highest out of the plural signal formats (e.g., step S79 in FIG. 21); the determining means determines plural display formats (e.g., step S91 in FIG. 22), the pseudo-photographed-image-signal generating means generates the pseudo photographed image signal of the signal format determined by the determining means (e.g., step S92 in FIG. 22), and the image converting means converts the pseudo photographed image signal into the high-quality image signal according to an arithmetic operation between the pseudo photographed image signal and the tap coefficient determined by the determining means (e.g., step S93 in FIG. 22) and, for each of the plural display formats, the display control means causes the display means to display the image corresponding to the high-quality image signal in the display format determined by the determining means (e.g., step S95 in FIG. 22), and the evaluating means evaluates the display image signal that is an electric signal corresponding to light serving as the display image outputted by the photo-detecting means (e.g., step S97 in FIG. 22), whereby the determining means determines a display format in which evaluation of the display image signal is the highest out of the plural display formats (e.g., step S99 in FIG. 22); and the determining means determines plural tap coefficients (e.g., step S111 in FIG. 23) and the pseudo-photographed-image-signal generating means generates the pseudo photographed image signal of the signal format determined by the determining means (e.g., step S112 in FIG. 23) and, for each of the plural tap coefficients, the image converting means converts the pseudo photographed image signal into the high-quality image signal (e.g., step S114 in FIG. 23), the display control means causes the display means to display the image corresponding to the high-quality image signal in the display format determined by the determining means (e.g., step S115 in FIG. 23), and the evaluating means evaluates the display image signal that is an electric signal corresponding to light serving as the display image outputted by the photo-detecting means (e.g., step S117 in FIG. 23), whereby the determining means determines a tap coefficient with which evaluation of the display image signal is the highest out of the plural tap coefficients (e.g., step S119 in FIG. 23).

A display apparatus according to still another embodiment of the invention is a display apparatus (e.g., a display apparatus 402 in FIG. 45) that displays an image. The display apparatus includes: determining means (e.g., a control unit 417 in FIG. 46) for determining whether an image corresponding to a photographed image signal, which is an image signal from photographing means for photographing an object, should be enlarged; pre-processing means (e.g., a pre-processing unit 411 in FIG. 46) for applying pre-processing to the photographed image signal; image converting means (e.g., an image converting unit 413 in FIG. 46) for converting, when it is determined by the determining means that the image should be enlarged, the photographed image signal subjected to the pre-processing into a high-quality image signal of an image higher in quality than the image corresponding to the photographed image signal, which is an image obtained by enlarging the image corresponding to the photographed image signal, according to an arithmetic operation between the photographed image signal and a tap coefficient obtained by learning performed in advance; and display control means (e.g., a display control unit 414 in FIG. 46) for causing the display means to display the image corresponding to the high-quality image signal in a display format determined according to learning performed using an image higher in quality than the image corresponding to the high-quality image signal.

In the display apparatus according to the embodiment, the image converting means includes: prediction tap extracting means (e.g., the tap extracting unit 41 in FIG. 48) for extracting, from the photographed image signal, prediction taps that are pixel values of plural pixels used for predicting a pixel value of a pixel of interest of the high-quality image signal; class tap extracting means (e.g., the tap extracting unit 42 in FIG. 48) for extracting, from the photographed image signal, class taps that are pixel values of plural pixels used for classification for classifying the pixel of interest into any one of plural classes; classifying means (e.g., the classifying unit 43 in FIG. 48) for performing classification of the pixel of interest on the basis of the class tap; coefficient outputting means (e.g., a coefficient memory 431 in FIG. 48) for outputting a tap coefficient of a class of the pixel of interest out of tap coefficients for the respective plural classes determined by learning in advance; and calculating means (e.g., the predicting unit 45 in FIG. 48) for calculating a pixel value of the pixel of interest according to prediction arithmetic operation in which the tap coefficient of the class of the pixel of interest and the prediction tap are used.

In the display apparatus according to the embodiment the pre-processing means includes: pre-processing tap extracting means (e.g., a pre-processing-tap extracting unit 421 in FIG. 47) for extracting, from the photographed image signal, preprocessing taps that are pixel values of plural pixels used for calculating a pixel value of a pixel of interest according to the pre-processing; and pre-processing arithmetic operation means (e.g., a pre-processing arithmetic operation unit 422 in FIG. 47) for calculating a pixel value of the pixel of interest according to an arithmetic operation in which a pre-processing coefficient used for an arithmetic operation serving as the pre-processing and the pre-processing tap are used.

A display method or a program according to the embodiment is a display method of displaying an image or a program for causing a computer to execute display processing for displaying an image. The display method or the display processing includes the steps of: determining whether an image corresponding to a photographed image signal, which is an image signal from photographing means for photographing an object, should be enlarged (e.g., step S401 in FIG. 49); applying pre-processing to the photographed image signal (e.g., step S404 in FIG. 49); converting, when it is determined that the image should be enlarged, the photographed image signal subjected to the pre-processing into a high-quality image signal of an image higher in quality than the image corresponding to the photographed image signal, which is an image obtained by enlarging the image corresponding to the photographed image signal, according to an arithmetic operation between the photographed image signal and a tap coefficient obtained by learning performed in advance (e.g., step S405 in FIG. 49); and causing display means to display the image corresponding to the high-quality image signal in a display format determined according to learning performed using an image higher in quality than the image corresponding to the high-quality image signal (e.g., step S406 in FIG. 49).

Embodiments of the invention will be hereinafter explained with reference to the accompanying drawings.

FIG. 1 is a diagram showing a first example of a structure of an image processing system (a system means a logical collection of plural apparatuses regardless of whether apparatuses of respective structures are provided in an identical housing) that processing an image.

In FIG. 1, the image processing system includes a camera (a video camera) 1 and a display apparatus 2.

The camera 1 photographs an object (a subject) and outputs a photographed image signal that is an image signal obtained by the photographing. The display apparatus 2 receives the photographed image signal outputted by the camera 1, converts the photographed image signal into a high-quality image signal that is an image signal of an image higher in quality than an image corresponding to the photographed image signal, and displays an image corresponding to the high-quality image signal.

The camera 1 is, for example, a 1CCD camera and outputs a photographed image signal of a signal format determined by learning described later.

When the signal format of the photographed image signal determined by learning is, for example, a Bayer format, color filters of a Bayer array are adopted in the camera 1. The camera 1 directly outputs a photographed image signal of the Bayer format obtained by the color filters of the Bayer array without changing the photographed image signal into an RGB image signal.

The photographed image signal outputted by the camera 1 is, for example, an SD (Standard Definition) image signal that is a standard resolution image signal. A high-quality image signal obtained by converting the SD image signal is an HD (High Definition) image signal that is a high resolution image signal. An image corresponding to the SD image signal is also referred to as an SD image and an image corresponding to the HD image signal is also referred to as an HD image as appropriate.

Figure 2:
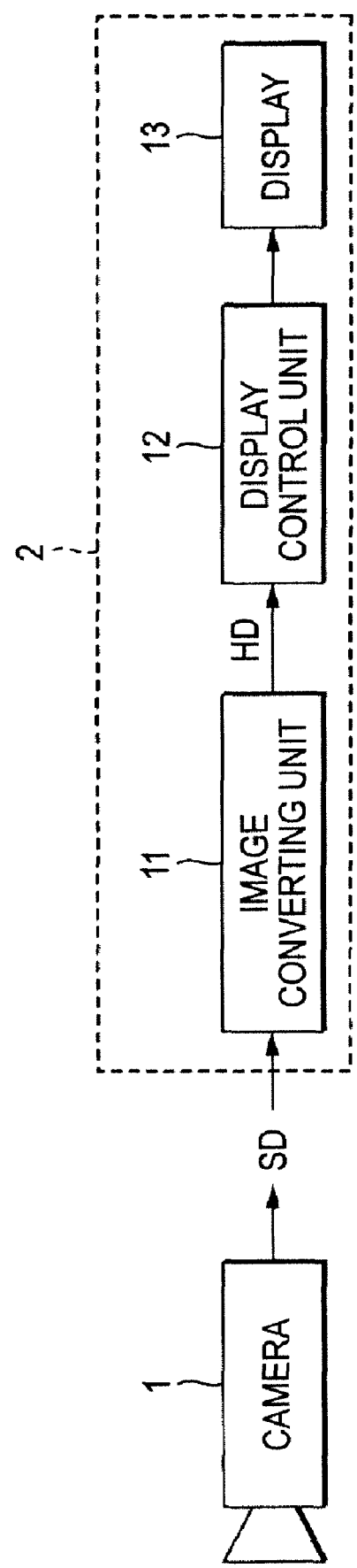
FIG. 2 is a block diagram showing an example of a structure of a display apparatus 2.

FIG. 2 is a diagram showing an example of a structure of the display apparatus 2 in FIG. 1.

The display apparatus 2 includes an image converting unit 11, a display control unit 12, and a display 13.

The image converting unit 11 converts an SD image signal from the camera 1 into an HD image signal according to an arithmetic operation between the SD image signal and a tap coefficient obtained by learning performed in advance. The image converting unit 11 supplies the HD image signal to the display control unit 12.

The display control unit 12 performs display control for causing the display 13 to display an HD image corresponding to the HD image signal supplied from the image converting unit 11 in a display format determined by learning performed using an image higher in quality than the HD image.

In the following explanations, the image higher in quality than the HD image is also referred to as an SHD image (a Super HD image) and an image signal of the SHD image is referred to as an SHD image signal as appropriate.

The display 13 is display means including, for example, a CRT (Cathode Ray Tube) or an LCD (Liquid Crystal Display). The display 13 displays an image in accordance with the control by the display control unit 12.

Figure 3:
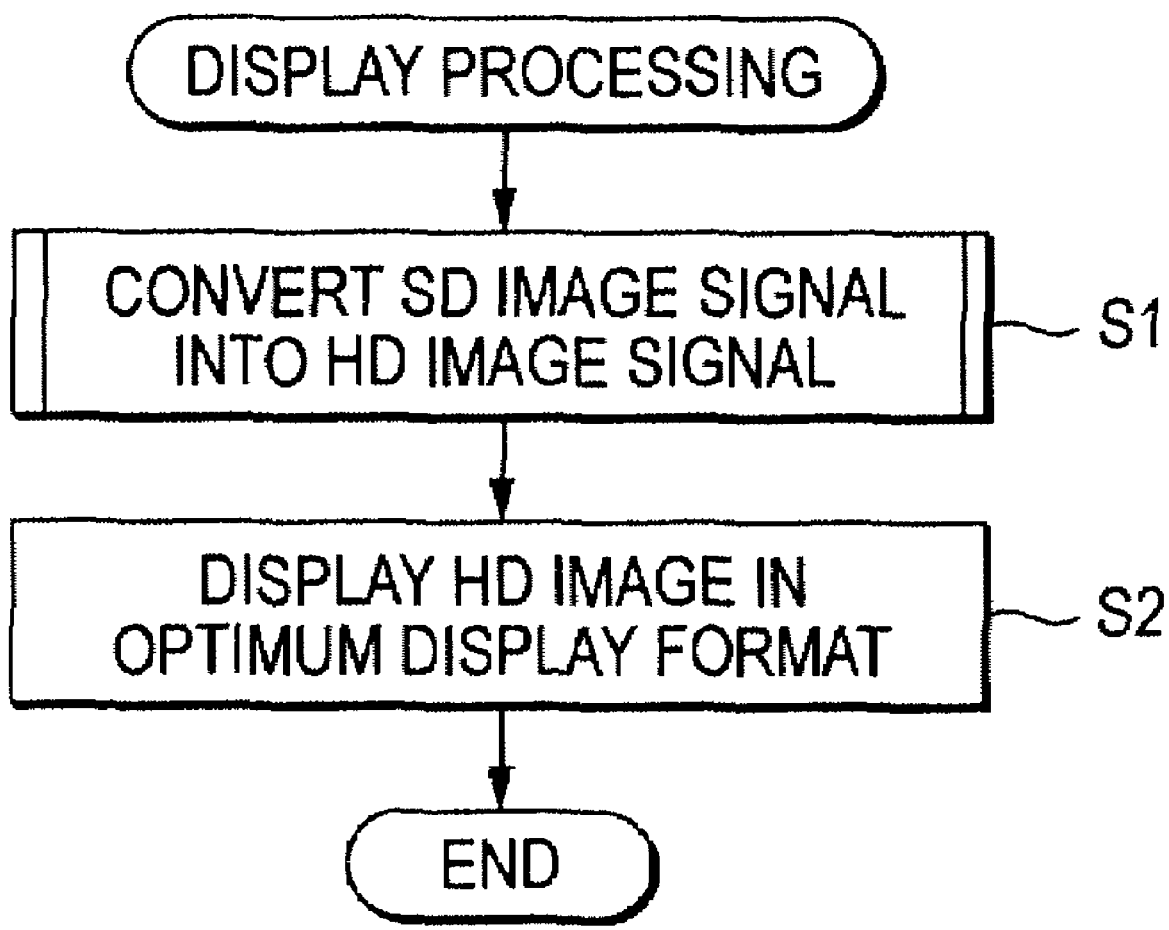
FIG. 3 is a flowchart for explaining processing by the display apparatus 2.

Operations of the display apparatus 2 in FIG. 2 will be explained with reference to a flowchart in FIG. 3.

An SD image signal is supplied to the display apparatus 2 from the camera 1. In the display apparatus 2, the SD image signal is received from the camera 1 and supplied to the image converting unit 11.

In step S1, the image converting unit 11 performs image conversion processing for converting the SD image signal from the camera 1 into an HD image signal according to, for example, an arithmetic operation in which a tap coefficient obtained by learning described later is used. The image converting unit 11 supplies an HD image signal obtained as a result of the image conversion processing to the display control unit 12 and proceeds to step S2.

In step S2, the display control unit 12 causes the display 13 to display an HD image corresponding to the HD image signal supplied from the image converting unit 11 in a display format determined by learning described later performed using an SHD image.

In this way, the HD image is displayed on the display 13.

The image conversion processing performed in the image converting unit 11 in FIG. 2 will be explained.

The image converting unit 11 performs the image conversion processing for converting a first image signal into a second image signal of an image higher in quality than an image corresponding to the first image signal.

The image converting unit 11 sets the SD image signal from the camera 1 as a first signal, sets the HD image signal as a second image signal, and performs the image conversion processing for converting the first image signal into the second image signal. According to such image conversion processing, it is possible to realize various kinds of processing depending on how the first and the second image signals are defined.

For example, when the second image signal is an HD image signal and the first image signal is an SD image signal obtained by reducing a resolution and the number of pixels of the second image signal, it can be said that the image conversion processing is processing for converting an SD image into an HD image. For example, when the second image signal is an image signal having a high S/N and the first image signal is an image signal having a low S/N obtained by reducing the S/N of the second image signal (adding noise to the second image signal), it can be said that the image conversion processing is noise removal processing for removing the noise. Moreover, for example, when the second image signal is a certain image signal and the first image signal is an image signal obtained by curtailing the number of pixels of the second image signal, it can be said that the image conversion processing is enlargement processing for enlarging an image.

Figure 4:
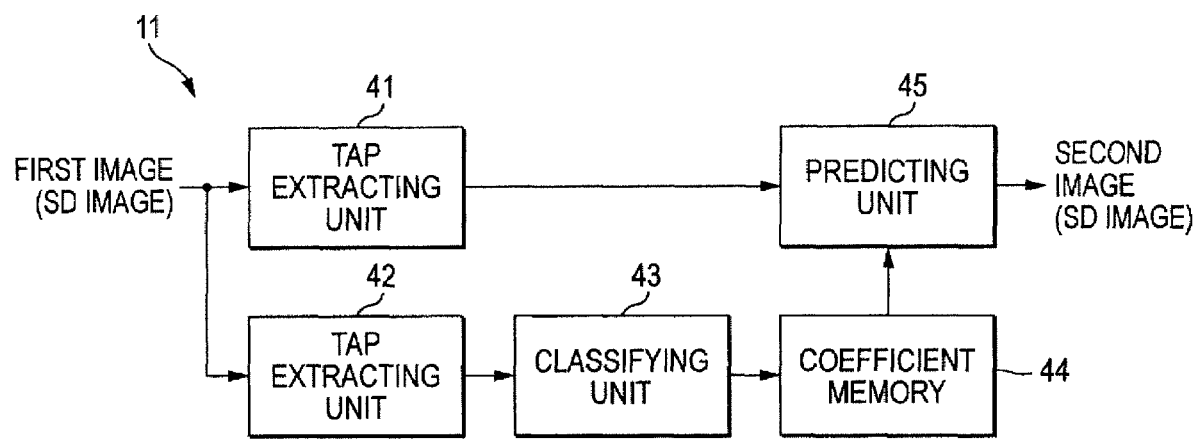
FIG. 4 is a block diagram showing an example of a structure of an image converting unit 12.

FIG. 4 is a diagram showing an example of a structure of the image converting unit 11 in FIG. 2.

The image converting unit 11 includes tap extracting units 41 and 42, a classifying unit 43, a coefficient memory 44, and a predicting unit 45.

An SD image signal from the camera 1 is supplied to the image converting unit 11 as the first image signal. The SD image signal serving as the first image signal is supplied to the tap extracting units 41 and 42.

The tap extracting unit 41 sequentially sets, as a pixel of interest, pixels constituting the second image signal (since an HD image signal serving as this second image signal is an image signal to be determined and is not present at the present stage, the HD image signal is imaginarily assumed) obtained by converting the first image signal. The tap extracting unit 41 extracts, from the first image signal, prediction taps that are pixel values of plural pixels used for predicting a pixel value of the pixel of interest.

Specifically, the tap extracting unit 41 extracts pixel values of plural pixels in a positional relation spatially or temporally close to a position of an image of the first image signal (for example, a position on the image of the first image signal on which a part of a subject identical with that shown in a position of the pixel of interest is shown) corresponding to the pixel of interest as prediction taps. The plural pixels are, for example, a pixel closest to the position on the image of the first image signal corresponding to the pixel of interest and a pixel spatially adjacent to the pixel.

The tap extracting unit 42 extracts, from the first image signal, class taps that are pixels values of plural pixels used for performing classification for classifying the pixel of interest to any one of several (plural) classes.

For simplification of the explanations, as the prediction taps and the class taps, pixel values of plural pixels having an identical tap structure, that is, pixel values of plural pixels having an identical positional relation with respect to a position corresponding to the pixel of interest are adopted. However, it is possible to adopt different tap structures for the prediction taps and the class taps.

The prediction taps obtained by the tap extracting unit 41 are supplied to the predicting unit 45. The class taps obtained by the tap extracting unit 42 are supplied to the classifying unit 43.

The classifying unit 43 classifies the pixel of interest on the basis of the class taps from the tap extracting unit 42. The classifying unit 43 supplies a class code corresponding to a class as a result of the classification to the coefficient memory 44.

As a method of performing classification, it is possible to adopt, for example, ADRC (Adaptive Dynamic Range Coding).

In the method of using the ADRC, pixel values of pixels set as class taps are subjected to ADRC processing and a class of the pixel of interest is determined in accordance with an ADRC code obtained as a result of the ADRC processing.

In K bit ADRC, for example, a maximum MAX and a minimum MIN are of pixel values of pixels set as class taps, DR=MAX−MIN is set as a local dynamic range of a set of plural pixel values serving as the class taps, and each of the plural pixels values serving as the class taps are re-quantized into K bits on the basis of this dynamic range DR. In other words, the minimum MIN is subtracted from each pixel value serving as the class tap and the subtracted value is divided by $DR/2^K$ (quantized). A bit string in which respective pixel values of K bits serving as the class taps obtained in this way are arranged in a predetermined order is outputted as an ADRC code. Therefore, for example, when a class tap is subjected to 1-bit ADRC processing, the minimum MIN is subtracted from each pixel value serving as the class tap and the subtracted value is divided by ½ of a difference between the maximum MAX and the minimum MIN (omit decimals). Consequently, each pixel value is set as 1 bit (binarized). A bit string in which pixel values of 1 bit are arranged in a predetermined order is outputted as an ADRC code.

It is also possible to cause the classifying unit 43 to output, for example, a pattern of a level distribution of plural pixel values serving as class taps directly as a class code. However, in this case, if the class taps are formed of N pixel values and K bits are allocated to the respective pixel values, there are $(2^N)^K$ ways as the number of cases of class codes outputted by the classifying unit 43. This is an enormous number exponentially proportional to the number of bits K of the pixel values.

Therefore, in the classifying unit 43, it is preferable that an amount of information of the class taps is compressed by the ADRC processing, vector quantization, or the like and classification is performed using a result of the compression.

It is also possible to perform classification on the basis of, other than the class taps, a vector representing a motion near a position on an image of a first image signal corresponding to the pixel of interest (hereinafter referred to corresponding position as appropriate) (a motion vector), a vector representing a positional relation between a pixel of the first image signal closest to the corresponding position and the corresponding position (a positional relation vector), and the like. In other words, it is possible to set a bit string, in which an ADRC code of the class taps and a bit string representing a code (a symbol) serving as a result of vector quantization of the motion vector or the positional relation vector are arranged in a row, as a class code representing a class of the pixel of interest.

The coefficient memory 44 stores tap coefficients for respective classes determined by learning described later in advance. In other words, the coefficient memory 44 stores tap coefficients for plural classes into which the pixel of interest can be classified by the classifying unit 43. The coefficient memory 44 outputs a tap coefficient of a class represented by the class code supplied from the classifying unit 43, that is, a class of the pixel of interest among the tap coefficients for the respective classes.

The tap coefficient is equivalent to, for example, a coefficient for multiplying input data in a so-called tap in a digital filter.

The predicting unit 45 acquires the prediction tap outputted by the tap extracting unit 41 and the tap coefficient outputted by the coefficient memory 44 and performs a predetermined prediction arithmetic operation for calculating a predicted value of a true value of the pixel of interest using the prediction tap and the tap coefficient. Consequently, the predicting unit 45 calculates (a predicted value of) a pixel value of the pixel of interest, that is, a pixel value of a pixel forming the second image signal and outputs the pixel value.

Figure 5:
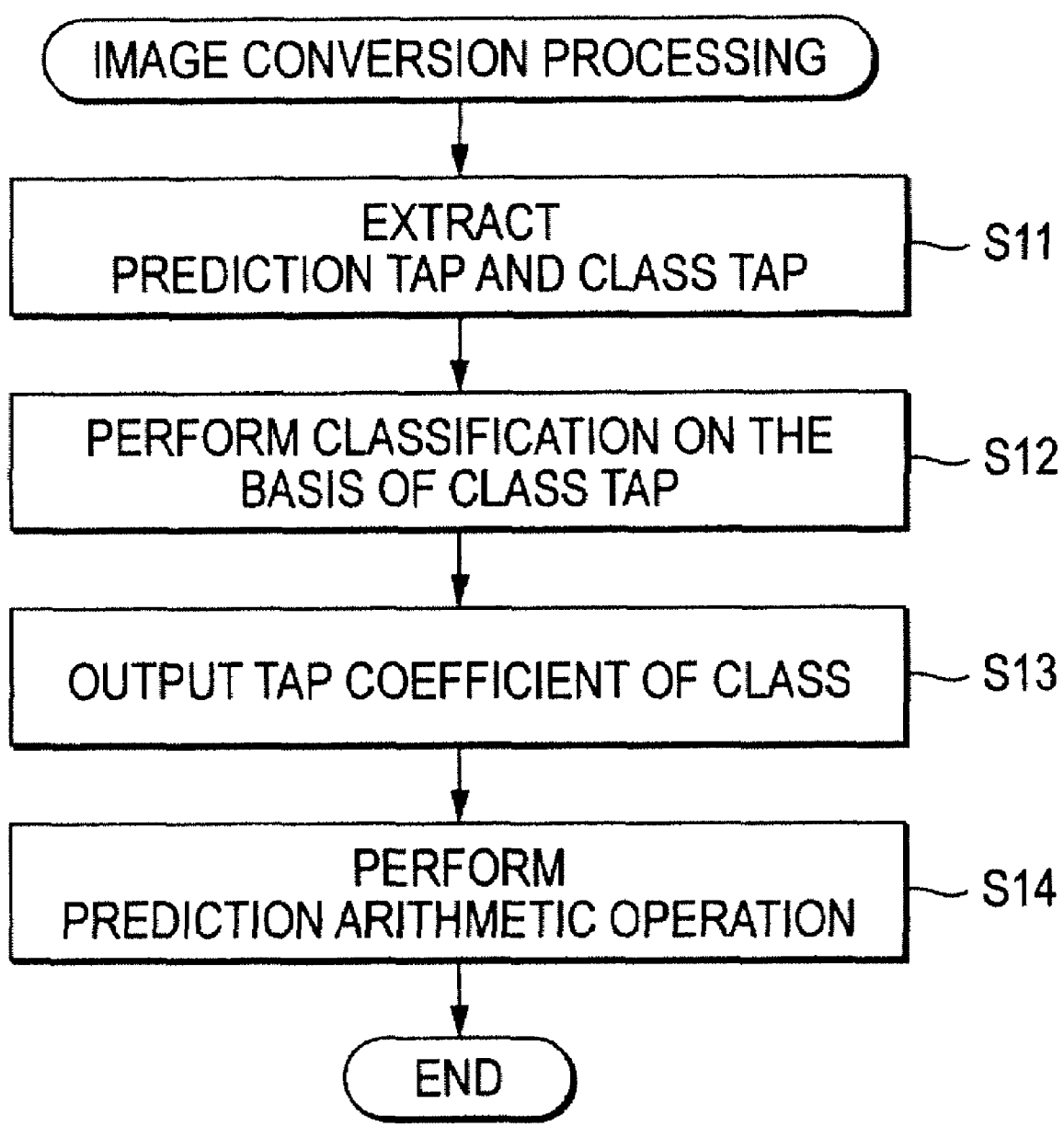
FIG. 5 is a flowchart for explaining processing by the image converting unit 12.

The image conversion processing in step S1 in FIG. 3 performed by the image converting unit 11 in FIG. 4 will be explained with reference to a flowchart in FIG. 5.

In the tap extracting unit 41, the respective pixels forming the HD image signal serving as the second image signal with respect to the SD image signal serving as the first image signal supplied from the camera 1 are sequentially set as a pixel of interest. In step S11, the tap extracting units 41 and 42 extract pixel values of pixels to be set as a prediction tap and a class tap of the pixel of interest from the first image signal supplied thereto, respectively. The prediction tap is supplied from the tap extracting unit 41 to the predicting unit 45 and the class tap is supplied from the tap extracting unit 42 to the classifying unit 43.

The classifying unit 43 receives the class tap for the pixel of interest from the tap extracting unit 42. In step S12, the classifying unit 43 classifies the pixel of interest on the basis of the class tap. Moreover, the classifying unit 43 outputs a class code representing a class of the pixel of interest obtained from a result of the classification to the coefficient memory 44 and proceeds to step S13.

In step S13, the coefficient memory 44 reads out a tap coefficient of the class represented by the class code supplied from the classifying unit 43, that is, a tap coefficient of the class of the pixel of interest, outputs the tap coefficient, and proceeds to step S14. The tap coefficient outputted by the coefficient memory 44 is acquired (received) by the predicting unit 45.

In step S14, the predicting unit 45 calculates a pixel value of the pixel of interest, that is, a pixel value of a pixel of the second image signal by performing the predetermined prediction arithmetic operation using the prediction tap outputted by the tap extracting unit 41 and the tap coefficient acquired from the coefficient memory 44. The predicting unit 45 outputs the HD image signal serving as the second image signal to the display control unit 12 (FIG. 2) every time the pixel value of the pixel of the second image signal for, for example, one frame is calculated in this way.

As described above, in the image converting unit 11, a prediction tap and a class tap for the pixel of interest of the second image signal are extracted from the first image signal, a class of the pixel of interest is found on the basis of the class tap, and an arithmetic operation in which a tap coefficient of the class and the prediction tap are used is performed to calculate (a predicted value of) a pixel value of the pixel of interest of the second image signal. Consequently, the first image signal is converted into the second image signal. Processing for calculating a pixel value of a pixel of interest by finding a class of the pixel of interest and performing an arithmetic operation in which a tap coefficient of the class and the first image signal (the prediction tap) are used is called classification adaptive processing.

In the classification adaptive processing, as described above, a tap coefficient is used. It is possible to determine the tap coefficient according to, for example, learning performed using the method of least squares.

For example, as the image conversion processing, it is conceivable that an HD image signal is set as a second image signal and an SD image signal obtained by, for example, curtailing pixels of the HD image signal and filtering the HD image signal with an LPF (Low Pass filter) is set as a first image signal, a prediction tap is extracted from the first image signal, and a pixel value of the second image signal is determined (predicted) according to the predetermined prediction arithmetic operation using the prediction tap and a tap coefficient.

As the predetermined prediction arithmetic operation, for example, linear primary prediction arithmetic operation is adopted. Then, a pixel value y of a pixel of a second image signal (hereinafter referred to as second pixel as appropriate) is calculated by the following linear primary expression.

$$y = \sum_{n=1}^{N} w_n x_n \quad (1)$$

In Equation (1), $x_n$ indicates a pixel value of an nth pixel of the first image signal (hereinafter referred to as first pixel as appropriate) forming a prediction tap for the second pixel y and $w_n$ indicates an nth tap coefficient for multiplying the pixel value of the nth first pixel. In Equation (1), the prediction tap is formed by pixel values $x_1, x_2, \ldots, x_N$ of plural, that is, N first pixels. In this case, N tap coefficients are present for one class.

It is also possible to calculate the pixel value y of the second pixel according to a quadratic or higher order expression rather than the liner primary expression indicated by Equation (1).

When a true value of a pixel value of a second pixel of a kth sample is represented as $y_k$ and a predicted value of the true value $y_k$ obtained by Equation (1) is represented as $y_k'$, a prediction error $e_k$ between the true value $y_k$ and the predicted value $y_k'$ is represented by the following equation.

$$e_k = y_k - y_k' \quad (2)$$

Since the predicted value $y_k'$ in Equation (2) is calculated in accordance with Equation (1), when $y_k'$ in Equation (2) is replaced in accordance with Equation (1), the following equation is obtained.

$$e_k = y_k - \left( \sum_{n=1}^{N} w_n x_{n,k} \right) \quad (3)$$

In Equation (3), $x_{n,k}$ indicates a pixel value of nth first pixel forming a prediction tap for the second pixel of the kth sample.

A tap coefficient $w_n$ that nulls the prediction error $e_k$ of Equation (3) (or Equation (2)) is optimum for predicting a pixel value of the second pixel. However, it is generally difficult to determine such a tap coefficient $w_n$ for all second pixels.

Thus, when, for example, the method of least squares is adopted as a standard for indicating that the tap coefficient $w_n$ is optimum, it is possible to determine the optimum tap coefficient $w_n$ by minimizing a sum E of square errors represented by the following equation.

$$E = \sum_{k=1}^{K} e_k^2 \quad (4)$$

In Equation (4), K indicates the number of samples (the number of samples for learning) of the pixel value $y_k$ of the second pixel and pixel values $x_{1,k}', x_{2,k}', \ldots, x_{N,k}'$ of the first pixel forming a prediction tap for the second pixel.

A minimum (a minimum value) of the sum E of square errors of Equation (4) is, as indicated by Equation (5), given by $w_n$ that nulls a value obtained by partially differentiating the sum E with the tap coefficient $w_n$.

$$\frac{\partial E}{\partial w_n} e_1 \frac{\partial e_1}{\partial w_n} + e_2 \frac{\partial e_2}{\partial w_n} + \cdots + e_K \frac{\partial e_K}{\partial w_n} = 0 \ (n = 1, 2, \cdots, N) \quad (5)$$

On the other hand, when Equation (3) is partially differentiated by the tap coefficient $w_n$, the following equation is obtained.

$$\frac{\partial e_K}{\partial w_1} = -x_{1,k}, \frac{\partial e_k}{\partial w_2} = -x_{2,k}, \cdots, \frac{\partial e_k}{\partial w_N} = -x_{N,k}, \quad (6)$$

$$(k = 1, 2, \cdots, K)$$

The following equation is obtained from Equation (5) and Equation (6).

$$\sum_{k=1}^{K} e_k x_{1,k} = 0, \sum_{k=1}^{K} e_k x_{2,k} = 0, \cdots \sum_{k=1}^{K} e_k x_{N,k} = 0 \quad (7)$$

It is possible to represent Equation (7) with a normal equation indicated by Equation (8) by substituting Equation (3) in $e_k$ of Equation (7).

$$\begin{bmatrix} \left(\sum_{k=1}^{K} x_{1,k} x_{1,k}\right) & \left(\sum_{k=1}^{K} x_{1,k} x_{2,k}\right) & \cdots & \left(\sum_{k=1}^{K} x_{1,k} x_{N,k}\right) \\ \left(\sum_{k=1}^{K} x_{2,k} x_{1,k}\right) & \left(\sum_{k=1}^{K} x_{2,k} x_{2,k}\right) & \cdots & \left(\sum_{k=1}^{K} x_{2,k} x_{N,k}\right) \\ \vdots & \vdots & \ddots & \vdots \\ \left(\sum_{k=1}^{K} x_{N,k} x_{1,k}\right) & \left(\sum_{k=1}^{K} x_{N,k} x_{2,k}\right) & \cdots & \left(\sum_{k=1}^{K} x_{N,k} x_{N,k}\right) \end{bmatrix} \begin{bmatrix} w_1 \\ w_2 \\ \vdots \\ w_N \end{bmatrix} = \begin{bmatrix} \left(\sum_{k=1}^{K} x_{1,k} y_k\right) \\ \left(\sum_{k=1}^{K} x_{2,k} y_k\right) \\ \vdots \\ \left(\sum_{k=1}^{K} x_{N,k} y_k\right) \end{bmatrix} \quad (8)$$

It is possible to solve the normal equation of Equation (8) for the tap coefficient $w_n$ by using, for example, a sweep out method (the Gauss-Jordan elimination).

It is possible to determine an optimum tap coefficient (a tap coefficient that minimizes the sum E of square errors) $w_n$ for each class by forming and solving the normal equation of Equation (8) for each class.

According to the classification adaptive processing, the arithmetic operation of Equation (1) is performed using the tap coefficient determined for each class as described above, whereby the SD image signal serving as the first image signal is converted into the HD image signal serving as the second image signal.

The method of determining a tap coefficient for each class by forming and solving the normal equation of Equation (8) for each class (hereinafter referred to as learning method, in which the normal equation is used, as appropriate) is an example of learning for determining tap coefficients for respective classes. In the coefficient memory 44 in FIG. 4, the tap coefficients for the respective classes determined by round-robin learning described later rather than the learning method in which the normal equation is used are stored.

In the following explanations, the image conversion processing means processing for converting a first image signal into a second image signal according to the classification adaptive processing unless specifically noted otherwise.

The classification adaptive processing looks like filtering by an FIR (Finite Impulse Response) filter judging only from Equation (1). However, a tap coefficient w equivalent to a coefficient of the FIR filter (a filter coefficient) is determined, for example, with an HD image signal set as a second image signal and an SD image signal obtained by, for example, reducing the number of pixels of the HD image signal set as a second image signal, by learning performed using the first image signal and the second image signal. Thus, it is possible to reproduce a signal component that is not included in the first image signal but is included in the second image signal. Therefore, it can be said that (the image conversion processing by) the classification adaptive processing is, so to speak, processing having an action of creating a signal component not included in the first image signal.

A signal format of an SD image signal (a photographed image signal) outputted by the camera 1, a display format of an HD image that the display control unit 12 of the display apparatus 2 (FIG. 2) causes the display 13 to display, and a tap coefficient that the image converting unit 11 (FIG. 4) of the display apparatus 2 uses for the image conversion processing in the image processing system in FIG. 1 will be explained.

As described above, the camera 1 outputs an SD image signal of a signal format determined by learning. The display control unit 12 (FIG. 2) of the display apparatus 2 causes the display 13 to display an HD image in a display format determined by learning. The image converting unit 11 (FIG. 4) of the display apparatus 2 performs the image conversion processing for converting the SD image signal from the camera 1 into an HD image signal using a tap coefficient determined by learning.

Therefore, all of the signal format of the SD image signal outputted by the camera 1, the tap coefficient used in the image conversion processing for converting the SD image signal into an HD image signal, and the display format for displaying an HD image corresponding to the HD image signal obtained by the image conversion processing are determined by learning. The learning for the signal format, the tap coefficient, and the display format is performed to improve performance of the entire image processing system in FIG. 1, that is, to form an image displayed on the display 13 (FIG. 2) of the display apparatus 2 as an appropriate image (an image that a user feels high in quality).

Figure 6:
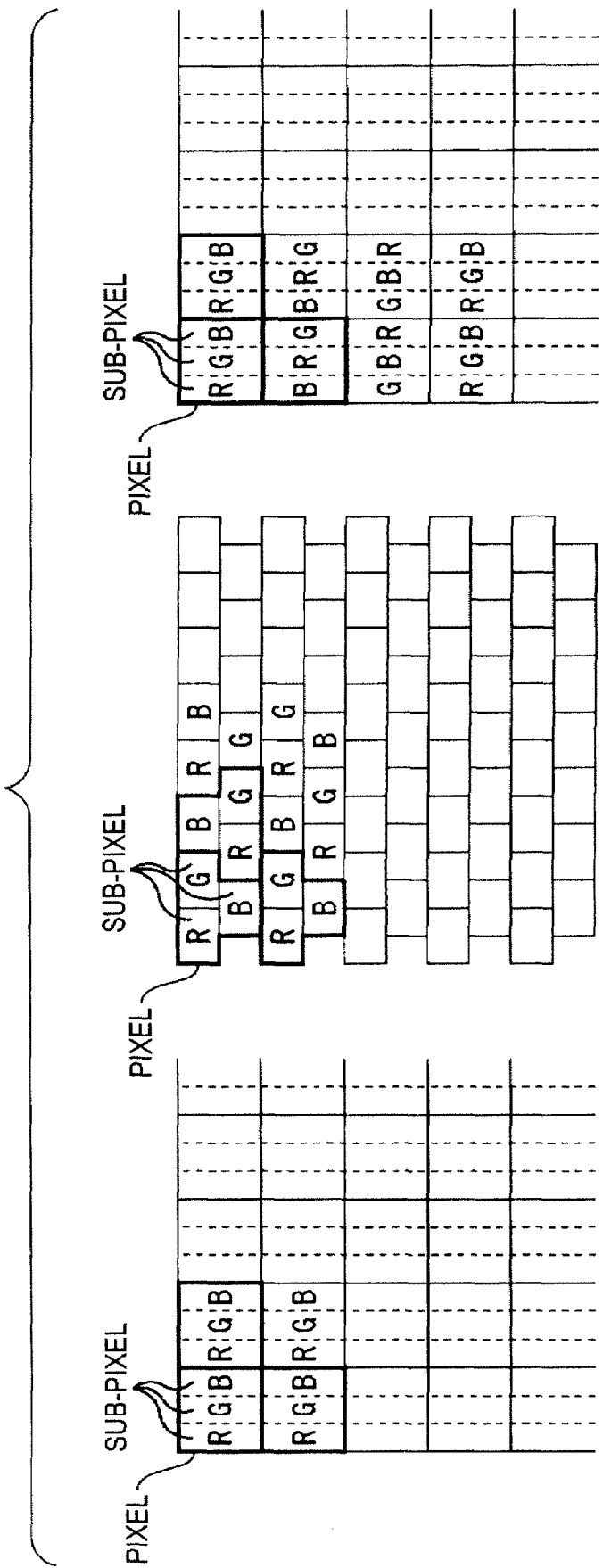
FIG. 6 is a diagram showing an example of a display format.

As an existing display format, there is, for example, a display format shown in FIG. 6.

FIG. 6 is a diagram showing an example of the existing display format.

In a general display apparatus, when an image corresponding to an image signal (an RGB image signal) having all three color components of R, G, and B as a pixel value of one pixel is displayed, it is physically difficult to display the three color components of R, G, and B in an identical position. Thus, in the display apparatus, the three color components of R, G, and B serving as the pixel value of one pixel are arrayed and displayed in different positions.

In the display apparatus, a small area serving as one pixel on a display screen is divided into smaller areas (hereinafter referred to as sub-pixels as appropriate) for the respective R, G, and B. R, G, and B serving as the pixel value of one pixel are displayed in the sub-pixels for R, G, and B, respectively.

As an array pattern of sub-pixels, for example, array patterns shown as a first pattern, a second pattern, and a third pattern from the left (a third pattern, a second pattern, and a first pattern from the right) in FIG. 6, respectively, are known.

In the first pattern from the left in FIG. 6, with an area of a square shape as one pixel, three areas obtained by equally dividing one pixel into three in the horizontal direction are sub-pixels. In each pixel, first, second, and third sub-pixels from the left are sub-pixels for R, G, B, respectively. Such an array (a display format) of sub-pixels is called a stripe.

In the second pattern from the left in FIG. 6, one pixel is formed by first and second two sub-pixels of a laterally-long rectangular shape arranged in the horizontal direction and a third pixel arranged in a position shifted by a half of the length of the horizontal side of one sub-pixel above or below the first and the second sub-pixels. Each of the first to the third sub-pixels is a sub-pixel for any one of R, G, and B. Sub-pixels of an identical color component are not adjacent to each other. Such an array (a display format) of sub-pixels is called a delta.

In the third pattern from the left in FIG. 6, like the stripe in the first pattern from the left in FIG. 6, with an area of a square shape as one pixel, three areas obtained by equally dividing one pixel into three in the horizontal direction are sub-pixels. However, where sub-pixels of an identical color component are arranged in the vertical direction in the strip in the first pattern from the left in FIG. 6, sub-pixels of an identical color component are not adjacent to each other in the vertical direction but are arranged in an oblique direction in the third pattern from the left in FIG. 6.

Such an array (a display format) of sub-pixels is called a mosaic.

Among the display formats described above, it is said that, for example, the stripe is suitable for display of a line, a figure, and a character. It is said that an image more natural than an image of the stripe is obtained by the mosaic and a more natural image is obtained by the delta.

The existing display formats described above are set according to, for example, convenience of processing by a display apparatus that displays an image. Therefore, images displayed in the existing display formats are not always images that a user feels high in quality. In other words, it is likely that there are display formats that are not the existing formats and the user feels images displayed in the display formats higher in quality than the images displayed in the existing display formats.

Figure 7:
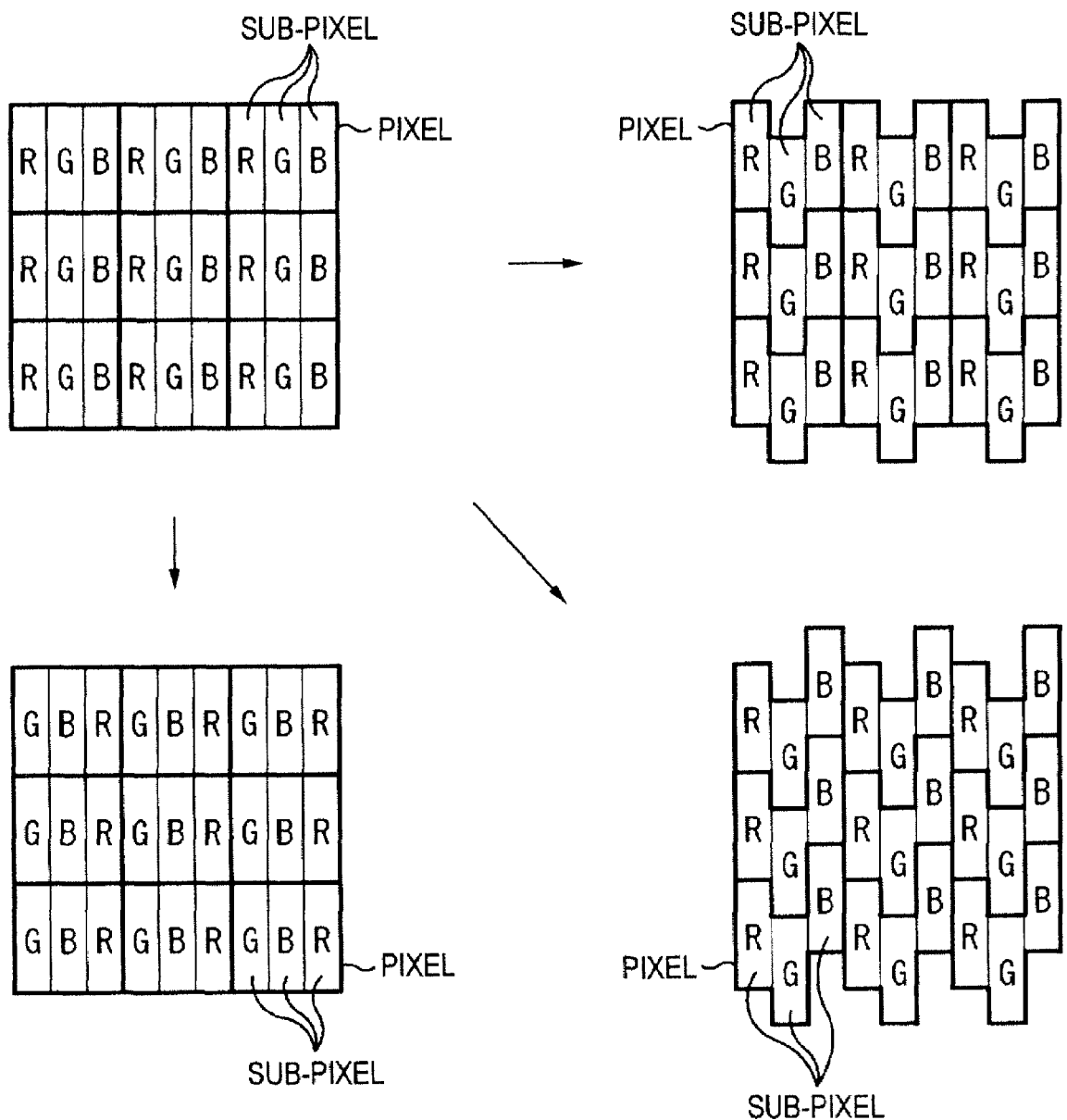
FIG. 7 is a diagram showing examples of display formats converted with a stripe format as a reference.

FIG. 7 is a diagram of examples of the display formats that are not the existing display formats.

The display formats shown in FIG. 7 are new display formats obtained by, with a stripe as a reference, transforming the stripe.

A display format of the stripe identical with the first pattern from the left in FIG. 6 is shown on the upper left in FIG. 7.

A display format in which color components displayed in sub-pixels of the stripe shown on the upper left in FIG. 7 are changed is shown on the lower left in FIG. 7. Whereas three sub-pixels arranged in the horizontal direction of one pixel are arranged in an order of sub-pixels for displaying, R, G, and B, respectively, in the stripe shown on the upper left in FIG. 7, sub-pixels are arranged in an order of sub-pixels for displaying G, B, R, respectively, in the display format shown on the lower left in FIG. 7.

A display format in which positions of the sub-pixels of the stripe shown on the upper left in FIG. 7 are shifted in the vertical direction is shown on the upper right in FIG. 7. Whereas three sub-pixels arranged in the horizontal direction in an order of R G, B of one pixel are arranged in an identical position in the vertical direction in the stripe shown on the upper left in FIG. 7, a sub-pixel of G among three sub-pixels arranged in the horizontal direction in an order of R, G, B of one pixel is arranged in a position lower than the sub-pixels of R and B in the display format shown on the upper right in FIG. 7.

A display format in which positions of the sub-pixels of the stripe shown on the upper left in FIG. 7 are shifted in the vertical direction as in the display format shown on the upper right in FIG. 7 is shown on the lower right in FIG. 7. However, in the display format on the lower right in FIG. 7, a sub-pixel of G among three sub-pixels arranged in the horizontal direction in an order of R, G, B of one pixel is arranged in a position lower than a sub-pixel of R and a sub-pixel of B is arranged in a position higher than the sub-pixel of R.

A display format of an image that the display control unit 12 causes the display 13 to display is determined by learning to display an image that the user feels high in quality in the display apparatus 2 (FIG. 2).

Figure 8:
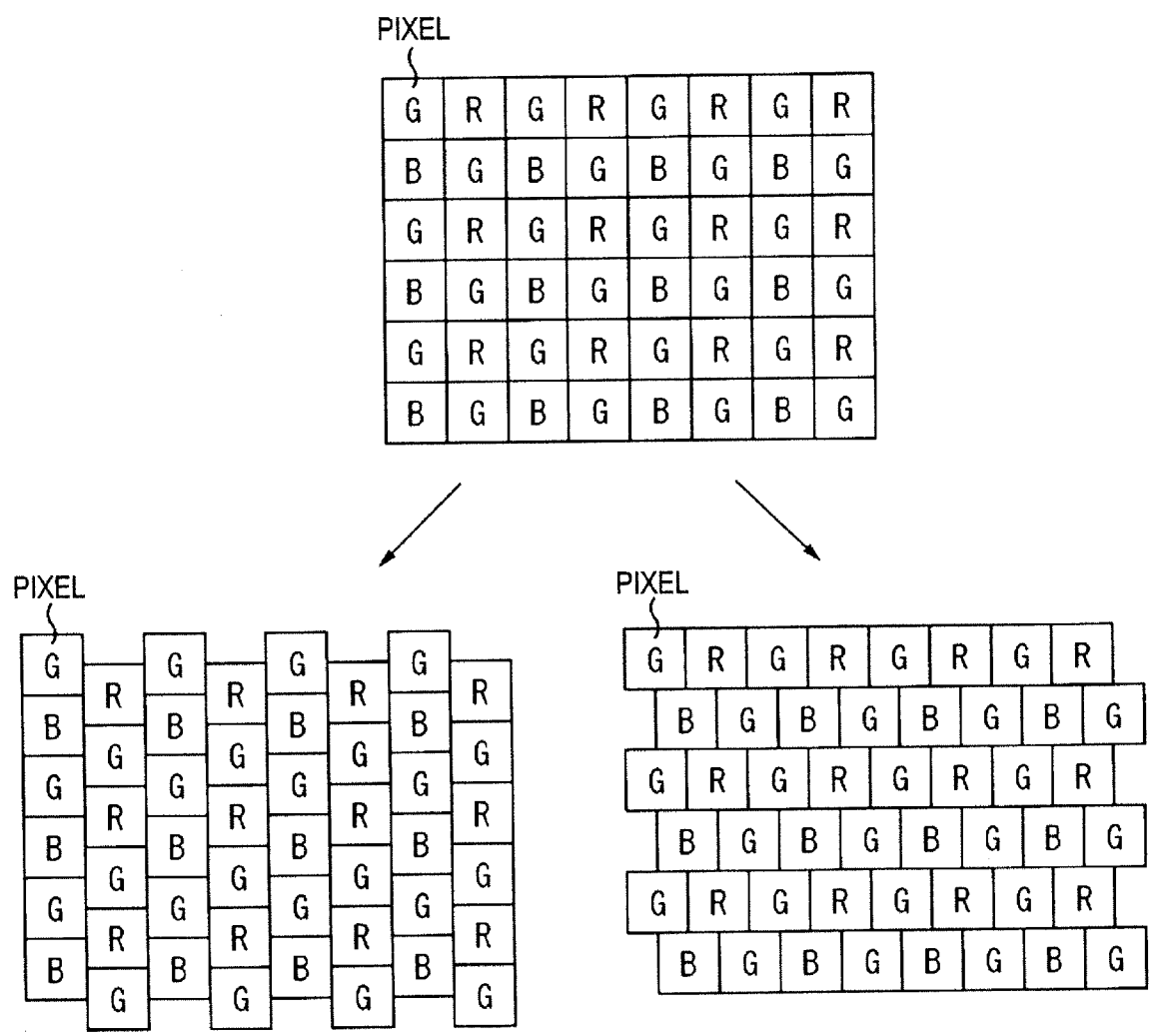
FIG. 8 is a diagram showing examples of signal formats converted with a Bayer format as a reference.

FIG. 8 is a schematic diagram of a signal format of an image signal.

An image signal of the Bayer format is shown in the upper part in FIG. 8.

As described above, in the 1CCD camera, since only any one color component of the color components R, G, B is obtained, a signal format is set for, for example, convenience of processing for interpolating the other two color components. This signal format is a Bayer format. Therefore, an HD image finally displayed on the display 13 after an image signal of such a Bayer format is converted into an HD image signal by the image converting unit 11 of the display apparatus 2 is not always an appropriate image. It is likely that signal formats with which the HD image finally displayed on the display 13 is more appropriate than an image obtained by the existing formats such as the Bayer format.

Examples of signal formats that are not the existing signal formats are shown in the lower part in FIG. 8.

New signal formats obtained by, with the Bayer format as a reference, transforming the Bayer format are (schematically) shown in the lower part in FIG. 8.

A signal format obtained by shifting positions of pixels of the Bayer format shown in the upper part in FIG. 8 in the downward direction every other column is shown on the left in the lower part in FIG. 8. A signal format obtained by shifting positions of pixels of the Bayer format shown in the upper part in FIG. 8 in the right (or the left) direction every other row is shown on the right in the lower part in FIG. 8.

As described above, learning for a signal format of an SD image signal outputted by the camera 1, a tap coefficient used in the image conversion processing for converting the SD image signal into an HD image signal, and a display format for displaying an HD image corresponding to the HD image signal obtained by the image conversion processing is performed to improve performance of the entire image processing system in FIG. 1. In other words, the learning is performed to finally display an appropriate image (an image that the user feels high in quality) on the display 13 (FIG. 2) of the display apparatus 2. An example of a structure of a learning apparatus that performs such learning is shown in FIG. 9.

Figure 9:
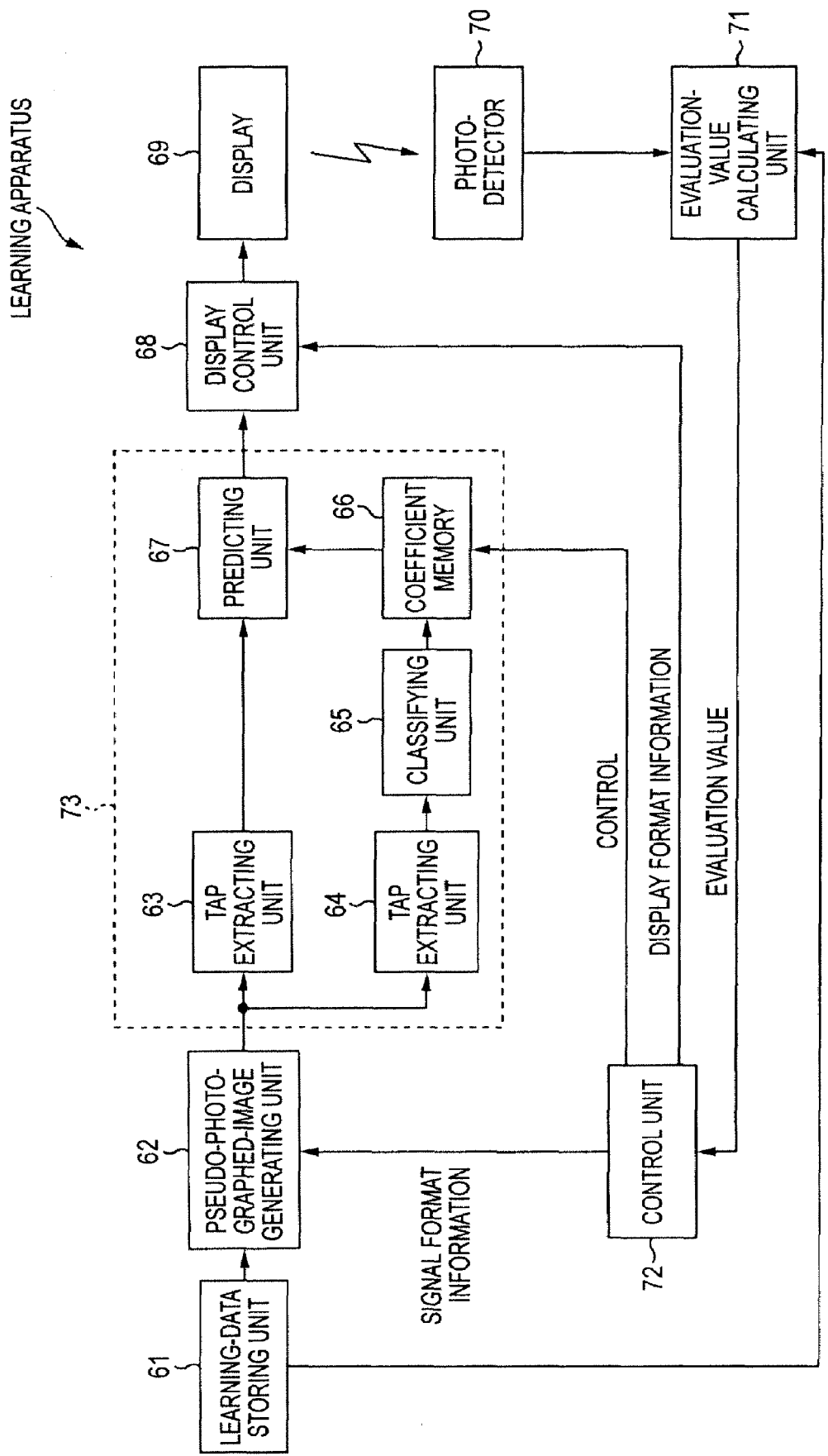
FIG. 9 is a block diagram showing an example of a structure of a learning apparatus that learns an optimum signal format, an optimum display format, and an optimum tap coefficient.

The learning apparatus in FIG. 9 performs learning for determining a tap coefficient used in the image converting unit 11 (FIG. 2) to perform the image conversion processing for converting an SD image signal (a photographed image signal) outputted by the camera 1 (FIG. 1) into a high-quality image signal (an HD image signal) of an image (an HD image) higher in quality than an SD image corresponding to the SD image signal to display an appropriate image on the display 13 (FIG. 2). Moreover, the learning apparatus in FIG. 9 also performs learning for a signal format of an SD image signal outputted by the camera 1 and a display format for displaying an HD image corresponding to an HD image signal obtained by the image conversion processing applied to the SD image signal to display an appropriate image on the display 13 (FIG. 2).

Specifically, in the learning apparatus in FIG. 9, a learning-data storing unit 61 stores an SHD image signal (an SHD image) as learning data used for learning for a tap coefficient, a signal format, and a display format.

Signal format information indicating a signal format is supplied to a pseudo-photographed-image generating unit 62 from a control unit 72 described later. The pseudo-photographed-image generating unit 62 sequentially selects image signals of respective frames of the SHD image signal stored in the learning-data storing unit 61 as an SHD image signal of interest. The pseudo-photographed-image generating unit 62, for example, curtails the number of pixels of the SHD image signal of interest to generate an SD image signal of the signal format indicated by the signal format information from the control unit 72. The pseudo-photographed-image generating unit 62 supplies the SD image signal to tap extracting units 63 and 64 as a pseudo photographed image signal equivalent to a photographed image signal outputted by the camera 1 (FIG. 1).

The tap extracting units 63 and 64, the classifying unit 65, the coefficient memory 66, and the predicting unit 67 constitute an image converting unit 73 that performs image conversion processing same as that performed by the image converting unit 11 in FIG. 4. The image converting unit 73 converts the pseudo photographed image signal (the SD image signal) supplied from the pseudo-photographed-image generating unit 62 into an HD image signal according to an arithmetic operation between the pseudo photographed image and a tap coefficient supplied from the control unit 72.

The tap extracting unit 63 sets the pseudo photographed image signal supplied from the pseudo-photographed-image generating unit 62 as a first image signal. The tap extracting unit 63 sets an HD image signal having a high quality (high resolution) intended to be obtained by converting the first image signal as a second image signal (since the HD image signal serving as the second image signal is an image signal to be determined and is not present at the present stage, the HD image signal is imaginarily assumed). The tap extracting unit 63 sequentially sets pixels constituting the second image signal as a pixel of interest. For the pixel of interest, the tap extracting unit 63 extracts, from the first image signal, a prediction tap of a tap structure identical with the prediction tap extracted by the tap extracting unit 41 in FIG. 4 and supplied the prediction tap to the predicting unit 67.

For the pixel of interest, the tap extracting unit 64 extracts, from the first image signal, a class tap of a tap structure identical with the class tap extracted by the tap extracting unit 42 in FIG. 4. The tap extracting unit 64 supplies to the class tap to the classifying unit 65.

The classifying unit 65 classifies the pixel of interest on the basis of the class tap from the tap extracting unit 64 according to a method identical with the method of the classifying unit 43 in FIG. 4. The classifying unit 65 supplies a class code corresponding to a class obtained as a result of the classification to the coefficient memory 66.

The coefficient memory 66 stores tap coefficients for respective classes in accordance with the control by the control unit 72. The coefficient memory 66 outputs a tap coefficient of a class indicated by the class code supplied from the classifying unit 65, that is, the class of the pixel of interest among the tap coefficients for the respective classes in the same manner as the coefficient memory 44 in FIG. 4.

The predicting unit 67 acquires (receives) the prediction tap outputted by the tap extracting unit 63 and the tap coefficient outputted by the coefficient memory 66 and performs a prediction arithmetic operation identical with the prediction arithmetic operation performed by the predicting unit 45 in FIG. 4. Consequently, the predicting unit 67 calculates (a predicted value of) a pixel value of the pixel of interest, that is, a pixel value of a pixel forming the HD image signal (the second image signal). The predicting unit 67 supplies the pixel value to the display control unit 68.

Display format information indicating a display format is supplied to the display control unit 68 from the control unit 72. The display control unit 68 causes the display 69 to display an HD image corresponding to the HD image signal supplied from the predicting unit 67 in the display format indicated by the display format information from the control unit 72.

The display 69 displays an HD image serving as light in the display format conforming to the control by the display control unit 68.

The photo-detector 70 detects (photoelectrically converts) the light serving as the HD image (a display image) displayed on the display 69 and outputs a display image signal equivalent to the HD image signal, which is an electric signal corresponding to the light, to an evaluation-value calculating unit 71.

The evaluation-value calculating unit 71 evaluates not only the display image signal from the photo-detector 70 but also the HD image displayed on the display 69.

In addition to the display image signal supplied from the photo-detector 70, an SHD image signal of interest is supplied to the evaluation-value calculating unit 71 from the learning-data storing unit 61. The evaluation-value calculating unit 71 compares the display image signal from the photo-detector 70 and the SHD image signal of interest from the learning-data storing unit 61 to calculate an evaluation value not only as evaluation of the display image signal but also as evaluation of an image quality that the user looking at the HD image displayed on the display 69 feels. The evaluation-value calculating unit 71 supplies the evaluation value to the control unit 72.

The control unit 72 determines, on the basis of the evaluation value from the evaluation-value calculating unit 71, a signal format of a pseudo photographed image signal, which the control unit 72 causes the pseudo-photographed-image generating unit 62 to generate, equivalent to the SD image signal outputted by the camera 1 (FIG. 1). The control unit 72 supplies signal format information indicating the signal format to the pseudo-photographed-image generating unit 62.

Further, the control unit 72 determines, on the basis of the evaluation value from the evaluation-value calculating unit 71, a display format in which the display control unit 68 displays an HD image corresponding to the HD image signal supplied from the predicting unit 67 on the display 69. The control unit 72 supplies display format information indicating the display format to the display control unit 68.

Moreover, the control unit 72 determines, on the basis of the evaluation value from the evaluation-value calculating unit 71, tap coefficients for respective classes that the image converting unit 73 uses for the image conversion processing. The control unit 72 causes the coefficient memory 66 to store the tap coefficients by controlling the coefficient memory 66.

A relation between the SHD image signal that the learning-data storing unit 61 in FIG. 9 stores as learning data and the HD image signal that (the predicting unit 67 of) the image converting unit 73 outputs (the HD image signal of the HD image displayed on the display 69) will be explained with reference to FIG. 10.

Figure 10:
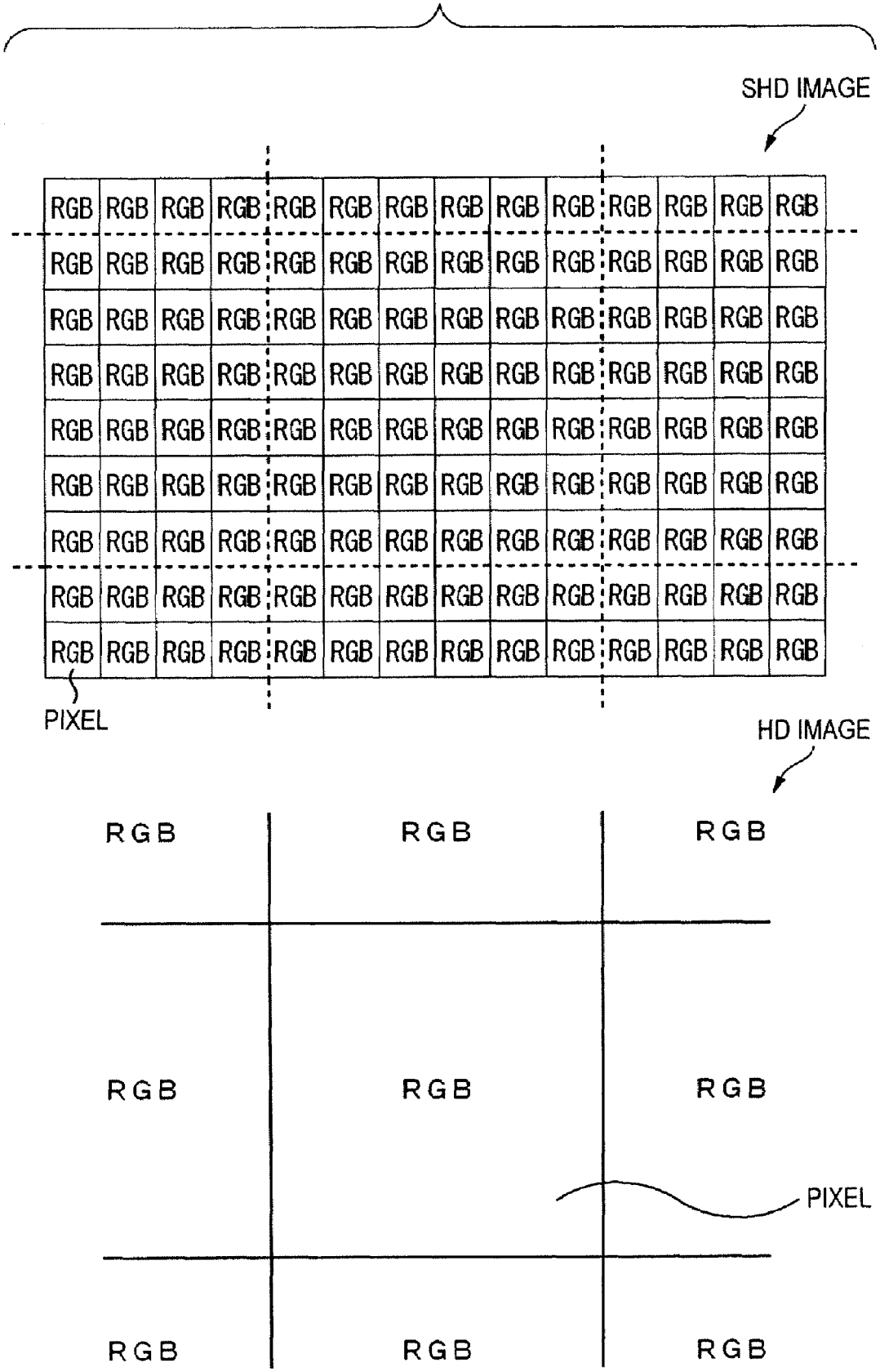
FIG. 10 is a diagram showing an SHD image and an HD image.

The SHD image signal and the HD image signal are the same in that, for example, as shown in the upper part and the lower part in FIG. 10, both the image signals are image signals that have three color components of R, G, and B as a pixel value for one pixel.

However, the HD image signal is an image signal of a low resolution having pixels smaller in number than that of the SHD image signal (the SHD image signal is an image signal of a high resolution having pixels larger in number than that of the HD image signal).

For example, the HD image signal is an image signal, one pixel of which corresponds to 6×6 pixels of the SHD image signal. In FIG. 10, to facilitate understanding of correspondence between one pixel of the HD image signal and 6×6 pixels of the SHD image signal, one pixel of the HD image signal and 6×6 pixels of the SHD image signal are shown in an identical size. However, sizes of pixels of the HD image signal and the SHD image signal do not always have to be in the relation shown in FIG. 10. This holds true for sizes of pixels of the SD image signal and the HD image signal.

A method with which the pseudo-photographed-image generating unit 62 in FIG. 9 generates a pseudo photographed image signal (an SD image signal) from an SHD image signal serving as learning data will be explained with reference to FIGS. 11 and 12.

The pseudo-photographed-image generating unit 62 generates, for example, from an SHD image signal, an HD image signal in the relation explained in FIG. 10 with the SHD image signal. In other words, for example, the pseudo-photographed-image generating unit 62 calculates an average value of each of R, G, and B of 6×6 pixels of the SHD image signal as each of R, G, and B of one pixel of the HD image signal corresponding to the 6×6 pixels or sets R, G, and B of one pixel of any one of 6×6 pixels of the SHD image signal as each of R, G, and B of one pixel of the HD image signal corresponding to the 6×6 pixels to generate the HD image signal. Moreover, the pseudo-photographed-image generating unit 62 generates a pseudo photographed image signal serving as an SD image signal from the HD image signal.

Specifically, here, it is assumed that the SD image signal is, for example, an image signal, one pixel of which corresponds to 2×2 pixels of the HD image signal, and, for example, signal format information indicating the Bayer format shown in the upper part of FIG. 8 is supplied to the pseudo-photographed-image generating unit 62 from the control unit 72. Then, the pseudo-photographed-image generating unit 62 generates, from the HD image signal, for example, as shown in FIG. 11, a pseudo photographed image signal serving as the SD image signal of the signal format indicated by the signal format information from the control unit 72.

Figure 11:
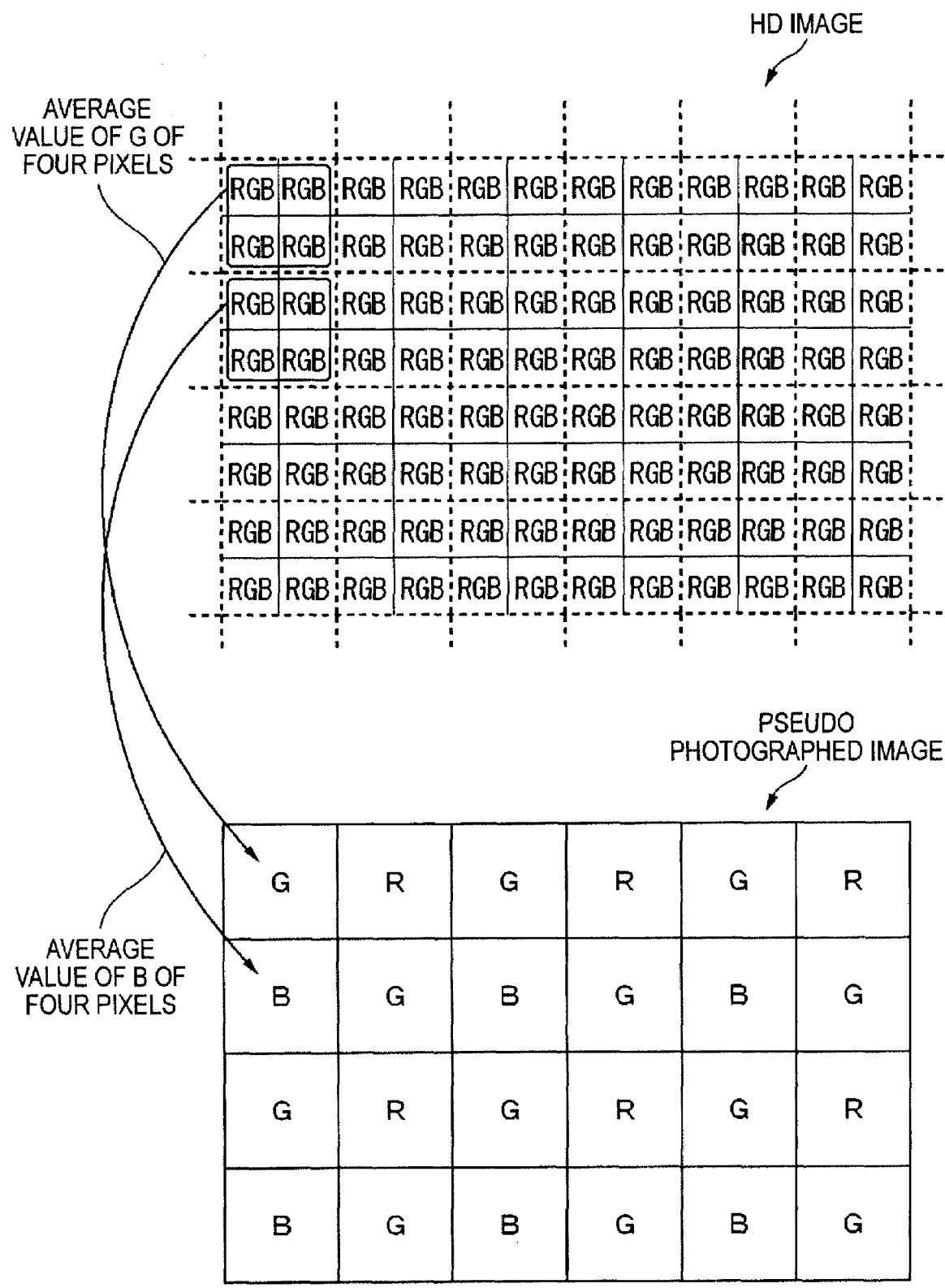
FIG. 11 is a diagram for explaining a generation method of generating a pseudo photographed image.

In this case, the pseudo-photographed-image generating unit 62 detects, as shown in FIG. 11, 2×2 pixels of the HD image signal corresponding to each pixel of the SD image signal of the Bayer format and calculates a pixel value of one pixel of the SD image signal corresponding to the 2×2 pixels to generate an SD image signal of the Bayer format serving as the pseudo photographed image signal.

Each pixel of the SD image signal of the Bayer format has only a color component of any one of R, G, and B as a pixel value. Thus, the pseudo-photographed-image generating unit 62 determines, from 2×2 pixels of the HD image signal, only a color component that one pixel of the SD image signal corresponding to the 2×2 pixel has as a pixel value.

Specifically, when, for example, a pixel having only a G component as a pixel value among pixels of the SD image signal of the Bayer format is set as a pixel of interest, as shown in FIG. 11, an average value or the like of the G component among pixel values of 2×2 pixels of the HD image signal corresponding to the pixel of interest is calculated as a pixel value of the pixel of interest.

When, for example, a pixel having a B component as a pixel value among the pixels of the SD image signal of the Bayer format is set as a pixel of interest, as shown in FIG. 11, an average value or the like of the B component among pixel values of 2×2 pixels of the HD image signal corresponding to the pixel of interest is calculated as a pixel value of the pixel of interest. A pixel value is calculated in the same manner for a pixel having only an R component as a pixel value among the pixels of the SD image signal of the Bayer format.

Besides, for example, signal format information indicating a signal format obtained by shifting positions of pixels of the Bayer format in the downward direction every other column, which is shown on the lower left of FIG. 8, is supplied to the pseudo-photographed-image generating unit 62 from the control unit 72. Even in such a case, the pseudo-photographed-image generating unit 62 generates, from the HD image signal, a pseudo photographed image signal serving as the SD image signal of the signal format indicated by the signal format information from the control unit 72 in the same manner as explained with reference to FIG. 11.

Figure 12:
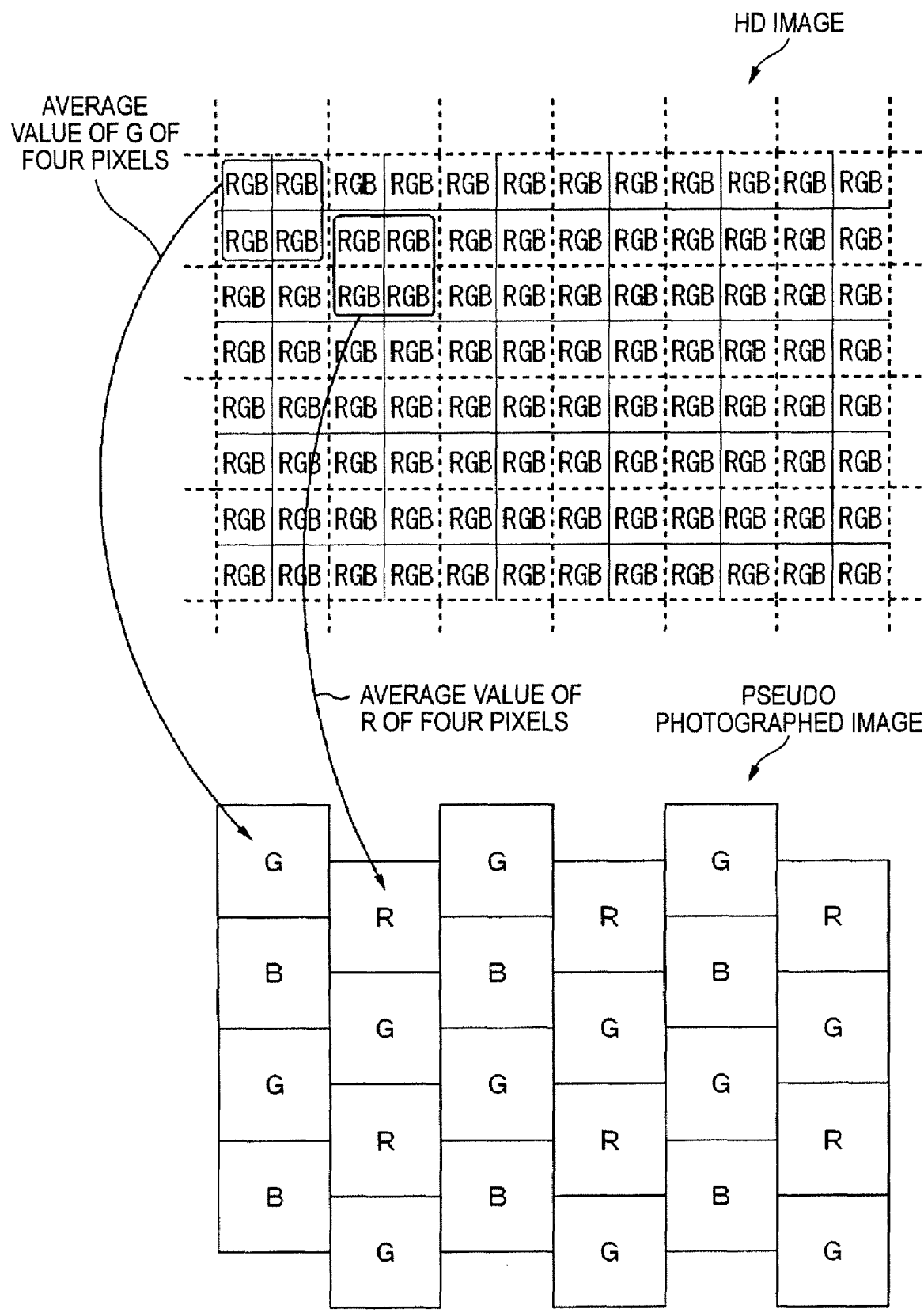
FIG. 12 is a diagram for explaining the generation method of generating a pseudo photographed image.

In other words, when, for example, a pixel having only a G component as a pixel value among pixels of the SD image signal of the signal format shown in the lower left in FIG. 8 is set as a pixel of interest, as shown in FIG. 12, the pseudo-photographed-image generating unit 62 calculates an average value or the like of the G component among pixel values of 2×2 pixels of the HD image signal corresponding to the pixel of interest as a pixel value of the pixel of interest.

When, for example, a pixel having only an R component as a pixel value among the pixels of the SD image signal of the signal format shown in the lower left in FIG. 8 is set as a pixel of interest, as shown in FIG. 12, the pseudo-photographed-image generating unit 62 calculates an average value or the like of the R component among pixels values of 2×2 pixels of the HD image signal corresponding to the pixel of interest as a pixel value of the pixel of interest. A pixel value is calculated in the same manner for a pixel having only a B component as a pixel value among the pixels of the SD image signal of the signal format shown on the lower left in FIG. 8.

In the learning apparatus in FIG. 9, the display control unit 68 causes the display 69 to display an HD image corresponding to the HD image signal in the display format indicated by the display format information supplied from the control unit 72. Therefore, the display 69 can display the HD image in various display formats.

Figure 13:
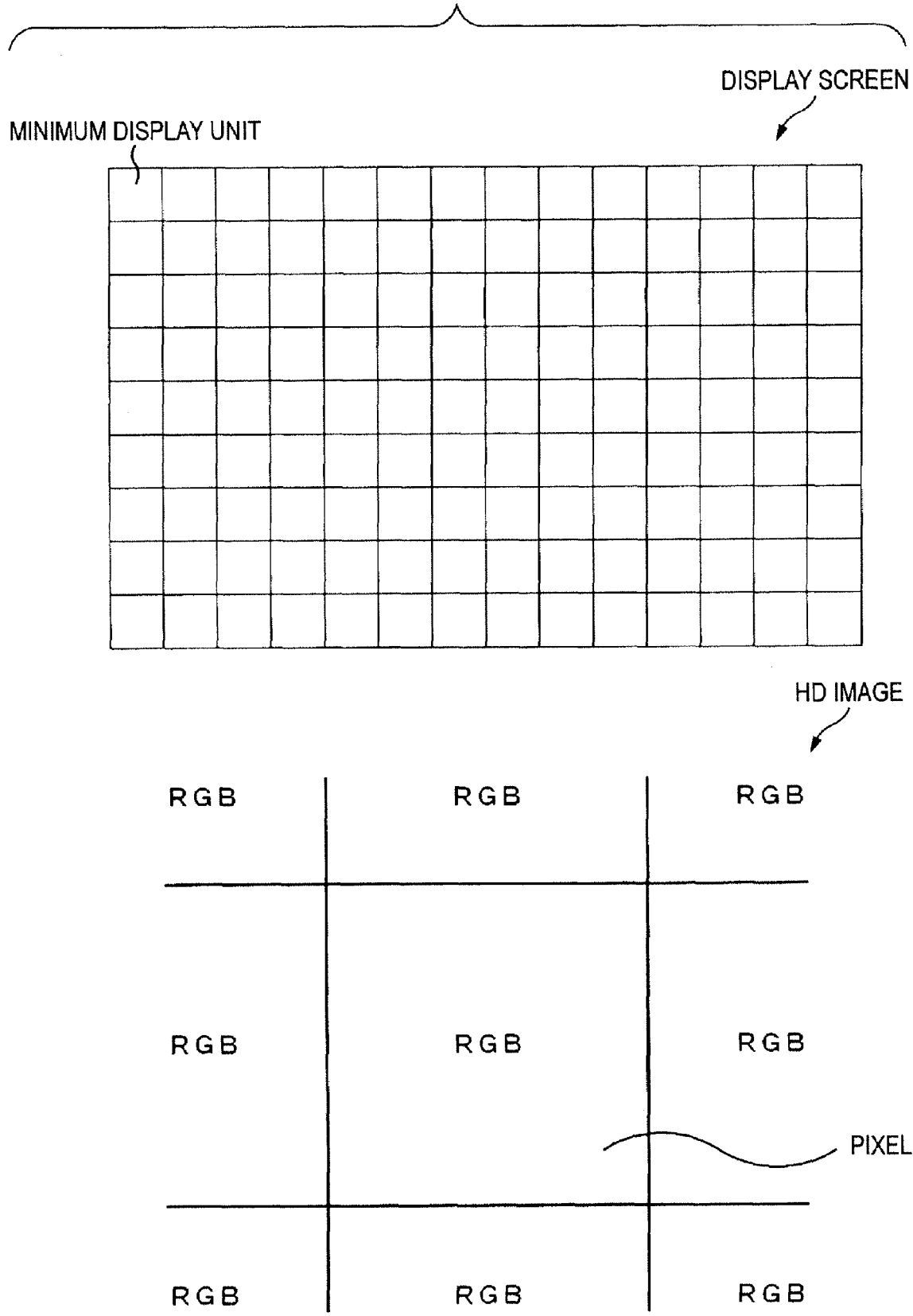
FIG. 13 is a diagram showing an HD image and a display screen of a display 69.

FIG. 13 is a diagram of a relation between a display screen of the display 69 and the HD image.

As shown in the upper part in FIG. 13, the display 69 has a display screen with an area corresponding to one pixel of the SHD image set as a minimum display unit that is a minimum unit in which a color component can be displayed. As explained with reference to FIG. 10, since 6×6 pixels of the SHD image and one pixel of the HD image correspond to each other, in the display screen with the area corresponding to one pixel of the SHD image set as the minimum display unit, a minimum display unit of the 6×6 pixels corresponds to one pixel of the HD image shown in the lower part in FIG. 13. In the display screen, the minimum display unit of 6×6 pieces corresponding to one pixel of the HD image is also referred to as a pixel as appropriate.

Figure 14:
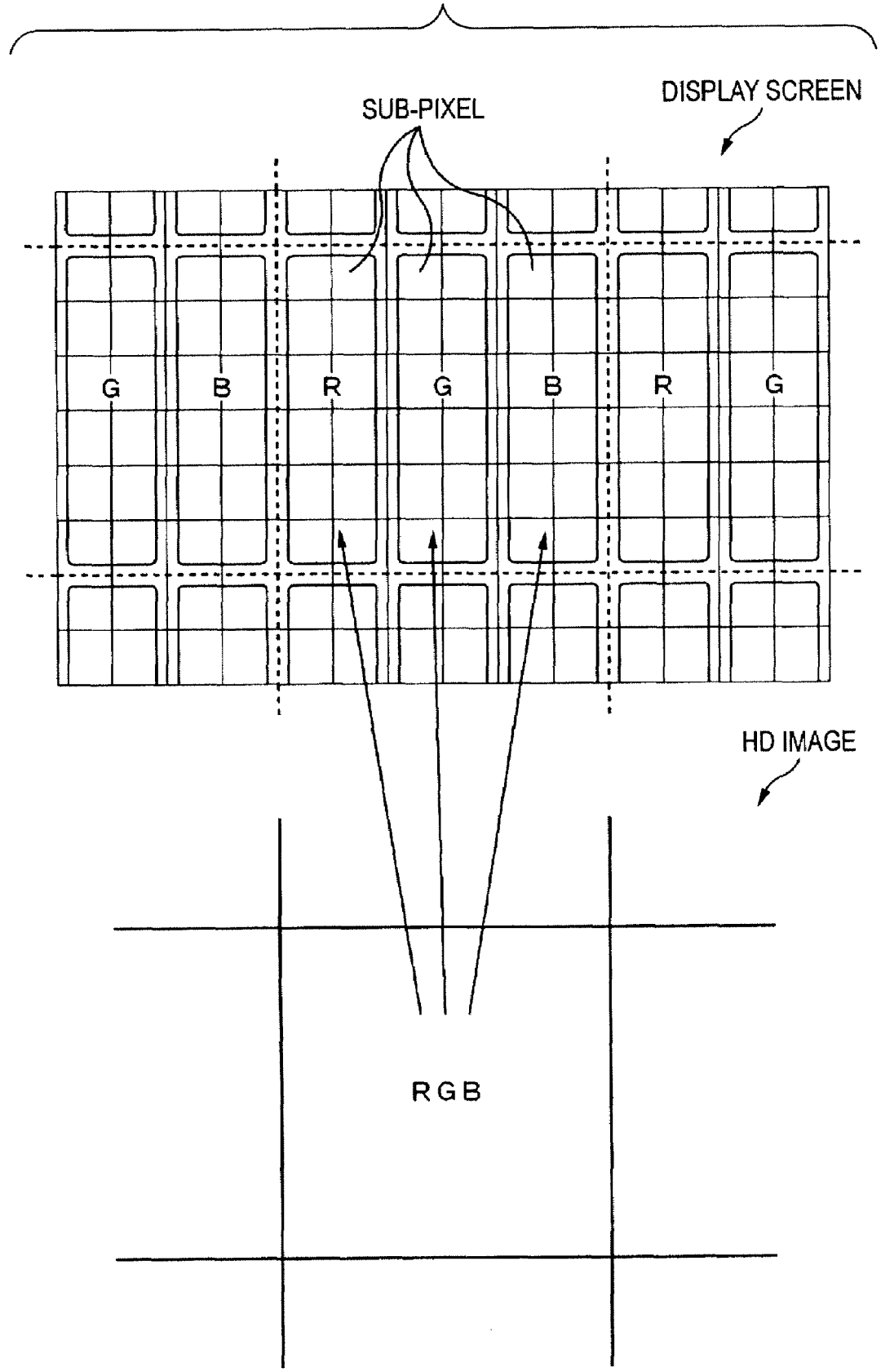
FIG. 14 is a diagram showing the HD image and the display screen of the display 69.
Figure 15:
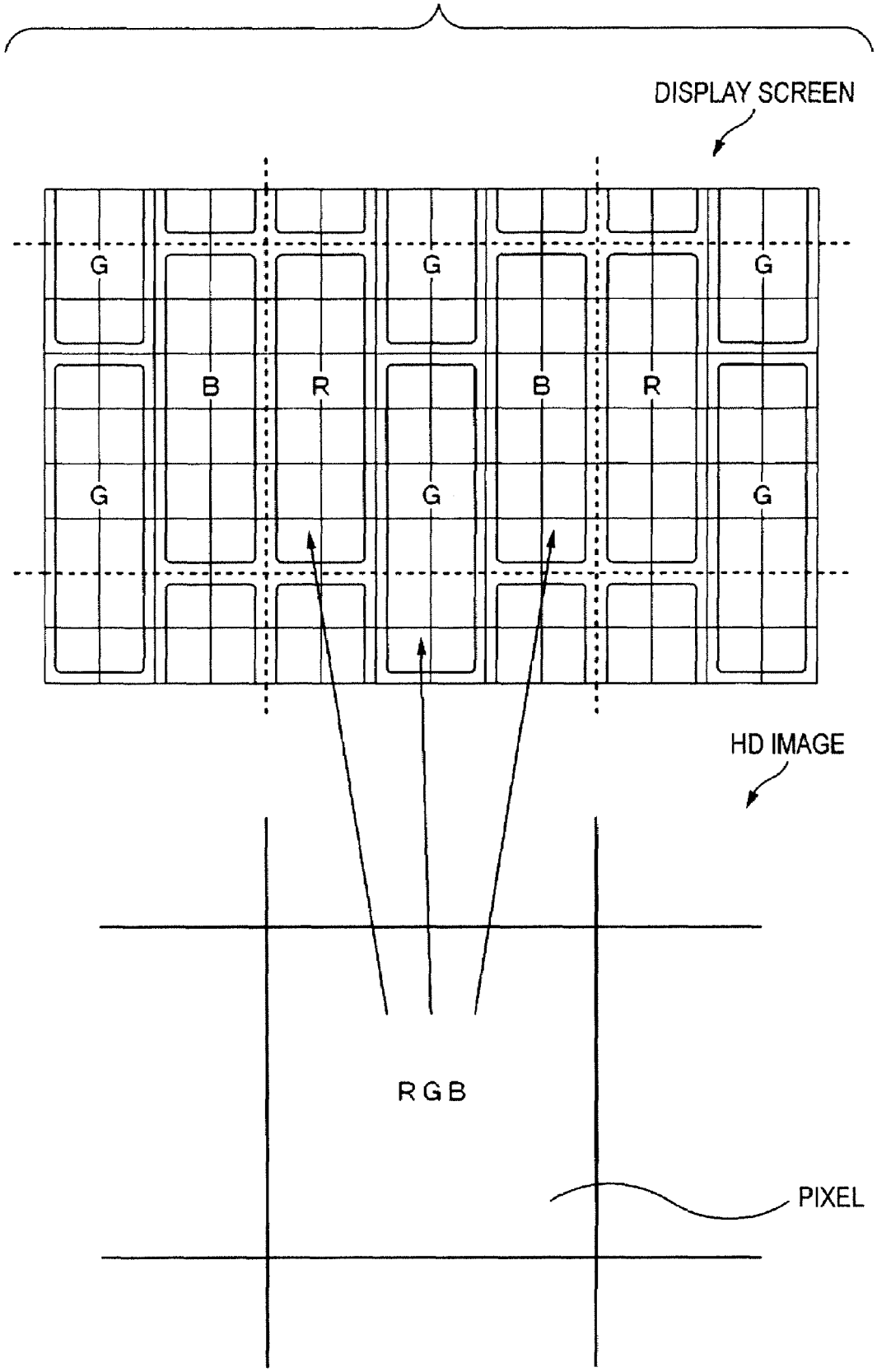
FIG. 15 is a diagram showing the HD image and the display screen of the display 69.

The display control unit 68 causes, for example, as shown in FIGS. 14 and 15, the HD image on the display screen of the display 69 in the display format indicated by the display format information from the control unit 72.

When the display format information from the control unit 72 indicates, for example, the stripe shown on the upper left in FIG. 7, as shown in FIG. 14, the display control unit 68 sets a minimum display unit of 2×6 pieces in the horizontal and the vertical directions, which equally divide pixels of the display screen into three in the horizontal direction, as a sub-pixel. As shown in FIG. 14, the display control unit 68 causes the display 69 to display color components of R, G, B of a pixel of the HD image in first, second, and third sub-pixels from the left of a pixel of the display screen corresponding to the pixel, respectively. Consequently, the HD image is displayed in the stripe indicated by the display format information from the control unit 72.

For example, the display format information from the control unit 72 indicates the display format in which a sub-pixel of G among three sub-pixels arranged in the horizontal direction in an order of R, G, and B of one pixel is arranged in a position lower than sub-pixels of R and B shown on the upper right in FIG. 7. In this case, as shown in FIG. 15, the display control unit 68 sets three sub-pixels (a minimum display unit of 2×6 pieces) of R, G, and B of the display screen to arrange a sub-pixel of G in a position lower than sub-pixels of R and B in the same manner as the display format. As shown in FIG. 15, the display control unit 68 causes the display 69 to display components of R, G, and B of the pixel of the HD image in sub-pixels corresponding thereto of the display screen. Consequently, the HD image is displayed in the display format indicated by the display format information from the control unit 72.

Processing of the evaluation-value calculating unit 71 in FIG. 9 will be explained with reference to FIGS. 16 to 18.

As explained with reference to FIG. 9, the evaluation-value calculating unit 71 compares the display image signal from the photo-detector 70 and the SHD image signal of interest from the learning-data storing unit 61 to calculate an evaluation value not only as evaluation of the display image signal but also as evaluation of an image quality that the user looking at the HD image displayed on the display 69 feels.

The photo-detector 70 detects light serving as the HD image (a display image) displayed on the display 69 for each of R, G, and B. The photo-detector 70 outputs a display image signal that is an HD image signal having an R component, a G component, and a B component, which are electric signals corresponding to the lights of R, G, and B, respectively, as a pixel value of each pixel to the evaluation-value calculating unit 71.

Figure 16:
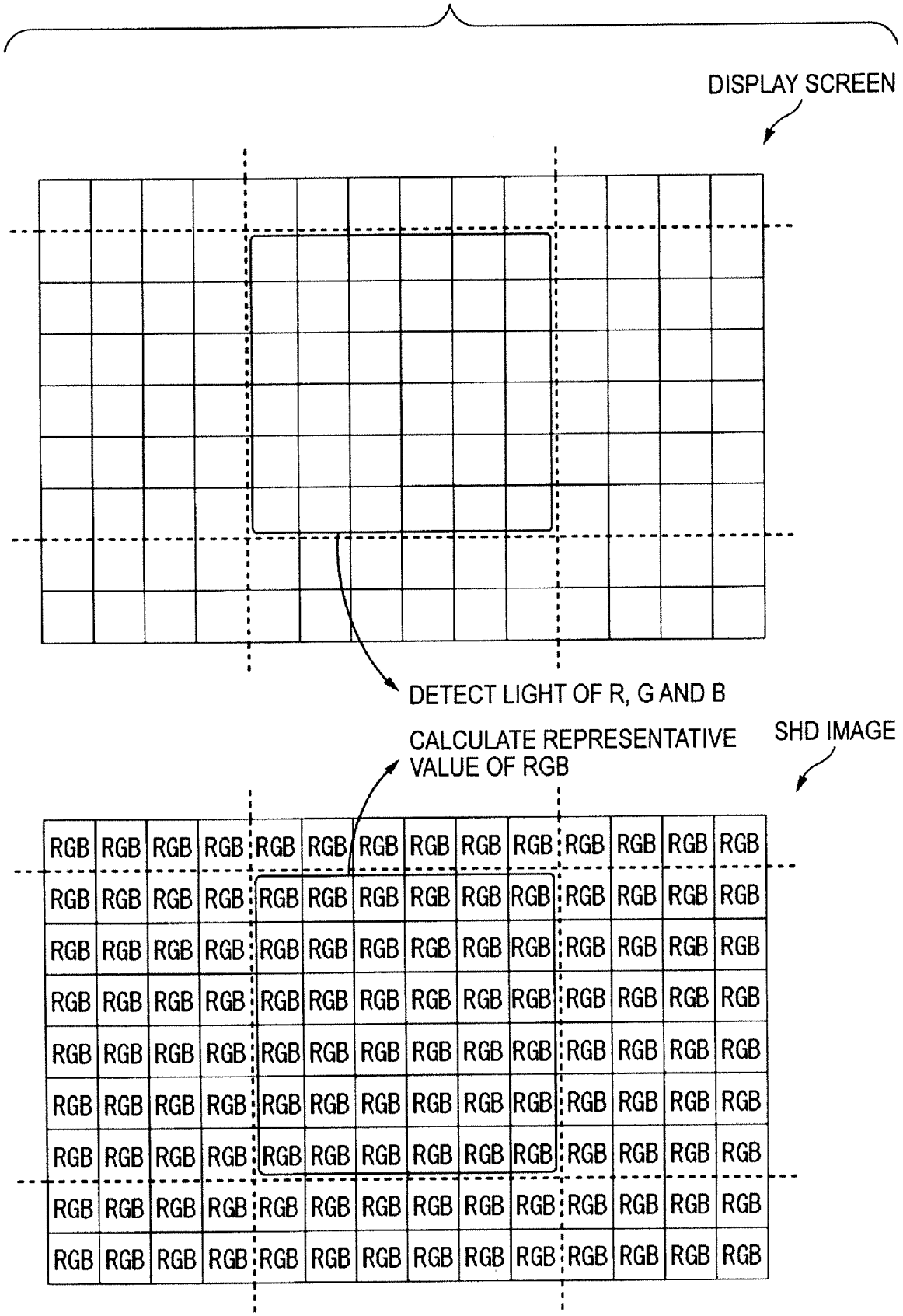
FIG. 16 is a diagram for explaining an evaluation method of evaluating a display image displayed on the display 69.

In other words, as shown in the upper part in FIG. 16, the photo-detector 70 detects light of each pixel, which is formed in the minimum display unit of 6×6 of the display screen of the display 69, for each of R, G, and B. The photo-detector 70 outputs a display image signal that is an HD image signal having an R component, a G component, and a B component, which are electric signals corresponding to the lights of R, G, and B, respectively, as a pixel value of each pixel to the evaluation-value calculating unit 71.

On the other hand, the evaluation-value calculating unit 71 generates an HD image signal for evaluation, which is an HD image signal used for evaluation of the display image signal, from the SHD image signal of interest stored in the learning-data storing unit 61.

Specifically, the evaluation-value calculating unit 71 calculates a representative value, which is set as a pixel value of a pixel of the HD image signal, from a pixel value of 6×6 pixels of the SHD image signal of interest corresponding to the pixel of the HD image signal. In other words, the evaluation-value calculating unit 71 calculates, for example, an average value of each of R, G, and B components of 6×6 pixels of the SHD image signal of interest corresponding to the pixel of the HD image signal or R, G, and B components of any one pixel of the 6×6 pixels as a representative value of each of the R, G, and B components of the 6×6 pixels. The evaluation-value calculating unit 71 generates an HD image signal having representative values of the R, G, and B components of 6×6 pixels of the SHD image signal of interest as R, G, B components of a pixel corresponding thereto, respectively, as an HD image signal for evaluation.

Moreover, the evaluation-value calculating unit 71 calculates, for all pixels of the HD image signal for evaluation obtained from the SHD image signal stored in the learning-data storing unit 61, an square error $(R_1-R_2)^2+(G_1-G_2)^2+(B_1-B_2)^2$ between a pixel value $(R_1, G_1, B_1)$ of a pixel of the HD image signal for evaluation and a pixel value $(R_2, G_2, B_2)$ of a pixel corresponding thereto of the display image signal. The evaluation-value calculating unit 71 calculates a value inversely proportional to a sum of square errors for all pixels of the display image signal as an evaluation value.

Figure 17:
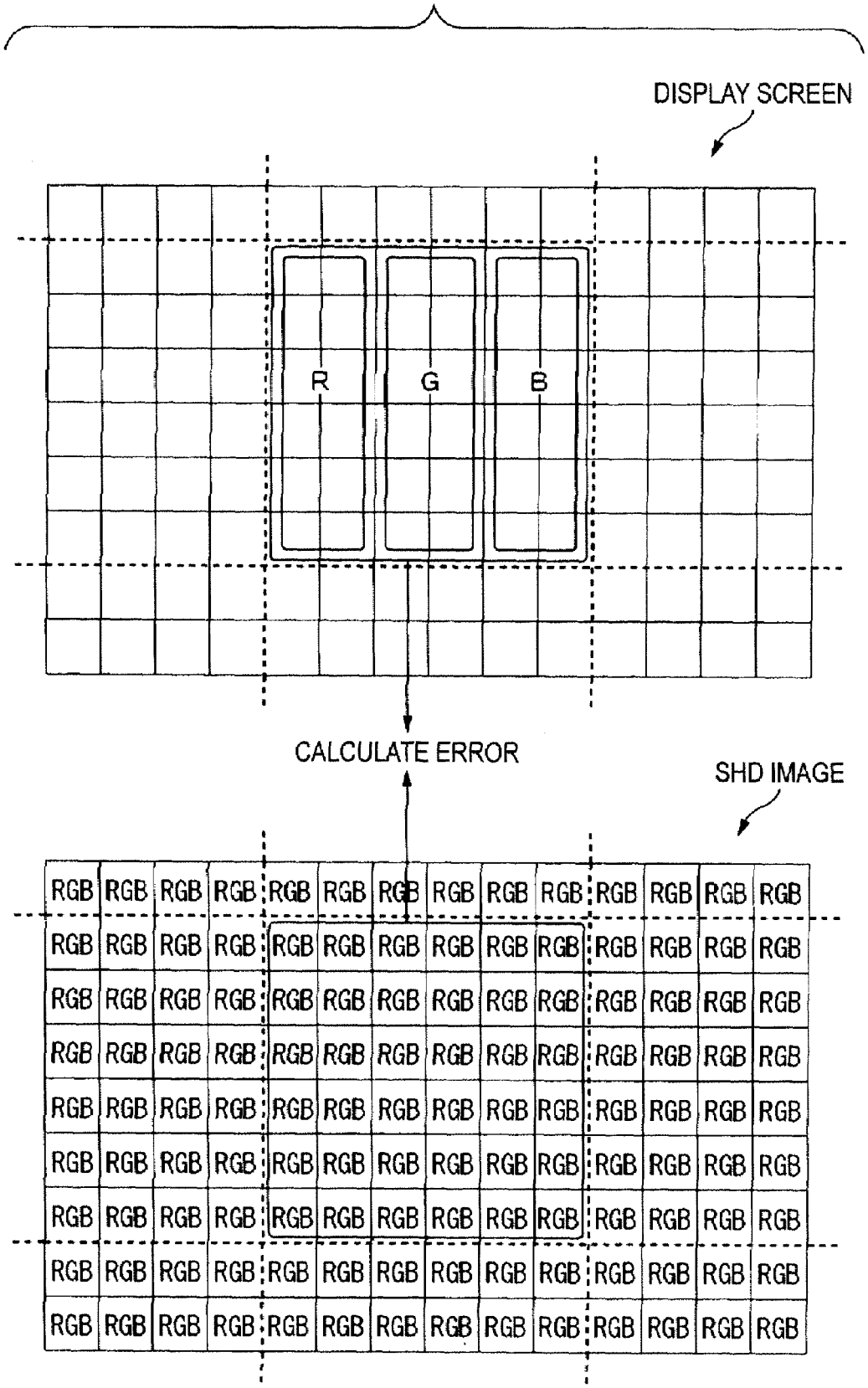
FIG. 17 is a diagram for explaining the evaluation method of evaluating a display image displayed on the display 69.

Therefore, in the display 69, when the HD image is displayed in, for example, the stripe that is the display format shown in FIG. 14, as shown in FIG. 17, the photo-detector 70 (FIG. 9) detects lights of R, G, and B of a minimum unit of 6×6 pixels serving as one pixel of the display screen, that is, lights of R, G, and B of sub-pixels (minimum display units of 2×6 pieces) of respective R, G, and B included in one pixel of the display screen. The photo-detector 70 supplies the R, G, and B components serving as electric signals corresponding to the lights of R, G, and B, respectively, to the evaluation-value calculating unit 71. The evaluation-value calculating unit 71 calculates, for all pixels of the HD image signal for evaluation obtained from the SHD image signal stored in the learning-data storing unit 61, a square error between R, G, and B components from the evaluation-value calculating unit 71 and R, G, and B components of a pixel of the HD image signal for evaluation having a representative value of 6×6 pixels of the SHD image signal of interest as a pixel value. The evaluation-value calculating unit 71 calculates a value inversely proportional to a sum of square errors for all the pixels as an evaluation value.

Figure 18:
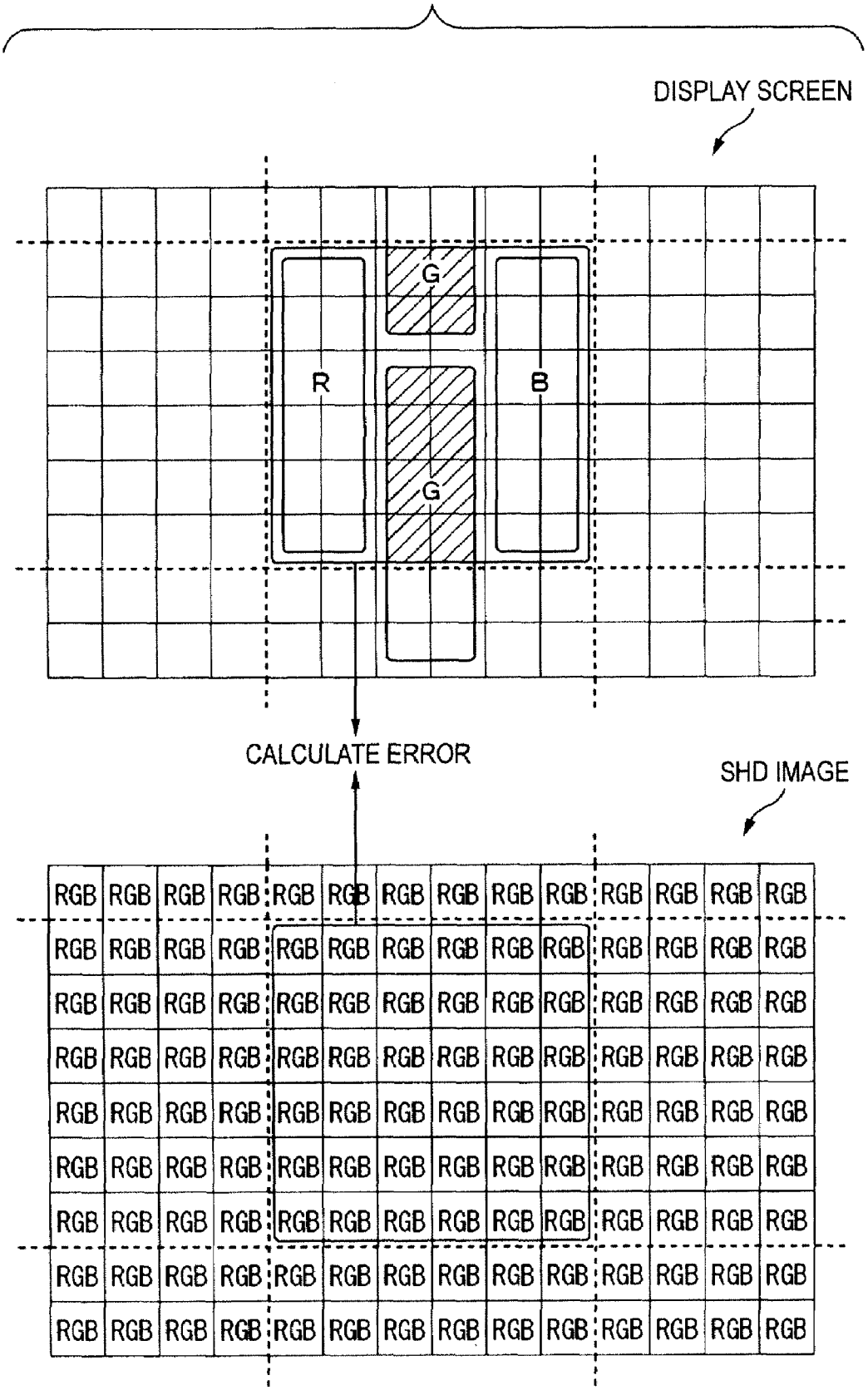
FIG. 18 is a diagram for explaining the evaluation method of evaluating a display image displayed on the display 69.

In the display 69, when the HD image is displayed in, for example, the display format in which a sub-pixel of G among sub-pixels of R, G, and B is arranged in a position lower than sub-pixels of R and B shown in FIG. 15, the photo-detector 70 (FIG. 9) detects lights of R, G, and B of the minimum display units of 6×6 pieces serving as one pixel of the display screen as shown in FIG. 18. The photo-detector 70 supplies R, G, and B components serving as electric signals corresponding to the lights of R, G, and B, respectively, to the evaluation-value calculating unit 71.

In this case, concerning R, the photo-detector 70 detects light of R of one sub-pixel (the minimum display unit of 2×6 pieces) of R included in one pixel of the display screen. The photo-detector 70 supplies an R component serving as an electric signal corresponding to the light of R to the evaluation-value calculating unit 71. Concerning B, similarly, the photo-detector 70 detects light of B of one sub-pixel (the minimum display unit of 2×6 pieces) of B included in one pixel of the display screen. The photo-detector 70 supplies a B component serving as an electric signal corresponding to the light of B to the evaluation-value calculating unit 71.

Concerning G, since the sub-pixel of G is arranged in the position lower than the sub-pixels of R and B, a part of two sub-pixels of G is included in one pixel of the display screen. Therefore, concerning G, the photo-detector 70 detects light (portions indicated by shades in FIG. 18) obtained by combining (totaling) parts of lights of B of the respective two pixels (the minimum display unit of 2×6 pieces) of B included in one pixel of the display screen. The photo-detector 70 supplies a B component serving as an electric signal corresponding to the light combined to the evaluation-value calculating unit 71.

The evaluation-value calculating unit 71 calculates, for all pixels of the HD image signal for evaluation obtained from the SHD image signal stored in the learning-data storing unit 61, a square error between R, G, and B components from the evaluation-value calculating unit 71 and R, G, and B components of a pixel of the HD image signal for evaluation having a representative value of 6×6 pixels of the SHD image signal of interest as a pixel value. The evaluation-value calculating unit 71 calculates a value inversely proportional to a sum of square errors for all the pixels as an evaluation value.

Learning processing for learning a tap coefficient, a signal format, and a display format performed by the learning apparatus in FIG. 9 will be explained with reference to a flowchart in FIG. 19.

In step S31, the control unit 72 determines an initial signal format $A_i$ to be set as a signal format of interest out of plural initial signal formats. The control unit 72 supplies signal format information indicating the signal format of interest $A_i$ to the pseudo-photographed-image generating unit 62 and proceeds to step S32.

In the learning apparatus in FIG. 9, for example, plural signal formats such as the Bayer format and the other existing signal formats are set (determined) as initial signal formats used in the beginning of the learning processing. The control unit 72 stores signal format information indicating the respective plural initial signal formats in a built-in memory (not shown). The control unit 72 determines (sets) one of initial signal formats, which have not been set as interest signal formats, among the plural initial signal formats indicated by the plural pieces of signal format information stored in the built-in memory as the signal format of interest $A_i$. The control unit 72 supplies signal format information indicating the signal format of interest $A_i$ to the pseudo-photographed-image generating unit 62.

Here, $A_i$ indicates, for example, an ith initial signal format among the plural initial signal formats.

In step S32, the control unit 72 determines an initial display format $B_j$ to be set as a display format of interest out of the plural initial display formats. The control unit 72 supplies display format information indicating the display format of interest $B_j$ to the display control unit 68 and proceeds to step S33.

In the learning apparatus in FIG. 9, for example, plural display formats such as the stripe, the delta, and the other existing display formats are set as initial display formats used in the beginning of the learning processing. The control unit 72 stores display format information indicating the respective plural initial display formats in the built-in memory. The control unit 72 determines one of initial display formats, which have not been set as interest display formats, among the plural initial display formats indicated by the plural pieces of display format information stored in the built-in memory as the display format of interest $B_j$. The control unit 72 supplies display format information indicating the display format of interest $B_j$ to the display control unit 68.

Here, $B_j$ indicates, for example, a jth initial display format among the plural initial display formats.

In step S33, the control unit 72 in the learning apparatus (FIG. 9) determines a provisional optimum set of tap coefficients (a set of tap coefficients $(x_1, x_2, \ldots, x_N)$ of respective classes used in the arithmetic operation of Equation (1)) $F_{i,j}$ for a combination of the signal format of interest $A_i$ and the display format of interest $B_j$.

In other words, in step S33, the control unit 72 determines, for the combination of the signal format of interest $A_i$ and the display format of interest $B_j$, a set of tap coefficients for providing a highest evaluation value of a display image signal obtained by detecting light serving as an HD image displayed on the display 69 when the HD image is displayed on the display 69 in the display format of interest $B_j$ with the photo-detector 70 as the provisional optimum set of tap coefficients $F_{i,j}$. The HD image corresponds to an HD image signal serving as a second image signal, which is formed by pixels having respective components of R, G, and B as pixel values, obtained by performing the image conversion processing using a tap coefficient in the image converting unit 11 in FIG. 4 with an SD image signal of the signal format of interest $A_i$ as a first image signal.

The control unit 72 proceeds from step S33 to step S34. The control unit 72 judges whether all the plural initial display formats indicated by the plural pieces of display format information stored in the built-in memory have been set as interest display formats and a set of tap coefficients is determined in step S33.

When it is judged in step S34 that all the plural initial display formats have not been set as interest display formats, the control unit 72 returns to step S32. The control unit 72 determines one of the initial display formats, which have not been set as a display format of interest, among the plural initial display formats as a display format of interest anew. The control unit 72 supplies display format information indicating the display format of interest to the display control unit 68. Subsequently, the control unit 72 repeats the same processing.

When it is judged in step S34 that all the plural initial display formats have been set as initial display formats, the control unit 72 proceeds to step S35. The control unit 72 judges whether all the plural initial signal formats indicated by the plural pieces of signal format information stored in the built-in memory have been set as interest signal formats and a set of tap coefficients is determined in step S33.

When it is judged in step S35 that all the plural initial signal formats have not been set as interest signal formats, the control unit 72 returns to step S31. The control unit 72 determines one of initial display formats, which have not been set as interest signal formats, among the plural initial signal formats as a signal format of interest anew. The control unit 72 supplies signal format information indicating the signal format of interest to the pseudo-photographed-image generating unit 62. Subsequently, the control unit 72 repeats the same processing.

When it is judged in step S35 that all the plural initial signal formats have been set as interest signal formats, that is, an optimum set of tap coefficients is determined for all combinations of the respective plural initial signal formats and the respective plural initial display formats in step S33, the control unit 72 proceeds to step S36. The control unit 72 provisionally determines a combination of an optimum signal format, an optimum display format, and an optimum set of tap coefficients out of combinations of initial signal formats and initial display formats and an optimum set of tap coefficients for a combination of the initial signal formats and the initial display formats.

When there are I kinds of signal formats as the plural initial signal formats and there are J kinds of display formats as the plural initial display formats, in step S33, the control unit 72 determines a provisional optimum set of tap coefficients for each of I×J kinds of combinations of initial signal formats and initial display formats. As a result, the control unit 72 obtains I×J kinds of combinations of initial signal formats, initial display formats, and sets of tap coefficients. In step S36, the control unit 72 provisionally determines a combination with a maximum evaluation value of a display image signal out of the I×J combinations of initial signal formats, initial display formats, and sets of tag coefficients as a combination of an optimum signal format, an optimum display format, and an optimum set of tap coefficients.

When the combination of the optimum signal format, the optimum display format, and the optimum set of tap coefficients is provisionally determined in step S36, the control unit 72 proceeds to step S37. The control unit 72 performs optimum signal format determination processing for provisionally determining an optimum signal format for a combination of present optimum display format and present optimum set of tap coefficients and proceeds to step S38.

In step S38, the control unit 72 performs optimum display format determination processing for provisionally determining an optimum display format for a combination of present optimum signal format and present optimum set of tap coefficients and proceeds to step S39.

In step S39, the control unit 72 performs optimum tap coefficient set determination processing for provisionally determining an optimum set of tap coefficients for a combination of present optimum signal format and present optimum display format and proceeds to step S40.

In step S40, the control unit 72 judges whether a combination of the present optimum signal format determined in the immediately preceding step S37, the present optimum display format determined in the immediately preceding step S38, and the present optimum set of tap coefficients determined in the immediately preceding step S39 is an optimized combination.

In the optimum tap coefficient set determining processing in the immediately preceding step S39, the control unit 72 provisionally determines, for a combination of present provisional optimum signal format and present provisional optimum display format, a set of tap coefficients, which maximizes an evaluation value calculated by the evaluation-value calculating unit 71 as described later, as an optimum set of tap coefficients. However, in step S40, for example, the control unit 72 judges, according to whether an evaluation value for the optimum set of tap coefficients is equal to or larger than (larger than) a predetermined threshold for judgment of optimization, whether a combination of a present provisional optimum signal format, a present provisional optimum display format, and a present provisional In the image processing system in FIG. 1, the camera 1 outputs a photographed image signal (an SD image signal) of the optimum signal format finally determined by the learning processing in FIG. 19. The display control unit 12 (FIG. 2) of the display apparatus 2 causes the display 13 to display an HD image in the optimum display format finally determined by the learning processing in FIG. 19. The optimum set of tap coefficients finally determined by the learning processing in FIG. 19 is stored in the coefficient memory 44 of the image converting unit 11 of the display apparatus 2. The image converting unit 11 performs the image conversion processing using the set of tap coefficients.

As a result, it is possible to improve performance of the image processing system that is the combination of the camera 1 and the display apparatus 2 in FIG. 1. In other words, according to the image processing system that is the combination of the camera 1 and the display apparatus 2 in FIG. 1, apart from S/Ns (Signal to Noise ratios) and the like of a photographed image signal outputted by the camera 1 and an HD image signal outputted by the image converting unit 11, it is possible to display an image that the user feels high in quality on the display 13.

Figure 19:
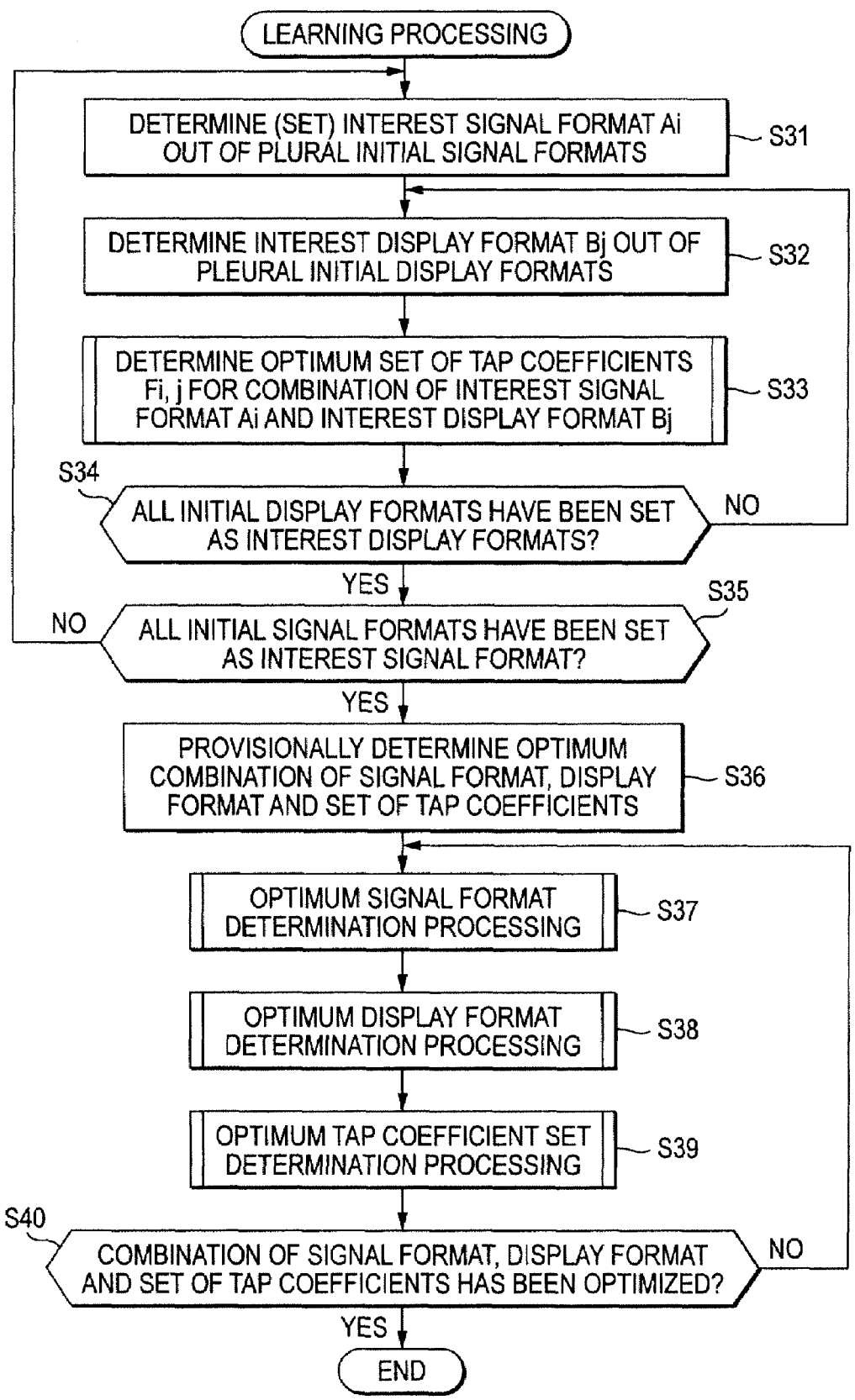
FIG. 19 is a flowchart for explaining processing by the learning apparatus that learns an optimum signal format, an optimum display format, and an optimum tap coefficient.

In FIG. 19, when an evaluation value of the set of tap coefficients determined in the optimum tap coefficient set determination processing is equal to or higher than the optimum display format, and a present provisional optimum set of tap coefficients is an optimized combination.

When it is judged in step S40 that the combination of the present provisional optimum signal format, the present provisional optimum display format, and the present provisional set of tap coefficients is not an optimized combination, that is, when the evaluation value for the optimum set of tap coefficients provisionally determined in the immediately preceding step S39 is not equal to or larger than the threshold for judgment of optimization, the control unit 72 returns to step S37 and repeats the same processing.

When it is judged in step S40 that the combination of the present provisional optimum signal format, the present provisional optimum display format, and the present provisional set of tap coefficients is an optimized combination, that is, when the evaluation value for the optimum set of tap coefficients provisionally determined in the immediately preceding step S39 is equal to or larger than the threshold for judgment of optimization, the control unit 72 finally determines the combination of the present provisional optimum signal format, the present provisional optimum display format, and the present provisional set of tap coefficients as a combination of an optimum signal format, an optimum display format, and an optimum set of tap coefficients and ends the learning processing.

threshold for judgment of optimization, the control unit 72 judges that a combination of a signal format, a display format, and a set of tap coefficients is optimized. Besides, for example, it is also possible to judge that a combination of a signal format, a display format, and a set of tap coefficients is optimized when the optimum signal format determination processing, the optimum display format determination processing, and the optimum tap coefficient set determination processing are repeated a predetermined number of times.

The processing in step S33 in FIG. 19 for determining the provisional set of tap coefficients $F_{i,j}$ for the signal format of interest $A_i$ and the display format of interest $B_j$ will be described in detail with reference to a flow chart in FIG. 20.

In step S51, the control unit 72 determines a set of tap coefficients for each class that the image converting unit 73 uses for the image conversion processing. For example, when a total number of classes is $\alpha$, the number of tap coefficients of each class is $\beta$ (N in Equation (1)), and the number of bits of the tap coefficient is $\gamma$, there are $\alpha \times \beta \times 2^{\gamma}$ kinds as a number that a set of tap coefficients can take. The control unit 72 determines one of sets of tap coefficients, which have not been set as interest tap coefficient sets in the present processing in FIG. 20, among the $\alpha \times \beta \times 2^{\gamma}$ kinds of sets of tap coefficients as a tap coefficient set of interest.

The control unit 72 supplies the tap coefficient set of interest to the coefficient memory 66 and causes the coefficient memory 66 to store the tap coefficient set of interest. The control unit 72 proceeds from step S51 to S52.

In step S52, the control unit 72 supplies signal format information indicating the signal format of interest $A_i$ to the pseudo-photographed-image generating unit 62 and causes the pseudo-photographed-image generating unit 62 to generate an SD image signal serving as a pseudo photographed image signal of the signal format of interest $A_i$.

When the signal format information indicating the signal format of interest $A_i$ is supplied from the control unit 72, for example, the pseudo-photographed-image generating unit 62 curtails the number of pixels of the SHD image signal stored in the learning-data storing unit 61 to generate an SD image signal of the signal format of interest $A_i$. The control unit 72 supplies the SD image signal to the image converting unit 73 as a pseudo photographed image signal equivalent to the photographed image signal outputted by the camera 1 (FIG. 1).

Thereafter, the image converting unit 73 proceeds from step S52 to step S53. The image converting unit 73 sets the pseudo photographed image signal (the SD image signal) of the signal format of interest $A_i$ supplied from the pseudo-photographed-image generating unit 62 as a first image signal. The image converting unit 73 performs image conversion processing for converting the first image signal into, for example, an HD image signal serving as a second image signal, one pixel of which has all R, G, and B components.

In step S53, first, in step $S53_1$, the tap extracting unit 63 of the image converting unit 73 sets the pseudo photographed image signal supplied from the pseudo-photographed-image generating unit 62 as a first image signal and sets an HD image signal having a high quality (high resolution) intended to be obtained by converting the first image signal as a second image signal (since the HD image signal serving as the second image signal is an image signal to be determined and is not present at the present stage, the HD image signal is imaginarily assumed). The tap extracting unit 63 sequentially sets pixels constituting the second image signal as a pixel of interest. The tap extracting unit 63 extracts, for the pixel of interest, a prediction tap of a tap structure identical with the prediction tap extracted by the tap extracting unit 41 in FIG. 4 from the first image signal and supplied the prediction tap to the predicting unit 67.

In step $S53_1$, the tap extracting unit 64 extracts, for the pixel of interest, a class tap of a tap structure identical with the class tap extracted by the tap extracting unit 42 in FIG. 4 from the first image signal. The tap extracting unit 64 supplies the class tap to the class tap to the classifying unit 65.

The classifying unit 65 proceeds from step $S53_1$ to step $S53_2$. The classifying unit 65 classifies the pixel of interest on the basis of the class tap from the tap extracting unit 64 according to a method identical with the method of the classifying unit 43 in FIG. 4. The classifying unit 65 supplies a class code corresponding to a class obtained as a result of the classification to the coefficient memory 66 and proceeds to step $S53_3$.

In step $S53_3$, the coefficient memory 66 acquires, in accordance with the control by the control unit 72, a tap coefficient of the class indicated by the class code supplied from the classifying unit 65, that is, the class of the pixel of interest among the tap coefficient set of interest stored therein. The coefficient memory 66 outputs the tap coefficient to the predicting unit 67 and proceeds to step $S53_4$.

In step $S53_4$, the predicting unit 67 acquires the prediction tap outputted by the tap extracting unit 63 and the tap coefficient outputted by the coefficient memory 66 and performs a prediction arithmetic operation identical with the prediction arithmetic operation performed by the predicting unit 45 in FIG. 4, for example, the arithmetic operation of Equation (1). Consequently, the predicting unit 67 calculates (a predicted value of) a pixel value of the pixel of interest, that is, a pixel value of a pixel forming the HD image signal (the second image signal). The predicting unit 67 supplies the pixel value to the display control unit 68.

After the processing in step S53, the control unit 72 proceeds to step S54. The control unit 72 supplies display format information indicating the display format of interest $B_j$ to the display control unit 68. Consequently, the display control unit 68 causes the display 69 to display an HD image corresponding to the HD image signal outputted by the image converting unit 73 in the display format of interest $B_j$ indicated by the display format information from the control unit 72. The control unit 72 proceeds from step S54 to step S55.

In step S55, the photo-detector 70 detects (photoelectrically converts) light serving as the HD image (a display image) displayed on the display 69 and outputs a display image signal equivalent to the HD image signal, which is an electric signal corresponding to the light, to the evaluation-value calculating unit 71. The photo-detector 70 proceeds to step S56.

In step S56, the evaluation-value calculating unit 71 evaluates not only the display image signal from the photo-detector 70 but also the HD image displayed on the display 69.

The evaluation-value calculating unit 71 reads out, from the learning-data storing unit 61, an SHD image signal corresponding to the display image signal from the photo-detector 70. The evaluation-value calculating unit 71 compares the display image signal and the corresponding SHD image signal to calculate an evaluation value not only as evaluation of the display image signal but also as evaluation of an image quality that the user looking at the HD image displayed on the display 69 feels. The evaluation-value calculating unit 71 supplies the evaluation value to the control unit 72.

The processing in steps S52 to S56 is applied to all frames of the SHD image signal stored in the learning-data storing unit 61. The control unit 72 calculates, for the tap coefficient set of interest, for example, a sum of evaluation values obtained for all the frames of the SHD image signal stored in the learning-data storing unit 61. The control unit 72 temporarily stores the sum as a final evaluation value for the tap coefficient set of interest.

Thereafter, the control unit 72 proceeds from step S56 to step S57. The control unit 72 judges whether evaluation values have been calculated for all $\alpha \times \beta \times 2^\gamma$ kinds of values that the set of tap coefficients can take.

Figure 20:
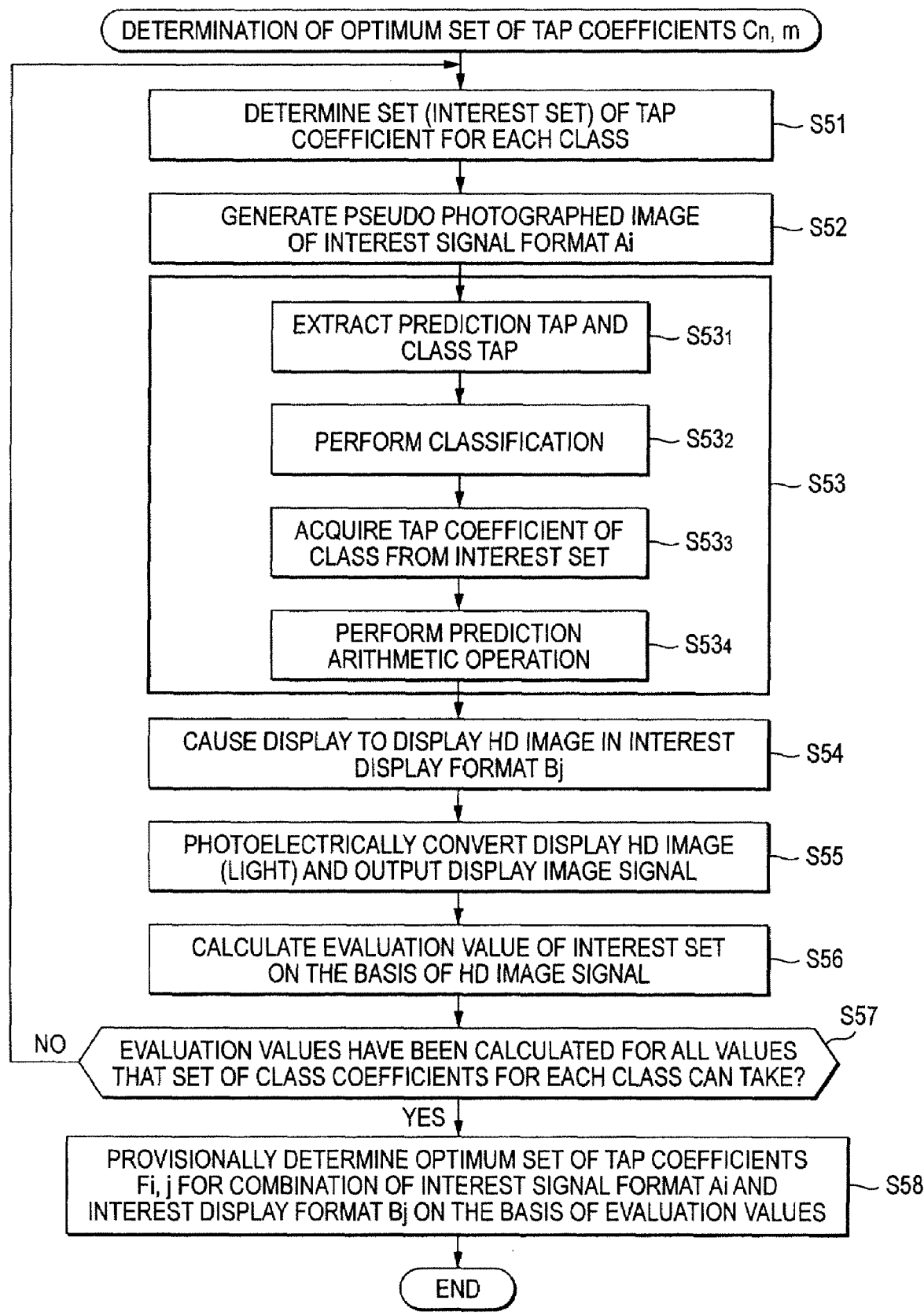
FIG. 20 is a flowchart for explaining details of processing in step S33.

When it is judged in step S57 that evaluation values have not been calculated for all the $\alpha \times \beta \times 2^\gamma$ kinds of values that the set of tap coefficients can take, that is, when there are sets of tap coefficients, which have not been set as interest tap coefficient sets in the present processing in FIG. 20, among the $\alpha \times \beta \times 2^\gamma$ kinds of sets of tap coefficients, the control unit 72 returns to step S51. The control unit 72 determines one of the sets of tap coefficients, which have not been set as interest tap coefficient sets in the present processing in FIG. 20, among the $\alpha \times \beta \times 2^\gamma$ kinds of sets of tap coefficients as a tap coefficient set of interest. Subsequently, the control unit 72 repeats the same processing.

When it is judged in step S57 that evaluation values have been calculated for all the $\alpha \times \beta \times 2^\gamma$ kinds of values that the set of tap coefficients can take, the control unit 72 proceeds to step S58. The control unit 72 determines a set of tap coefficients having a highest evaluation value among the $\alpha \times \beta \times 2^\gamma$ kinds of sets of tap coefficients as an optimum set of tap coefficients $F_{i,j}$ for the combination of the signal format of interest $A_i$ and the display format of interest $B_j$. The control unit 72 returns to the start of the processing.

As explained with reference to FIG. 19, when there are I kinds of signal formats as plural initial signal formats and there are J kinds of display formats as plural initial display formats, the processing in FIG. 20, which is the processing in step S33, is performed I×J times. As a result, I×J kinds of combinations of initial signal formats, initial display formats, and sets of tap coefficients are obtained. In step S36 in FIG. 19, a combination with a maximum evaluation value obtained in the processing in FIG. 20 is provisionally determined as a combination of an optimum signal format, an optimum display format, and an optimum set of tap coefficients out of the I×J combinations of initial signal formats, initial display formats, and sets of tag coefficients.

Learning for a tap coefficient for calculating an evaluation value for all the $\alpha \times \beta \times 2^\gamma$ kinds of values that a set of tap coefficients can take and determining a tap coefficient having a highest evaluation value as described above is called round-robin learning.

The optimum signal format determination processing in step S37 in FIG. 19 will be described in detail with reference to a flowchart in FIG. 21.

In step S71, the control unit 72 determines plural candidates of an optimum signal format with a present provisional (provisionally determined) optimum signal format as a reference.

For example, when the Bayer format is the present provisional optimum signal format, for example, as shown in FIG. 8, the control unit 72 determines several (plural) signal formats of signal formats obtained by slightly transforming the Bayer format as plural candidates of the optimum signal format. Concerning how the present provisional optimum signal format is transformed in order to obtain plural candidates of the optimum signal format, for example, a transformation rule is determined in advanced. The control unit 72 transforms the present provisional optimum signal format in accordance with the transformation rule and determines plural candidates of the optimum signal format.

After the processing in step S71, the control unit 72 proceeds to step S72. The control unit 72 determines one of signal formats, which have not been set as interest signal formats, among the plural candidates of the optimum signal format as a signal format of interest. The control unit 72 supplies signal format information indicating the signal format of interest to the pseudo-photographed-image generating unit 62 and proceeds to step S73.

In step S73, for example, the pseudo-photographed-image generating unit 62 curtails the number of pixels of the SHD image signal stored in the learning data storing unit 61 to generate an SD image signal of a signal format of interest indicated by the signal format information from the control unit 72. The control unit 72 supplies the SD image signal to the image converting unit 73 as a pseudo photographed image signal equivalent to the photographed image signal outputted by the camera 1 (FIG. 1) and proceeds to step S74.

In step S74, the control unit 72 causes the coefficient memory 66 to store a present provisional optimum set of tap coefficients. Further, in step S74, as in step S53 in FIG. 20, the image converting unit 73 sets the pseudo photographed image signal (the SD image signal) of the signal format of interest supplied from the pseudo-photographed-image generating unit 62 as a first image signal. The image converting unit 73 performs image conversion processing for converting the first image signal into an HD image signal serving as a second image signal according to an arithmetic operation between the first image signal and the present provisional optimum set of tap coefficients stored in the coefficient memory 66. The image converting unit 73 supplies an HD image signal obtained as a result of the image conversion processing to the display control unit 68.

After the processing in step S74, the control unit 72 proceeds to step S75. The control unit 72 supplies display format information indicating a present provisional optimum display format to the display control unit 68. Consequently, the display control unit 68 causes the display 69 to display an HD image corresponding to the HD image signal outputted by the image converting unit 73 in the present provisional optimum display format indicated by the display format information from the control unit 72. The display control unit 68 proceeds from step S75 to step S76.

In step S76, the photo-detector 70 detects (photoelectrically converts) light serving as the HD image (a display image) displayed on the display 69 and outputs a display image signal equivalent to the HD image signal, which is an electric signal corresponding to the light, to the evaluation-value calculating unit 71. The photo-detector 70 proceeds to step S77.

In step S77, the evaluation-value calculating unit 71 evaluates not only the display image signal from the photo-detector 70 but also the HD image displayed on the display 69.

The evaluation-value calculating unit 71 reads out, from the learning-data storing unit 61, an SHD image signal corresponding to the display image signal from the photo-detector 70. The evaluation-value calculating unit 71 compares the display image signal and the corresponding SHD image signal to calculate an evaluation value not only as evaluation of the display image signal but also as evaluation of an image quality that the user looking at the HD image displayed on the display 69 feels. The evaluation-value calculating unit 71 supplies the evaluation value to the control unit 72.

The processing in steps S73 to S77 is applied to all frames of the SHD image signal stored in the learning-data storing unit 61. The control unit 72 calculates, for the signal format of interest, for example, a sum of evaluation values obtained for all the frames of the SHD image signal stored in the learning-data storing unit 61. The control unit 72 temporarily stores the sum as a final evaluation value for the tap coefficient set of interest.

Thereafter, the control unit 72 proceeds from step S77 to step S78. The control unit 72 judges whether evaluation values have been calculated for all the plural candidates of the optimum signal format.

When it is judged in step S78 that evaluation values have not been calculated for all the plural candidates of the optimum signal format, the control unit 72 returns to step S72. The control unit 72 determines one of signal formats, which have not been set as interest signal formats, among the plural candidates of the optimum signal format as a signal format of interest anew. Subsequently, the control unit 72 repeats the same processing.

When it is judges in step S78 that evaluation values are calculated for all the plural candidates of the optimum signal format, the control unit 72 proceeds to step S79. The control unit 72 provisionally determines a candidate having a highest evaluation value among the plural candidates of the optimum signal format as an optimum signal format for a combination of a present provisional optimum display format and a present provisional optimum set of tap coefficients anew. The control unit 72 returns to the start of the processing.

The optimum display format determination processing in step S38 in FIG. 19 will be described in detail with reference to a flowchart in FIG. 22.

In step S91, the control unit 72 determines plural candidates of the optimum display format with a present provisional (provisionally determined) optimum display format as a reference.

For example, when the stripe is the present provisional optimum display format, for example, as shown in FIG. 7, the control unit 72 determines several (plural) display formats obtained by slightly transforming the stripe as plural candidates of the optimum display format. Concerning how the present provisional optimum display format is transformed in order to obtain plural candidates of the optimum display format, for example, a transformation rule is determined in advanced. The control unit 72 transforms the present provisional optimum display format in accordance with the transformation rule and determines plural candidates of the optimum display format.

After the processing in step S91, the control unit 72 proceeds to step S92. The control unit 72 supplies signal format information indicating the present provisional optimum signal format to the pseudo-photographed-image generating unit 62. Consequently, for example, the pseudo-photographed-image generating unit 62 curtails the number of pixels of the SHD image signal stored in the learning-data storing unit 61 to generate an SD image signal of a signal format of interest indicated by the signal format information from the control unit 72. The control unit 72 supplies the SD image signal to the image converting unit 73 as a pseudo photographed image signal equivalent to a photographed image signal outputted from the camera 1 (FIG. 1) and proceeds to step S93.

In step S93, as in step S53 in FIG. 20, the image converting unit 73 sets the pseudo photographed image signal (the SD image signal) supplied from the pseudo-photographed-image generating unit 62 as a first image signal. The image converting unit 73 performs image conversion processing for converting the first image signal into an HD image signal serving as a second image signal according to an arithmetic operation between the first image signal and the present provisional optimum set of tap coefficients stored in the coefficient memory 66. The image converting unit 73 supplies an HD image signal obtained as a result of the image conversion processing to the display control unit 68.

After the processing in step S93, the control unit 72 proceeds to step S94. The control unit 72 determines one of display formats, which have not been set as interest display formats, among the plural candidates of the optimum display format as a display format of interest. The control unit 72 supplies display format information indicating the display format of interest to the display control unit 68 and proceeds to step S95.

In step S95, the display control unit 68 causes the display 69 to display an HD image corresponding to the HD image signal outputted by the image converting unit 73 in the display format of interest indicated by the display format information from the control unit 72 and proceeds to step S96.

In step S96, the photo-detector 70 detects (photoelectrically converts) light serving as the HD image (a display image) displayed on the display 69. The photo-detector 70 outputs a display image signal equivalent to the HD image signal, which is an electric signal corresponding to the light, to the evaluation-value calculating unit 71 and proceeds to step S97.

In step S97, the evaluation-value calculating unit 71 evaluates not only the display image signal from the photo-detector 70 but also the HD image displayed on the display 69.

The evaluation-value calculating unit 71 reads out, from the learning-data storing unit 61, an SHD image signal corresponding to the display image signal from the photo-detector 70. The evaluation-value calculating unit 71 compares the display image signal and the corresponding SHD image signal to calculate an evaluation value as evaluation of the display image signal as evaluation of an image quality that the user looking at the HD image displayed on the display 69 feels. The evaluation-value calculating unit 71 supplies the evaluation value to the control unit 72.

The processing in steps S92 and S93 and steps S95 to S97 is applied to all frames of the SHD image signal stored in the learning-data storing unit 61. The control unit 72 calculates, for the display format of interest, for example, a sum of evaluation values obtained for all the frames of the SHD image signal stored in the learning-data storing unit 61. The control unit 72 temporarily stores the sum as a final evaluation value for the display format of interest.

Thereafter, the control unit 72 proceeds from step S97 to step S98. The control unit 72 judges whether evaluation values have been calculated for all the plural candidates of the optimum display formats.

When it is judged in step S98 that evaluation values have not been calculated for all the plural candidates of the optimum display format, the control unit 72 returns to step S94. The control unit 72 determines one of display formats, which have not been set as interest display formats, among the plural candidates of the optimum display format as a display format of interest anew and repeats the same processing.

When it is judged in step S98 that evaluation values have been calculated for all the plural candidates of the optimum display format, the control unit 72 proceeds step S99. The control unit 72 sets a candidate having a highest evaluation value among the plural candidates of the optimum display format as an optimum display format for a combination of a present provisional optimum signal format and a present provisional optimum set of tap coefficients anew. The control unit 72 returns to the start of the processing.

The optimum tap coefficient set determination processing in step S39 in FIG. 19 will be described in detail with reference to a flowchart in FIG. 23.

In step S111, the control unit 72 determines plural candidates of an optimum set of tap coefficients with a present provisional (provisionally determined) optimum set of tap coefficients as a reference.

The control unit 72 selects, for example, plural points in a predetermined range with a point in a Z-dimensional vector space as a reference. The point in the Z-dimensional vector space is represented by a Z-dimensional vector (in this case, a product of a total number of classes and the number of tap coefficients per one class is Z) having respective tap coefficients of a present provisional optimum set of tap coefficients as components. The control unit 72 determines (components of) plural Z-dimensional vectors representing the respective plural points as plural candidates of the optimum set of tap coefficients. Concerning what kind of points in what kind of range are selected with the Z-dimensional vector corresponding to the present provisional optimum set of tap coefficients as a reference in order to obtain plural candidates of the optimum set of tap coefficients, a rule is determined in advance. The control unit 72 selects plural points in the predetermined range with the Z-dimensional vector corresponding to the present provisional optimum set of tap coefficients as a reference in accordance with the rule to determine plural candidates of the optimum set of tap coefficients.

After the processing in step S111, the control unit 72 proceeds to step S112. The control unit 72 supplies signal format information indicating the present provisional optimum signal format to the pseudo-photographed-image generating unit 62. Consequently, for example, the pseudo-photographedimage generating unit 62 curtails the number of pixels of the SHD image signal stored in the learning-data storing unit 61 to generate an SD image signal of a signal format indicated by the signal format information from the control unit 72. The control unit 72 supplies the SD image signal to the image converting unit 73 as a pseudo photographed image signal equivalent to a photographed image signal outputted from the camera 1 (FIG. 1) and proceeds to step S113.

In step S113, the control unit 72 determines one of sets of tap coefficients, which have not been set as interest tap coefficient sets, among the plural candidates of the optimum set of tap coefficients as a tap coefficient set of interest. The control unit 72 causes the coefficient memory 66 to store the tap coefficient set of interest by controlling the coefficient memory 66 and proceeds to step S114.

In step S114, as in step S53 in FIG. 20, the image converting unit 73 sets the pseudo photographed image signal (the SD image signal) supplied from the pseudo-photographed-image generating unit 62 as a first image signal. The image converting unit 73 performs image conversion processing for converting the first image signal into an HD image signal serving as a second image signal according to an arithmetic operation between the first image signal and the tap coefficient set of interest stored in the coefficient memory 66. The image converting unit 73 supplies an HD image signal obtained as a result of the image conversion processing to the display control unit 68.

After the processing in step S114, the control unit 72 proceeds to step S115. The control unit 72 supplies display formation information indicating a present provisional optimum display format to the display control unit 68. Consequently, the display control unit 68 causes the display 69 to display an HD image corresponding to the HD image signal outputted by the image converting unit 73 in the display format indicated by the display format information from the control unit 72 and proceeds to step S116.

In step S116, the photo-detector 70 detects (photoelectrically converts) light serving as the HD image (a display image) displayed on the display 69. The photo-detector 70 outputs a display image signal equivalent to the HD image signal, which is an electric signal corresponding to the light, to the evaluation-value calculating unit 71 and proceeds to step S117.

In step S117, the evaluation-value calculating unit 71 evaluates not only the display image signal from the photo-detector 70 but also the HD image displayed on the display 69.

The evaluation-value calculating unit 71 reads out, from the learning-data storing unit 61, an SHD image signal corresponding to the display image signal from the photo-detector 70. The evaluation-value calculating unit 71 compares the display image signal and the corresponding SHD image signal to calculate an evaluation value not only as evaluation of the display image signal but also as evaluation of an image quality that the user looking at the HD image displayed on the display 69 feels. The evaluation-value calculating unit 71 supplies the evaluation value to the control unit 72.

The processing in step S112 and steps S114 to S117 is applied to all frames of the SHD image signal stored in the learning-data storing unit 61. The control unit 72 calculates, for the tap coefficient set of interest, for example, a sum of evaluation values obtained for all the frames of the SHD image signal stored in the learning-data storing unit 61. The control unit 72 temporarily stores the sum as a final evaluation value for the tap coefficient set of interest.

Thereafter, the control unit 72 proceeds from step S117 to step S118. The control unit 72 judges whether evaluation values have been calculated for all the plural candidates of the optimum set of tap coefficients.

When it is judged in step S118 that evaluation values have not been calculated for all the plural candidates of the optimum set of tap coefficients, the control unit 72 returns to step S113. The control unit 72 determines one of sets of tap coefficients, which have not been set as interest tap coefficient sets, among the plural candidates of the optimum set of tap coefficients as a tap coefficient set of interest anew. Subsequently, the control unit 72 repeats the same processing.

When it is judged in step S118 that evaluation values have been calculated for all the plural candidates of the optimum set of tap coefficients, the control unit 72 proceeds to step S119. The control unit 72 provisionally determines a candidate having a highest evaluation value among the plural candidates of the optimum set of tap coefficients as an optimum set of tap coefficients for a combination of a present provisional optimum signal format and a present provisional optimum display format anew. The control unit 72 returns to the start of the processing.

As described above, in the learning apparatus in FIG. 9, in step S37 in FIG. 19, the control unit 72 determines plural signal formats as plural candidates of an optimum signal format. The pseudo-photographed-image generating unit 62 generates a pseudo photographed image signal for each of the plural signal formats. The image converting unit 73 converts the pseudo photographed image signal into an HD image signal according to an arithmetic operation between the pseudo photographed image signal and a tap coefficient (a present provisional optimum set of tap coefficients) determined by the control unit 72. The display control unit 68 causes the display 69 to display an HD image corresponding to the HD image signal in a display format (a present provisional optimum display format) determined by the control unit 72. The photo-detector 70 detects light serving as a display image and outputs a display image signal, which is an electric signal corresponding to the light. The evaluation-value calculating unit 71 performs the optimum signal format determination processing (FIG. 21) for provisionally determining a signal format in which an evaluation of the display image signal is the highest out of the plural signal format by evaluating the display image signal.

In the learning apparatus in FIG. 9, in step S38 in FIG. 19, the control unit 72 determines plural display formats as plural candidates of an optimum display format. The pseudo-photographed-image generating unit 62 generates a pseudo photographed image signal of a signal format (a present provisional optimum signal format) determined by the control unit 72. The image converting unit 73 converts the pseudo photographed image signal into an HD image signal according to an arithmetic operation between the pseudo photographed image signal and a tap coefficient (a present provisional optimum set of tap coefficients) determined by the control unit 72. For each of the plural display formats, the display control unit 68 causes the display 69 to display an HD image corresponding to the HD image signal. The photo-detector 70 detects light serving as a display image and outputs a display image signal, which is an electric signal corresponding to the light. The evaluation-value calculating unit 71 performs the optimum display format determination processing (FIG. 22) for provisionally determining a display format in which evaluation of the display image signal is the highest out of the plural display format by evaluating the display image signal.

In the learning apparatus in FIG. 9, in step S39 in FIG. 19, the control unit 72 determines (a set of) plural tap coefficients as plural candidates of an optimum set of tap coefficients. The pseudo-photographed-image generating unit 62 generates a pseudo photographed image signal of a signal format (a present provisional optimum signal format) determined by the control unit 72. For each of the plural tap coefficients, the image converting unit 73 converts the pseudo photographed image signal into an HD image signal. The display control unit 68 causes the display 69 to display an HD image corresponding to the HD image signal in a display format (a present provisional optimum display format) determined by the control unit 72. The photo-detector 70 detects light serving as a display image and outputs a display image signal, which is an electric signal corresponding to the light. The evaluation-value calculating unit 71 performs the optimum tap coefficient set determination processing (FIG. 23) for provisionally determining a tap coefficient with which evaluation of the display image signal is the highest out of the plural tap coefficient by evaluating the display image signal.

In the learning apparatus in FIG. 9, as explained with reference to FIG. 19, the optimum signal format determination processing, the optimum display format determination processing, and the optimum tap coefficient set determination processing are repeated until an evaluation value (an evaluation value obtained by the immediately preceding optimum tap coefficient set determination processing) becomes equal to or larger than the threshold for judgment of optimization. Consequently, (a set of) tap coefficients used for performing the image conversion processing for further improving a quality of a display image, which is an HD image displayed on the display 69, a signal format of a photographed image signal to be subjected to the image conversion processing performed using the tap coefficients, and a display format for displaying an HD image corresponding to an HD image signal obtained by the image conversion processing applied to the photographed image signal of the signal format are determined.

Therefore, according to the learning apparatus in FIG. 9, it is possible to determine a tap coefficient, a signal format, and a display format in which the user feels a display image displayed on the display 69 higher in quality, that is, an optimum (appropriate) tap coefficient, an optimum signal format, and an optimum display format for further improving the performance of the image processing system including the camera 1 and the display apparatus 2 in FIG. 1.

The camera 1 in FIG. 1 outputs the photographed image signal of the optimum signal format obtained in the learning apparatus in FIG. 9. The display apparatus 2 in FIG. 1 performs the image conversion processing using the optimum tap coefficient obtained by the learning apparatus in FIG. 9 and displays the HD image obtained by the image conversion processing in the optimum display format obtained in the learning apparatus in FIG. 9. Consequently, the image processing system is constituted by the combination of the camera 1 and the display apparatus 2. In this case, it is possible to show maximum performance as the image processing system as a whole.

Figure 21:
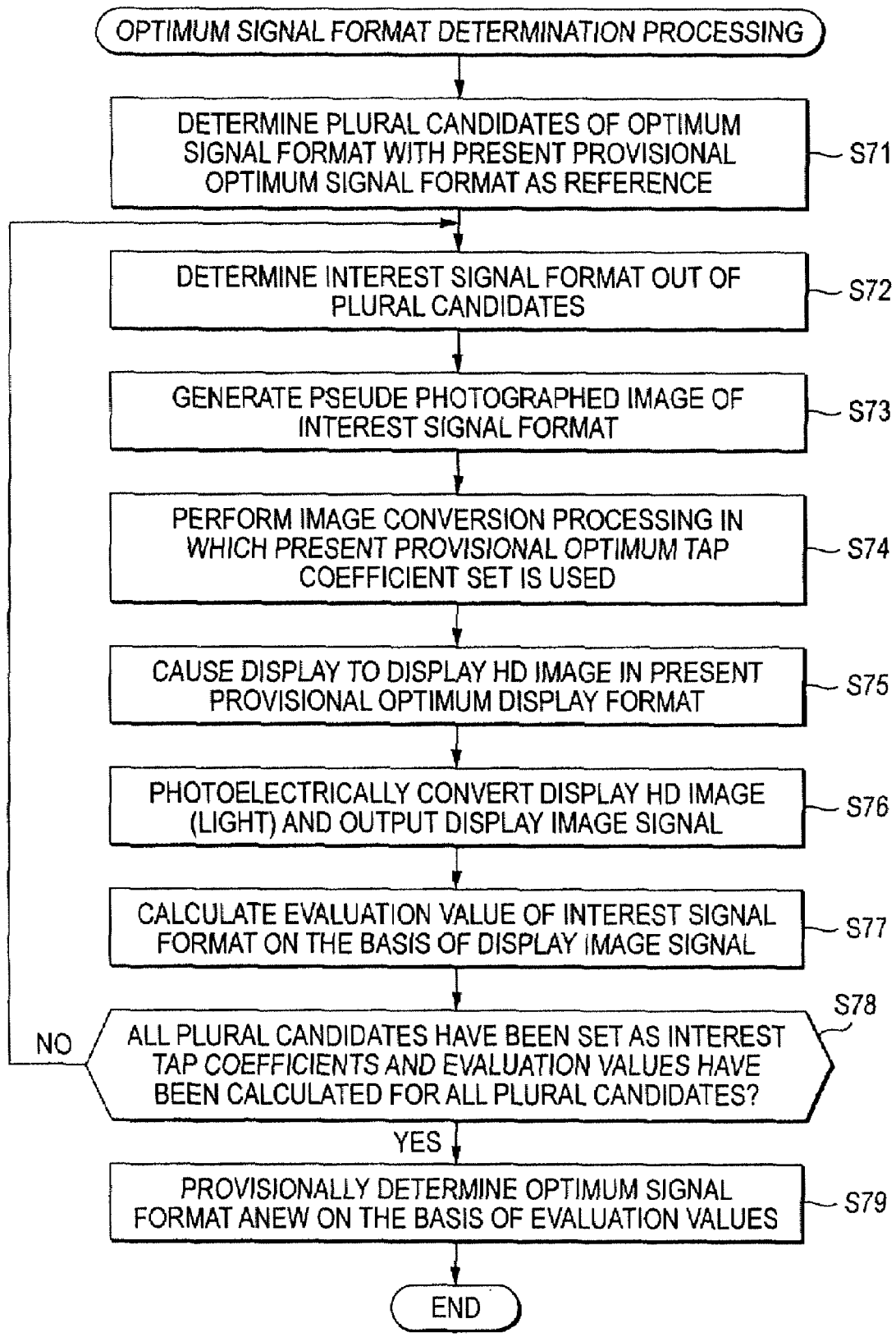
FIG. 21 is a flowchart for explaining details of processing in step S37.

In the optimum signal format determination processing in FIG. 21, plural candidates of an optimum signal format are determined with a present provisional optimum signal format as a reference. In this case, as a method of transforming the present provisional optimum signal format, it is possible to adopt a method of, so to speak, substantially transforming the present provisional optimum signal format when the number of times of repetition of steps S37 to S39 in FIG. 19 is small and gradually reducing the transformation as the number of times of repetition increases. The same holds true for a display format and a set of tap coefficients.

When an evaluation value calculated for a candidate of the optimum signal format is not so large and rarely increases, it is possible to substantially transform the present provisional optimum signal format to determine plural candidates of the optimum signal format. In this case, it is possible to solve a problem of so-called local minimum. The same holds true for a display format and a set of tap coefficients.

Figure 24:
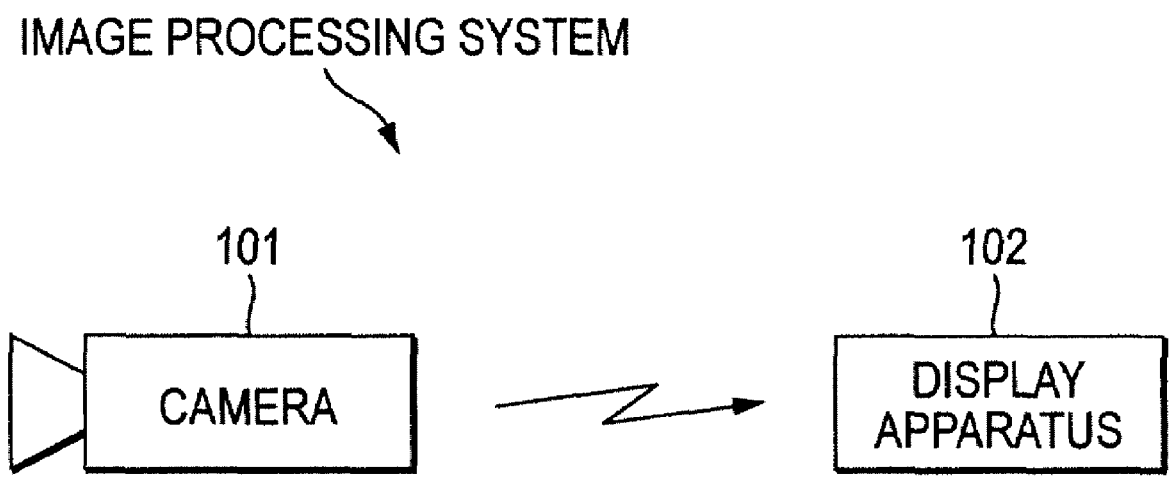
FIG. 24 is a block diagram showing a second example of the structure of the image processing system that performs processing of an image.

FIG. 24 is a diagram of a second example of the structure of the image processing system for processing an image.

In FIG. 24, the image processing system includes a camera (a video camera) 101 and a display apparatus 102.

The camera 101 photographs an object (a subject) and outputs a photographed image signal that is an image signal obtained by the photographing. The display apparatus 102 receives the photographed image signal outputted by the camera 101, converts the photographed image signal into a high-quality image signal that is an image signal of an image higher in quality than an image corresponding to the photographed image signal, and displays an image corresponding to the high-quality image signal.

The camera 101 is, for example, a 1CCD camera and outputs a photographed image signal of a certain signal format.

When, for example, color filters of the Bayer array are adopted in the camera 101, the camera 101 directly outputs a photographed image signal of the Bayer format obtained by the color filters of the Bayer array without changing the photographed image signal into an RGB image signal.

The photographed image signal outputted by the camera 101 is, for example, an SD image signal like the photographed image signal outputted by the camera 1 in FIG. 1. In the display apparatus 102, a high-quality image signal obtained by converting the SD image signal is an HD image signal as in the case of FIG. 1.

In the image processing system in FIG. 24, the display apparatus 102 acquires a signal format of the photographed image signal outputted by the camera 101 by, for example, detecting the signal format. The display apparatus 102 converts the photographed image signal, which is the SD image signal, outputted by the camera 101 into an HD image signal according to an arithmetic operation between the signal format and a tap coefficient for the signal format.

According to the image processing system in FIG. 1, the image processing system include the combination of the camera 1 that outputs the photographed image signal of the optimum signal format obtained in the learning apparatus in FIG. 9 and the display apparatus 2 that performs the image conversion processing using the optimum tap coefficient obtained by the learning apparatus in FIG. 9 and displays the HD image obtained by the image conversion processing in the optimum display format obtained in the learning apparatus in FIG. 9. In this case, it is possible to show maximum performance as the image processing system as a whole.

However, for example, when the display apparatus 2 is combined with a camera that outputs a photographed image signal of a signal format, which is not the optimum signal formation obtained by the learning apparatus in FIG. 9, to constitute an image processing system, it is not always possible to display an image that the user feels high in quality in the image processing system.

Thus, in FIG. 24, even when the display apparatus 102 is combined with the camera 101 that outputs a photographed image signal of an arbitrary signal format to constitute an image processing system, the image processing system displays an image that the user feels high in quality according to a signal format of a photographed image signal of the camera 101.

Figure 25:
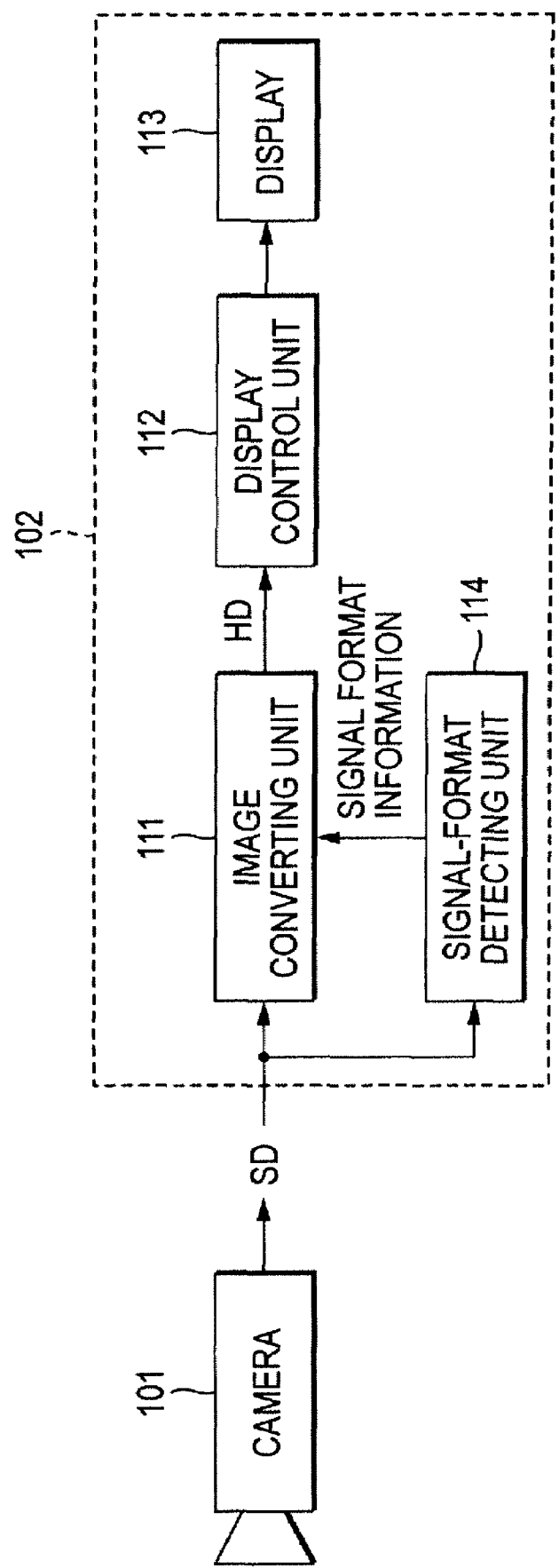
FIG. 25 is a block diagram showing an example of a structure of a display apparatus 102.

FIG. 25 is a diagram showing an example of a structure of the display apparatus 102 in FIG. 24.

The display apparatus 102 includes an image converting unit 111, a display control unit 112, a display 113, and a signal-format detecting unit 114.

A photographed image signal, which is an SD image signal, is supplied to the image converting unit 111 from the camera 101. Signal format information indicating a signal format of the photographed image signal is supplied to the image converting unit 111 from the signal-format detecting unit 114. The image converting unit 111 stores a set of tap coefficients for each class for respective plural signal formats obtained by learning performed in advance. The image converting unit 111 selects a set of tap coefficients for the signal format indicated by the signal format information from the signal-format detecting unit 114 among sets of tap coefficients for the respective plural signal formats. The image converting unit 111 converts the SD image signal, which is the photographed image signal, from the camera 101 into an HD image signal according to an arithmetic operation between the SD image signal and the tap coefficient. The image converting unit 111 supplies the HD image signal to the display control unit 112.

The display control unit 112 performs display control for causing the display 113 to display an HD image corresponding to the HD image signal supplied from the image converting unit 111 in a display format determined by learning performed using an SHD image higher in quality than the HD image.

The display 113 is, for example, displaying means including a CRT or an LCD panel. The display 113 displays an image in accordance with the control by the display control unit 112.

A photographed image signal is supplied to the signal-format detecting unit 114 from the camera 101. The signal-format detecting unit 114 acquires a signal format of the photographed image signal from the camera 101 by detecting the signal format. The signal-format detecting unit 114 supplies signal format information indicating the signal format to the image converting unit 111.

Figure 26:
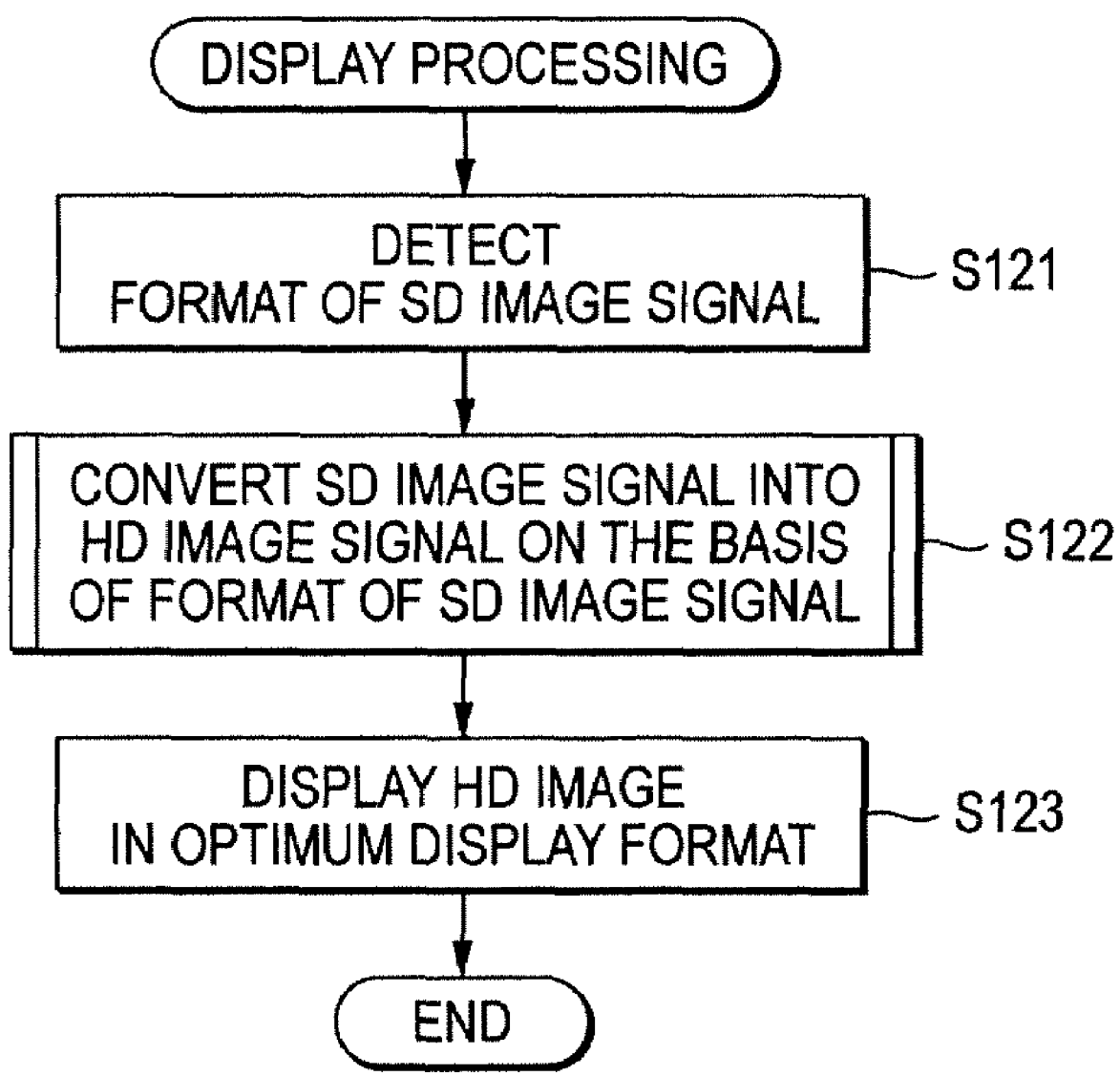
FIG. 26 is a flowchart for explaining processing by the display apparatus 102.

Operations of the display apparatus 102 in FIG. 25 will be explained with reference to a flowchart in FIG. 26.

An SD image signal from the camera 101 is supplied to the display apparatus 102. In the display apparatus 102, the SD image signal from the camera 101 is received and supplied to the image converting unit 111 and the signal-format detecting unit 114.

In step S121, the signal-format detecting unit 114 detects a signal format of the SD image signal from the camera 101, supplies signal format information indicating the signal format to the image converting unit 111, and proceeds to step S122.

The SD image signal from the camera 101 includes, for example, a signal indicating the signal format of the SD image signal. The signal-format detecting unit 114 detects the signal format of the SD image signal from the camera 101 on the basis of the signal.

In step S122, the image converting unit 111 performs, on the basis of the signal format indicated by the signal formation information from the signal-format detecting unit 114, image conversion processing for converting the SD image signal from the camera 101 into an HD image signal according to, for example, an arithmetic operation in which a tap coefficient obtained by learning described later is used. The image converting unit 111 supplies an HD image signal obtained as a result of the image conversion processing to the display control unit 112 and proceeds to step S123.

In step S123, the display control unit 112 causes the display 113 to display an HD image corresponding to the HD image signal supplied from the image converting unit 111 in a display format determined by learning described later performed using an SHD image.

In this way, the HD image is displayed on the display 113.

Figure 27:
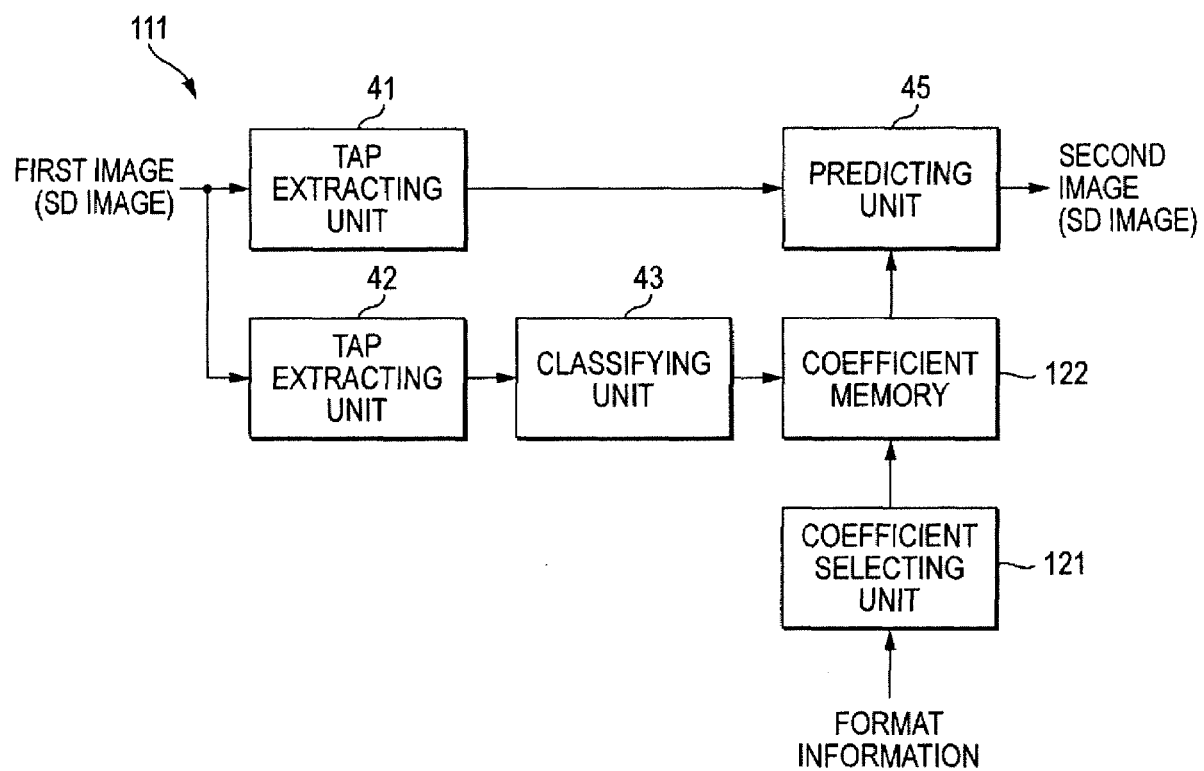
FIG. 27 is a block diagram showing an example of a structure of an image converting unit 111.

FIG. 27 is a diagram showing an example of a structure of the image converting unit 111 in FIG. 25.

In the figure, components corresponding to those of the image converting unit 11 in FIG. 4 are denoted by the identical reference numerals. Explanations of the components are omitted below as appropriate. The image converting unit 111 performs image conversion processing for converting a first image signal into a second image signal in the same manner as the image converting unit 11 in FIG. 4. The image converting unit 111 is the same as the image converting unit 11 in FIG. 4 in that the image converting unit 111 includes the tap extracting units 41 and 42, the classifying unit 43, and the predicting unit 45. However, the image converting unit 111 is different from the image converting unit 11 in FIG. 4 in that a coefficient memory 122 is provided instead of the coefficient memory 44 and a coefficient selecting unit 121 is provided anew.

Signal format information indicating a signal format of an SD image signal outputted by the camera 101 is supplied to the coefficient selecting unit 121 from the signal-format detecting unit 114 in FIG. 25. The coefficient selecting unit 121 controls the coefficient memory 122 to select a set of tap coefficients associated with the signal format information from the signal-format detecting unit 114 among sets of tap coefficients stored in the coefficient memory 122 as an effective set of tap coefficients.

The coefficient memory 122 stores, depending on learning described later, a set of tap coefficients for each class determined in advance for each of plural signal formats in association with signal format information indicating the signal format. The coefficient memory 122 selects an effective set of tap coefficients out of sets of tap coefficients stored in association with the plural kinds of signal format information in accordance with the control by the coefficient selecting unit 121. The coefficient memory 122 acquires a tap coefficient of a class indicated by a class code supplied from the classifying unit 43, that is, a class of a pixel of interest among the effective set of tap coefficients by reading out the tap coefficient and outputs the tap coefficient to the predicting unit 45.

Figure 28:
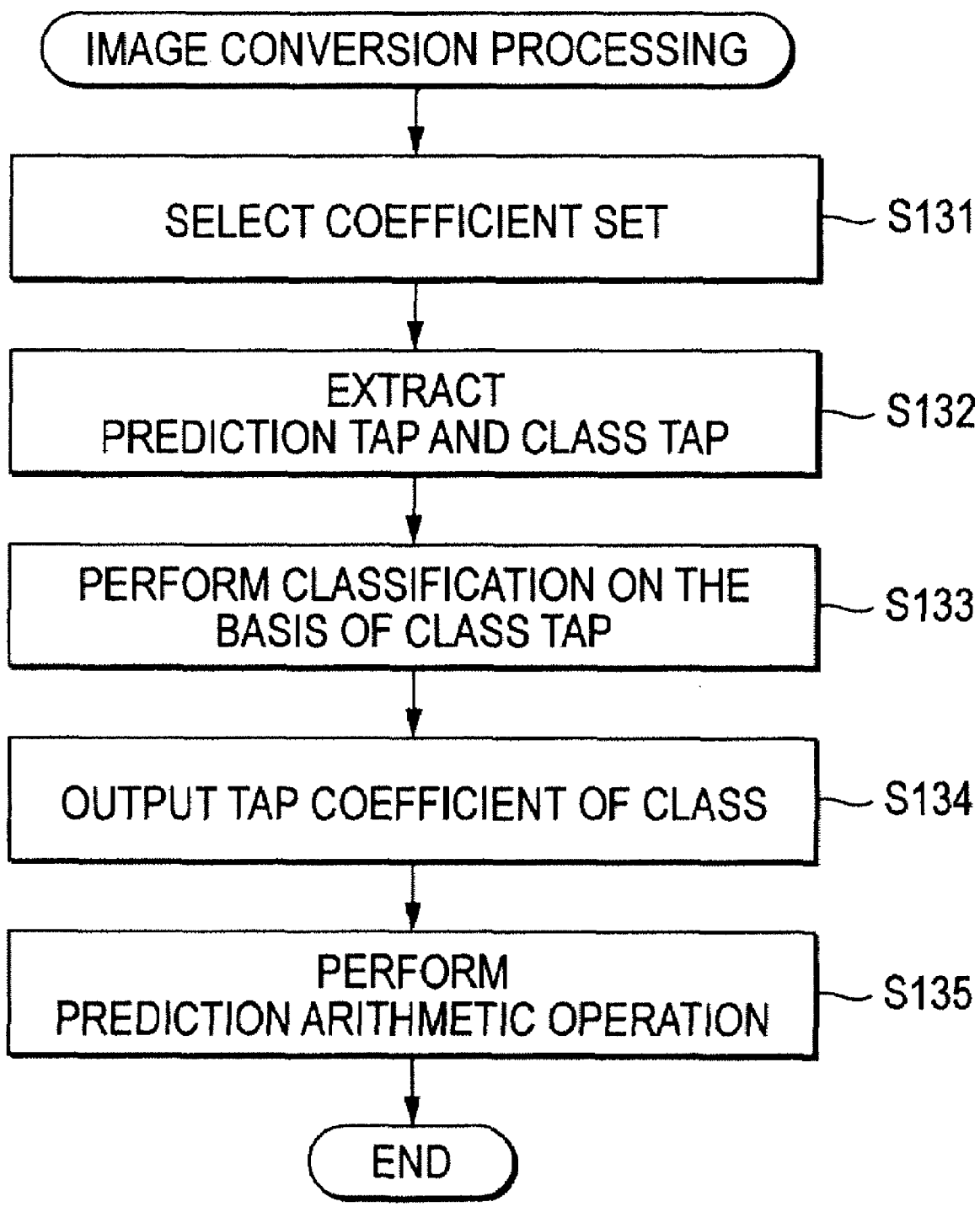
FIG. 28 is a flowchart for explaining processing by the image converting unit 111.

The image conversion processing in step S122 in FIG. 26 performed by the image converting unit 111 in FIG. 27 will be explained with reference to a flowchart in FIG. 28.

In the image converting unit 111, in step S131, the coefficient selecting unit 121 controls the coefficient memory 122 to select a set of tap coefficients associated with signal format information from the signal-format detecting unit 114, that is, signal format information indicating a signal format of an SD image signal outputted by the camera 101. Consequently, the coefficient memory 122 selects an effective set of tap coefficients out of the sets of tap coefficients stored in association with the plural pieces of signal format information and proceeds to step S132.

In step S132, the tap extracting unit 41 sequentially sets, as a pixel of interest, respective pixels forming an HD image signal serving as a second image signal for the SD image signal serving as a first image signal supplied from the camera 101. The tap extracting units 41 and 42 extract pixel values of pixels to be set as a prediction tap and a class tap for the pixel of interest out of the first image signal from the camera 101, respectively. The prediction tap is supplied from the tap extracting unit 41 to the predicting unit 45 and the class tap is supplied from the tap extracting unit 42 to the classifying unit 43.

The classifying unit 43 receives the class tap for the pixel of interest from the tap extracting unit 42. In step S133, the classifying unit 43 classifies the pixel of interest on the basis of the class tap. Moreover, the classifying unit 43 outputs a class code indicating a class of the pixel of interest obtained as a result of the classification to the coefficient memory 122 and proceeds to step S134.

In step S134, the coefficient memory 122 reads out and outputs a tap coefficient of the class indicated by the class code supplied from the classifying unit 43, that is, a tap coefficient of the class of the pixel of interest among the effective set of tap coefficients and proceeds to step S135. The tap coefficient outputted by coefficient memory 122 is acquired by the predicting unit 45.

In step S135, the predicting unit 45 performs the arithmetic operation of Equation (1) serving as the predetermined prediction arithmetic operation using the prediction tap outputted by the tap extracting unit 41 and the tap coefficient acquired from the coefficient memory 122 to calculate a pixel value of the pixel of interest, that is, a pixel value of a pixel of the second image signal. Every time the predicting unit 45 calculates the pixel value of the pixel of the second image signal for, for example, one frame as described above, the predicting unit 45 outputs the HD image signal serving as the second image signal to the display control unit 112 (FIG. 25).

As described above, the image converting unit 111 extracts, in the same manner as the image converting unit 11 in FIG. 4, a prediction tap and a class tap for the pixel of interest of the second image signal from the first image signal, determines a class of the pixel of interest on the basis of the class tap, and performs an arithmetic operation in which the tap coefficient of the class and the prediction tap are used to calculate (a predicted value) of a pixel value of the pixel of interest of the second image signal. In this way, the image converting unit 111 performs classification adaptive processing serving as image conversion processing for converting the first image signal into the second image signal.

As described above, the display control unit 112 of the display apparatus 102 (FIG. 25) performs display control for causing the display 113 to display an HD image corresponding to the HD image signal supplied from the image converting unit 111 in a display format determined by learning performed using an SHD image signal higher in quality than the HD image.

Figure 29:
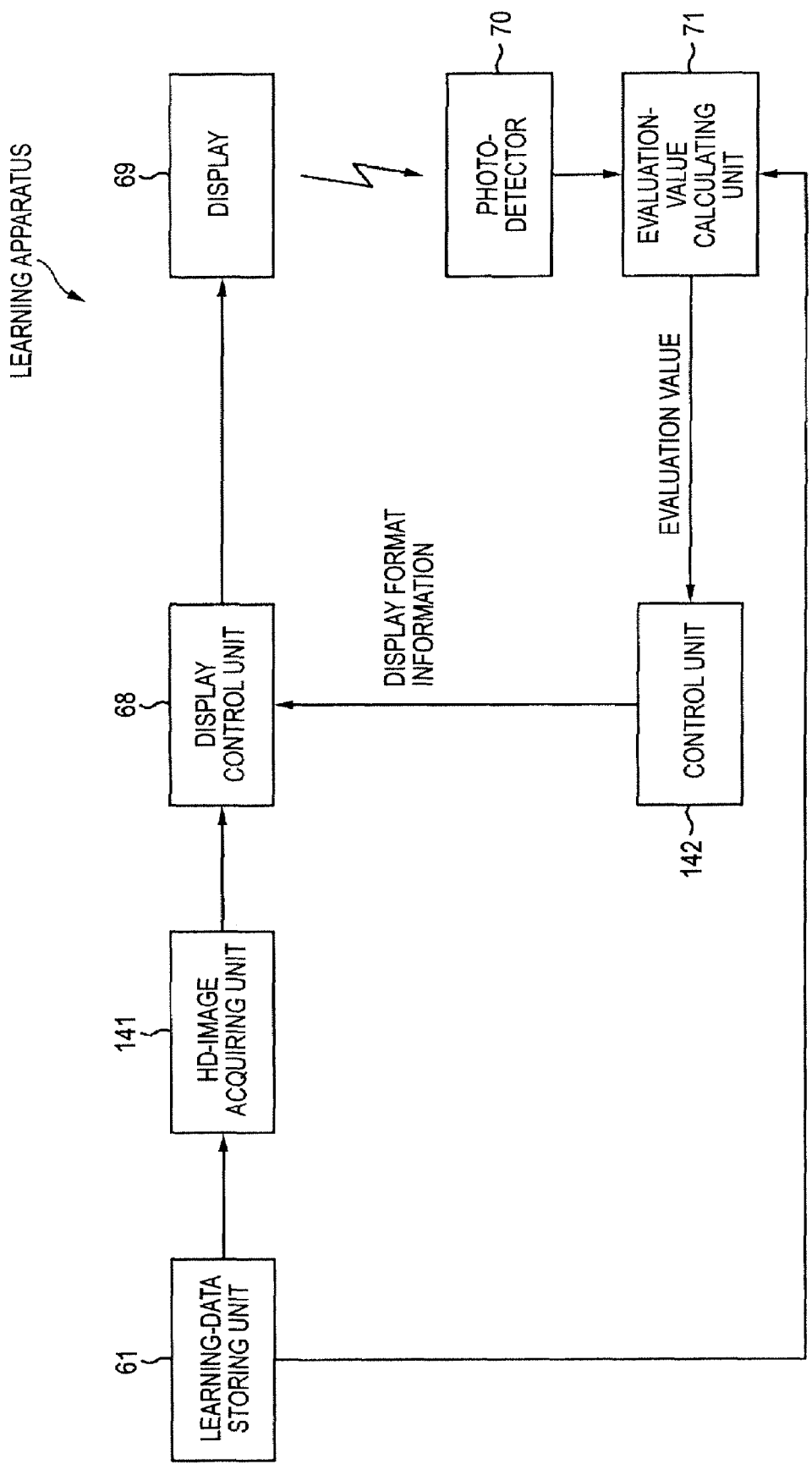
FIG. 29 is a block diagram showing an example of a structure of a learning apparatus that learns an optimum display format.

FIG. 29 is a diagram showing an example of a structure of a learning apparatus that performs learning for a display format in which the display control unit 112 causes the display 113 to display an HD image.

In the figure, components corresponding to the learning apparatus in FIG. 9 are denoted by the identical reference signs. Explanations of the components are omitted below as appropriate. The learning apparatus in FIG. 29 is the same as the learning apparatus in FIG. 9 in that the learning-data storing unit 61, the display control unit 68, the display 69, the photo-detector 70, and the evaluation-value calculating unit 71 are provided. However, the learning apparatus in FIG. 29 is different from the learning apparatus in FIG. 9 in that the pseudo-photographed-image generating unit 62 and the image converting unit 73 are not provided, a control unit 142 is provided instead of the control unit 72, and an HD-image acquiring unit 141 is provided anew.

The HD-image acquiring unit 141 selects an image signal of each frame of an SHD image signal stored in the learning-data storing unit 61 as an SHD image signal of interest. For example, the HD-image acquiring unit 141 curtails the number of pixels of the SHD image signal of interest to generate (acquire) an HD image signal serving as an RGB image signal having all three color components of R, G, and B as a pixel value of one pixel. The HD-image acquiring unit 141 supplies the HD image signal to the display control unit 68. The HD-image acquiring unit 141 generates an HD image signal from the SHD image signal before generating an SD image signal serving as a pseudo photographed image signal, for example, in the same manner as the pseudo-photographed-image generating unit 62 in FIG. 9 generating an HD image signal from an SHD image signal.

The control unit 142 determines, on the basis of an evaluation value from the evaluation-value calculating unit 71, a display format in which the display control unit 68 displays an HD image corresponding to the HD image signal supplied from the HD-image acquiring unit 141 on the display 69. The control unit 142 supplies display format information indicating the display format to the display control unit 68.

Learning processing for learning a display format performed by the learning apparatus in FIG. 29 will be explained with reference to a flowchart in FIG. 30.

In step S151, the HD-image acquiring unit 141 generates an HD image signal serving as an RGB image signal from the SHD image signal stored in the learning-data storing unit 61. The HD-image acquiring unit 141 supplies the HD image signal to the display control unit 68 and proceeds to step S152.

In step S152, the control unit 142 determines, for example, one of display formats, which have not been set as interest display formats, among predetermined plural display formats as a display format of interest. The control unit 142 supplies display format information indicating the display format of interest to the display control unit 68 and proceeds to step S153.

The control unit 142 can set, for example, the existing plural display formats explained in step S32 in FIG. 19 as the predetermined plural display formats and determine a display format of interest out of the plural display formats. The control unit 142 can also set each of the existing plural display formats as a reference, and set all of one or more display formats obtained by slightly transforming the respective display formats as the predetermined plural display formats, and determine a display format of interest out of the plural display formats.

In step S153, the display control unit 68 causes the display 69 to display an HD image corresponding to an HD image signal supplied from the HD-image acquiring unit 141 in the display format of interest indicated by the display format information from the control unit 142 and proceeds to step S154.

In step S154, the photo-detector 70 detects (photoelectrically converts) light serving as the HD image (a display image) displayed on the display 69. The photo-detector 70 outputs a display image signal equivalent to the HD image signal, which is an electric signal corresponding to the light, to the evaluation-value calculating unit 71 and proceeds to step S155.

In step S155, the evaluation-value calculating unit 71 evaluates not only the display image signal from the photo-detector 70 but also the HD image displayed on the display 69.

The evaluation-value calculating unit 71 reads out, from the learning-data storing unit 61, an SHD image signal corresponding to the display image signal from the photo-detector 70. The evaluation-value calculating unit 71 compares the display image signal and the corresponding SHD image signal to calculate an evaluation value not only as evaluation of the display image signal but also as evaluation of an image quality that the user looking at the HD image displayed on the display 69 feels. The evaluation-value calculating unit 71 supplies the evaluation value to the control unit 142.

The processing in step S151 and steps S153 to S155 is applied to all frames of the SHD image signal stored in the learning-data storing unit 61. The control unit 142 calculates, for the display format of interest, for example, a sum of evaluation values obtained for all the frames of the SHD image signal stored in the learning-data storing unit 61. The control unit 72 temporarily stores the sum as a final evaluation value for the display format of interest.

Thereafter, the control unit 142 proceeds from step S155 to step S156. The control unit 142 judges whether evaluation values have been calculated for all the predetermined plural display formats.

When it is judged in step S156 that evaluation values have not been calculated for all the predetermined plural display formats, the control unit 142 returns to step S152. The control unit 142 determines one of display formats, which have not been set as interest display formats, among the predetermined plural display formats as a display format of interest anew. Subsequently, the control unit 142 repeats the same processing.

When it is judged in step S156 that evaluation values have been calculated for all the predetermined plural display formats, the control unit 142 proceeds to step S157. The control unit 142 determines a display format having a highest evaluation value among the predetermined plural display formats as an optimum (appropriate) display format and ends the learning processing for a display format.

Figure 30:
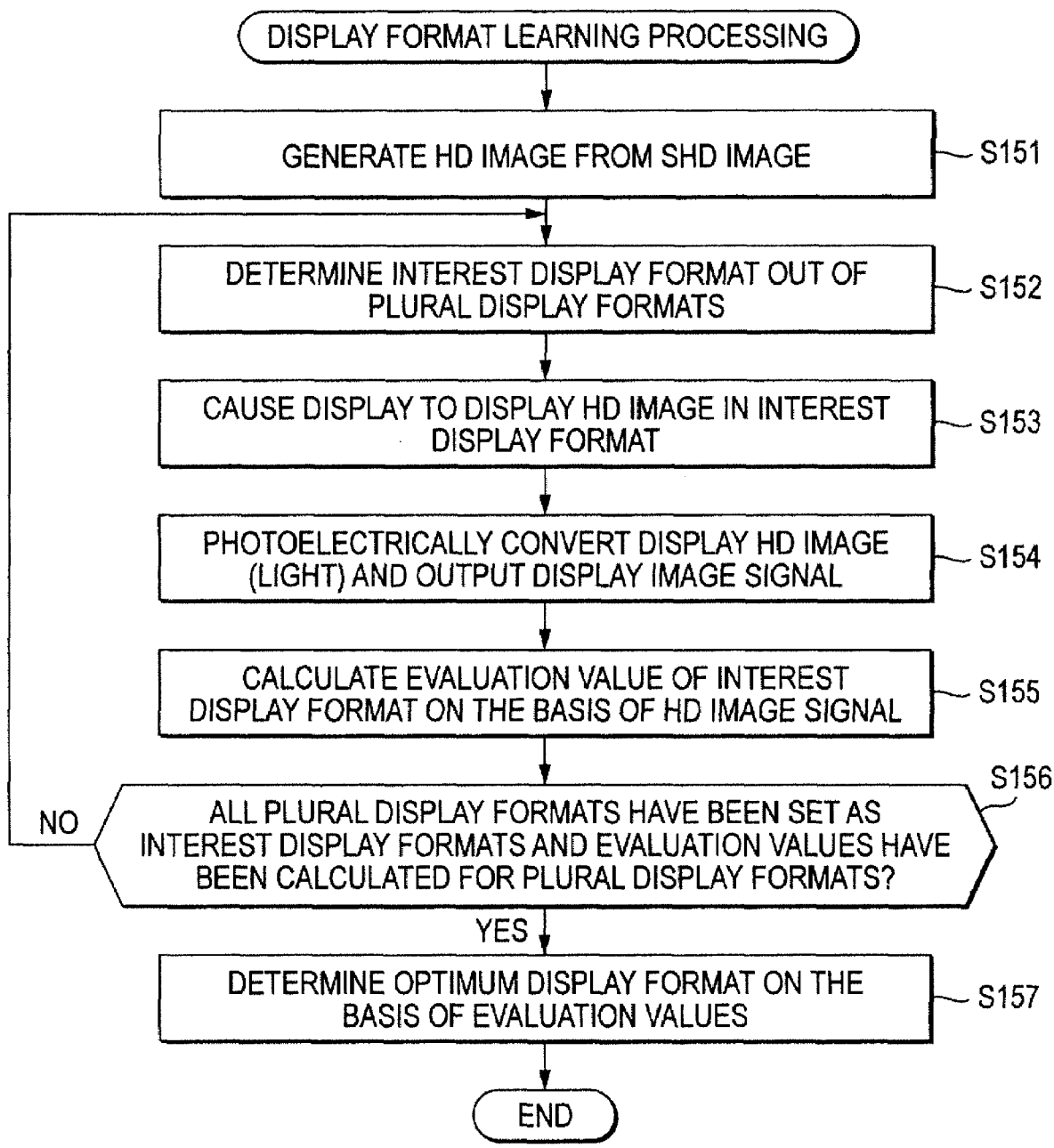
FIG. 30 is a flowchart for explaining processing by the learning apparatus that learns an optimum display format.

The display control unit 112 in FIG. 25 causes the display 113 to display an image in the display format determined as the optimum display format by the learning processing in FIG. 30.

Figure 31:
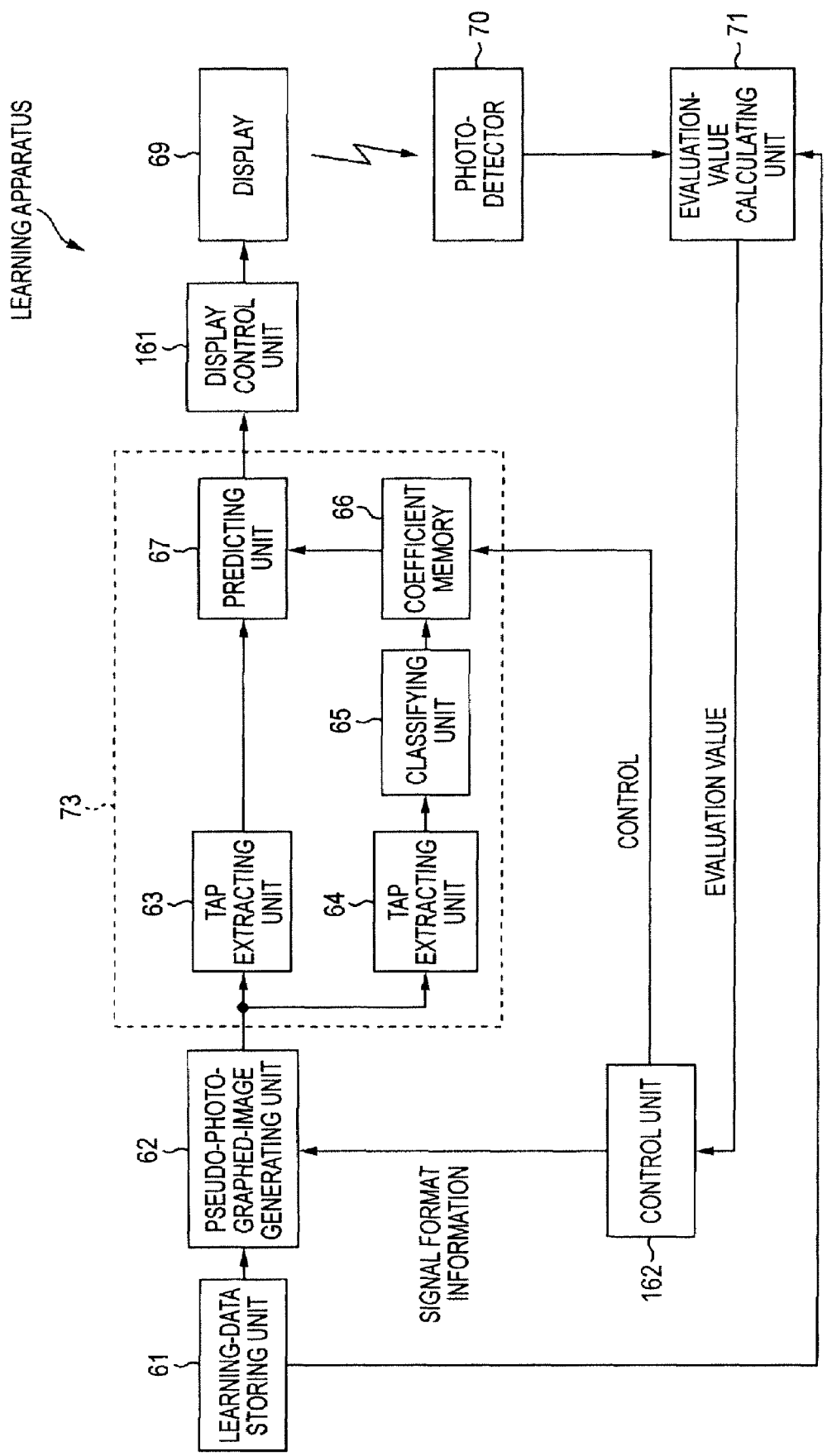
FIG. 31 is a flowchart for explaining an example of a structure of a learning apparatus that learns optimum tap coefficients for respective signal formats.

FIG. 31 is a diagram showing an example of a structure of a learning apparatus that performs learning for determining an optimum set of tap coefficients for combinations of the optimum (appropriate) display format determined by the learning processing in FIG. 30 and various signal formats.

In the figure, components corresponding to those of the learning apparatus in FIG. 9 are denoted by the identical reference numerals. Explanations of the components are omitted below as appropriate. The learning apparatus in FIG. 31 is the same as the learning apparatus in FIG. 9 in that the learning-data storing unit 61, the pseudo-photographed-image generating unit 62, the display 69, the photo-detector 70, the evaluation-value calculating unit 71, and the image converting unit 73 are provided. However, the learning apparatus in FIG. 31 is different from the learning apparatus in FIG. 9 in that a display control unit 161 and a control unit 162 are provided instead of the display control unit 68 and the control unit 72, respectively.

The display control unit 161 causes the display 69 to display an HD image corresponding to an HD image signal supplied from (the predicting unit 67) of the image converting unit 73 in the optimum display format determined by the learning processing in FIG. 30.

The control unit 162 determines a signal format of a pseudo photographed image signal that the control unit 162 causes the pseudo-photographed-image generating unit 62 to generate. The control unit 162 supplies signal format information indicating the signal format to the pseudo-photographed-image generating unit 62.

The control unit 162 determines, on the basis of an evaluation value from the evaluation-value calculating unit 71, a tap coefficient for each class that the image converting unit 73 uses for image conversion processing. The control unit 162 causes the coefficient memory 66 to store the tap coefficient by controlling the coefficient memory 66.

Learning processing for determining an optimum set of tap coefficients for respective signal formats performed by the learning apparatus in FIG. 31 will be explained with reference to a flowchart in FIG. 32.

In step S171, the control unit 162 determines, for example, one of signal formats, which have not been set as interest signal formats, among predetermined plural signal formats as a signal format of interest. The control unit 162 supplies signal format information indicating the signal format of interest to the pseudo-photographed-image generating unit 62 and proceeds to step S172.

The control unit 162 can set, for example, the existing plural signal formats explained in step S31 in FIG. 19 as the predetermined plural signal formats and determine a signal format of interest out of the plural signal formats. The control unit 162 can also set, with each of the existing plural signal formats as a reference, all of one or more signal formats obtained by slightly transforming respective signal formats as the predetermined plural signal formats and determine a signal format of interest out of the plural signal formats.

In step S172, for example, the pseudo-photographed-image generating unit 62 curtails the number of pixels of the SHD image signal stored in the learning-data storing unit 61 to generate an SD image signal of the signal format of interest indicated by the signal format information from the control unit 162. The pseudo-photographed-image generating unit 62 supplies the SD image signal to the image converting unit 73 and proceeds to step S173.

In step S173, the control unit 162 determines a set of tap coefficients for each class that the image converting unit 73 uses for image conversion processing. For example, as explained in step S51 in FIG. 20, when a total number of classes is $\alpha$, the number of tap coefficients of each class is $\beta$, and the number of bits of the tap coefficient is $\gamma$, there are $\alpha \times \beta \times 2^{\gamma}$ kinds as a number that a set of tap coefficients can take. The control unit 162 determines one of sets of tap coefficients, which have not been set as interest tap coefficient sets in the learning processing in FIG. 32, among the $\alpha \times \beta \times 2^{\gamma}$ kinds of sets of tap coefficients as a tap coefficient set of interest.

The control unit 162 supplies the tap coefficient set of interest to the coefficient memory 66 and causes the coefficient memory 66 to store the tap coefficient set of interest. The control unit 162 proceeds from step S173 to S174.

In step S174, as in step S53 in FIG. 20, the image converting unit 73 sets the pseudo photographed image signal (the SD image signal) supplied from the pseudo-photographed-image generating unit 62 as a first image signal. The image converting unit 73 performs image conversion processing for converting the first image signal into an HD image signal serving as a second image signal according to an arithmetic operation between the first image signal and the tap coefficient set of interest stored in the coefficient memory 66. The image converting unit 73 supplies an HD image signal obtained as a result of the image conversion processing to the display control unit 161.

After the processing in step S174, the display control unit 161 proceeds to step S175. The display control unit 161 causes the display 69 to display an HD image corresponding to the HD image signal outputted by the image converting unit 73 in the optimum display format determined by the learning processing in FIG. 30 and proceeds to step S176.

In step S176, the photo-detector 70 detects (photoelectrically converts) light serving as the HD image (a display image) displayed on the display 69. The photo-detector 70 outputs a display image signal equivalent to the HD image signal, which is an electric signal corresponding to the light, to the evaluation-value calculating unit 71 and proceeds to step S177.

In step S177, the evaluation-value calculating unit 71 reads out, from the learning-data storing unit 61, an SHD image signal corresponding to the display image signal from the photo-detector 70. The evaluation-value calculating unit 71 compares the display image signal and the corresponding SHD image signal to calculate an evaluation value not only as evaluation of the display image signal but also as evaluation of an image quality that the user looking at the HD image displayed on the display 69 feels. The evaluation-value calculating unit 71 supplies the evaluation value to the control unit 162.

The processing in step S172 and steps S174 to 177 is applied to all frames of the SHD image signal stored in the learning-data storing unit 61. The control unit 162 calculates, for the tap coefficient set of interest, for example, a sum of evaluation values obtained for all the frames of the SHD image signal stored in the learning-data storing unit 61. The control unit 162 temporarily stores the sum as a final evaluation value for the tap coefficient set of interest.

Thereafter, the control unit 162 proceeds from step S177 to S178. The control unit 162 judges whether evaluation values have been calculated for all $\alpha \times \beta \times 2^\gamma$ kinds of values that a set of tap coefficients can take.

Figure 32:
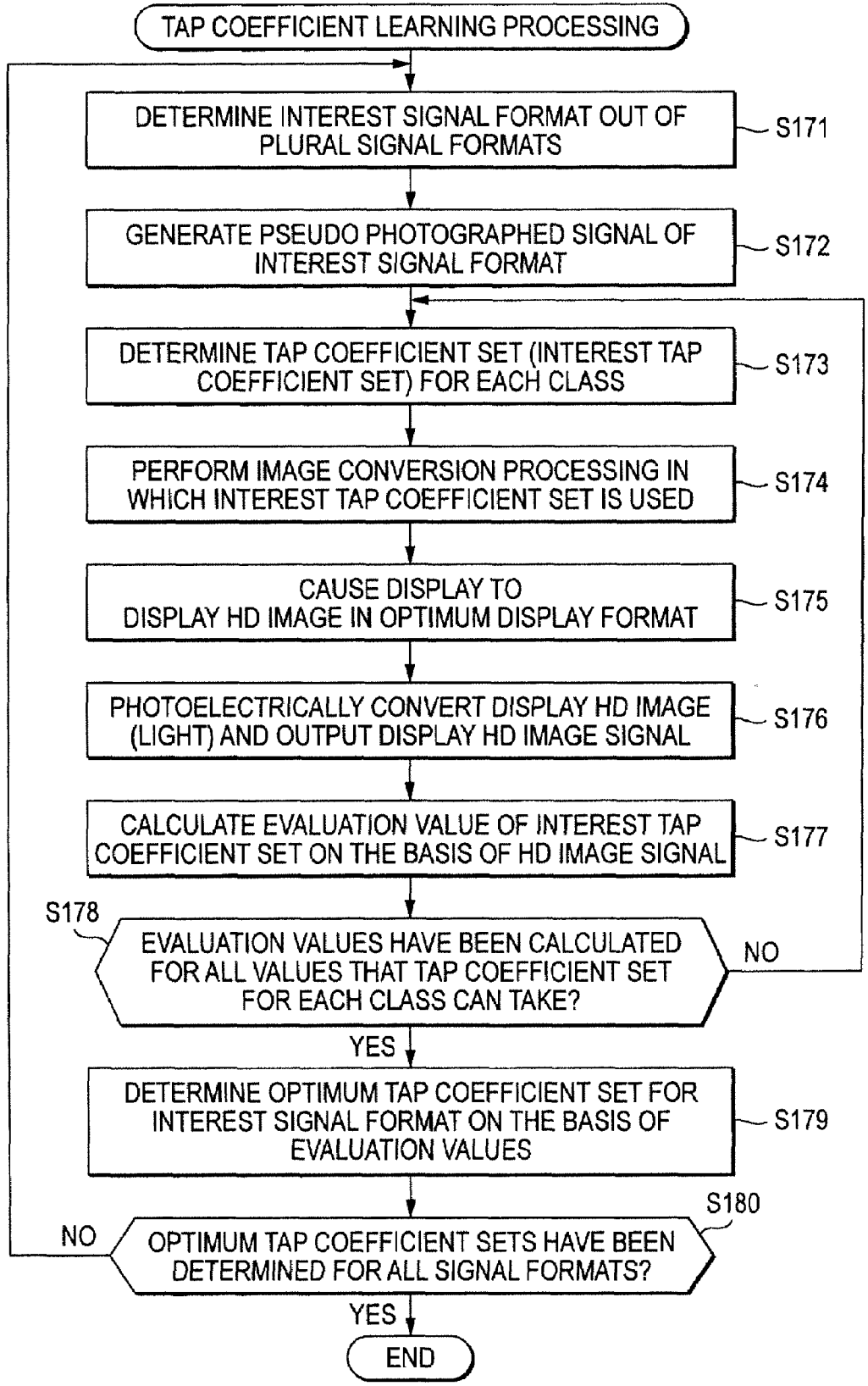
FIG. 32 is a flowchart for explaining processing by the learning apparatus that learns optimum tap coefficients for respective signal formats.

When it is judged in step S178 that evaluation values have not been calculated for all the $\alpha \times \beta \times 2^\gamma$ kinds of values that a set of tap coefficients can take, that is, when there are sets of tap coefficients, which have not been set as interest tap coefficient sets in the learning processing in FIG. 32, among the $\alpha \times \beta \times 2^\gamma$ kinds of sets of tap coefficients, the control unit 162 returns to step S173. The control unit 162 determines one of the sets tap coefficients, which have not been set as interest tap coefficient sets in the learning processing in FIG. 32, among the $\alpha \times \beta \times 2^\gamma$ kinds of sets of tap coefficients as a tap coefficient set of interest anew. Subsequently, the control unit 162 repeats the same processing.

When it is judged in step S178 that evaluation values have been calculated for all the $\alpha \times \beta \times 2^\gamma$ kinds of values that a set of tap coefficients can take, the control unit 162 proceeds to step S179. The control unit 162 determines a set of tap coefficients having a highest evaluation value among the $\alpha \times \beta \times 2^\gamma$ kinds of sets of tap coefficients as an optimum set of tap coefficients for a combination of the optimum (appropriate) display format determined by the learning processing in FIG. 30 and the signal format of interest. The control unit 162 stores the optimum set of tap coefficients in association with the signal format information indicating the signal format of interest and proceeds to step S180.

In step S180, the control unit 162 judges, for example, whether optimum sets of tap coefficients have been determined with all the predetermined plural signal formats as interest signal formats.

When it is judged in step S180 that optimum sets of tap coefficients have not been determined for all the predetermined plural signal formats, the control unit 162 returns to step S171. The control unit 162 determines one of the signal formats, which have not been set as interest signal formats, among the predetermined plural signal formats as a signal format of interest anew. Subsequently, the control unit 162 repeats the same processing.

When it is judged in step S180 that optimum sets of tap coefficients have been determined for all the predetermined plural signal formats, the learning apparatus in FIG. 31 ends the learning processing in FIG. 32.

In the image converting unit 111 (FIG. 25) of the display apparatus 102, an optimum set of coefficients obtained for each of the predetermined plural signal formats by the learning processing in FIG. 32 is stored in the coefficient memory 122 (FIG. 27) in association with signal format information indicating the signal format.

In the display apparatus 102, as described above, the signal-format detecting unit 114 acquires a signal format of an SD image signal from the camera 101. The image converting unit 111 converts, according to image conversion processing in which a set of tap coefficients associated with signal format information indicating the signal format is used, the SD image signal from the camera 101 into an HD image signal that the user feels high in quality when the HD image signal is displayed in the optimum display format obtained by the learning processing in FIG. 30. The display control unit 112 displays an HD image corresponding to the HD image signal obtained by the image conversion processing by the image converting unit 111 in the optimum display format obtained by the learning processing in FIG. 30.

Therefore, even when the display apparatus 102 constitutes an image processing system in combination with the camera 101 that outputs a photographed image signal of an arbitrary signal format (in the predetermined plural signal formats used in the learning processing in FIG. 32), the display apparatus 102 can display an image that the user feels high in quality according to the signal format of the photographed image signal of the camera 101.

Figure 33:
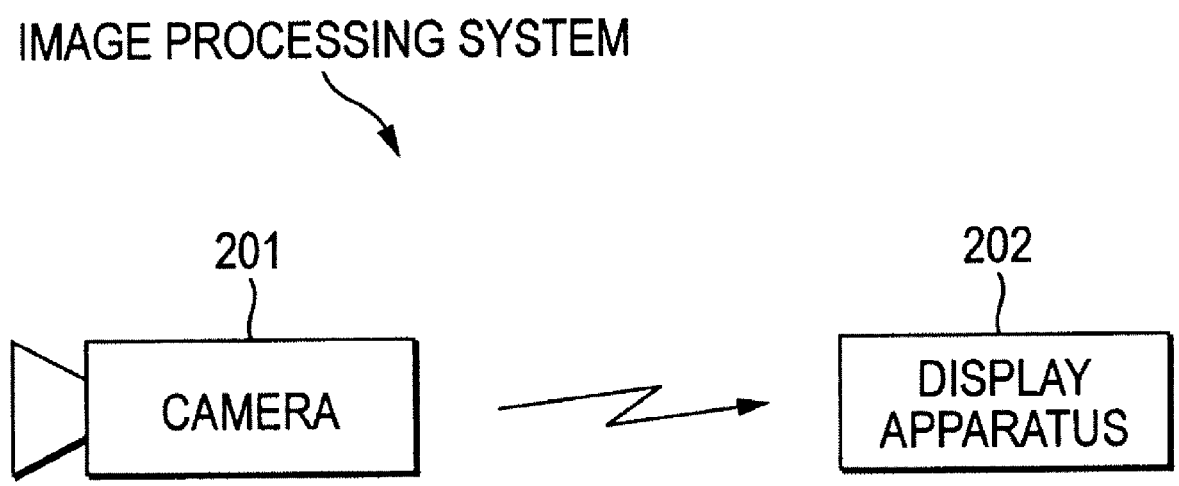
FIG. 33 is a block diagram showing a third example of the structure of the image processing system that performs processing of an image.

FIG. 33 is a diagram of a third example of the structure of the image processing system that processes an image.

In FIG. 33, the image processing system includes a camera (a video camera) 201 and a display apparatus 202.

The camera 201 photographs an object (a subject) and outputs a photographed image signal that is an image signal obtained by the photographing. The display apparatus 202 receives the photographed image signal outputted by the camera 201, converts the photographed image signal into a high-quality image signal higher in quality than an image corresponding to the photographed image signal, which is an enlarged high-quality image signal obtained by enlarging the image corresponding to the photographed image signal, and displays an image corresponding to the enlarge high-quality image signal, that is, an enlarged image obtained by enlarging the image corresponding to the photographed image signal, which is a high-quality enlarged image.

The camera 201 outputs, for example, an RGB image signal as the photographed image signal.

The photographed image signal outputted by the camera 201 is an SD image signal like the photographed image signal outputted by the camera 1 in FIG. 1. An enlarged high-quality image signal obtained by converting the SD image signal is an HD image signal as in the case of FIG. 1.

Figure 34:
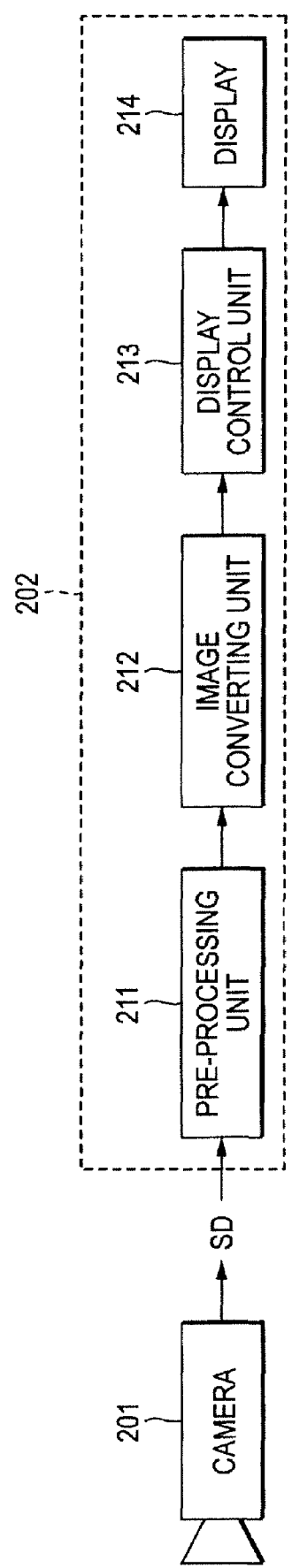
FIG. 34 is a block diagram showing an example of a structure of a display apparatus 202.

FIG. 34 is a diagram showing an example of a structure of the display apparatus 202 in FIG. 33.

The display apparatus 202 includes a pre-processing unit 211, an image converting unit 212, a display control unit 213, and a display 214.

An SD image signal is supplied to the pre-processing unit 211 from the camera 201. The pre-processing unit 211 applies pre-processing, which is suitable for enlarging an image corresponding to the SD image signal from the camera 201, to the SD image signal. The pre-processing unit 211 supplies an SD image signal obtained as a result of the pre-processing (hereinafter also referred to as SD image signal after pre-processing as appropriate) to the image converting unit 212.

The image converting unit 212 sets the SD image signal after pre-processing from the pre-processing unit 211 as a first image signal and sets an HD image signal (hereinafter also referred to as enlarged HD image signal as appropriate) corresponding to an enlarged image of an HD image (hereinafter also referred to as enlarged HD image as appropriate) obtained by enlarging the image corresponding to the SD image signal before the pre-processing as a second image signal. The image converting unit 212 converts the SD image signal after pre-processing serving as the first image signal into the enlarged HD image signal serving as the second image signal according to an arithmetic operation between the SD image signal after pre-processing and a tap coefficient obtained by learning performed in advance. The image converting unit 212 supplies the enlarged HD image signal to the display control unit 213.

The display control unit 213 performs display control for causing the display 214 to display an enlarged HD image corresponding to the enlarged HD image signal supplied from the image converting unit 212 in a predetermined display format such as the display format determined by performing the learning processing in FIG. 30 in the learning apparatus in FIG. 29.

The display 214 is, for example, display means including a CRT or an LCD panel. The display 214 displays an image (an enlarged HD image) in accordance with the control by the display control unit 213.

Figure 35:
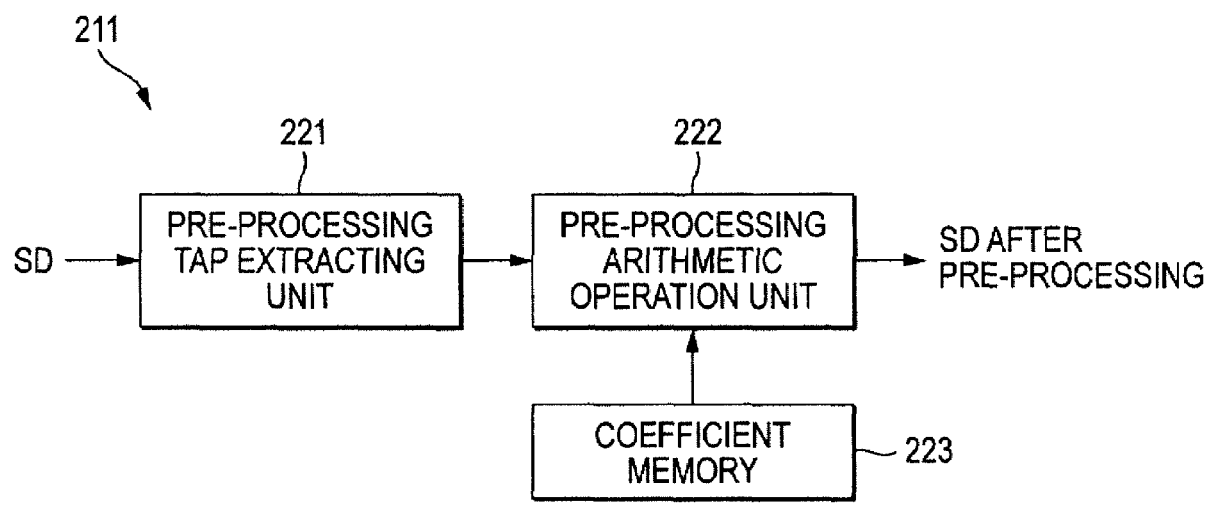
FIG. 35 is a block diagram showing an example of a structure of a pre-processing unit 211.

FIG. 35 is a diagram showing an example of a structure of the pre-processing unit 211 in FIG. 33.

The pre-processing unit 211 includes, for example, a pre-processing-tap extracting unit 221, a pre-processing arithmetic operation unit 222, and a coefficient memory 223.

The pre-processing-tap extracting unit 221 sequentially sets, as a pixel of interest, pixels forming an SD image signal after pre-processing intended to be obtained by applying the pre-processing to an SD image signal from the camera 201 (FIG. 33). The pre-processing-tap extracting unit 221 extracts, from the SD image signal from the camera 201, pre-processing taps that are pixel values of plural pixels used for calculating a pixel value of the pixel of interest.

Specifically, the pre-processing-tap extracting unit 221 extracts pixel values of plural pixels in a positional relation spatially or temporally close to a position of an image of the SD image signal from the camera 201 (for example, a position on the image of the SD image signal from the camera 201 on which a part of a subject identical with that shown in a position of the pixel of interest is shown) corresponding to the pixel of interest as a pre-processing tap. The plural pixels are, for example, a pixel closest to the position on the image of the SD image signal from the camera 201 corresponding to the pixel of interest and a pixel spatially adjacent to the pixel.

The pre-processing-tap extracting unit 221 supplies the pre-processing tap obtained for the pixel of interest to the pre-processing arithmetic operation unit 222.

The pre-processing arithmetic operation unit 222 performs, with the pixel values serving as the pre-processing taps supplied from the pre-processing-tap extracting unit 221 as arguments, a predetermined arithmetic operation for a function for pre-processing defined by one or plural coefficients stored in the coefficient memory 223. The pre-processing arithmetic operation unit 222 outputs a result of the arithmetic operation for a function for preprocessing as a pixel value of the pixel of interest of the SD image signal after pre-processing.

The coefficient memory 223 stores a set of coefficients defining the function for preprocessing (hereinafter referred to as a pre-processing coefficient as appropriate) determined in advance by learning described later.

When, for example, a linear primary expression is adopted as a function f( ) for pre-processing, a function $f(x_1, x_2, \ldots, x_M)$ for preprocessing is represented as equation $f(x_1, x_2, \ldots, x_M) = p_1 x_1 + p_2 x_2 + \ldots + p_M x_M$. Here, $x_1, x_2, \ldots, x_M$ indicate pixel values of plural pixels (M pixels) of the SD image signal from the camera 201 set as the pre-processing taps for the pixel of interest and $p_1, p_2, \ldots, p_M$ indicate a set of coefficients defining the function f( ) for preprocessing stored in the coefficient memory 233.

Figure 36:
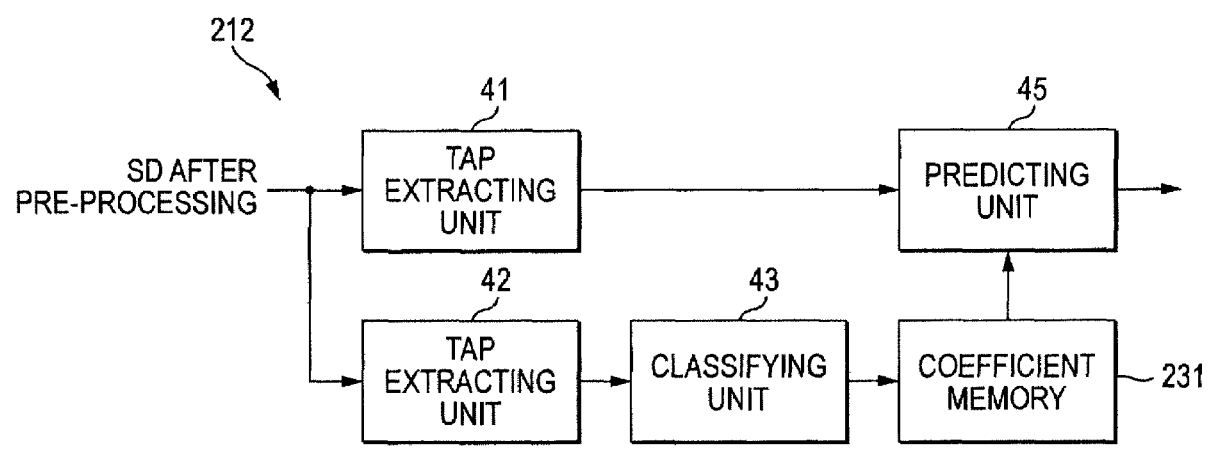
FIG. 36 is a block diagram showing an example of a structure of an image converting unit 212.

FIG. 36 is a diagram showing an example of a structure of the image converting unit 212 in FIG. 34.

In the figure, components corresponding to those in the image converting unit 11 in FIG. 4 are denoted by the identical reference numerals. Explanations of the components are omitted below as appropriate. The image converting unit 212 in FIG. 36 is the same as the image converting unit 11 in FIG. 4 in that the tap extracting units 41 and 42, the classifying unit 43, and the predicting unit 45 are provided. However, the image converting unit 212 is different from the image converting unit 11 in FIG. 4 in that a coefficient memory 231 is provided instead of the coefficient memory 44.

The coefficient memory 231 stores set of tap coefficients obtained by learning described later different from the set of tap coefficients stored in the coefficient memory 44.

The image converting unit 212 performs image conversion processing using the set of tap coefficients stored in the coefficient memory 231 to convert the SD image signal after pre-processing into the enlarged HD image signal.

The image converting unit 212 sets the SD image signal after pre-processing from the pre-processing unit 211 as a first image signal and sets the enlarged HD image signal obtained by enlarging the SD image signal before pre-processing as a second image signal. The tap extracting unit 41 sequentially sets pixels of the enlarged HD image signal serving as the second signal as a pixel of interest and extracts, for the pixel of interest, a pixel value of a pixel to be set as a prediction tap from the SD image signal after pre-processing serving as the first image signal. The tap extracting unit 41 supplies the pixel value to the predicting unit 45. Moreover, the tap extracting unit 42 extracts, for the pixel of interest, a pixel value of a pixel to be set as a class tap from the SD image signal after pre-processing serving as the first image signal. The tap extracting unit 42 supplies the pixel value to the classifying unit 43.

The classifying unit 43 performs, on the basis of the class tap from the tap extracting unit 42, classification for determining a class of the pixel of interest. The classifying unit 43 supplies (a class code indicating) a class of the pixel of interest obtained as a result of the classification to the coefficient memory 231. The coefficient memory 231 reads out a tap coefficient of the class according to the class from the classifying unit 43 and outputs the tap coefficient to the predicting unit 45.

The predicting unit 45 performs, for example, the arithmetic operation of Equation (1) described above using the prediction tap from the tap extracting unit 41 and the tap coefficient from the coefficient memory 231 to calculate (predict) a pixel value of the pixel of interest of the enlarged HD image signal serving as the second image signal.

Figure 37:
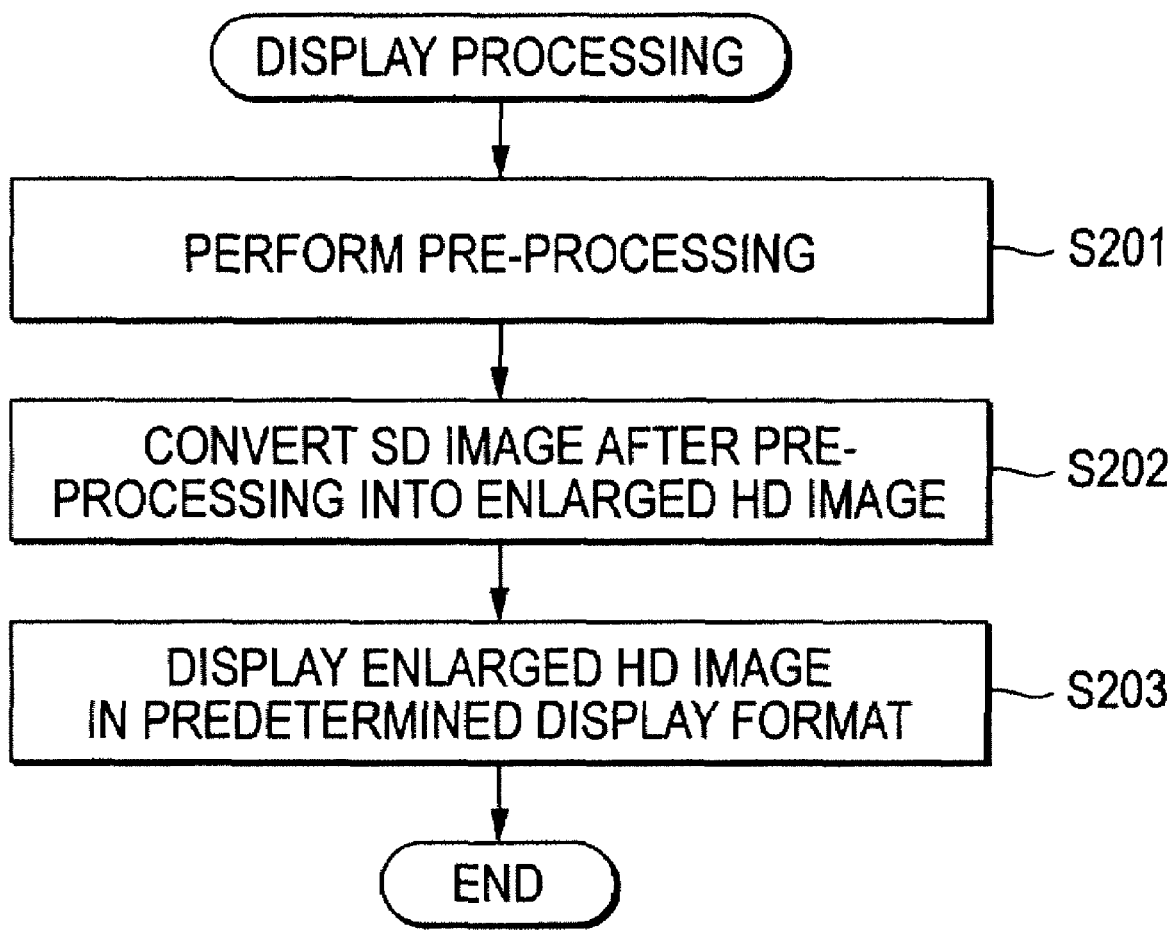
FIG. 37 is a flowchart for explaining processing by the display apparatus 202.

Operations of the display apparatus 202 in FIG. 34 will be explained with reference to a flowchart in FIG. 37.

An SD image signal from the camera 201 is supplied to the display apparatus 202. In the display apparatus 202, the SD image from the camera 201 is received and supplied to the pre-processing unit 211.

In step S201, the pre-processing unit 211 applies pre-processing to the SD image signal from the camera 201 and outputs an SD image signal after pre-processing obtained as a result of the pre-processing.

In the pre-processing unit 211 (FIG. 35), the pre-processing-tap extracting unit 221 sequentially sets, as a pixel of interest, pixels forming an SD image signal after pre-processing intended to be obtained by applying pre-processing to the SD image signal from the camera 201. The pre-processing-tap extracting unit 221 extracts, from the SD image signal from the camera 201, pre-processing taps that are pixel values of plural pixels used for calculating a pixel value of the pixel of interest. The pre-processing-tap extracting unit 221 supplies the pre-processing tap to the pre-processing arithmetic operation unit 222.

The pre-processing arithmetic operation unit 222 performs, with the pixel values serving as the pre-processing taps from the pre-processing-tap extracting unit 221 as arguments, an arithmetic operation for a function for pre-processing defined by the pre-processing coefficient stored in the coefficient memory 223. The pre-processing arithmetic operation unit 222 outputs a result of the arithmetic operation for a function for pre-processing as a pixel value of the pixel of interest of the SD mage signal after pre-processing.

In this way, the SD image signal after pre-processing outputted by the pre-processing unit 211 is supplied to the image converting unit 212.

In step S202, the image converting unit 212 performs, according to an arithmetic operation in which the tap coefficients obtained by learning described later stored in the coefficient memory 231 (FIG. 36) are used, image conversion processing for converting the SD image signal after pre-processing from the pre-processing unit 211 into an enlarged HD image signal obtained by enlarging the SD image signal outputted by the camera 201 and improving a quality of the SD image signal. The image converting unit 212 supplies an enlarged HD image signal obtained as a result of the image conversion processing to the display control unit 213 and proceeds to step S203.

In step S203, the display control unit 213 causes the display 214 to display an enlarged HD image corresponding to the enlarged HD image signal supplied from the image converting unit 212 in a predetermined display format.

In this way, the enlarged HD image is displayed on the display 214.

In the display apparatus 202 in FIG. 34, as described above, the image converting unit 212 sets the SD image signal after pre-processing obtained by applying pre-processing to the SD image signal outputted by the camera 201 in the pre-processing unit 211 as the first image signal and sets the enlarged HD image signal obtained by enlarging and improving resolution of the SD image signal outputted by the camera 201 as the second image signal. The image converting unit 212 performs the image conversion processing for converting the first image signal into the second image signal.

The image converting unit 212 may set the SD image signal itself outputted by the camera 201 as the first image signal instead of the SD image signal after pre-processing outputted by the pre-processing unit 211 to obtain the enlarged HD image signal as the second image signal and perform the image conversion processing.

However, it is not always appropriate to set the SD image signal itself outputted by the camera 201 as an image signal to be set as the first image signal in the image conversion processing for obtaining the enlarged HD image signal as the second image signal.

It is more likely that an enlarged HD image signal that the user feels high in quality can be obtained if the image conversion processing is performed by, rather than setting the SD image signal outputted by the camera 201 as the first image signal, applying some processing to the SD image signal and setting an image signal obtained as a result of the processing as the first image signal.

Thus, in the display apparatus 202 in FIG. 34, the pre-processing unit 211 provided in the pre-stage of the image converting unit 212 applies pre-processing suitable for enlarging and improving an image quality of the SD image signal from the camera 201 to the SD image signal. This pre-processing is, in other words, pre-processing for converting the SD image signal from the camera 201 into an image signal suitable for obtaining an enlarged HD image signal that the user feels high in quality according to the image conversion processing.

In the pre-processing unit 211 (FIG. 35), as described above, the pre-processing-tap extracting unit 221 extracts, from the SD image signal from the camera 201, pre-processing taps that are pixel values of plural pixels in a predetermined positional relation with a pixel of interest (a tap structure) used for calculating a pixel value of the pixel of interest. A positional relation of a pixel set as the pre-processing tap with the pixel of interest is determined by learning. In other words, a positional relation (a tap structure) of a pixel to be set as the pre-processing tap with respect to the pixel of interest is determined by learning.

Moreover, in the pre-processing unit 211, the pre-processing arithmetic operation unit 222 performs, with the pixel values serving as the pre-processing taps as arguments, the arithmetic operation for a function for pre-processing defined by the pre-processing coefficient stored in the coefficient memory 223 to calculate a pixel value of the pixel of interest (the SD image signal after pre-processing). The pre-processing coefficient defining the function for pre-processing is also determined by learning.

The image converting unit 212 (FIG. 34) performs the image conversion processing for converting the SD image signal after pre-processing obtained by the pre-processing unit 211 into an enlarged HD image signal according to an arithmetic operation between the SD image signal after pre-processing and a tap coefficient. The tap coefficient used for the image conversion processing for obtaining the enlarged HD image signal (hereinafter referred to as tap coefficient for enlargement as appropriate) is also determined by learning.

Figure 38:
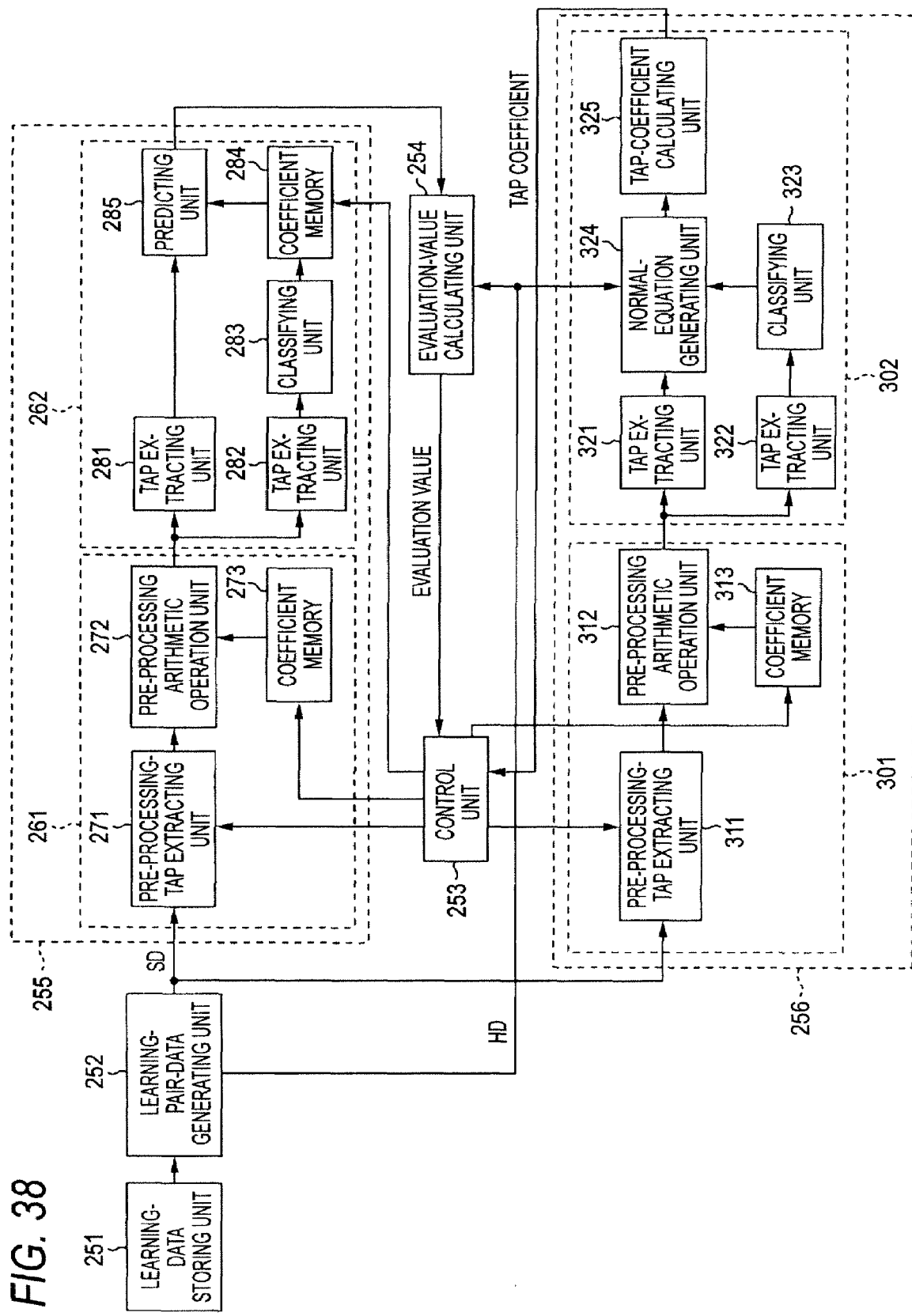
FIG. 38 is a block diagram showing an example of a learning apparatus that learns an optimum tap structure, an optimum pre-processing coefficient, and an optimum tap coefficient.

FIG. 38 is a diagram showing an example of a learning apparatus that learns (determines) a tap structure of a pre-processing tap obtained by the pre-processing-tap extracting unit 221 (FIG. 35), a pre-processing coefficient defining a function for preprocessing used for an arithmetic operation by the pre-processing arithmetic operation unit 22, and a tap coefficient for enlargement.

The learning apparatus in FIG. 38 includes a learning-data storing unit 251, a learning-pair-data generating unit 252, a control unit 253, an evaluation-value calculating unit 254, and learning units 255 and 256.

The learning-data storing unit 251 has stored therein, for example, an SHD image signal (an SHD image) as learning data used for learning of a tap structure of a pre-processing tap, a pre-processing coefficient, and a tap coefficient for enlargement.

The learning-pair-data generating unit 252 generates, from the learning data stored in the learning-data storing unit 251, an SD image signal equivalent to the SD image signal supplied to the pre-processing unit 211 of the display apparatus 202 in FIG. 34 and an enlarged HD image signal obtained by enlarging the SD image signal (an HD image signal equivalent to the enlarged HD image signal outputted by the image converting unit 212 of the display apparatus 202 in FIG. 34).

An ideal output signal with respect to a certain input signal is referred to as a teacher signal and an input signal given to obtain the teacher signal is referred to as a student signal. The learning-pair-data generating unit 252 generates an SD image signal serving as the student signal and an enlarged HD image signal serving as the teacher signal obtained by enlarging the SD image signal.

Specifically, the learning-pair-data generating unit 252 sequentially sets frames of the SHD image signal serving as the learning data stored in the learning-data storing unit 251 as a frame of interest. For example, the learning-pair-data generating unit 252 curtails pixels of the frame of interest by changing the number of pixels to be curtailed to generate an SD pixel signal serving as the student signal and generate an enlarged HD image signal serving as the teacher signal having the number of pixels larger than that of the SD image signal.

The learning-pair-data generating unit 252 supplies a set of the SD image signal serving as the student signal and the enlarged HD image signal serving as the teacher signal obtained by enlarging the SD image signal to the evaluation-value calculating unit 254 and the learning units 255 and 256 as learning pair data.

The control unit 253 controls the learning units 255 and 256 on the basis of, for example, evaluation of the enlarged HD image signal obtained by the learning unit 255 and supplied from the evaluation-value calculating unit 254.

The evaluation-value calculating unit 254 evaluates the enlarged HD image signal outputted by (a predicting unit 285 constituting an image converting unit 262 of) the learning unit 255. The evaluation-value calculating unit 254 supplies a result of the evaluation to the control unit 253.

The evaluation-value calculating unit 254 compares, for example, the enlarged HD image signal outputted by the learning unit 255 and the enlarged HD image signal serving as the teacher signal, which forms a set with the student signal converted into the enlarged HD image signal outputted by the learning unit 255, of the learning pair data supplied from the learning-pair-data generating unit 252. Then, the evaluation-value calculating unit 254 calculates an evaluation value indicating, so to speak, closeness of the enlarged HD image signal outputted by the learning unit 255 to (a degree of coincidence of the enlarged HD image signal outputted by the learning unit 255 with) the teacher signal. The evaluation-value calculating unit 254 supplies the evaluation value to the control unit 72.

As the evaluation value calculated by the evaluation-value calculating unit 254, it is possible to adopt, for example, a value inversely proportional to a sum of square errors between pixels values of pixels in identical positions of the enlarged HD image signal outputted by the learning unit 255 and the enlarged HD image signal serving as the teacher signal of the learning pair data supplied from the learning-pair-data generating unit 252.

In this case, the evaluation-value calculating unit 254 calculates, for all pixels of the enlarged HD image signal serving as the teacher signal forming the learning pair data generated by the learning-pair-data generating unit 252, square errors between pixel values of pixels in identical positions of the enlarged HD image signal outputted by the learning unit 255 and the enlarged HD image signal serving as the teacher signal of the learning pair data supplied from the learning-pair-data generating unit 252. The evaluation-value calculating unit 254 calculates a value inversely proportional to a sum of the square errors as an evaluation value.

The learning unit 255 includes a pre-processing unit 261 and an image converting unit 262.

The pre-processing unit 261 includes a pre-processing-tap extracting unit 271, a pre-processing arithmetic operation unit 272, and a coefficient memory 273. The pre-processing unit 261 performs processing, which is the same as the processing of the pre-processing unit 211 constituting the display apparatus 202 in FIG. 34, in accordance with the control by the control unit 253.

The pre-processing-tap extracting unit 271 sequentially sets, as a pixel of interest, pixels forming an SD image signal after pre-processing (this SD signal after pre-processing is imaginarily assumed) obtained by applying pre-processing to the SD image signal serving as the student signal of the learning pair data supplied from the learning-pair-data generating unit 252. The pre-processing-tap extracting unit 271 extracts, from the student signal (the SD image signal) from the learning-pair-data generating unit 252, pre-processing taps that are pixel values of plural pixels used for calculating a pixel value of the pixel of interest. The pre-processing-tap extracting unit 271 supplies the pre-processing tap to the pre-processing arithmetic operation unit 272.

The pre-processing-tap extracting unit 271 extracts pre-processing tap of a tap structure conforming to the control by the control unit 253. The control unit 253 controls a positional relation of (a pixel value of) a pixel with the pixel of interest set as the pre-processing tap obtained by the pre-processing-tap extracting unit 271.

In the same manner as the pre-processing arithmetic operation unit 222 in FIG. 35, the pre-processing arithmetic operation unit 272 performs, with the pixel values serving as the pre-processing taps supplied from the pre-processing-tap extracting unit 271 as arguments, an arithmetic operation for a function for pre-processing defined by a pre-processing coefficient stored in the coefficient memory 273. The pre-processing arithmetic operation unit 272 supplies a result of the arithmetic operation for a function for pre-processing to the image converting unit 262 as a pixel value of the pixel of interest of the SD image signal after pre-processing.

The coefficient memory 273 stores a pre-processing coefficient supplied from the control unit 253 (in an overwriting manner).

The image converting unit 262 includes tap extracting units 281 and 282, a classifying unit 283, a coefficient memory 284, and a predicting unit 285. The image converting unit 262 performs processing (image conversion processing in which a set of tap coefficients is used), which is the same as the processing performed by the image converting unit 212 constituting the display apparatus 202 in FIG. 34, in accordance with the control by the control unit 253.

The image converting unit 262 sets the SD image signal before pre-processing from (the pre-processing arithmetic operation unit 272 of) the pre-processing unit 261 as a first image signal and sets an enlarged HD image signal obtained by enlarging the SD image signal before pre-processing as a second image signal. The tap extracting unit 281 sequentially sets pixels of the enlarged HD image signal serving as the second image signal as a pixel of interest. For the pixel of interest, the tap extracting unit 281 extracts a pixel value of a pixel to be set as a prediction tap from the SD image signal after pre-processing serving as the first image signal. The tap extracting unit 281 supplies a prediction tap of a tap structure identical with the tap structure obtained by the tap extracting unit 41 of the image converting unit 212 (FIG. 36) to the predicting unit 285.

The tap extracting unit 282 extracts, for the pixel of interest, a pixel value of a pixel to be set as a class tap from the SD image signal after pre-processing serving as the first image signal. The tap extracting unit 282 supplies a class tap of a tap structure identical with the tap structure obtained by the tap extracting unit 41 of the image converting unit 212 to the classifying unit 283.

The classifying unit 283 performs classification, which is the same as the classification performed by the classifying unit 43 of the image converting unit 212, on the basis of the class tap from the tap extracting unit 282. The classifying unit 282 supplies a class of the pixel of interest obtained as a result of the classification to the coefficient memory 284.

The coefficient memory 284 stores a set of tap coefficients supplied from the control unit 253 (in an overwriting manner) in accordance with the control by the control unit 253. The coefficient memory 284 reads out, according to the class from the classifying unit 283, a tap coefficient of the class and outputs the tap coefficient to the predicting unit 285.

The predicting unit 285 performs an arithmetic operation, which is the same as the arithmetic operation performed by the predicting unit 45 of the image converting unit 212, using the prediction tap from the tap extracting unit 281 and the tap coefficient from the coefficient memory 284 to calculate (predict) a pixel value of the pixel of interest of the enlarged HD image signal serving as the second image signal. The predicting unit 285 supplies the pixel value to the evaluation-value calculating unit 254.

The learning unit 256 includes a pre-processing unit 301 and a tap-coefficient learning unit 302.

The pre-processing unit 301 includes a pre-processing-tap extracting unit 311, a pre-processing arithmetic operation unit 312, and a coefficient memory 313. The pre-processing unit 301 performs processing, which is the same processing performed by the pre-processing unit 261 and the pre-processing unit 211 constituting the display apparatus 202 in FIG. 34, in accordance with the control by the control unit 253.

In the same manner as the pre-processing-tap extracting unit 271, the pre-processing-tap extracting unit 311 sequentially sets, as a pixel of interest, pixels forming the SD image signal for pre-processing obtained by applying pre-processing to the SD image signal serving as the student signal of the learning pair data supplied from the learning-pair-data generating unit 252. The pre-processing-tap extracting unit 311 extracts, from the student signal (the SD image signal) from the learning-pair-data generating unit 252, pre-processing taps that are pixel values of plural pixels used for calculating a pixel value of the pixel of interest. The pre-processing-tap extracting unit 311 supplies the pre-processing tap to the pre-processing arithmetic operation unit 312.

The pre-processing-tap extracting unit 311 extracts a pre-processing tap of a tap structure conforming to the control by the control unit 253. The control unit 253 controls positional relation of (a pixel value of) a pixel with the pixel of interest set as the preprocessing tap obtained by the pre-processing-tap extracting unit 311.

In the same manner as the pre-processing arithmetic operation unit 272, the pre-processing arithmetic operation unit 312 performs, with the pixel values serving as the pre-processing taps supplied from the pre-processing-tap extracting unit 311 as arguments, an arithmetic operation for a function for pre-processing defined by a pre-processing coefficient stored in the coefficient memory 313. The pre-processing arithmetic operation unit 312 supplies a result of the arithmetic operation for a function for pre-processing to the tap-coefficient learning unit 302 as a pixel value of the pixel of interest of the SD image signal after pre-processing.

The coefficient memory 313 stores a pre-processing coefficient supplied from the control unit 253 (in an overwriting manner).

The tap-coefficient learning unit 302 includes tap extracting units 321 and 322, a classifying unit 323, a normal-equation generating unit 324, and a tap-coefficient calculating unit 325. The tap-coefficient learning unit 302 performs learning by the learning method in which the normal equation is used, that is, the learning method of forming and solving the normal equation of Equation (8) for each class to calculate a tap coefficient for each class.

In the tap-coefficient learning unit 302, the tap extracting unit 321 sequentially sets, as a pixel of interest, pixels of the enlarged HD image signal serving as the teacher signal of the learning pair data supplied from the learning-pair-data generating unit 252. The tap extracting unit 321 extracts, for the pixel of interest, a pixel value of a pixel to be set as a prediction tap from the SD image signal after pre-processing from (the pre-processing arithmetic operation unit 312 of) the pre-processing unit 301. The tap extracting unit 321 supplies a prediction tap of a tap structure identical with the prediction tap of the tap structure obtained by the tap extracting unit 281 to the normal-equation generating unit 324.

The tap extracting unit 322 extracts, for the pixel of interest, a pixel value of a pixel to be set as a class tap from the SD image signal after pre-processing from (the pre-processing arithmetic operation unit 312 of) the pre-processing unit 301. The tap extracting unit 322 supplies a class tap of a tap structure identical with the class tap of the tap structure obtained by the tap extracting unit 282 to the classifying unit 323.

In the same manner as the classifying unit 283, the classifying unit 323 classifies the pixel of interest on the basis of the class tap supplied from the tap extracting unit 322. The classifying unit 323 supplies a class of the pixel of interest obtained as a result of the classification to the normal-equation generating unit 324.

The normal-equation generating unit 324 performs, for each class code supplied from the classifying unit 323, an addition for (a pixel value of) a pixel of interest $y_k$ of the enlarged HD image signal serving as the teacher signal of the learning pair data supplied from the learning-pair-data generating unit 252 and (pixel values of) pixels $x_{n,k}$ forming a prediction tap for the pixel of interest supplied from the tap extracting unit 321.

The normal-equation generating unit 324 performs, for each class supplied from the classifying unit 323, a multiplication ($x_{n,k}x_{n',k}$) and an arithmetic operation equivalent to a summation ($\Sigma$) of prediction tap pixels in a matrix on the left-hand side of Equation (8) using pixels $x_{n,k}$ forming the prediction tap for the pixel of interest supplied from the tap extracting unit 321 (hereinafter also referred to as prediction tap coefficient as appropriate).

The normal-equation generating unit 324 also performs, for each class supplied from the classifying unit 323, a multiplication ($x_{n,k}y_k$) and an arithmetic operation equivalent to a summation ($\Sigma$) of the prediction tap pixels $x_{n,k}$ and the pixel of interest $y_k$ in a vector on the right-hand side of Equation (8) using the prediction tap pixel $x_{n,k}$ and the pixel (the pixel of interest) $y_k$ of the enlarged HD image signal.

The normal-equation generating unit 324 has stored in a memory (not shown) built therein a component ($\Sigma x_{n,k}x_{n',k}$) of the matrix on the left-hand side and a component ($\Sigma x_{n,k}y_k$) of the vector on the right-hand side of Equation (8) calculated for a pixel of an enlarged HD image signal set as a pixel of interest last time (hereinafter also referred to as enlarged HD pixel as appropriate).

The normal-equation generating unit 324 adds, to the component ($\Sigma x_{n,k} x_{n'k}$) of the matrix stored in the memory, a component $x_{n,k+1} x_{n',k+1}$ corresponding thereto calculated using a prediction tap pixel $x_{n,k+1}$ forming a prediction tap for an enlarged HD image set as a pixel of interest anew (performs an addition indicated by a summation in the matrix on the left-hand side of Equation (8)). In addition, the normal-equation generating unit 324 adds, to the component ($\Sigma x_{n,k} y_k$) of the vector stored in the memory, a component $x_{n,k+1} y_{k+1}$ corresponding thereto calculated for the enlarged HD image set as the pixel of interest anew using an enlarged HD pixel $y_{k+1}$ and a prediction tap pixel $x_{n,k+1}$ (performs an addition indicated by a summation in the vector on the right-hand side of Equation (8)).

The normal-equation generating unit 324 performs the addition with all pixels of the enlarged HD image signal serving as the teacher signal of the learning pair data supplied from the learning-pair-data generating unit 252 as pixels of interest to form the normal equation indicated by Equation (8) for each class. Then, the normal-equation generating unit 324 supplies the normal equation to the tap-coefficient calculating unit 325.

The tap-coefficient calculating unit 325 solves the normal equation for each class supplied from the normal-equation generating unit 324 to calculate an optimum tap coefficient (a tap coefficient that minimizes the sum E of square errors of Equation (4)) $w_n$ for each class. The tap-coefficient calculating unit 325 supplies the tap coefficient $W_n$ to the control unit 253.

The learning processing for learning a tap coefficient, a pre-processing coefficient, and a tap coefficient for enlargement of a pre-processing tap performed by the learning apparatus in FIG. 38 will be explained with reference to a flowchart in FIG. 39.

First, in step S211, the learning-pair-data generating unit 252 generates, from the learning data stored in the learning-data storing unit 251, an SD image signal equivalent to the SD image signal supplied to the pre-processing unit 211 of the display apparatus 202 in FIG. 34 and an enlarged HD image obtained by enlarging the SD image signal (an HD image signal equivalent to the enlarged HD image signal outputted by the image converting unit 212 of the display apparatus 202 in FIG. 34). The learning-pair-data generating unit 252 associates the SD image signal and the enlarged HD image signal for, for example, each frame. The learning-pair-data generating unit 252 supplies the SD image signal and the enlarged HD image signal to the evaluation-value calculating unit 254 and the learning units 255 and 256 as learning pair data.

Thereafter, the control unit 253 proceeds from step S211 to step S212. The control unit 253 determines an initial tap structure $D_m$ to be set as a tap structure of interest out of plural initial tap structures. The control unit 253 supplies tap structure information indicating the tap structure of interest $D_m$ to the pre-processing-tap extracting unit 311 of the pre-processing unit 301 and proceeds to step S213.

In the learning apparatus in FIG. 38, for example, plural tap structures of a pre-processing tap such as 3×3 pixels arranged vertically and horizontally with a pixel closest to a position of a pixel of interest as the center and nine pixels arranged in the horizontal direction and five pixels arranged in the vertical direction with a pixel closest to a position of a pixel of interest as the center are set (determined) as initial tap structures used in the beginning of the learning processing. The control unit 253 stores tap structure information indicating the respective plural initial tap structures in a memory (not shown) built therein. The control unit 253 determines (sets) one of initial tap structures, which have not been set as initial tap structures, among the plural initial tap structures indicated by plural pieces of tap structure information stored in the memory built therein as the tap structure of interest $D_m$. The control unit 253 supplies tap structure information indicating the tap structure of interest $D_m$ to the pre-processing-tap extracting unit 311.

Here, $D_m$ indicates, for example, an mth initial tap structure among the plural initial tap structures.

In step S213, the control unit 253 determines a pre-processing coefficient set of interest $E_n$ that is a set of pre-processing coefficients that the pre-processing unit 301 uses for pre-processing. For example, when the number of (pixel values) of pixels forming a pre-processing tap of the tap structure of interest $D_m$ is X and the number of bits of a pre-processing coefficient is Y, there are $X \times 2^Y$ kinds as a number that the set of pre-processing coefficients can take with respect to the pre-processing tap of the tap structure of interest $D_m$. The control unit 253 determines one of sets of pre-processing coefficients, which have not been set as interest pre-processing coefficient sets, among the $X \times 2^Y$ kinds of sets of pre-processing coefficients as the pre-processing coefficient set of interest $E_n$.

The control unit 253 supplies the pre-processing coefficient set of interest $E_n$ to the coefficient memory 313 of the pre-processing unit 301 and causes the coefficient memory 313 to store the pre-processing coefficient set of interest $E_n$. The control unit 253 proceeds from step S213 to step S214.

In step S214, the learning apparatus (FIG. 38) determines, for a combination of the tap structure of interest $D_m$ and the pre-processing coefficient set of interest $E_n$, a provisional optimum set of tap coefficients for enlargement (a set of tap coefficients $(x_1, x_2, \ldots, x_N)$ of each class used in the arithmetic operation of Equation (1)) $F_{m,n}$.

In step S214, the learning unit 256 determines, using the pre-processing tap of the tap structure of interest $D_m$ and the pre-processing coefficient set of interest $E_n$, with an SD image signal after pre-processing obtained by applying pre-processing to an SD image signal set as a first image signal, a set of tap coefficients for enlargement as an optimum set of tap coefficients for enlargement $F_{m,n}$. The set of tap coefficients for enlargement minimizes a sum of square errors between an enlarged HD image signal serving as a second image signal including pixels having respective components of R, G, and B as pixel values obtained by performing image conversion processing, in which a set of tap coefficients for enlargement is used, and an enlarged HD image signal serving as the teacher signal of the learning pair data generated by the learning-pair-data generating unit 252. The learning unit 256 supplies the optimum set of tap coefficients for enlargement to the control unit 253.

The control unit 253 proceeds from step S214 to step S215. The control unit 253 judges whether all the $X \times 2^Y$ kinds of sets of pre-processing coefficients that can be set for the pre-processing tap of the tap structure of interest $D_m$ have been set as interest pre-processing coefficient sets.

When it is judged in step S215 that all the $X \times 2^Y$ kinds of sets of pre-processing coefficients that can be set for the pre-processing tap of the tap structure of interest $D_m$ have not been set as interest pre-processing coefficient sets, the control unit 253 returns to step S213. The control unit 253 determines one of sets of pre-processing coefficients, which have not been set as interest pre-processing coefficient sets, among the $X \times 2^Y$ kinds of sets of pre-processing coefficients that can be set for the pre-processing tap of the tap structure of interest $D_m$ as a pre-processing coefficient set of interest anew. The control unit 253 repeats the same processing.

When it is judged in step S215 that all the $X \times 2^Y$ kinds of sets of pre-processing coefficients that can be set for the pre-processing tap of the tap structure of interest $D_m$ have been set as interest pre-processing coefficient sets, the control unit 253 proceeds to step S216. The control unit 253 judges whether all the plural initial tap structures indicated by plural pieces of tap structure information stored in the built-in memory have been set as interest tap structures.

When it is judged in step S216 that all the plural initial tap structures have not been set as interest tap structures, the control unit 253 returns to step S212. The control unit 253 determines one of initial tap structures, which have not been set as initial tap structures, among the plural initial tap structures as a tap structure of interest anew. The control unit 253 repeats the same processing.

When it is judged in step S216 that all the plural initial tap structures have been set as interest tap structures, that is, when optimum sets of tap coefficients are determined in step S214 for all combinations of the respective plural initial tap structures and the respective plural pre-processing coefficient sets that can be set for the pre-processing tap of each initial tap structure, the control unit 253 proceeds to step S217. The control unit 253 provisionally determines a combination of an optimum tap structure, an optimum pre-processing coefficient set, and an optimum set of tap coefficients for enlargement out of combinations of an initial tap structure and a pre-processing coefficient set and an optimum set of tap coefficients for enlargement for a combination of the initial tap structure and the pre-processing coefficient set.

After the combination of the optimum tap structure, the optimum pre-processing coefficient set, and the optimum set of tap coefficients for expansion is provisionally determined in step S217, the control unit 253 proceeds to step S218. The control unit 253 performs optimum tap structure determination processing for provisionally determining an optimum tap structure for a combination of a present provisional optimum pre-processing coefficient set and a present provisional optimum set of tap coefficients for expansion. The control unit 253 proceeds to step S219.

In step S219, the control unit 253 performs optimum pre-processing coefficient set determination processing for provisionally determining an optimum pre-processing coefficient set for a combination of a present provisional optimum tap structure and a present provisional optimum set of tap coefficients for expansion. The control unit 253 proceeds to step S220.

In step S220, the control unit 253 performs optimum tap coefficient set determining processing for provisionally determining an optimum set of tap coefficients for expansion for a combination of a present provisional optimum tap structure and a present provisional optimum pre-processing coefficient set. The control unit 253 proceeds to step S221.

In step S221, the control unit 253 judges whether a combination of the present provisional optimum tap structure determined in the immediately preceding step S218, the present provisional optimum pre-processing coefficient set determined in the immediately preceding step S219, and the present provisional optimum set of tap coefficients for expansion determined in the immediately preceding step S220 is an optimized combination.

In the optimum tap coefficient set determination processing in the immediately preceding step S220, the control unit 253 provisionally determines a set of tap coefficients for expansion that maximizes an evaluation value calculated by the evaluation-value calculating unit 254 as an optimum set of tap coefficients for expansion for the combination of the present provisional optimum tap structure and the present provisional optimum pre-processing coefficient set. In step S221, the control unit 253 judges whether the combination of the present provisional optimum tap structure, the present provisional optimum pre-processing coefficient set, and the present provisional optimum set of tap coefficients for expansion is an optimized combination according to, for example, whether an evaluation value for the optimum set of tap coefficients for expansion is equal to or larger than (larger than) a predetermined threshold for judgment of optimization.

When it is judged in step S221 that the combination of the present provisional optimum tap structure, the present provisional optimum pre-processing coefficient set, and the present provisional optimum set of tap coefficients for expansion is not an optimized combination, that is, when the evaluation value for the present provisional optimum set of tap coefficients for expansion determined in the immediately preceding step S220 is not equal to or larger than the threshold for judgment of optimization, the control unit 253 returns to step S218. The control unit 253 repeats the same processing.

When it is judged in step S221 that the combination of the present provisional optimum tap structure, the present provisional optimum pre-processing coefficient set, and the present provisional optimum set of tap coefficients for expansion is an optimized combination, that is, when the evaluation value for the present provisional optimum set of tap coefficients for expansion determined in the immediately preceding step S220 is equal to or larger than the threshold for judgment of optimization, the control unit 253 finally determines the combination of the present provisional optimum tap structure, the present provisional optimum pre-processing coefficient set, and the present provisional optimum set of tap coefficients for expansion as a combination of an optimum tap structure, an optimum pre-processing coefficient set, and an optimum set of tap coefficients for expansion and ends the learning processing.

Figure 39:
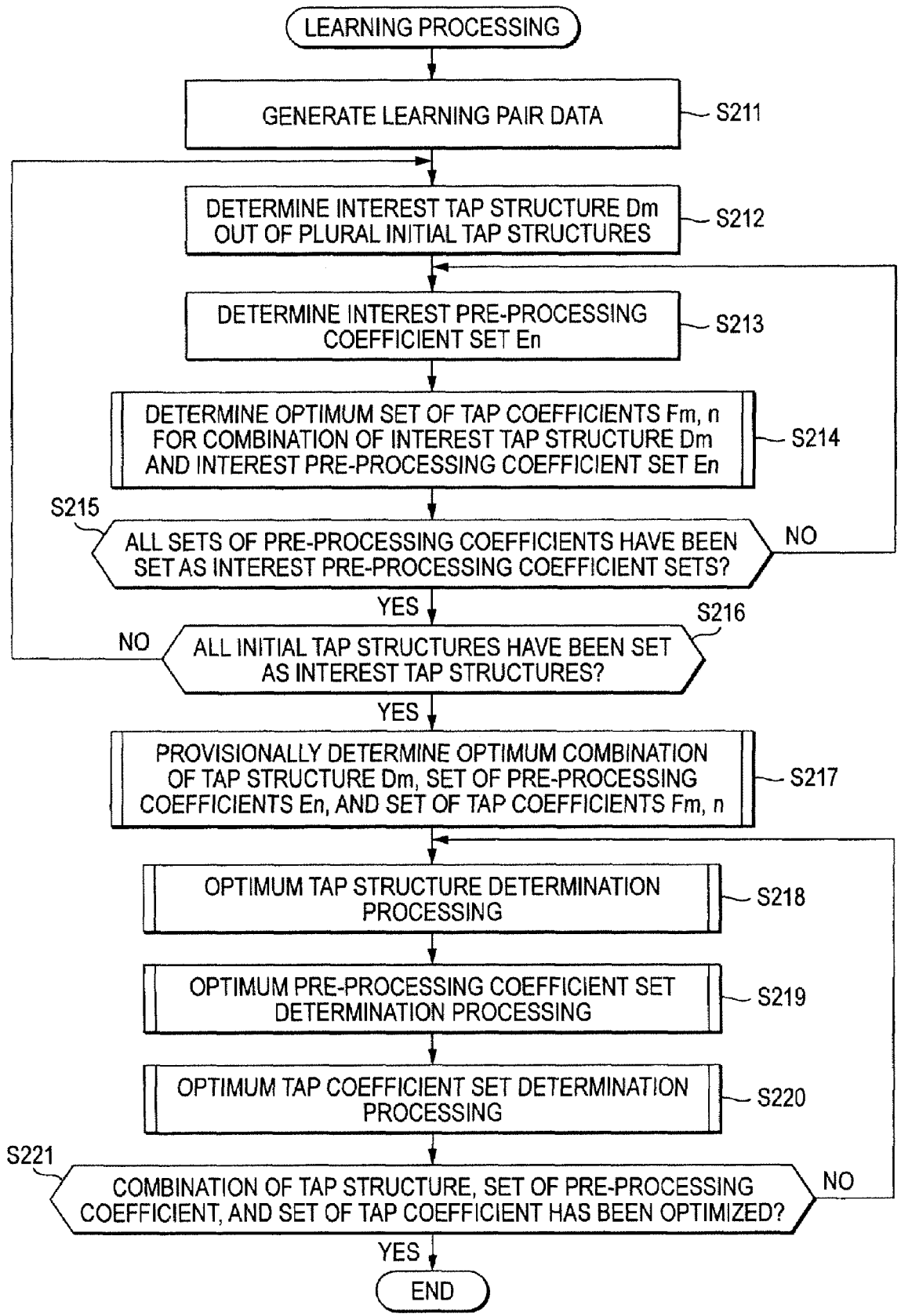
FIG. 39 is a flowchart for explaining processing by the learning apparatus that learns an optimum tap structure, an optimum pre-processing coefficient, and an optimum tap coefficient.

In the display apparatus 202 in FIG. 34, the pre-processing unit 211 applies pre-processing to the SD image signal from the camera 201 using a pre-processing tap of the optimum tap structure and the optimum pre-processing coefficient set finally determined by the learning processing in FIG. 39. The pre-processing unit 211 outputs an SD image signal after pre-processing obtained as a result of the pre-processing. The image converting unit 213 performs image conversion processing for converting the SD image signal after pre-processing outputted by the pre-processing unit 211 into an expanded HD image signal using the optimum set of tap coefficients for expansion finally determined by the learning processing in FIG. 39.

Therefore, apart from an S/N and the like of the SD image signal after pre-processing outputted by the pre-processing unit 211, the image converting unit 212 can obtain an expanded HD image signal having an image quality closer to an image quality of the expanded HD image signal serving as the teacher signal of the learning pair data.

In FIG. 39, when an evaluation value for a set of tap coefficients for expansion determined in the optimum tap coefficient set determination processing is equal to or larger than the threshold for judgment of optimization, it is judged that a combination of a tap structure of a pre-processing tap, a pre-processing coefficient set, and a set of tap coefficients for expansion is optimized. Besides, for example, it is also possible to judge that a combination of a tap structure, a pre-processing coefficient set, and a set of tap coefficients for expansion is optimized when the optimum tap structure determination processing, the optimum pre-processing coefficient set determination processing, and the optimum tap coefficient set determination processing are repeated a predetermined number of times.

Figure 40:
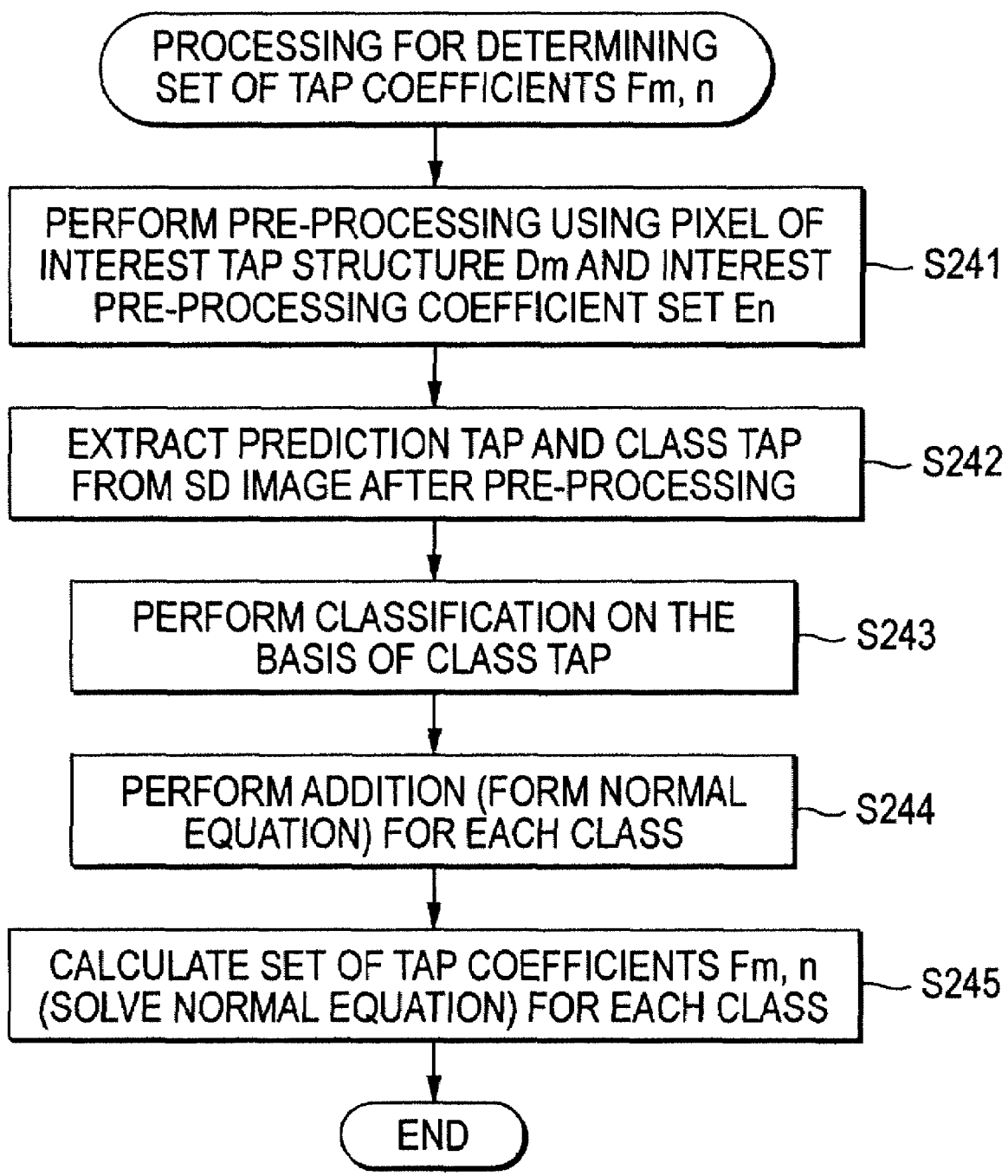
FIG. 40 is a flowchart for explaining details of processing in step S214.

The processing in step S214 in FIG. 39 for determining a provisional optimum set of tap coefficients $F_{m,n}$ for enlargement for a combination of a tap structure of interest $D_m$ and a pre-processing coefficient set of interest $E_n$ will be described in detail with reference to a flowchart in FIG. 40.

In step S241, the pre-processing unit 301 (FIG. 8) applies, on the basis of tap structure information and a pre-processing coefficient set of interest $E_n$ supplied from the control unit 253, pre-processing to the SD image signal serving as the student signal of the learning pair data supplied from the learning-pair-data generating unit 252. The pre-processing unit 301 supplies an SD image signal after pre-processing obtained as a result of the pre-processing to the tap-coefficient learning unit 302.

In the pre-processing unit 301, the pre-processing-tap extracting unit 311 sequentially sets, as a pixel of interest, pixels forming the SD image signal after pre-processing obtained by applying pre-processing to the SD image signal serving as the student signal of the learning pair data supplied from the learning-pair-data generating unit 252. For the pixel of interest, the pre-processing-tap extracting unit 311 extracts, from the student signal (the SD image signal) from the learning-pair-data generating unit 252, pixel values of plural pixels to be set as pre-processing taps of the tap structure of interest $D_m$ indicated by the tap structure information supplied from the control unit 253. The pre-processing-tap extracting unit 11 supplies the pixel values to the pre-processing arithmetic operation unit 312.

The pre-processing arithmetic operation unit 312 performs an arithmetic operation for a function for pre-processing defined by the pre-processing coefficient set of interest $E_n$, which is supplied from the control unit 253 and stored in the coefficient memory 313, with the pixel values serving as the pre-processing taps supplied from the pre-processing-tap extracting unit 311 as arguments. The pre-processing arithmetic operation unit 312 supplies a result of the arithmetic operation for a function of pre-processing to the tap-coefficient learning unit 302 as a pixel value of the pixel of interest of the SD image signal after pre-processing.

With the SD image signal after pre-processing supplied from the pre-processing unit 301 set as a first image signal, the tap-coefficient learning unit 302 determines, according to a learning method in which a normal equation is used, an optimum set of tap coefficients for enlargement $F_{m,n}$ used for performing image conversion processing for converting the first image signal into an enlarged HD image signal serving as a second image signal.

In the tap-coefficient learning unit 302, in step S242, the tap extracting unit 321 sequentially sets, as a pixel of interest, pixels of the enlarged HD image signal serving as the teacher signal supplied from the learning-pair-data generating unit 252. The tap extracting unit 321 extracts a pixel value of a pixel to be set as a prediction tap for the pixel of interest from the SD image signal after pre-processing serving as the first image signal supplied from the pre-processing unit 301. The tap extracting unit 321 supplies the pixel value to the normal-equation generating unit 324.

The tap extracting unit 322 extracts a pixel value of a pixel to be set as a class tap for the pixel of interest from the SD image signal after pre-processing serving as the first image signal supplied from the pre-processing unit 301. The tap extracting unit 322 supplies the pixel value to the classifying unit 323.

In step S243, the classifying unit 323 classifies the pixel of interest on the basis of the class tap from the tap extracting unit 322. The classifying unit 323 supplies a class of the pixel of interest obtained as a result of the classification to the normal-equation generating unit 324 and proceeds to step S244.

In step S244, the normal-equation generating unit 324 performs, with (the pixel value of) the pixel of interest of the learning pair data supplied from the learning-pair-data generating unit 252 and (the pixel value of) the pixel of the SD image signal after pre-processing forming the prediction tap obtained for the pixel of interest supplied from the tap extracting unit 321 as objects, the addition of Equation (8) formed for the class supplied from the classifying unit 323 as described above.

In the tap-coefficient learning unit 302, when the addition in step S244 is performed with all the pixels of the enlarged HD image signal serving as the teacher signal of the learning pair data supplied from the learning-pair-data generating unit 252 as pixels of interest, the normal-equation generating unit 324 supplies a normal equation for each class (a normal equation for each class formed by a matrix on the left-hand side and a vector on the right-hand side of Equation (8) for each class) obtained by the addition to the tap-coefficient calculating unit 325. The normal-equation generating unit 324 proceeds from step S244 to step S245.

In step S245, the tap-coefficient calculating unit 325 determines a set of tap coefficients for each class by solving the normal equation for each class (the normal equation for each class formed by the matrix on the left-hand side and the vector on the right-hand side of Equation (8) for each class) supplied from the normal-equation generating unit 324. The tap-coefficient calculating unit 325 determines the set of tap coefficients as the optimum set of tap coefficients for enlargement $F_{m,n}$ for the combination of the tap structure of interest $D_m$ and the pre-processing coefficient set of interest $E_n$. The tap-coefficient calculating unit 325 supplies the set of tap coefficients to the control unit 253 and returns to the start of the processing.

It is likely that there are classes for which normal equations are not obtained by a number necessary for determining tap coefficients because, for example, the number of pair data for learning is insufficient. For such classes, the tap-coefficient calculating unit 325 outputs, for example, a default tap coefficient.

Figure 41:
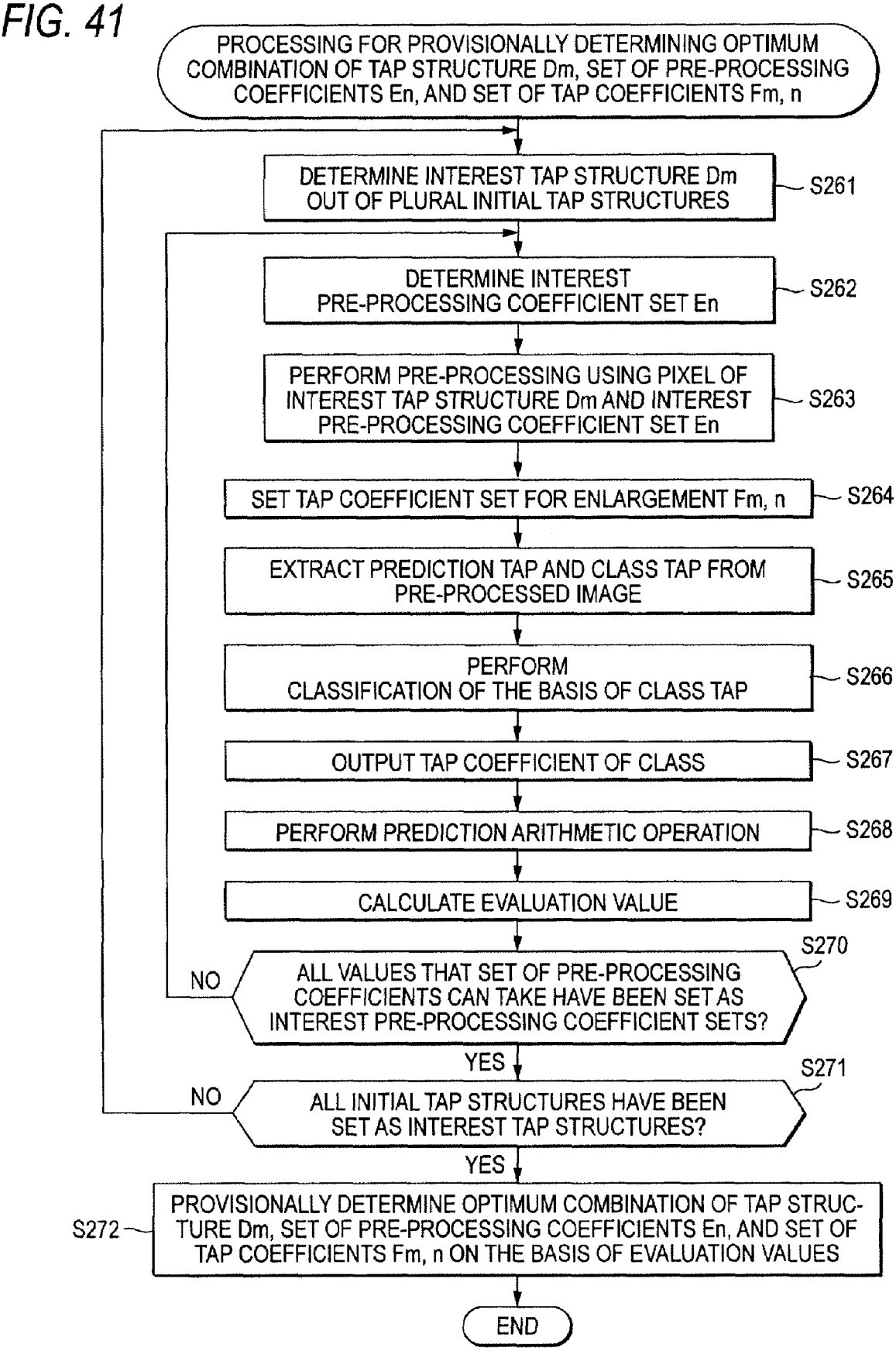
FIG. 41 is a flowchart for explaining details of processing in step S217.

The processing for provisionally determining a combination of an optimum tap structure, an optimum pre-processing coefficient set, and an optimum set of tap coefficients for enlargement in step S217 in FIG. 39 will be described in detail with reference to a flowchart in FIG. 41.

The control unit 253 proceeds to step S261. As in step S212 in FIG. 39, the control unit 253 determines an initial tap structure $D_m$ to be set as a tap structure of interest out of the plural initial tap structures. The control unit 253 supplies tap structure information indicating the tap structure of interest $D_m$ to the pre-processing-tap extracting unit 271 of the pre-processing unit 261 and proceeds to step S262.

In step S262, as in step S213 in FIG. 39, the control unit 253 determines a pre-processing coefficient set of interest $E_n$ that is a set of pre-processing coefficients that the pre-processing unit 261 uses for pre-processing. For example, when the number of (pixel values of) pixels forming a pre-processing tap of the tap structure of interest $D_m$ is X and the number of bits of a pre-processing coefficient is Y, there are $X \times 2^Y$ kinds as a number that the set of pre-processing coefficients can take with respect to the pre-processing tap of the tap structure of interest $D_m$. The control unit 253 determines one of sets of pre-processing coefficients, which have not been set as interest pre-processing coefficient sets, among the $X \times 2^Y$ kinds of sets of pre-processing coefficients as the pre-processing coefficient set of interest $E_n$.

The control unit 253 supplies the pre-processing coefficient set of interest $E_n$ to the coefficient memory 273 of the pre-processing unit 261 and causes the coefficient memory 273 to store the pre-processing coefficient set of interest $E_n$. The control unit 253 proceeds from step S262 to step S263.

In step S263, the pre-processing unit 261 applies, on the basis of the tap structure information and the pre-processing coefficient set of interest $E_n$ supplied from the control unit 253, pre-processing to the SD image signal serving as the student signal of the learning pair data supplied from the learning-pair-data generating unit 252. The pre-processing unit 261 supplies an SD image signal after pre-processing obtained as a result of the pre-processing to the image converting unit 262.

In the pre-processing unit 261, the pre-processing-tap extracting unit 271 sequentially sets, as a pixel of interest, pixels forming the SD image signal after pre-processing obtained by applying pre-processing to the SD image signal serving as the student signal of the learning pair data supplied from the learning-pair-data generating unit 252. The pre-processing-tap extracting unit 271 extracts, from the student pixel (the SD image signal) from the learning-pair-data generating unit 252, pixel values of plural pixels to be set as pre-processing taps of the tap structure of interest $D_m$ indicated by the tap structure information supplied from the control unit 253. The pre-processing-tap extracting unit 271 supplies the pixel values to the pre-processing arithmetic operation unit 272.

The pre-processing arithmetic operation unit 272 performs, with the pixel values serving as the pre-processing taps supplied from the pre-processing-tap extracting unit 271 as arguments, an arithmetic operation for a function for pre-processing defined by the pre-processing coefficient set of interest $E_n$ supplied from the control unit 253 and stored in the coefficient memory 273. The pre-processing arithmetic operation unit 272 supplies a result of the arithmetic operation for a function for pre-processing to the image converting unit 262 as a pixel value of the pixel of interest of the SD image signal after pre-processing.

The image converting unit 262 sets the SD image signal after pre-processing supplied from the pre-processing unit 261 as a first image signal and performs image conversion processing for converting the first image signal into an enlarged HD image signal serving as a second image signal.

In step S264, the control unit 253 supplies the optimum set of tap coefficients for enlargement $F_{m,n}$ determined for the combination of the tap structure of interest $D_m$ and the pre-processing coefficient set of interest $E_n$ in step S214 in FIG. 39 to the coefficient memory 284 of the image converting unit 262 and causes the coefficient memory 284 to store the optimum set of tap coefficients for enlargement $F_{m,n}$.

The tap extracting unit 281 proceeds from step S264 to step S265. The tap extracting unit 281 sets the SD image signal after pre-processing from (the pre-processing arithmetic operation unit 272 of) the pre-processing unit 261 as a first image signal and sets an enlarged HD image signal obtained by enlarging the SD image signal before pre-processing as a second image signal. The tap extracting unit 281 sequentially sets pixels of the enlarged HD image signal serving as the second image signal as a pixel of interest. The tap extracting unit 281 extracts, for the pixel of interest, a pixel value of a pixel to be set as a prediction tap from the SD image signal after pre-processing serving as the first image signal. The tap extracting unit 281 supplies the pixel value to the predicting unit 285.

In step S265, the tap extracting unit 282 extracts, for the pixel of interest, a pixel value of a pixel to be set as a class tap from the SD image signal after pre-processing serving as the first image signal from the pre-processing unit 261. The tap extracting unit 282 supplies the pixel value to the classifying unit 283 and proceeds to step S266.

In step S266, the classifying unit 283 classifies the pixel of interest on the basis of the class tap from the tap extracting unit 282. The classifying unit 283 supplies a class of the pixel of interest obtained as a result of the classification to the coefficient memory 284.

In step S267, the coefficient memory 284 reads out, according to the class of the pixel of interest from the classifying unit 283, (a set of) tap coefficients of the class among the set of tap coefficients for enlargement $F_{m,n}$ stored in the immediately preceding step S264. The coefficient memory 284 outputs the tap coefficients to the predicting unit 285.

In step S268, the predicting unit 285 performs an arithmetic operation, which is the same as the arithmetic operation performed by the predicting unit 45 of the image converting unit 212 (FIG. 46), using the prediction tap from the tap extracting unit 281 and the tap coefficients for enlargement from the coefficient memory 284 to determine (predict) a pixel value of the pixel of attention of the enlarged HD image signal serving as the second image signal. The predicting unit 285 supplies the pixel value to the pixel value calculating unit 254.

In step S269, the evaluation-value calculating unit 254 evaluates the enlarged HD image signal obtained by the image conversion processing performed in steps S265 to S268 in the image converting unit 262. The evaluation-value calculating unit 254 supplies a result of the evaluation to the control unit 253.

The evaluation-value calculating unit 254 calculates, for all pixels of the enlarged HD image signal serving as the teacher signal forming the learning pair data supplied from the learning-pair-data generating unit 252, for example, square errors between pixel values of pixels in identical positions of the enlarged HD image signal serving as the second image signal supplied from the image converting unit 262 and the enlarged HD image signal serving as the teacher signal, which forms a set with the SD image signal serving as the student signal converted into the enlarged HD image signal supplied from the image converting unit 262, of the learning pair data supplied from the learning-pair-data generating unit 252. The evaluation-value calculating unit 254 calculates a value inversely proportional to a sum of the square errors as an evaluation value.

The evaluation-value calculating unit 254 supplies the evaluation value to the control unit 253 as an evaluation value for a combination of the tap structure of interest $D_m$, the pre-processing coefficient set of interest $E_n$, and the set of tap coefficients for enlargement $F_{m,n}$ (a combination of the tap structure of interest $D_m$ and the pre-processing coefficient set of interest $E_n$ and the optimum set of tap coefficients for enlargement $F_{m,n}$ for a combination of the tap structure of interest $D_m$ and the pre-processing coefficient set of interest $E_n$).

Thereafter, the control unit 253 proceeds from step S269 to step S270. The control unit 253 judges whether all the $X \times 2^Y$ kinds of sets of pre-processing coefficients that can be set for the pre-processing tap of the tap structure of interest $D_m$ have been set as interest pre-processing coefficient sets.

When it is judged in step S270 that all the X×2$^Y$ kinds of sets of pre-processing coefficients that can be set for the pre-processing tap of the tap structure of interest D$_m$ have not been set as interest pre-processing coefficient sets, the control unit 253 returns to step S262. The control unit 253 determines one of sets of pre-processing coefficients, which have not been set as interest pre-processing coefficient sets, among the X×2$^Y$ kinds of sets of pre-processing coefficients that can be set for the pre-processing tap of the tap structure of interest D$_m$ as a pre-processing coefficient set of interest anew. The control unit 253 repeats the same processing.

When it is judged in step S270 that all the X×2$^Y$ kinds of sets of pre-processing coefficients that can be set for the pre-processing tap of the tap structure of interest D$_m$ have been set as interest pre-processing coefficient sets, the control unit 253 proceeds to step S271. The control unit 253 judges whether all the plural initial tap structures indicated by plural pieces of tap structure information stored in the built-in memory have been set as interest tap structures.

When it is judged in step S271 that all the plural initial tap structures have not been set as interest tap structures, the control unit 253 returns to step S261. The control unit 253 determines one of initial tap structures, which have not been set as initial tap structures, among the plural initial tap structures as a tap structure of interest anew. The control unit 253 repeats the same processing.

When it is judged in step S271 that all the plural initial tap structures have been set as interest tap structures, that is, when evaluation values for all the combinations of the initial tap structure D$_m$, the pre-processing coefficient set E$_n$, and the set of tap coefficients for enlargement F$_{m,n}$ obtained in step S214 in FIG. 39 are obtained, the control unit 253 proceeds to step S272. The control unit 253 provisionally determines a combination of an initial tap structure, a pre-processing coefficient set, and a set of tap coefficients for enlargement, for which a maximum evaluation value is obtained, among the evaluation values from the evaluation-value calculating unit 254 as an optimum combination (a combination of an optimum tap structure, an optimum pre-processing coefficient set, and an optimum set of tap coefficients for enlargement). The control unit 253 returns to the start of the processing.

The optimum tap structure determination processing in step S218 in FIG. 39 will be described in detail with reference to a flowchart in FIG. 42.

In step S280, the control unit 253 supplies a present provisional (provisionally determined) optimum pre-processing tap coefficient set to the coefficient memory 273 of the pre-processing unit 261 and causes the coefficient memory 273 to store the present provisional optimum pre-processing tap coefficient set. The control unit 253 supplies a present provisional (provisionally determined) optimum set of tap coefficients for enlargement to the coefficient memory 284 of the image converting unit 262 and causes the coefficient memory 284 to store the present provisional optimum set of tap coefficients for enlargement. The control unit 253 proceeds to step S281.

In step S281, the control unit 253 determines plural candidates of an optimum tap structure with a present provisional (provisionally determined) optimum tap structure as a reference.

For example, when 3×3 adjacent pixels arranged horizontally and vertically with a pixel closest to a position of a pixel of interest as the center are the present provisional optimum tap structure, the control unit 253 determines, for example, tap structures obtained by transforming the present provisional optimum tap structure as plural candidates of the optimum tap structure. Examples of the tap structures include 3×3 pixels arranged horizontally and vertically every other pixels with a pixel closest to a position of a pixel of interest as the center and 3×3 pixels arranged horizontally and vertically every other two pixels with a pixel closest to a position of a pixel of interest as the center.

Concerning how the present provisional optimum tap structure is transformed in order to obtain plural candidates of the optimum tap structure, for example, a transformation rule is determined in advance. The control unit 253 transforms the present provisional optimum tap structure in accordance with the transformation rule and determines plural candidates of the optimum tap structure.

The present provisional optimum tap structure is also included in the plural candidates of the optimum tap structure.

After the processing in step S281, the control unit 253 proceeds to step S282. The control unit 253 determines one candidate, which has not been set as a tap structure of interest, among the plural candidates of the optimum tap structure as a tap structure of interest. The control unit 253 supplies tap structure information indicating the tap structure of interest to the pre-processing unit 261 and proceeds to step S283.

In step S283, the pre-processing unit 261 applies, on the basis of the tap structure information supplied from the control unit 253 and the present provisional pre-processing coefficient set stored in the coefficient memory 273, pre-processing to the SD image signal serving as the student signal of the learning pair data supplied from the learning-pair-data generating unit 252. The pre-processing unit 261 supplies an SD image signal after pre-processing obtained as a result of the pre-processing to the image converting unit 262.

In step S283, in the pre-processing unit 261, the pre-processing-tap extracting unit 271 sequentially sets, as a pixel of interest, pixels forming the SD image signal after pre-processing obtained by applying pre-processing to the SD image signal serving as the student signal of the learning pair data supplied from the learning-pair-data generating unit 252. For the pixel of interest, the pre-processing-tap extracting unit 271 extracts, from the student signal (the SD image signal) from the learning-pair-data generating unit 252, pixel values of plural pixels to be set as pre-processing taps of a tap structure of interest indicated by the tap structure information supplied from the control unit 253. The pre-processing-tap extracting unit 271 supplies the pixel values to the pre-processing arithmetic operation unit 272.

The pre-processing arithmetic operation unit 272 performs, with the pixel values serving as the pre-processing taps supplied from the pre-processing-tap extracting unit 271 as arguments, an arithmetic operation for a function for pre-processing defined by the present provisional optimum pre-processing coefficient set supplied from the control unit 253 and stored in the coefficient memory 273. The pre-processing arithmetic operation unit 272 supplies a result of the arithmetic operation for a function for pre-processing to the image converting unit 262 as a pixel value of the pixel of interest of the SD image signal after pre-processing.

In step S284, the image converting unit 262 sets the SD image signal after pre-processing supplied from the pre-processing unit 261 as a first image signal. The image converting unit 262 performs image conversion processing for converting the first image signal into an enlarged HD image signal serving as a second image signal using the present provisional (provisionally determined) optimum set of tap coefficients for enlargement.

In step S284, the tap extracting unit 281 sets the SD image signal after pre-processing from (the pre-processing arithmetic operation unit 272 of) the pre-processing unit 261 as a first image signal and sets an enlarged HD image signal obtained by enlarging the SD image signal before preprocessing as a second image signal. The tap extracting unit 281 sequentially sets pixels of the enlarged HD image signal serving as the second image signal as a pixel of interest. For the pixel of interest, the tap extracting unit 281 extracts a pixel value of a pixel to be set as a prediction tap from the SD image signal after pre-processing serving as the first image signal. The tap extracting unit 281 supplies the pixel value to the predicting unit 285.

For the pixel of interest, the tap extracting unit 282 extracts a pixel value of a pixel to be set as a class tap from the SD image signal after pre-processing serving as the first image signal. The tap extracting unit 282 supplies the pixel value to the classifying unit 283. The classifying unit 283 classifies the pixel of interest on the basis of the class tap from the tap extracting unit 282. The classifying unit 283 supplies a class of the pixel of interest obtained as a result of the classification to the coefficient memory 284. The coefficient memory 284 reads out (a set of) tap coefficients of a class of the pixel of interest from the classifying unit 283 among the present provisional optimum set of tap coefficients for enlargement stored in the immediately preceding step S280. The coefficient memory 284 outputs the tap coefficients to the predicting unit 285.

The predicting unit 285 performs the arithmetic operation of Equation (1) using the prediction tap from the tap extracting unit 281 and the tap coefficient for enlargement from the coefficient memory 284 to calculate (predict) a pixel value of the pixel of interest of the enlarged HD image signal serving as the second image signal. The predicting unit 285 supplies the pixel value to the evaluation-value calculating unit 254.

Thereafter, in step S285, the evaluation-value calculating unit 254 evaluates the enlarged HD image signal obtained by the image conversion processing performed by the image converting unit 262. The evaluation-value calculating unit 254 supplies a result of the evaluation to the control unit 253.

The evaluation-value calculating unit 254 calculates, for all pixels of the enlarged HD image signal serving as the teacher signal forming the learning pair data supplied from the learning-pair-data generating unit 252, for example, square errors between pixel values of pixels in identical positions of the enlarged HD image signal serving as the second image signal supplied from the image converting unit 262 and the enlarged HD image signal serving as the teacher signal, which forms a set with the SD image signal serving as the student signal converted into the enlarged HD image signal supplied from the image converting unit 262, of the learning pair data supplied from the learning-pair-data generating unit 252. The evaluation-value calculating unit 254 calculates a value inversely proportional to a sum of the square errors as an evaluation value.

The evaluation-value calculating unit 254 supplies the evaluation value to the control unit 253 as an evaluation value for the tap structure of interest.

The control unit 253 proceeds from step S285 to step S286. The control unit 253 judges whether evaluation values for all the plural candidates of the optimum tap structure determined in step S281 have been calculated.

When it is judged in step S286 that evaluation values for all the plural candidates of the optimum tap structure have not been calculated, the control unit 253 returns to step S282. The control unit 253 determines one of candidates, which have not been set as interest tap structures, among the plural candidates of the optimum tap structure as a tap structure of interest anew. Subsequently, the control unit 253 repeats the same processing.

When it is judged in step S286 that evaluation values for all the plural candidates of the optimum tap structure have been calculated, the control unit 253 proceeds to step S287. The control unit 253 provisionally determines a candidate having a highest evaluation value among the plural candidates of the optimum tap structure as an optimum tap structure for the combination of the present provisional optimum pre-processing coefficient set and the present provisional optimum set of tap coefficients for enlargement anew. The control unit 253 returns to the start of the processing.

The optimum pre-processing coefficient set determination processing in step S219 in FIG. 39 will be described in detail with reference to a flowchart in FIG. 43.

In step S290, the control unit 253 supplies tap structure information indicating the present provisional (provisionally determined) optimum tap structure to the pre-processing-tap extracting unit 271 of the pre-processing unit 261. The control unit 253 supplies the present provisional optimum set of tap coefficients for enlargement to the coefficient memory 284 of the image converting unit 262 and causes the coefficient memory 284 to store the present provisional optimum set of tap coefficients for enlargement. The control unit 253 proceeds to step S291.

In step S291, the control unit 253 determines plural candidates of the optimum pre-processing coefficient set with the present provisional optimum pre-processing coefficient set as a reference.

The control unit 253 selects, for example, plural points in a predetermined range with a point in a Φ-dimensional vector space set as a reference, which are indicated by a Φ-dimensional vector (in this case, a total number of pre-processing coefficients serving as a pre-processing coefficient set is Φ) having respective pre-processing coefficients of the present provisional optimum pre-processing coefficient as components. The control unit 253 determines (components of) plural Φ-dimensional vectors indicating the respective plural points as plural candidates of the optimum pre-processing coefficient set. Concerning what kind of points in what kind of range are selected with the Φ-dimensional vector corresponding to the present provisional optimum pre-processing coefficient set as a reference in order to obtain plural candidates of the optimum pre-processing coefficient set, a rule is determined in advance. The control unit 253 selects plural points in the predetermined range with the Φ-dimensional vector corresponding to the present provisional optimum pre-processing coefficient set as a reference in accordance with the rule to determine plural candidates of the optimum pre-processing coefficient set.

After the processing in step S291, the control unit 253 proceeds to step S292. The control unit 253 determines one of candidates, which have not been set as interest pre-processing coefficient sets, among the plural candidates of the optimum pre-processing coefficient set as a pre-processing coefficient set of interest. The control unit 253 supplies the pre-processing coefficient set of interest to the coefficient memory 273 of the pre-processing unit 261 and causes the coefficient memory 273 to store the pre-processing coefficient set of interest. The control unit 253 proceeds to step S293.

In step S293, the pre-processing unit 261 applies, on the basis of the tap structure information supplied from the control unit 253 in step S290 and the pre-processing coefficient set of interest stored in the coefficient memory 273, pre-processing to the SD image signal serving as the student signal of the learning pair data supplied from the learning-pair-data generating unit 252. The pre-processing unit 261 supplies an SD image signal after pre-processing obtained as a result of the prep-processing to the image converting unit 262.

In step S293, in the pre-processing unit 261, the pre-processing-tap extracting unit 271 sequentially sets, as a pixel of interest, pixels forming an SD image signal after pre-processing corresponding to the SD image signal serving as the student signal of the learning pair data supplied from the learning-pair-data generating unit 252 (an SD image signal after pre-processing obtained by applying pre-processing to the SD image signal serving as the student signal). For the pixel of interest, the processing tap extracting unit 271 extracts, from the student signal (the SD image signal) from the learning-pair-data generating unit 252, pixel values of plural pixels to be set as pre-processing taps of the tap structure indicated by the tap structure information supplied from the control unit 253 in step S290. The processing tap extracting unit 271 supplies the pixel values to the pre-processing arithmetic operation unit 272.

The pre-processing arithmetic operation unit 272 performs, with the pixel values serving as the pre-processing taps supplied from the pre-processing-tap extracting unit 271 as arguments, an arithmetic operation for a function for pre-processing defined by the pre-processing coefficient set of interest supplied from the control unit 253 and stored in the coefficient memory 273. The pre-processing arithmetic operation unit 272 supplies a result of the arithmetic operation for a function for pre-processing to the image converting unit 262 as a pixel value of the pixel of interest of the SD image signal after pre-processing.

Figure 42:
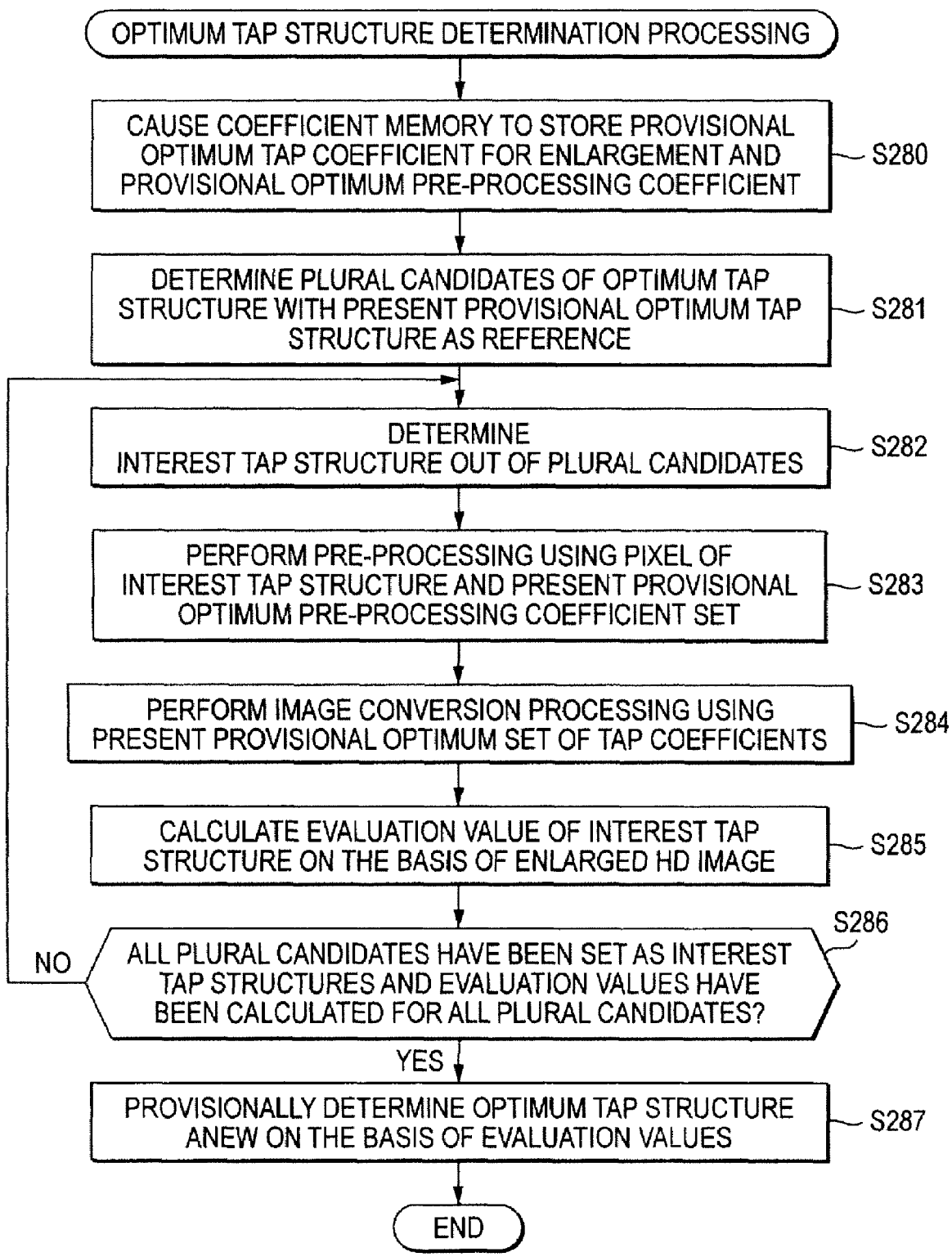
FIG. 42 is a flowchart for explaining details of processing in step S218.

In step S294, as in step S284 in FIG. 42, the image converting unit 262 sets the SD image signal after pre-processing supplied from the pre-processing unit 261 as a first image signal. The image converting unit 262 performs image conversion processing for converting the first image signal into an enlarged HD image signal serving as a second image signal using the present provisional optimum set of tap coefficients for enlargement stored in the coefficient memory 284 in step S290. The image converting unit 262 supplies an enlarged HD image signal serving as a second image signal obtained as a result of the image conversion processing to the evaluation-value calculating unit 254 and proceeds to step S295.

In step S295, the evaluation-value calculating unit 254 evaluates the enlarged HD image signal obtained by the image conversion processing performed by the image converting unit 262 the evaluation-value calculating unit 254 supplies a result of the evaluation to the control unit 253.

The evaluation-value calculating unit 254 calculates, for all pixels of the enlarged HD image signal serving as the teacher signal forming the learning pair data supplied from the learning-pair-data generating unit 252, for example, square errors between pixel values of pixels in identical positions of the enlarged HD image signal serving as the second image signal supplied from the image converting unit 262 and the enlarged HD image signal serving as the teacher signal, which forms a set with the SD image signal serving as the student signal converted into the enlarged HD image signal supplied from the image converting unit 262, of the learning pair data supplied from the learning-pair-data generating unit 252. The evaluation-value calculating unit 254 calculates a value inversely proportional to a sum of the square errors as an evaluation value.

The evaluation-value calculating unit 254 supplies the evaluation value to the control unit 253 as an evaluation value for the pre-processing coefficient set of interest.

The control unit 253 proceeds from step S295 to step S296. The control unit 253 judges whether evaluation values for all the plural candidates of the optimum pre-processing coefficient set determined in step S291 have been calculated.

When it is judged in step S296 that evaluation values for all the plural candidates of the optimum pre-processing coefficient set have not been calculated, the control unit 253 returns to step S292. The control unit 253 determines one of candidates, which have not been set as interest pre-processing coefficient sets, among the plural candidates of the optimum pre-processing coefficient set as a tap structure of interest anew. Subsequently, the control unit 253 repeats the same processing.

When it is judged in step S296 that evaluation values for all the plural candidates of the optimum pre-processing coefficient set have been calculated, the control unit 253 proceeds to step S297. The control unit 253 provisionally determines a candidate having a highest evaluation value among the plural candidates of the optimum pre-processing coefficient set as an optimum pre-processing coefficient set for the combination of the present provisional optimum tap structure and the present provisional optimum set of tap coefficients for enlargement anew. The control unit 253 returns to the start of the processing.

Figure 44:
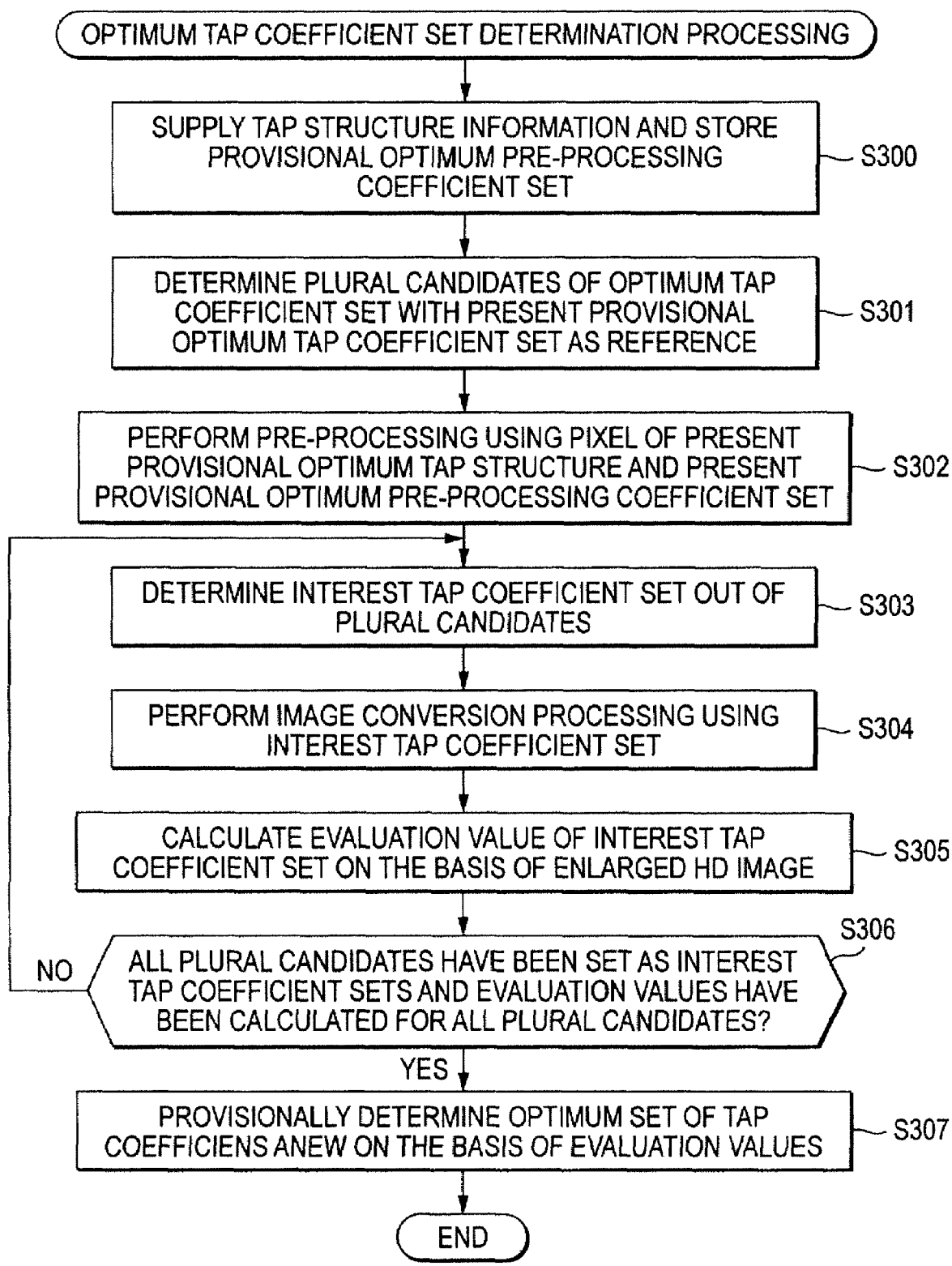
FIG. 44 is a flowchart for explaining details of processing in step S220.

The optimum tap coefficient set determination processing in step S220 in FIG. 39 will be described in detail with reference to a flowchart in FIG. 44.

In step S300, the control unit 253 supplies tap structure information indicating a present provisional (provisionally determined) optimum tap structure to the pre-processing-tap extracting unit 271 of the pre-processing unit 261. The control unit 253 supplies a present provisional optimum pre-processing coefficient set to the coefficient memory 273 of the pre-processing unit 261 and causes the coefficient memory 273 to store the present provisional optimum pre-processing coefficient set. The control unit 253 proceeds to step S301.

In step S301, the control unit 253 determines plural candidates of an optimum set of tap coefficients for enlargement with a present provisional optimum tap coefficients for enlargement as a reference.

Figure 23:
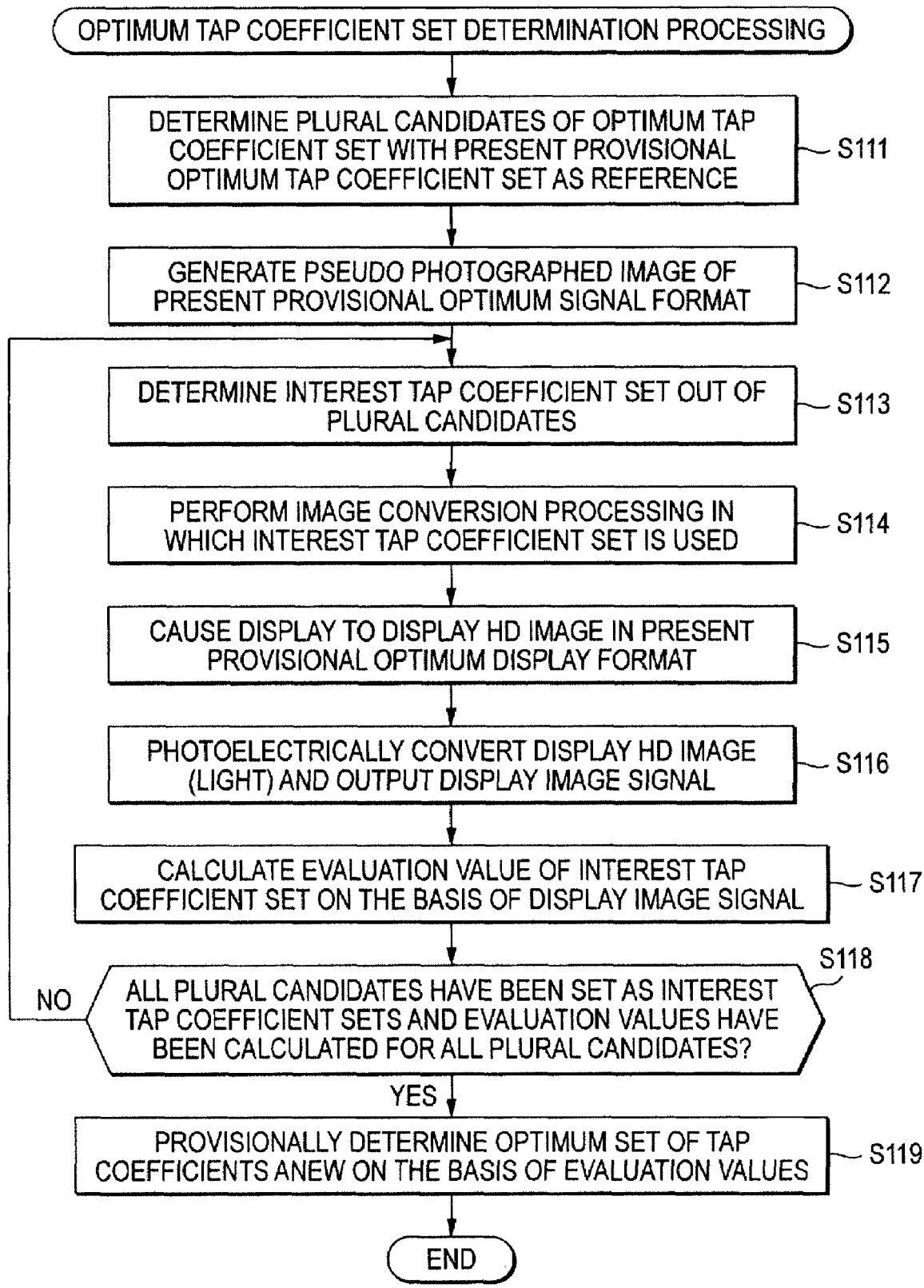
FIG. 23 is a flowchart for explaining details of processing in step S39.

As explained in step S111 in FIG. 23, the control unit 253 selects, for example, plural points in a predetermined range with a point in a Z-dimensional vector space, which is represented by a Z-dimensional vector having respective tap coefficients of a present provisional optimum set of tap coefficients as components, as a reference according to the predetermined rule. The control unit 72 determines (components of) plural Z-dimensional vectors representing the respective plural points as plural candidates of the optimum set of tap coefficients.

After the processing in step S301, the control unit 253 proceeds to step S302. The pre-processing unit 261 applies, on the basis of the tap structure information supplied from the control unit 253 in step S300 and the present provisional pre-processing coefficient set stored in the coefficient memory 273, pre-processing to the SD image signal serving as the student signal of the learning pair data supplied from the learning-pair-data generating unit 252. The pre-processing unit 261 supplies an SD image signal after pre-processing obtained as a result of the pre-processing to the image converting unit 262.

In step S302, in the pre-processing unit 261, the pre-processing-tap extracting unit 271 sequentially sets, as a pixel of interest, pixels forming the SD image signal after pre-processing corresponding to the SD image signal serving as the student signal of the learning pair data supplied from the learning-pair-data generating unit 252. For the pixel of interest, the pre-processing-tap extracting unit 271 extracts, from the student signal (the SD image signal) from the learningpair-data generating unit 252, pixel values of plural pixels to be set as pre-processing taps of a tap structure of interest indicated by the tap structure information supplied from the control unit 253 in step S300. The pre-processing-tap extracting unit 271 supplies the pixel values to the pre-processing arithmetic operation unit 272.

The pre-processing arithmetic operation unit 272 performs, with the pixel values serving as the pre-processing taps supplied from the pre-processing-tap extracting unit 271 as arguments, an arithmetic operation for a function for pre-processing defined by the present provisional optimum pre-processing coefficient set supplied from the control unit 253 and stored in the coefficient memory 273. The pre-processing arithmetic operation unit 272 supplies a result of the arithmetic operation for a function for pre-processing to the image converting unit 262 as a pixel value of the pixel of interest of the SD image signal after pre-processing.

Thereafter, in step S303, the control unit 253 determines one of candidates, which have not been set as interest tap coefficient sets, among the plural candidates of the optimum set of tap coefficients for enlargement as a tap coefficient set of interest. The control unit 253 supplies the tap coefficient set of interest to the coefficient memory 284 of the image converting unit 262 and causes the coefficient memory 284 to store the tap coefficient set of interest. The control unit 253 proceeds to step S303.

In step S304, as in step S284 in FIG. 42, the image converting unit 262 sets the SD image signal after pre-processing supplied from the pre-processing unit 261 as a first image signal. The image converting unit 262 performs image conversion processing for converting the first image signal into an enlarged HD image signal serving as a second image signal using the tap coefficient set of interest stored in the coefficient memory 284 in the immediately preceding step S303. The image converting unit 262 supplies an enlarged HD image signal serving as a second image signal obtained as a result of the image conversion processing to the evaluation-value calculating unit 254 and proceeds to step S305.

In step S305, the evaluation-value calculating unit 254 evaluates the enlarged HD image signal obtained by the image conversion processing performed by the image converting unit 262 the evaluation-value calculating unit 254 supplies a result of the evaluation to the control unit 253.

The evaluation-value calculating unit 254 calculates, for all pixels of the enlarged HD image signal serving as the teacher signal forming the learning pair data supplied from the learning-pair-data generating unit 252, for example, square errors between pixel values of pixels in identical positions of the enlarged HD image signal serving as the second image signal supplied from the image converting unit 262 and the enlarged HD image signal serving as the teacher signal, which forms a set with the SD image signal serving as the student signal converted into the enlarged HD image signal supplied from the image converting unit 262, of the learning pair data supplied from the learning-pair-data generating unit 252. The evaluation-value calculating unit 254 calculates a value inversely proportional to a sum of the square errors as an evaluation value.

The evaluation-value calculating unit 254 supplies the evaluation value to the control unit 253 as an evaluation value for the tap coefficient set of interest.

The control unit 253 proceeds from step S305 to step S306. The control unit 253 judges whether evaluation values for all the plural candidates of the optimum set of tap coefficients for enlargement determined in step S301 have been calculated.

When it is judged in step S306 that evaluation values for all the plural candidates of the optimum set of tap coefficients for enlargement have not been calculated, the control unit 253 returns to step S303. The control unit 253 determines one of candidates, which have not been set as interest tap coefficient sets, among the plural candidates of the optimum sets of tap coefficients for enlargement as a tap coefficient set of interest anew. Subsequently, the control unit 253 repeats the same processing.

When it is judged in step S306 that evaluation values for all the plural candidates of the optimum set of tap coefficients for enlargement have been calculated, the control unit 253 proceeds to step S307. The control unit 253 provisionally determines a candidate having a highest evaluation value among the plural candidates of the optimum set of tap coefficients for enlargement as an optimum set of tap coefficients for enlargement for the combination of the present provisional optimum tap structure and the present provisional optimum pre-processing coefficient set anew. The control unit 253 returns to the start of the processing.

As explained with reference to FIG. 39, the learning apparatus in FIG. 38 repeats the following processing until an evaluation value (an evaluation value obtained by the immediately preceding optimum tap coefficient set determination processing) becomes equal to or larger than the threshold for judgment of optimization: the optimum tap structure determination processing in step S218 (FIG. 42) for determining an optimum tap structure for a combination of a present provisional optimum pre-processing coefficient set and a present provisional optimum set of tap coefficients for enlargement; the optimum pre-processing coefficient set determination processing in step S219 (FIG. 43) for determining an optimum pre-processing coefficient set for a combination of a present provisional optimum tap structure and a present provisional optimum set of tap coefficients for enlargement; and the optimum tap coefficient set determination processing (FIG. 44) for determining an optimum set of tap coefficients for enlargement for a combination of a present provisional optimum tap structure and a present provisional optimum pre-processing coefficient. Consequently, a tap structure of a pre-processing tap and a pre-processing coefficient used for pre-processing for obtaining an enlarged HD image signal closer to the enlarged HD image signal serving as the teacher signal and a set of tap coefficients for enlargement used for the image conversion processing are determined.

Therefore, the pre-processing unit 211 of the display apparatus 202 in FIG. 34 performs pre-processing for the SD image signal outputted by the camera 201 using the pre-processing tap of the optimum tap structure and the optimum pre-processing coefficient obtained by the learning apparatus in FIG. 38. The image converting unit 212 performs the image conversion for converting the SD image signal after pre-processing obtained as a result of the preprocessing into an enlarged HD image signal using the optimum set of tap coefficients for enlargement. It is possible to obtain, as an HD image signal obtained by enlarging the SD image signal outputted by the camera 201, an HD image signal of an image quality closer to an image quality of the enlarged HD image signal serving as the teacher signal.

In the optimum tap structure determination processing in FIG. 42, in determining plural candidates of an optimum tap structure with a present provisional optimum tap structure as a reference, as a method of transforming the present provisional optimum tap structure, it is possible to adopt a method of, so to speak, substantially transforming the present provisional optimum tap structure when the number of times of repetition of steps S218 to S220 in FIG. 39 is small and gradually reducing the transformation as the number of times of repetition increases. The same holds true for a pre-processing coefficient set and a set of tap coefficients.

When an evaluation value calculated for a candidate of the optimum tap structure is not so large and rarely increases, it is possible to substantially transform the present provisional tap structure to determine plural candidates of the optimum tap structure. In this case, it is possible to solve a problem of so-called local minimum. The same holds true for a pre-processing coefficient set and a set of tap coefficients.

Figure 45:
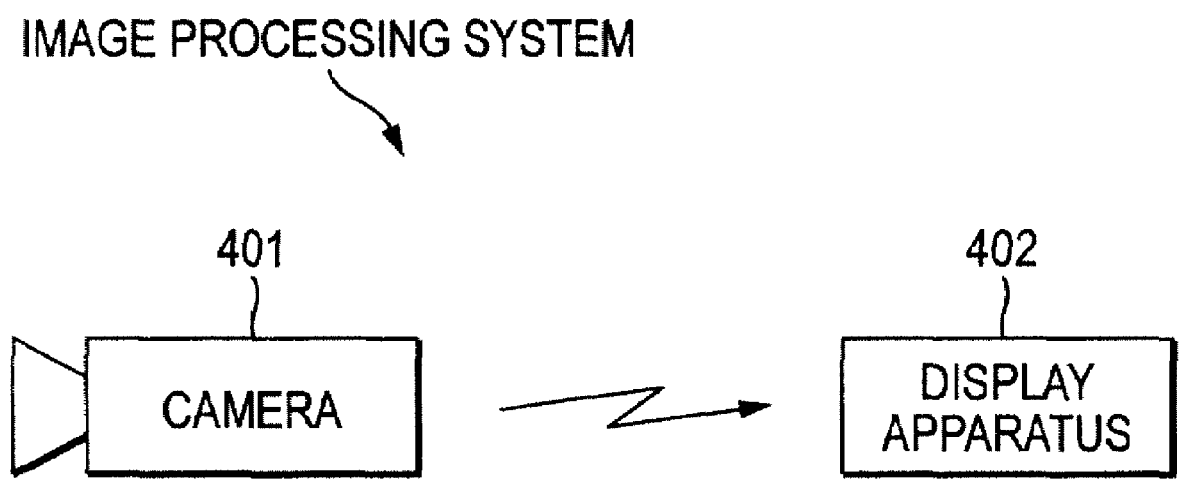
FIG. 45 is a flowchart for explaining a fourth example of the structure of the image processing system that performs processing of an image.

FIG. 45 is a diagram of a fourth example of the structure of the image processing system for processing an image.

In FIG. 45, the image processing system includes a camera (a video camera) 401 and a display apparatus 402.

The camera 401 photographs an object (a subject) and outputs an SD image signal serving as a photographed image signal that is an image signal obtained by the photographing. The display apparatus 402 receives the photographed image signal outputted by the camera 401, converts the photographed image signal into an HD image signal serving as a high-quality image signal that is an image signal of an image higher in quality than an image corresponding to the photographed image signal, and displays an HD image corresponding to the HD image signal.

The display apparatus 402 converts, according to operation by the user, the SD image signal from the camera 401 into any one of an enlarged HD image signal or an HD image signal of a normal size (hereinafter also referred to as normal HD image signal as appropriate) and displays an HD image corresponding to the signal.

The camera 401 is, for example, a 1CCD camera and outputs a photographed image signal of a signal format determined by learning, that is, for example, a signal format determined as an optimum signal format in the learning apparatus in FIG. 9.

Figure 46:
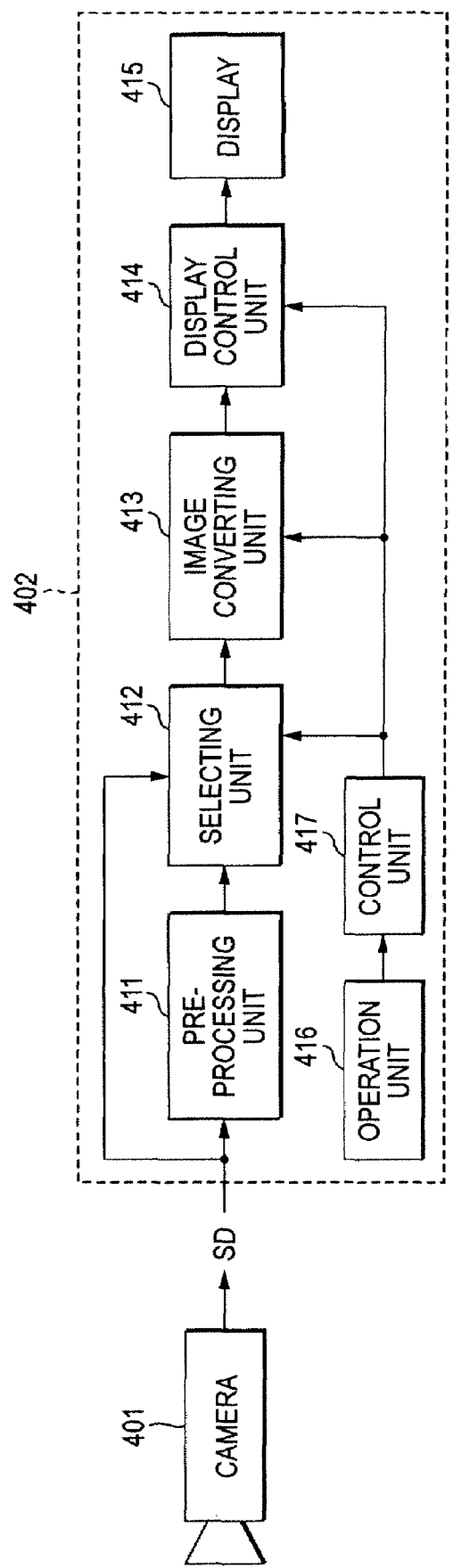
FIG. 46 is a block diagram showing an example of a structure of a display apparatus 402.

FIG. 46 is a diagram showing an example of a structure of the display apparatus 402 in FIG. 45.

The display apparatus 402 includes a pre-processing unit 411, a selecting unit 412, an image converting unit 413, a display control unit 414, a display 415, an operation unit 416, and a control unit 417.

The SD image signal is supplied to the pre-processing unit 411 from the camera 401. The pre-processing unit 411 applies pre-processing suitable for enlarging an image corresponding to the SD image signal to the SD image signal from the camera 401. The pre-processing unit 411 supplies an SD image signal after pre-processing obtained as a result of the pre-processing to the selecting unit 412.

The SD image signal (the photographed image signal) from the camera 401 is supplied to the selecting unit 412 in addition to the SD image signal after pre-processing from the pre-processing unit 411. The selecting unit 412 selects any one of the SD image signal after pre-processing and the SD image signal from the camera 401 in accordance with the control by the control unit 417. The selecting unit 412 supplies the SD image signal selected (hereinafter also referred to as selected SD image signal as appropriate) to the image converting unit 413.

The image converting unit 413 sets the selected SD image signal from the selecting unit 412 as a first image signal and sets a predetermined HD image signal as a second image signal. The image converting unit 413 converts, in accordance with the control by the control unit 417, the selected SD image signal serving as the first image signal into the HD image signal serving as the second image signal according to an arithmetic operation between the selected SD image signal and a tap coefficient obtained by learning performed in advance. The image converting unit 413 supplies the HD image signal to the display control unit 414.

When the selected SD image signal from the pre-processing unit 411 is an SD image signal not subjected to pre-processing, that is, the photographed image signal itself that is the SD image signal outputted by the camera 401, the image converting unit 413 sets the SD image signal, which is the photographed image signal, as a first image signal. The image converting unit 413 sets an HD image signal of a normal size (a normal HD image signal) obtained by improving an image quality of the SD image signal as a second image signal. The image converting unit 413 performs image conversion processing for converting the SD image signal serving as the first image signal into the normal HD image signal serving as the second image signal according to an arithmetic operation between the SD image signal and the tap coefficient obtained by learning performed in advance. The image converting unit 413 supplies a normal HD image signal obtained as a result of the image conversion processing to the display control unit 414.

When the selected SD image signal from the pre-processing unit 411 is the SD image signal after pre-processing obtained by the pre-processing unit 411, the image converting unit 413 sets the SD image signal after pre-processing as a first image signal. The image converting unit 413 sets an HD image signal obtained by enlarging the SD image signal before pre-processing (an enlarged HD image signal) as a second image signal. The image converting unit 413 performs image conversion processing for converting the SD image signal after pre-processing serving as the first image signal into the enlarged HD image signal serving as the second image signal according to an arithmetic operation between the SD image signal after pre-processing and the tap coefficient obtained by learning performed in advance. The image converting unit 413 supplies an enlarged HD image signal obtained as a result of the image conversion processing to the display control unit 414.

In the image converting unit 413, a set of tap coefficients used in the image conversion processing for converting, with the photographed image signal serving as the SD image signal outputted by the camera 401 as a first image signal, the first image signal into a normal HD image signal serving as a second image signal (hereinafter also referred to as HD conversion processing as appropriate) is different from a set of tap coefficients used in the image conversion processing for converting, with the SD image signal after pre-processing as a first image signal, the first image signal into an enlarge HD image signal serving as a second image signal (hereinafter also referred to as enlargement conversion processing as appropriate).

In the following explanations, the set of tap coefficients used in the HD conversion processing is also referred to as a set of normal tap coefficients in order to distinguish the set of tap coefficients from the set of tap coefficients used in the enlargement conversion processing. As described above, the set of tap coefficients used in the enlargement conversion processing is referred to as a set of tap coefficients for expansion as appropriate.

The display control unit 414 performs, in accordance with the control by the control unit 417, display control for causing the display 415 to display an HD image corresponding to the HD image signal supplied from the image converting unit 413 in a display format determined by learning performed using an SHD image higher in quality than the HD image.

The display 415 is, for example, display means including a CRT or an LCD panel. The display 415 displays an image in accordance with the control by the display control unit 414.

The operation unit 416 is operated by a user to supply an instruction signal indicating an instruction corresponding to the operation by the user to the control unit 417. As the instruction signal, there is, for example, a signal for instructing a display mode for displaying an image on the display 415. As the display mode, there are a normal mode for displaying an HD image corresponding to the normal HD image signal and an enlarged mode for displaying an HD image corresponding to the enlarged HD image signal on the display 415.

The control unit 417 controls the selecting unit 412, the image converting unit 413, and the display control unit 414 according the instruction signal supplied from the control unit 416.

Figure 47:
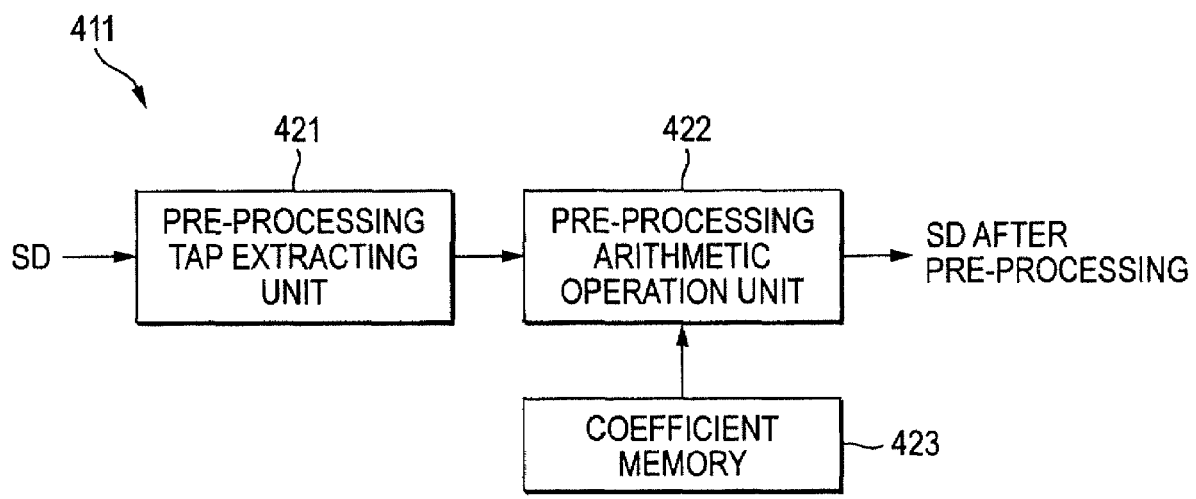
FIG. 47 is a block diagram showing an example of a structure of a pre-processing unit 411.

FIG. 47 is a diagram showing an example of a structure of the pre-processing unit 411 in FIG. 46.

The pre-processing unit 411 includes, for example, a pre-processing-tap extracting unit 421, a pre-processing arithmetic operation unit 422, and a coefficient memory 423.

The pre-processing-tap extracting unit 421 sequentially sets, as a pixel of interest, pixels forming an SD image signal after pre-processing intended to be obtained by applying pre-processing to the SD image signal from the camera 401 (FIG. 46) (an SD image signal after pre-processing corresponding to the SD image signal from the camera 401). The pre-processing-tap extracting unit 421 extracts pre-processing taps, which are pixel values of plural pixels used for calculating a pixel value of the pixel of interest, from the SD image signal from the camera 401.

Specifically, the pre-processing-tap extracting unit 421 extracts pixel values of plural pixels in a positional relation spatially or temporally close to a position of an image of the SD image signal from the camera 401 (for example, a position on the image of the SD image signal from the camera 401 on which a part of a subject identical with that shown in a position of the pixel of interest is shown) corresponding to the pixel of interest as a prediction tap. The plural pixels are, for example, a pixel closest to the position on the image of the SD image signal from the camera 401 corresponding to the pixel of interest and a pixel spatially adjacent to the pixel.

The pre-processing-tap extracting unit 421 supplies the pre-processing taps obtained for the pixel of interest to the pre-processing arithmetic operation unit 422.

The pre-processing-tap extracting unit 421 extracts, from the SD image signal from the camera 401, a pre-processing tap of a tap structure determined by the learning performed using the SHD image higher in quality than the HD image.

The pre-processing arithmetic operation unit 422 performs, with pixel values serving as the pre-processing taps supplied from the pre-processing-tap extracting unit 421 as arguments, a predetermined arithmetic operation for a function for pre-processing defined by (a set of) pre-processing coefficients determined by the learning performed using the SHD image higher in quality than the HD image, which are stored in the coefficient memory 423. The pre-processing arithmetic operation unit 422 outputs a result of the arithmetic operation for a function for pre-processing as a pixel value of the pixel of interest of the SD image signal after pre-processing.

The coefficient memory 423 has stored therein a pre-processing coefficient set defining the function for pre-processing that is determined in advance by learning performed using the SHD image higher in quality than the HD image.

Figure 48:
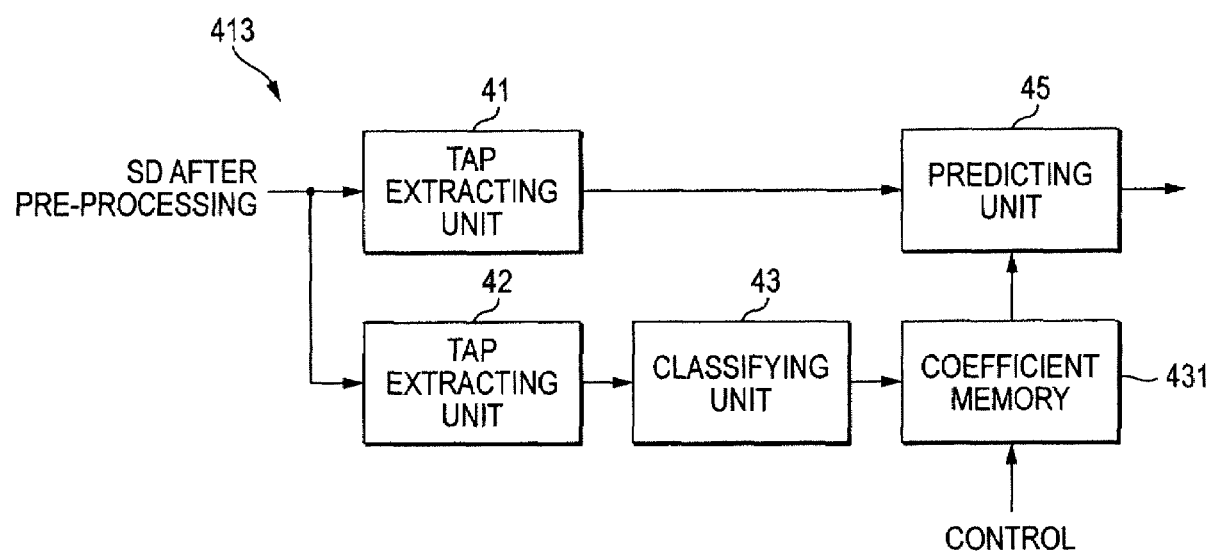
FIG. 48 is a block diagram showing an example of a structure of an image converting unit 413.

FIG. 48 is a diagram showing an example of a structure of the image converting unit 413 in FIG. 46.

In the figure, components corresponding to those of the image converting unit 11 in FIG. 4 are denoted by the identical reference numerals and explanations of the components are omitted below as appropriate. The image converting unit 413 in FIG. 48 is the same as the image converting unit 11 in FIG. 4 in that the tap extracting units 41 and 42, the classifying unit 43, and the predicting unit 45 are provided. However, the image converting unit 413 in FIG. 48 is different from the image converting unit 11 in FIG. 4 in that a coefficient memory 431 is provided instead of the coefficient memory 44.

At least two kinds of sets of tap coefficients, namely, a set of normal tap coefficients and a set of tap coefficients for enlargement, are stored in the coefficient memory 431. The image converting unit 413 enables any one of the set of normal tap coefficients and the set of tap coefficients for enlargement stored therein in accordance with the control by the control unit 417 (FIG. 46) and performs image conversion processing using the effective set of tap coefficients (hereinafter also referred to as set of effective tap coefficients as appropriate).

The image converting unit 413 sets the selected SD image signal from the selecting unit 412 (FIG. 46) as a first image signal and sets a normal HD image signal obtained by improving an image quality of the selected SD image signal or an enlarged HD image signal obtained by enlarging the SD image signal before pre-processing as a second image signal. The tap extracting unit 41 sequentially sets pixels of the HD image signal serving as the second image signal as a pixel of interest. The tap extracting unit 41 extracts, for the pixel of interest, a pixel value of a pixel to be set as a prediction tap from the selected SD image signal serving as the first image signal. The tap extracting unit 41 supplies the pixel value to the predicting unit 45. The tap extracting unit 42 extracts, for the pixel of interest, a pixel value of a pixel to be set as a class tap from the selected SD image signal serving as the first image signal. The tap extracting unit 42 supplies the pixel value to the classifying unit 43.

The classifying unit 43 performs classification for determining a class of the pixel of interest on the basis of the class tap from the tap extracting unit 42. The classifying unit 43 supplies (a class code indicating) a class of the pixel of interest obtained as a result of the classification to the coefficient memory 431. The coefficient memory 431 reads out (a set of) tap coefficients of the class from the classifying unit 43 out of the set of effective tap coefficients and outputs the tap coefficient to the predicting unit 45.

The predicting unit 45 performs, for example, the arithmetic operation of Equation (1) using the prediction tap from the tap extracting unit 41 and the tap coefficient from the coefficient memory 431 to calculate (predict) a pixel value of the pixel of interest of the HD image signal serving as the second image signal.

Figure 49:
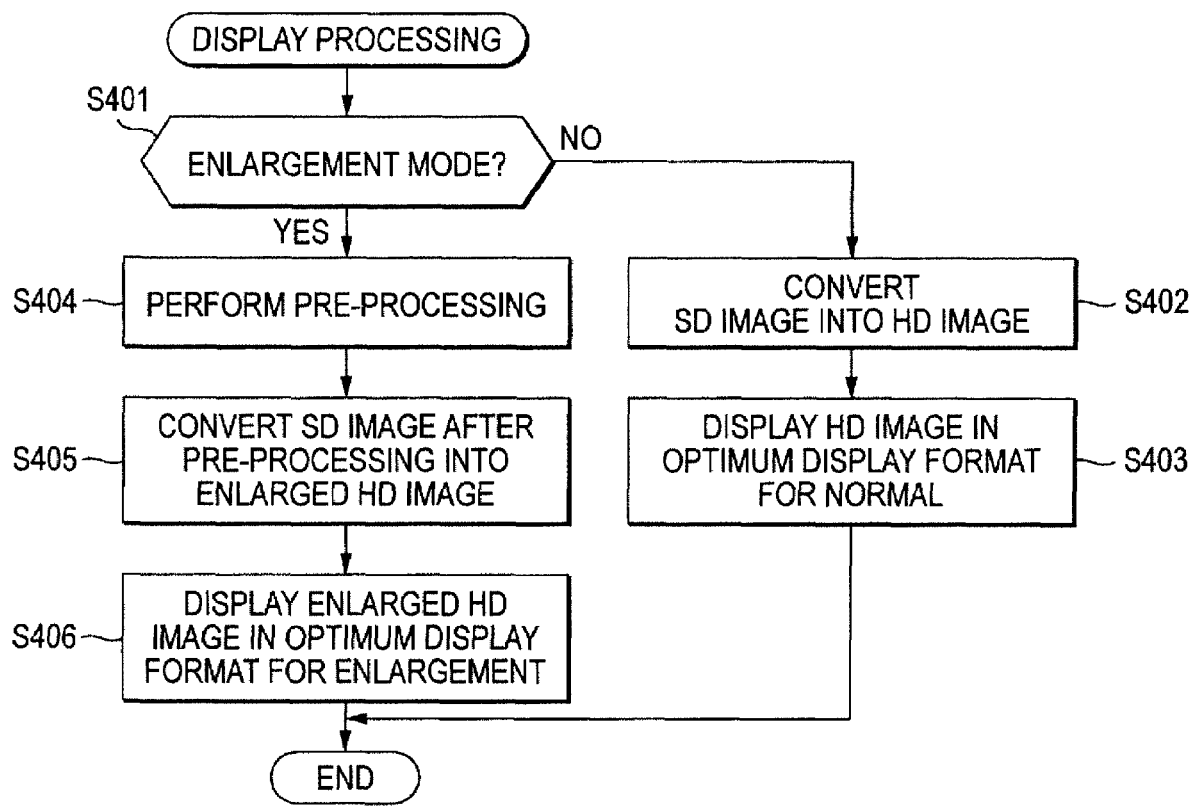
FIG. 49 is a flowchart for explaining processing by the display apparatus 402.

Operations of the display apparatus 402 in FIG. 46 will be explained with reference to a flowchart in FIG. 49.

An SD image signal is supplied to the display apparatus 402 from the camera 401. In the display apparatus 402, the SD image signal from the camera 401 is received and supplied to the pre-processing unit 411 and the selecting unit 412.

In step S401, the control unit 417 judges whether a display mode is an enlargement mode. When it is judged in step S401 that the display mode is not the enlargement mode, that is, when an instruction signal indicating the display mode supplied to the control unit 417 from the operation unit 416 immediately before the judgment is a signal instructing a normal mode and the present display mode is the normal mode, the control unit 417 supplies a control signal indicating the normal mode to the selecting unit 412, the image converting unit 413, and the display control unit 414. The control unit 417 proceeds to step S402.

When the control signal indicating the normal mode is supplied from the control unit 417, out of the output of the pre-processing unit 411 and the SD image signal outputted by the camera 401, the selecting unit 412 selects the SD image signal outputted by the camera 401 as a selected SD image signal. The selecting unit 412 supplies the selected SD image signal to the image converting unit 413.

When the control signal indicating the normal mode is supplied from the control unit 417, out of the set of normal tap coefficients and the set of tap coefficients for enlargement, the coefficient memory 431 of the image converting unit 413 (FIG. 48) sets the set of normal tap coefficients as the set of effective tap coefficients (enables the set of normal tap coefficients).

In step S402, the image converting unit 413 performs image conversion processing for converting the SD image signal outputted by the camera 401, which is the selected SD image signal supplied from the selecting unit 412, into a normal HD image signal according to an arithmetic operation in which the set of normal tap coefficients serving as the set of effective tap coefficients is used. The image converting unit 413 supplies a normal HD image signal obtained as a result of the image conversion processing to the display control unit 414 and proceeds to step S403.

In step S403, the display control unit 414 causes, in accordance with the control signal indicating the normal mode from the control unit 417, the display 415 to display an HD image corresponding to the normal HD image signal supplied from the image converting unit 413 in a display format suitable for display of the HD image corresponding to the normal HD image signal (hereinafter referred to as optimum display format for normal as appropriate) among display formats determined by learning performed using an SHD image.

As described above, when the display mode is the normal mode, the HD image corresponding to the normal HD image signal is displayed on the display 415 in the optimum display format for normal.

On the other hand, when it is judged in step S401 that the display mode is the enlargement mode, that is, when the instruction signal instructing the display mode supplied to the control unit 417 from the operation unit 416 immediately before the judgment is a signal instructing the enlargement mode and the present display mode is the enlargement mode, the control unit 417 supplies a control signal indicating the enlargement mode to the selecting unit 412, the image converting unit 413, and the display control unit 414. The control unit 417 proceeds to step S404.

In step S404, the pr-processing unit 411 applies pre-processing to the SD image signal from the camera 401. The pre-processing unit 411 outputs an SD image signal after pre-processing obtained as a result of the pre-processing.

In this way, the SD image signal after pre-processing outputted by the pre-processing unit 411 is supplied to the selecting unit 412.

When the control signal indicating the enlargement mode is supplied from the control unit 417, out of the SD image signal after pre-processing outputted by the pre-processing unit 411 and the SD image signal outputted by the camera 401, the selecting unit 412 selects the SD image signal after pre-processing outputted by the pre-processing unit 411 as a selected SD image signal. The selecting unit 412 supplies the selected SD image signal to the image converting unit 413.

When the control signal indicating the enlargement mode is supplied from the control unit 417, out of the set of normal tap coefficients and the set of tap coefficients for enlargement, the coefficient memory 431 of the image converting unit 413 (FIG. 48) sets the set of tap coefficients for enlargement as a set of effective tap coefficients (enables the set of tap coefficients for enlargement).

In step S405, the image converting unit 413 performs image conversion processing for converting the SD image signal after pre-processing serving as the selected SD image signal supplied from the selecting unit 412 into an enlarged HD image signal according to an arithmetic operation in which the set of tap coefficients for enlargement serving as the set of effective tap coefficients is used. The image converting unit 413 supplies an enlarged HD image signal obtained as a result of the image conversion processing to the display control unit 414 and proceeds to step S406.

In step S406, the display control unit 414 causes, in accordance with the control signal indicating the enlargement mode from the control unit 417, the display 415 to display an HD image corresponding to the enlarged HD image signal supplied from the image converting unit 413 in a display format suitable for display of the HD image corresponding to the enlarged HD image signal (hereinafter referred to as optimum display format for enlargement as appropriate) among the display formats determined by learning performed using an SHD image.

As described above, when the display mode is the enlargement mode, the HD image corresponding to the enlarged HD image signal is displayed on the display 415 in the optimum display format for enlargement.

In the image processing system in FIG. 45, the following seven parameters are determined by performing learning using an SHD image higher in quality than the HD image: the signal format of the photographed image signal, which is the SD image signal outputted by the camera 401; the tap structure of a pre-processing tap extracted by the pre-processing-tap extracting unit 421 and the pre-processing coefficient set stored in the coefficient memory 423 in the pre-processing unit 411 (FIG. 47) of the display apparatus 402 (FIG. 46); the set of normal tap coefficients and the set of tap coefficients for enlargement stored in the coefficient memory 431 of the image converting unit 413 (FIG. 48); and the optimum display format for normal and the optimum display format for enlargement in which the display control unit 414 causes the display 415 to display the HD image.

Among the seven parameters, namely, the signal format of the photographed image signal, the tap structure of the pre-processing tap, the pre-processing coefficient set, the set of normal tap coefficients, the set of tap coefficients for enlargement, the optimum display format for normal, and the optimum display format for enlargement, the three parameters, namely, the signal format of the photographed image signal, the set of normal tap coefficients, and the optimum display format for normal, are determined by the learning processing in FIG. 19 performed in the learning apparatus in FIG. 9.

Figure 50:
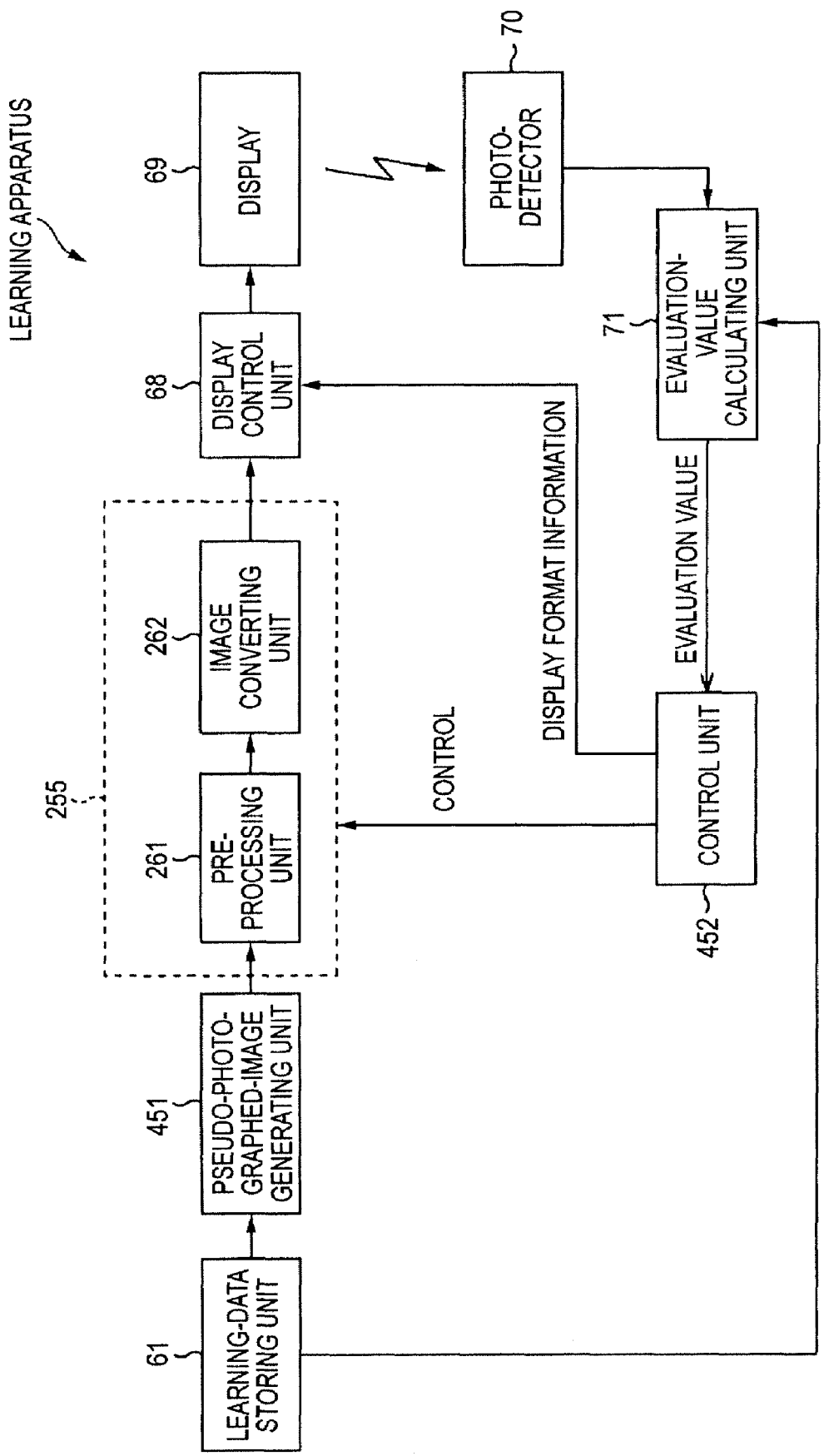
FIG. 50 is a block diagram showing an example of a structure of a learning apparatus that learns an optimum display format, an optimum tap structure, an optimum pre-processing coefficient, and an optimum tap coefficient.

The remaining four parameters, namely, the tap structure of the pre-processing tap, the pre-processing coefficient sets, the set of tap coefficients for enlargement, and the optimum display format for enlargement, are determined by learning processing performed by a learning apparatus in FIG. 50.

FIG. 50 is a diagram showing an example of a structure of a learning apparatus that performs learning for determining the four parameters, namely, the tap structure of the pre-processing tap, the pre-processing coefficient set, the set of tap coefficients for enlargement, and the optimum display format for enlargement.

In the figure, components corresponding to those in FIG. 9 or FIG. 38 are denoted by the identical reference numerals and explanations of the components are omitted below as appropriate. The learning apparatus in FIG. 50 is the same as the learning apparatus in FIG. 9 except that a pseudo-photographed-image generating unit 451 and a control unit 452 are provided instead of the pseudo-photographed-image generating unit 62 and the control unit 72, respectively, and the learning unit 255 including the pre-processing unit 261 and the image converting unit 262 in FIG. 38 is provided instead of the image converting unit 73.

The pseudo-photographed-image generating unit 451 sequentially selects image signals of each frame of the SHD image signal stored in the learning-data storing unit 61 as an SHD image signal of interest and, for example, curtails the number of pixels of the SHD image signal of interest to generate an SD image signal of the signal format determined as optimum in the learning apparatus in FIG. 9. The pseudo-photographed-image generating unit 451 supplies the SD image signal to the learning unit 255 as a pseudo photographed image signal equivalent to the photographed image signal outputted by the camera 401 (FIG. 45).

An evaluation value is supplied to the control unit 452 from the evaluation-value calculating unit 71. The control unit 452 controls the pre-processing unit 261 and the image converting unit 262 constituting the learning unit 255 on the basis of the evaluation value from the evaluation-value calculating unit 71. Specifically, the control unit 452 controls (sets) a tap structure of a pre-processing tap and a pre-processing coefficient set used for pre-processing in the pre-processing unit 261 and controls a set of tap coefficients for enlargement used for enlargement conversion processing serving as the image conversion processing in the image converting unit 262.

The control unit 452 determines, on the basis of the evaluation value from the evaluation-value calculating unit 71, a display format in which the display control unit 68 displays an enlarged HD image corresponding to the enlarged HD image signal supplied from the image converting unit 262 of the learning unit 255 on the display 69. The control unit 452 supplies display format information indicating the display format to the display control unit 68.

The learning processing for learning a tap structure of a pre-processing tap, a pre-processing coefficient set, a set of tap coefficients for enlargement, and an optimum display format for enlargement performed by the learning apparatus in FIG. 50 will be explained with reference to a flowchart in FIG. 51.

First, in step S421, for example, the pseudo-photographed-image generating unit 451 curtails the number of pixels of the SHD image signal stored in the learning-data storing unit 61 to generate an SD image signal of the optimum signal format determined by learning performed by the learning apparatus in FIG. 9. The pseudo-photographed-image generating unit 451 supplies the SD image signal to the learning unit 255 as a pseudo photographed image signal equivalent to the photographed image signal outputted by the camera 401 (FIG. 45) and proceeds to step S422.

In step S422, the control unit 452 determines an initial tap structure $D_m$ to be set as a tap structure of interest out of plural initial tap structures. The control unit 452 supplies tap structure information indicating the tap structure of interest $D_m$ to the pre-processing unit 261 of the learning unit 255 and proceeds to step S423.

In the learning apparatus in FIG. 50, as in the learning apparatus in FIG. 38, plural tap structures of a pre-processing tap are set (determined) as initial tap structures used in the beginning of the learning processing. The control unit 452 has tap structure information indicating the respective plural initial tap structures stored in a memory built therein (not shown). The control unit 452 determines (sets) one of initial tap structures, which have not been set as interest tap structures, among the plural initial tap structures indicated by the plural pieces of tap structure information stored in the memory built therein as a tap structure of interest $D_m$. The control unit 452 supplies tap structure information indicating the tap structure of interest $D_m$ to the pre-processing unit 261.

In step S423, the control unit 452 determines a pre-processing coefficient set of interest $E_n$ that is a set of pre-processing coefficients that the pre-processing unit 261 uses for pre-processing. For example, when the number of (pixel values of) pixels forming a pre-processing tap of the tap structure of interest $D_m$ is X and the number of bits of a pre-processing coefficient is Y, there are $X \times 2^Y$ kinds as a number that the set of pre-processing coefficients can take with respect to the pre-processing tap of the tap structure of interest $D_m$. The control unit 452 determines one of sets of pre-processing coefficients, which have not been set as interest pre-processing coefficient sets, among the $X \times 2^Y$ kinds of sets of pre-processing coefficients as the pre-processing coefficient set of interest $E_n$.

The control unit 452 supplies the pre-processing coefficient set of interest $E_n$ to the pre-processing unit 261 and proceeds from step S423 to step S424.

In step S424, the control unit 452 determines an initial display format $B_j$ to be set as a display format of interest out of plural initial display formats. The control unit 452 supplies display format information indicating the display format of interest $B_j$ to the display control unit 68 and proceeds to step S425.

In the learning apparatus in FIG. 50, as in the learning apparatus in FIG. 9, plural display formats are set as initial display formats used in the beginning of the learning processing. The control unit 452 has display format information indicating the respective plural initial display formats stored in the built-in memory. The control unit 452 determines one of initial display formats, which have not been set as interest display formats, among the plural initial display formats indicated by the plural pieces of display format information stored in the built-in memory as a display format of interest $B_j$. The control unit 452 supplies display format information indicating the display format of interest $B_j$ to the display control unit 68.

In step S425, in the learning apparatus (FIG. 50), the control unit 452 determines a provisional optimum set of tap coefficients for enlargement (a set of tap coefficients ($x_1$, $x_2$, ..., $x_N$) of each class used in the arithmetic operation in Equation (1)) $F_{j,m,n}$ for a combination of the display format of interest $B_j$, the tap structure of interest $D_m$, and the pre-processing coefficient set of interest $E_n$.

In step S425, the control unit 452 determines a set of tap coefficients, with which an evaluation value of a display image signal obtained by detecting light serving as an HD image displayed on the display 69 with the photo-detector 70 is the highest when the HD image is displayed in the display format of interest $B_j$, as the provisional optimum set of tap coefficients for enlargement $F_{j,m,n}$ for a combination of the display format of interest $B_j$, the tap structure of interest $D_m$, and the pre-processing coefficient set of interest $E_n$. The HD image is an HD image corresponding to an enlarged HD image signal serving as a second image including pixels having respective components of R, G, and B as pixel values. The HD image is obtained by performing, using a pre-processing tap of the tap structure of interest $D_m$ and the pre-processing coefficient set of interest $E_n$ and with an SD image signal obtained by applying pre-processing to the SD image signal as a first image signal, image conversion processing (enlargement conversion processing) in which a set of tap coefficients is used.

The control unit 452 proceeds from step S425 to S426. The control unit 452 judges whether, for the present interest tap structure $D_m$ and interest pre-processing coefficient set $E_n$, all the plural initial display formats indicated by the plural pieces of display format information stored in the built-in memory have been set as interest display formats and a set of tap coefficients for enlargement has been determined in step S425.

When it is judged in step S426 that all the plural initial display formats have not been set as interest display formats, the control unit 452 returns to step S424. The control unit 452 determines one of initial display formats, which have not been set as interest display formats, among the plural initial display formats as a display format of interest anew. The control unit 452 supplies display format information indicating the display format of interest to the display control unit 68. Subsequently, the control unit 452 repeats the same processing.

When it is judged in step S426 that all the plural initial display formats have been set as interest display formats, the control unit 452 proceeds to step S427. The control unit 452 judges whether all the $X \times 2^Y$ kinds of sets of pre-processing coefficients, which the set of pre-processing coefficients can take with respect to the pre-processing tap of the tap structure of interest $D_m$, have been set as interest pre-processing coefficient sets.

When it is judged in step S427 that all the $X \times 2^Y$ kinds of sets of pre-processing coefficients, which the set of pre-processing coefficients can take with respect to the pre-processing tap of the tap structure of interest $D_m$, have not been set as interest pre-processing coefficient sets, the control unit 452 returns to step S423. The control unit 452 determines one of sets of pre-processing coefficients, which have not been set as interest pre-processing coefficient sets, among the $X \times 2^Y$ kinds of sets of pre-processing coefficients, which the set of pre-processing coefficients can take with respect to the pre-processing tap of the tap structure of interest $D_m$, as a pre-processing coefficient set of interest anew. The control unit 452 repeats the same processing.

When it is judged in step S427 that all the $X \times 2^Y$ kinds of sets of pre-processing coefficients, which the set of pre-processing coefficients can take with respect to the pre-processing tap of the tap structure of interest $D_m$, have been set as interest pre-processing coefficient sets, the control unit 452 proceeds to step S428. The control unit 452 judges whether all the plural initial tap structures indicated by the plural pieces of tap structure information stored in the built-in memory have been set as interest tap structures.

When it is judged in step S428 that all the plural initial tap structures have not been set as interest tap structures, the control unit 452 returns to step S422. The control unit 452 determines one of initial tap structures, which have not been set as interest tap structures, among the plural initial tap structures as a tap structure of interest. The control unit 452 repeats the same processing.

When it is judged in step S428 that all the plural initial tap structures have been set as interest tap structures, that is, when an optimum set of tap coefficients for enlargement is determined in step S425 for all combinations of (initial) tap structures, pre-processing coefficient sets, and (initial) display formats, the control unit 452 proceeds to step S429. The control unit 452 provisionally determines a combination of an optimum tap structure, an optimum pre-processing coefficient sets, an optimum display format, and a set of tap coefficients for enlargement out of the combinations of tap structures, pre-processing coefficient sets, display formats, and set of tap coefficients for enlargements.

When there are M kinds of tap structures as the initial tap structure, there are N kinds as a number of cases that the pre-processing coefficient set can take, there are J kinds of display formats as the initial display format, and there are M×N×J kinds of combinations as the combinations of (initial) tap structures, pre-processing coefficient sets, and (initial) display formats. In step S425, the control unit 452 determines a provisional optimum set of tap coefficients for enlargement for each of the M×N×J kinds of combinations. Therefore, in step S425, combinations of tap structures, pre-processing coefficient sets, display formats, and sets of tap coefficients for enlargement are obtained by M×N×J kinds. In step S429, a combination having a maximum evaluation value of a display image signal is provisionally determined as a combination of an optimum tap structure, an optimum pre-processing coefficient set, an optimum display format, and an optimum set of tap coefficients for enlargement out of the M×N×J kinds of combinations (combinations of tap structures, pre-processing coefficient sets, display formats, and sets of tap coefficients for enlargement).

When the combination of the optimum tap structure, the optimum pre-processing coefficient set, the optimum display format, and the optimum set of tap coefficients for enlargement is provisionally determined in step S429, the control unit 452 proceeds to step S430. The control unit 452 performs optimization processing for optimizing the tap structure, the present provisional optimum pre-processing coefficient set, the present provisional optimum display format, and the present provisional optimum set of tap coefficients for enlargement one by one. The control unit 452 proceeds to step S431.

In step S431, the control unit 452 judges whether the combination of the present provisional optimum tap structure, the present provisional optimum pre-processing coefficient set, the present provisional optimum display format, and the present provisional optimum set of tap coefficients for enlargement determined by the optimization processing in the immediately preceding step S430 is an optimized combination.

In the optimization processing in step S430, processing for sequentially paying attention to the four parameters, namely the present provisional optimum tap structure, the present provisional optimum pre-processing coefficient set, the present provisional optimum display format, and the present provisional optimum set of tap coefficients for enlargement, and updating a parameter of interest (a parameter in which the user is interested) to maximize an evaluation value calculated by the evaluation-value calculating unit 71. In step S431, it is judged whether the combination of the present provisional optimum tap structure, the present provisional optimum pre-processing coefficient set, the present provisional optimum display format, and the present provisional optimum set of tap coefficients for enlargement is an optimized combination according to, for example, whether an evaluation value for a parameter updated last in the optimization processing in the immediately preceding step S430 is equal to or larger than (larger than) the predetermined threshold for judgment of optimization.

When it is judged in step S431 that the combination of the present provisional optimum tap structure, the present provisional optimum pre-processing coefficient set, the present provisional optimum display format, and the present provisional optimum set of tap coefficients for enlargement is not an optimized combination, that is, when the evaluation value for the parameter updated last in the immediately preceding step S430 is not equal to or larger than the threshold for judgment of optimization, the control unit 452 returns to step S430. The control unit 452 repeats the same processing.

When it is judged in step S431 that the combination of the present provisional optimum tap structure, the present provisional optimum pre-processing coefficient set, the present provisional optimum display format, and the present provisional optimum set of tap coefficients for enlargement is an optimized combination, that is, when the evaluation value for the parameter updated last in the immediately preceding step S430 is equal to or larger than the threshold for judgment of optimization, the control unit 452 finally determines the combination of the present provisional optimum tap structure, the present provisional optimum pre-processing coefficient set, the present provisional optimum display format, and the present provisional optimum set of tap coefficients for enlargement as a combination of an optimum tap structure, an optimum pre-processing coefficient set, an optimum display format, and an optimum set of tap coefficients for enlargement and ends the learning processing.

In the image processing system in FIG. 45, processing is performed on the basis of the combination of the optimum tap structure, the optimum pre-processing coefficient set, the optimum display format (optimum display format for enlargement), and the optimum set of tap coefficients for enlargement finally determined by the learning processing of the learning apparatus in FIG. 50 and the combination of the optimum signal format, the optimum set of normal tap coefficients, and the optimum display format (the optimum display format for normal) finally determined by the learning apparatus in FIG. 9.

In the image processing system in FIG. 45, the camera 401 outputs a photographed image signal (an SD image signal) of the optimum signal format finally determined by the learning apparatus in FIG. 9.

The display apparatus 402 (FIG. 46) sets a display mode to the normal mode or the enlargement mode according to operation by the user. When the display mode is the normal mode, the image converting unit 413 of the display apparatus 402 performs image conversion processing (HD conversion processing) using the optimum set of normal tap coefficients finally determined by the learning apparatus in FIG. 9 to convert the SD image signal outputted by the camera 401 into a normal HD image signal. The display control unit 414 of the display apparatus 402 causes the display 415 to display an HD image corresponding to the normal HD image signal in the optimum display format (the optimum display format for normal) finally determined by the learning apparatus in FIG. 9.

On the other hand, when the display mode is the enlargement mode, the pre-processing unit 411 of the display apparatus 402 applies pre-processing based on the optimum tap structure and the optimum pre-processing coefficient set finally determined by the learning apparatus in FIG. 50 to the SD image signal outputted by the camera 401. Consequently the SD image signal outputted by the camera 401 is converted into an SD image signal after pre-processing suitable for image conversion processing (enlargement conversion processing) at a later stage. The image converting unit 413 of the display apparatus 402 performs image conversion processing (enlargement conversion processing) using the optimum set of tap coefficients for enlargement finally determined by the learning apparatus in FIG. 50 to convert the SD image signal after pre-processing into an enlarged HD image signal. The display control unit 414 of the display apparatus 402 causes the display 415 to display an HD image corresponding to the enlarged HD image signal in the optimum display format (the optimum display format for enlargement) finally determined by the learning apparatus in FIG. 50.

Therefore, according to the image processing system in FIG. 45, like the image processing system in FIG. 1, it is possible to improve performance of the image processing system that is the combination of the camera 401 and the display apparatus 402.

According to the image processing system in FIG. 45, apart from an S/N and the like of the photographed image signal outputted by the camera 401 and the HD image signal outputted by the image converting unit 413, as the image processing system as a whole, it is possible to display an image that the user feels high in quality on the display 415.

According to the image processing system in FIG. 45, it is possible to display an enlarged HD image and an HD image of a normal size according to operation by the user.

Figure 51:
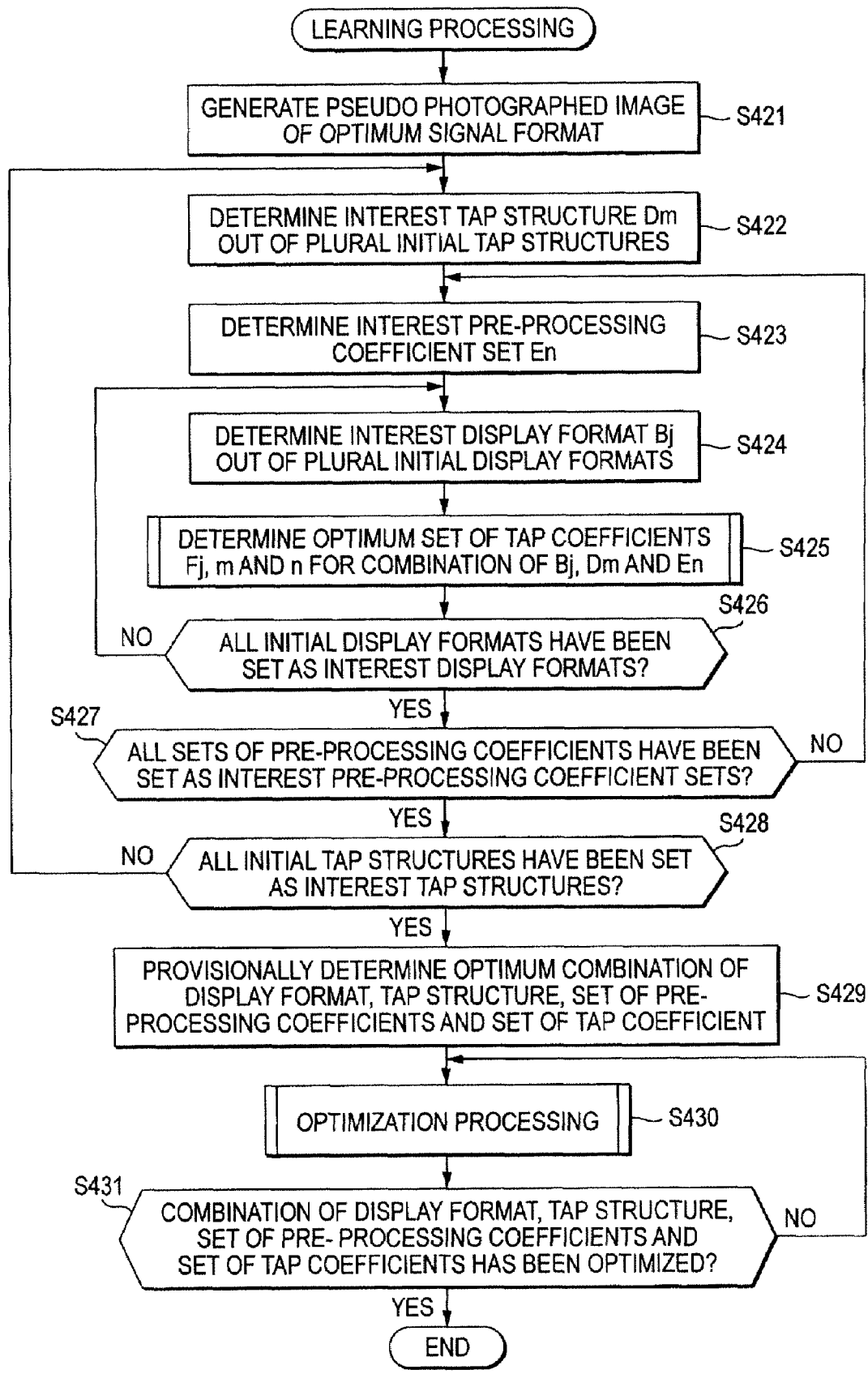
FIG. 51 is a flowchart for explaining processing by the learning apparatus that learns an optimum display format, an optimum tap structure, an optimum pre-processing coefficient, and an optimum tap coefficient.

In FIG. 51, when an evaluation value for a parameter updated last in the optimization processing in step S430 is equal to or larger than the threshold for judgment of optimization, it is judged that a combination of a tap structure, a pre-processing coefficient set, a display format, and a set of tap coefficients for enlargement is optimized. Besides, for example, it is also possible to judge that a combination of a tap structure, a pre-processing coefficient set, a display format, and a set of tap coefficients for enlargement is optimized when the optimization processing in step S430 is repeated a predetermined number of times.

The processing in step S425 in FIG. 51 for determining an optimum set of tap coefficients $F_{j,m,n}$ for a combination of a display format of interest $B_j$, a tap structure of interest $D_m$, and a pre-processing coefficient set of interest $E_n$ will be described in detail with reference to a flowchart in FIG. 52.

In step S451, the control unit 452 determines a set of tap coefficients for enlargement for each class that the image converting unit 262 of the learning unit 255 uses for image conversion processing (enlargement conversion processing). For example, when a total number of classes is $\alpha$, the number of tap coefficients of each class is $\beta$, and the number of bits of the tap coefficient for enlargement is $\gamma$, there are $\alpha \times \beta \times 2^\gamma$ kinds as a number that a set of tap coefficients can take. The control unit 452 determines one of sets of tap coefficients, which have not been set as interest tap coefficient sets in the present processing in FIG. 52, among the $\alpha \times \beta \times 2^\gamma$ kinds of sets of tap coefficients as a tap coefficient set of interest.

The control unit 452 supplies the tap coefficient set of interest to the image converting unit 262 and proceeds from step S451 to S452.

In step S452, the control unit 452 controls the pre-processing unit 261 to perform pre-processing based on the tap structure of interest $D_m$ and the pre-processing coefficient set of interest $E_n$. Consequently, the pre-processing unit 261 applies pre-processing to the SD image signal serving as the pseudo photographed image signal supplied from the pseudo-photographed-image generating unit 451 to the learning unit 255 in accordance with the control by the control unit 253. The pre-processing unit 261 supplies an SD image signal after pre-processing obtained as a result of the pre-processing to the image converting unit 262.

The pre-processing unit 261 sequentially sets, as a pixel of interest, pixels forming the SD image signal after pre-processing corresponding to the SD image signal serving as the pseudo photographed image signal supplied from the pseudo-photographed-image generating unit 451. The pre-processing unit 261 extracts, for the pixel of interest, pixel values of plural pixels to be set as pre-processing taps of the tap structure of interest $D_m$ from the SD image signal serving as the pseudo photographed image signal supplied from the pseudophotographed-image generating unit 451. The pre-processing unit 261 performs, with the pixel values serving as the pre-processing taps as arguments, an arithmetic operation for a function for pre-processing defined by the pre-processing coefficient set of interest $E_n$. The pre-processing unit 261 supplies a result of the arithmetic operation for a function for pre-processing to the image converting unit 262 as a pixel value of a pixel of interest of the SD image signal after pre-processing.

Thereafter, the image converting unit 262 proceeds from step S452 to step S453. The image converting unit 262 sets the SD image signal after pre-processing supplied from the pre-processing unit 261 as a first image signal and sets an enlarged HD image signal obtained by enlarging the SD image signal before pre-processing as a second image signal. The image converting unit 262 performs image conversion processing (enlargement conversion processing) for converting the SD image signal for pre-processing into an enlarged HD image signal using the tap coefficient set of interest supplied from the control unit 452 in the immediately preceding step S451. The image converting unit 262 supplies an enlarged HD image signal obtained by the image conversion processing to the display control unit 68.

After the processing in step S453, the control unit 452 proceeds to step S454. The control unit 452 supplies display format information indicating the display format of interest $B_j$ to the display control unit 68. Consequently, the display control unit 68 causes the display 69 to display an HD image (an enlarged HD image) corresponding to the enlarged HD image signal outputted by the image converting unit 262 in the display format of interest $B_j$ indicated by the display format information from the control unit 452. The display control unit 68 proceeds from step S454 to step S455.

In step S455, the photo-detector 70 detects (photoelectrically converts) light serving as the enlarged HD image (a display image) displayed on the display 69. The photo-detector 70 outputs a display image signal equivalent to the HD image signal, which is an electric signal corresponding to the light) to the evaluation-value calculating unit 71, and proceeds to step S456.

In step S456, the evaluation-value calculating unit 71 evaluates not only the display image signal from the photo-detector 70 but also the enlarged HD image displayed on the display 69.

The evaluation-value calculating unit 71 reads out, from the learning-data storing unit 61, an SHD image signal corresponding to the display image signal from the photo-detector 70. The evaluation-value calculating unit 71 compares the display image signal and the corresponding SHD image signal to calculate an evaluation value not only as evaluation of the display image signal but also as evaluation of an image quality that the user looking at the enlarged HD image displayed on the display 69 feels. The evaluation-value calculating unit 71 supplies the evaluation value to the control unit 452.

The processing in steps S452 to S456 is applied to all frames of the SHD image signal stored in the learning-data storing unit 61. The control unit 452 calculates, for the tap coefficient set of interest, for example, a sum of evaluation values obtained for all the frames of the SHD image signal stored in the learning-data storing unit 61. The control unit 452 temporarily stores the sum as a final evaluation value for the tap coefficient set of interest.

Thereafter, the control unit 452 proceeds from step S456 to step S457. The control unit 452 judges whether evaluation values have been calculated for all $\alpha \times \beta \times 2^\gamma$ kinds of values that the set of tap coefficients for enlargement can take.

Figure 52:
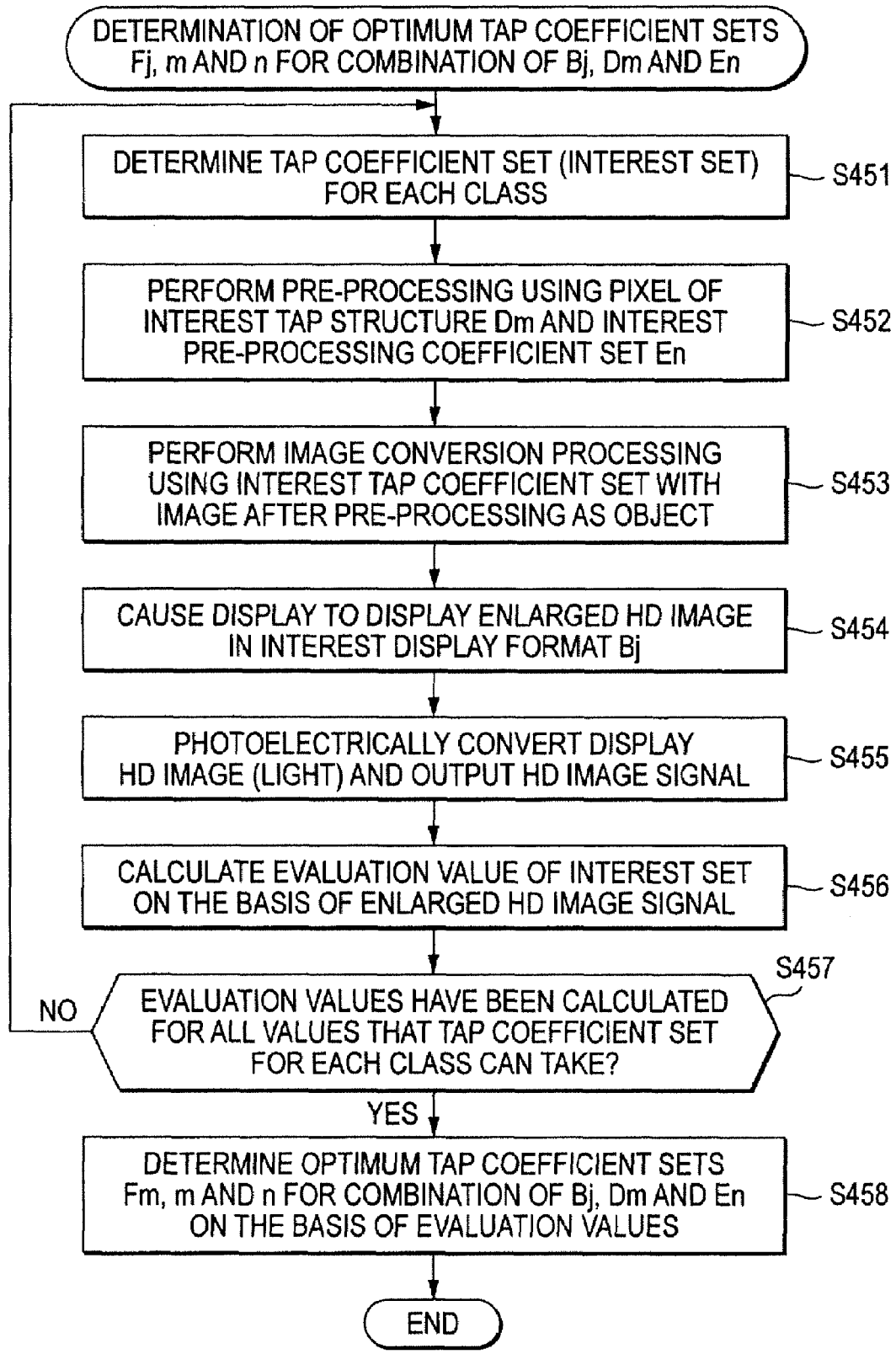
FIG. 52 is a flowchart for explaining details of processing in step S425.

When it is judged in step S457 that evaluation values have not been calculated for all the $\alpha \times \beta \times 2^\gamma$ kinds of values that the set of tap coefficients for enlargement can take, that is, when there are sets of tap coefficients for enlargement, which have not been set as interest tap coefficient sets in the present processing in FIG. 52, among the $\alpha \times \beta \times 2^\gamma$ kinds of sets of tap coefficients for enlargement, the control unit 452 returns to step S451. The control unit 452 determines one of the sets of tap coefficients for enlargement, which have not been set as interest tap coefficient sets in the present processing in FIG. 52, among the $\alpha \times \beta \times 2^\gamma$ kinds of sets of tap coefficients for enlargement as a tap coefficient set of interest anew. Subsequently, the control unit 452 repeats the same processing.

When it is judged in step S457 that evaluation values have been calculated for all the $\alpha \times \beta \times 2^\gamma$ kinds of values that the set of tap coefficients for enlargement can take, the control unit 452 proceeds to step S458. The control unit 452 determines (provisionally determines) a set of tap coefficients for enlargement having a highest evaluation value among the $\alpha \times \beta \times 2^\gamma$ kinds of sets of tap coefficients for enlargement as an optimum set of tap coefficients for enlargement $F_{j,m,n}$ for the combination of the display format of interest $B_j$ and the tap structure of interest $D_m$, and the pre-processing coefficient set of interest $E_n$. The control unit 452 returns to the start of the processing.

In step S429 in FIG. 51, a combination of a tap structure, a pre-processing coefficient set, a display format, and a set of tap coefficients for enlargement, with which an evaluation value obtained in the processing in steps S451 to S458 in FIG. 52 serving as the processing in step S425 is maximized, is provisionally determined as an optimum combination.

Figure 53:
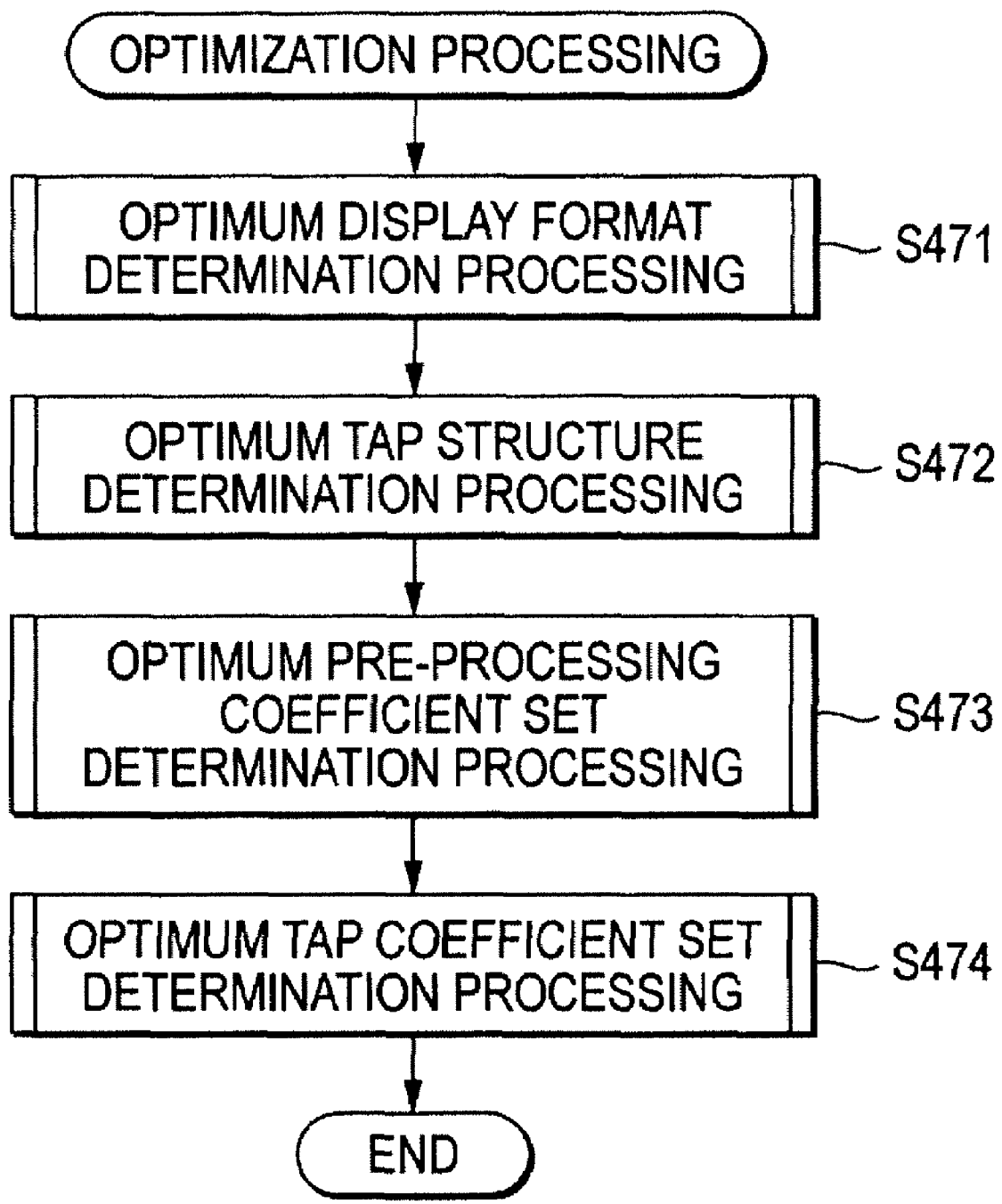
FIG. 53 is a flowchart for explaining details of processing in step S430.

The optimization processing in step S430 in FIG. 51 will be further explained with reference to a flowchart in FIG. 53.

In the optimization processing, in step S471, the control unit 452 performs optimum display format determination processing for provisionally determining an optimum display format for a combination of a present provisional optimum tap structure, a present provisional optimum pre-processing coefficient set, and a present provisional optimum set of tap coefficients for enlargement. The control unit 452 proceeds to step S472.

In step S472, the control unit 452 performs optimum tap structure determination processing for provisionally determining an optimum tap structure for a combination of a present provisional optimum display format, a present provisional optimum pre-processing coefficient set, and a present provisional optimum set of tap coefficients for enlargement. The control unit 452 proceeds to step S473.

In step S473, the control unit 452 performs optimum pre-processing coefficient set determination processing for provisionally determining an optimum pre-processing coefficient set for a combination of a present provisional optimum display format, a present provisional optimum tap structure, and a present provisional optimum set of tap coefficients for enlargement. The control unit 452 proceeds to step S474.

In step S474, the control unit 452 performs optimum tap coefficient set determination processing for provisionally determining an optimum set of tap coefficients for enlargement for a combination of a present provisional optimum display format, a present provisional optimum tap structure, and a present provisional optimum pre-processing coefficient set. The control unit 452 returns to the start of the processing.

The optimum display format determination processing in step S471 in FIG. 52 will be described in detail with reference to a flowchart in FIG. 54.

Figure 22:
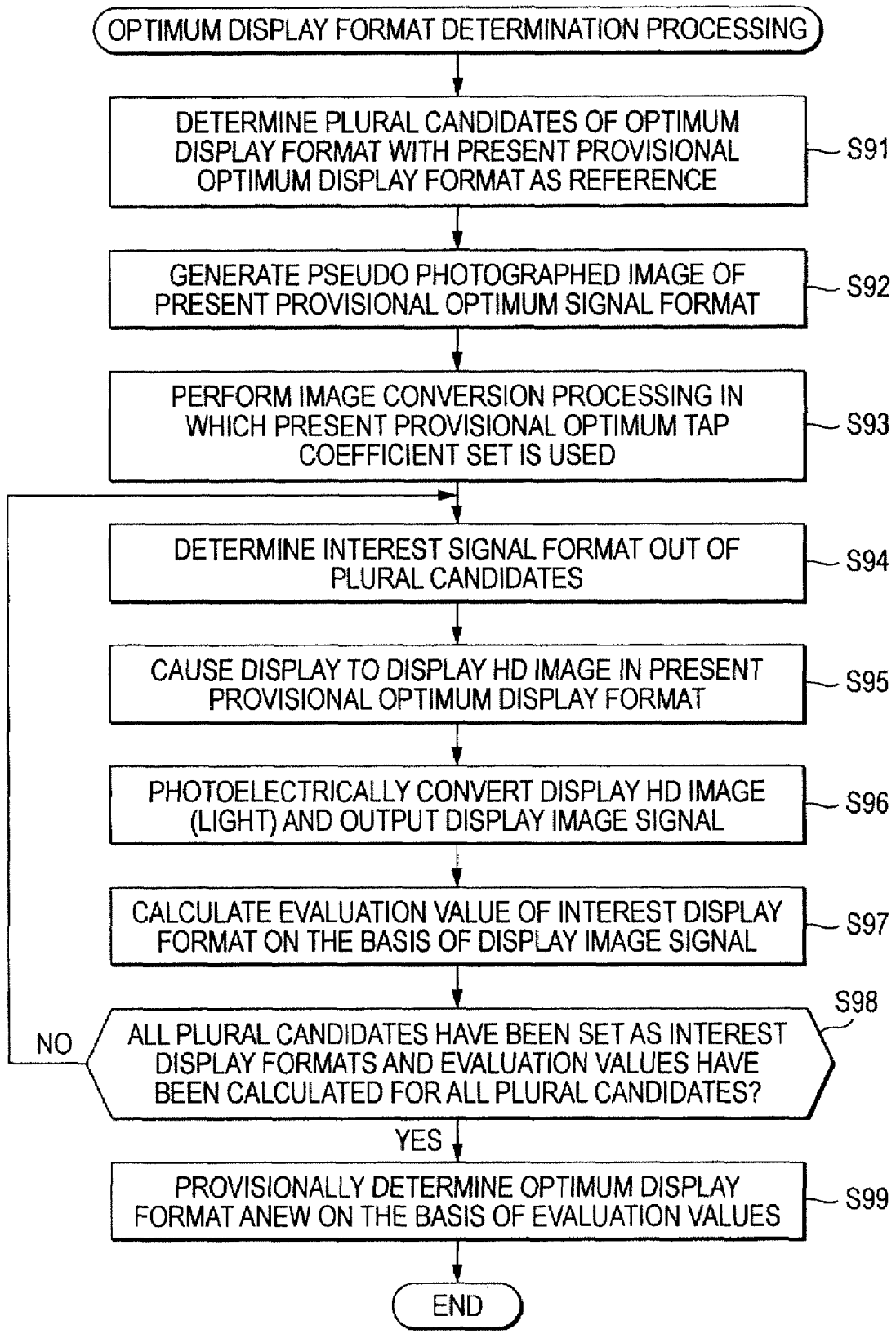
FIG. 22 is a flowchart for explaining details of processing in step S38.

In step S491, as in step S91 in FIG. 22, the control unit 452 (FIG. 50) transforms, with a present provisional (provisionally determined) optimum display format as a reference, the present provisional optimum display format in accordance with a predetermined transformation rule to determine plural candidates of an optimum display format.

After the processing in step S491, the control unit 452 proceeds to step S492. The control unit 452 controls the pre-processing unit 261 (FIG. 50) to perform pre-processing based on the present provisional optimum tap structure and the present provisional optimum pre-processing coefficient set. Consequently, the pre-processing unit 261 applies, in accordance with the control by the control unit 452, pre-processing to the SD image signal serving as the pseudo photographed image signal supplied from the pseudo-photographed-image generating unit 451 to the learning unit 255. The pre-processing unit 261 supplies an SD image signal after pre-processing obtained as a result of the pre-processing to the image converting unit 262.

The pre-processing unit 261 sequentially sets, as a pixel of interest, pixels forming the SD image signal after pre-processing corresponding to the SD image signal serving as the pseudo photographed image signal supplied from the pseudo-photographed-image generating unit 451. The pre-processing unit 261 extracts, for the pixel of interest, pixel values of plural pixels to be set as pre-processing taps of the present provisional optimum tap structure from the SD image signal serving as the pseudo photographed image signal supplied from the pseudo-photographed-image generating unit 451. The pre-processing unit 261 performs, with the pixel values serving as the pre-processing taps as arguments, an arithmetic operation for a function for pre-processing defined by the present provisional optimum pre-processing coefficient set. The pre-processing unit 261 supplies a result of the arithmetic operation for a function for pre-processing to the image converting unit 262 as a pixel value of the pixel of interest of the SD image signal after pre-processing.

Thereafter, the image converting unit 262 proceeds from step S492 to step S493. The image converting unit 262 receives the supply of the present provisional optimum set of tap coefficients for enlargement from the control unit 452. The image converting unit 262 sets the SD image signal after pre-processing supplied from the pre-processing unit 261 as a first image signal and sets an enlarged HD image signal obtained by enlarging the SD image signal before pre-processing as a second image. The image converting unit 262 performs image conversion processing (enlargement conversion processing) for converting the SD image signal after pre-processing into an enlarged HD image signal using the present provisional optimum set of tap coefficients from the control unit 452. The image converting unit 262 supplies an enlarged HD image signal obtained by the image conversion processing to the display control unit 68.

After the processing in step S493, the control unit 452 proceeds to step S494. The control unit 452 determines one of candidates, which have not been set as interest display formats, among the plural candidates of the optimum display format determined in step S491 as a display format of interest. The control unit 452 supplies display format information indicating the display format of interest to the display control unit 68 and proceeds to step S495.

In step S495, the display control unit 68 causes the display 69 to display an enlarged HD image corresponding to the enlarged HD image signal supplied from the image converting unit 262 of the learning unit 255 (FIG. 50) in the display format of interest indicated by the display format information from the control unit 452. The display control unit 68 proceeds to step S496.

In step S496, the photo-detector 70 detects (photoelectrically converts) light serving as the enlarged HD image (a display image) displayed on the display 69. The photo-detector 70 outputs a display image signal equivalent to the HD image signal, which is an electric signal corresponding to the light, to the evaluation-value calculating unit 71 and proceeds to step S497.

In step S497, the evaluation-value calculating unit 71 evaluates not only the display image signal from the photo-detector 70 but also the enlarged HD image displayed on the display 69.

The evaluation-value calculating unit 71 reads out, from the learning-data storing unit 61, an SHD image signal corresponding to the display image signal from the photo-detector 70. The evaluation-value calculating unit 71 compares the display image signal and the corresponding SHD image signal to calculate an evaluation value not only as evaluation of the display image signal but also as evaluation of an image quality that the user looking at the HD image displayed on the display 69 feels. The evaluation-value calculating unit 71 supplies the evaluation value to the control unit 452.

The processing in steps S492 and S493 and steps S495 to S497 is applied to all frames of the SHD image signal stored in the learning-data storing unit 61. The control unit 452 calculates, for the display format of interest, for example, a sum of evaluation values obtained for all the frames of the SHD image signal stored in the learning-data storing unit 61. The control unit 452 temporarily stores the sum as a final evaluation value for the display format of interest.

Thereafter, the control unit 452 proceeds from step S497 to step S498. The control unit 452 judges whether evaluation values have been calculated for all the plural candidates of the optimum display format determined in step S491.

When it is judged in step S498 that evaluation values have not been calculated for all the plural candidates of the optimum display format, the control unit 452 returns to step S494. The control unit 452 determines one of candidates, which have not been set as interest display formats, among the plural candidates of the optimum display format as a display format of interest anew. Subsequently, the control unit 452 repeats the same processing.

When it is judged in step S498 that evaluation values have been calculated for all the plural candidates of the optimum display format, the control unit 452 proceeds to step S499. The control unit 452 provisionally determines a candidate having a highest evaluation value among the plural candidates of the optimum display format as an optimum display format for the combination of the present provisional optimum tap structure, the present provisional optimum pre-processing coefficient set, and the present provisional optimum set of tap coefficients for enlargement anew. The control unit 452 returns to the start of the processing.

Figure 55:
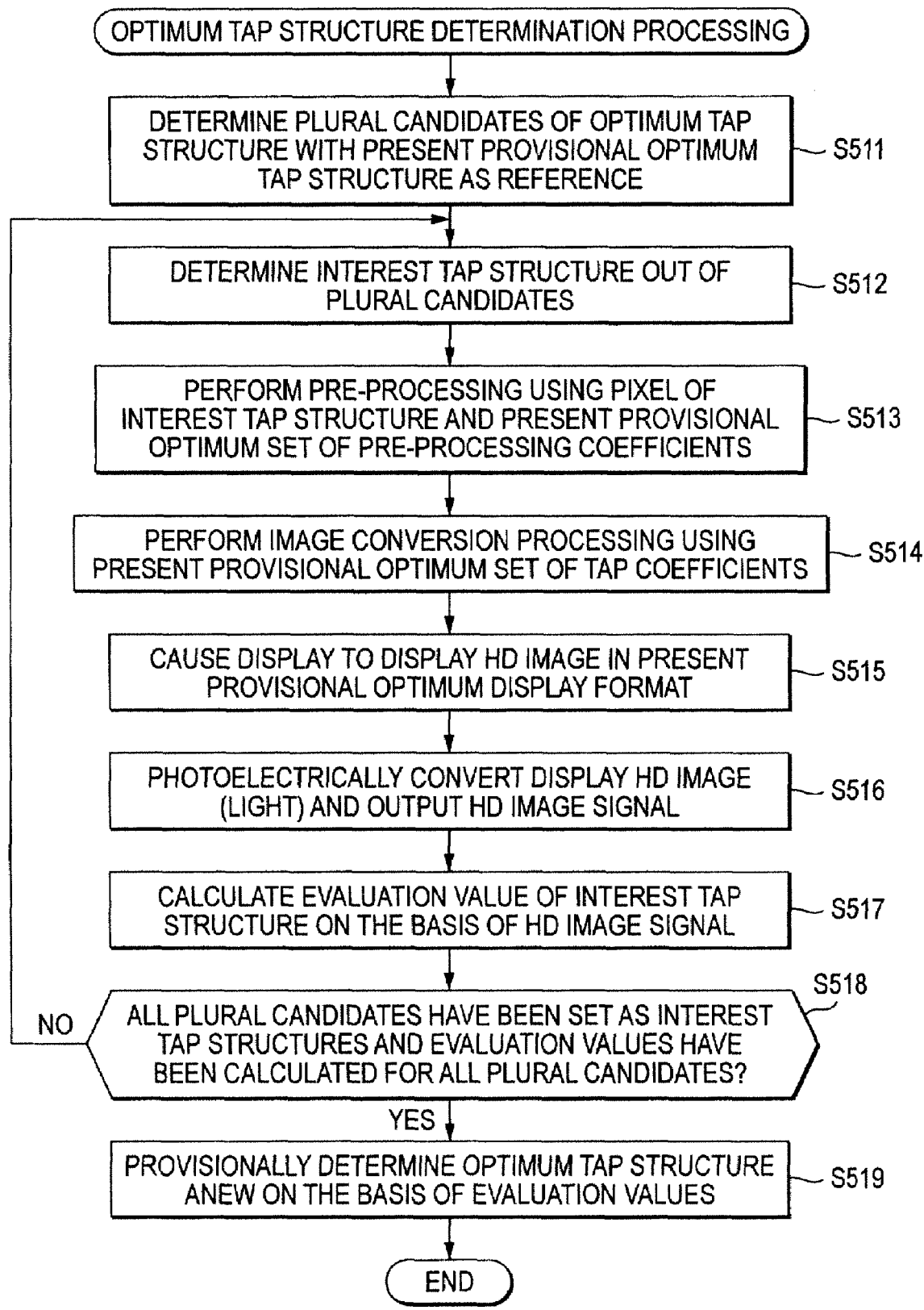
FIG. 55 is a flowchart for explaining details of processing in step S472.

The optimum tap structure determination processing in step S472 in FIG. 53 will be described in detail with reference to a flowchart in FIG. 55.

In step S511, as explained in step S281 in FIG. 42, the control unit 452 transforms, with the present provisional optimum tap structure as a reference, the tap structure in accordance with a predetermined transformation rule to plural candidates of an optimum tap structure.

After the processing in step S511, the control unit 452 proceeds to step S512. The control unit 452 determines one of candidates, which have not been set as interest tap structures, among the plural candidates of the optimum tap structure as a tap structure of interest and proceeds to step S513.

In step S513, the control unit 452 controls the pre-processing unit 261 to perform pre-processing based on the tap structure of interest and the present provisional optimum pre-processing coefficient set. Consequently, the pre-processing unit 261 applies, in accordance with the control by the control unit 452, pre-processing to the SD image signal serving as the pseudo photographed image signal supplied from the pseudo-photographed-image generating unit 451 to the learning unit 255. The pre-processing unit 261 supplies an SD image signal after pre-processing obtained as a result of the pre-processing to the image converting unit 262.

The pre-processing unit 261 sequentially sets, as a pixel of interest, pixels forming the SD image signal after pre-processing corresponding to the SD image signal serving as the pseudo photographed image signal supplied from the pseudo-photographed-image generating unit 451. The pre-processing unit 261 extracts, for the pixel of interest, pixel values of plural pixels to be set as pre-processing taps of the tap structure of interest from the SD image signal serving as the pseudo photographed image signal supplied from the pseudo-photographed-image generating unit 451. The pre-processing unit 261 performs, with the pixel values serving as the pre-processing taps as arguments, an arithmetic operation for a function for pre-processing defined by the present provisional optimum pre-processing coefficient set. The pre-processing unit 261 supplies a result of the arithmetic operation for a function for pre-processing to the image converting unit 262 as a pixel value of the pixel of interest of the SD image signal after pre-processing.

In step S514, the image converting unit 262 receives the supply of the present provisional optimum set of tap coefficients for enlargement from the control unit 452. The image converting unit 262 sets the SD image signal after pre-processing supplied from the pre-processing unit 261 as a first image signal and sets an enlarged HD image signal obtained by enlarging the SD image signal before pre-processing as a second image. The image converting unit 262 performs image conversion processing (enlargement conversion processing) for converting the SD image signal after pre-processing into an enlarged HD image signal using the present provisional optimum set of tap coefficients for enlargement. The image converting unit 262 supplies an enlarged HD image signal obtained by the image conversion processing to the display control unit 68.

After the processing in step S514, the control unit 452 proceeds to step S515. The control unit 452 supplies display format information indicating the present provisional optimum display format to the display control unit 68. The display control unit 68 causes the display 69 to display an enlarged HD image corresponding to the enlarged HD image signal supplied from the image converting unit 262 in the present provisional optimum display format indicated by the display format information from the control unit 452. The display control unit 68 proceeds to step S516.

In step S516, the photo-detector 70 detects (photoelectrically converts) light serving as the enlarged HD image (a display image) displayed on the display 69. The photo-detector 70 outputs a display image signal equivalent to the HD image signal, which is an electric signal corresponding to the light, to the evaluation-value calculating unit 71 and proceeds to step S517.

In step S517, the evaluation-value calculating unit 71 evaluates not only the display image signal from the photo-detector 70 but also the enlarged HD image displayed on the display 69.

The evaluation-value calculating unit 71 reads out, from the learning-data storing unit 61, an SHD image signal corresponding to the display image signal from the photo-detector 70. The evaluation-value calculating unit 71 compares the display image signal and the corresponding SHD image signal to calculate an evaluation value not only as evaluation of the display image signal but also as evaluation of an image quality that the user looking at the HD image displayed on the display 69 feels. The evaluation-value calculating unit 71 supplies the evaluation value to the control unit 452.

The processing in steps S513 to S517 is applied to all frames of the SHD image signal stored in the learning-data storing unit 61. The control unit 452 calculates, for the tap structure of interest, for example, a sum of evaluation values obtained for all the frames of the SHD image signal stored in the learning-data storing unit 61. The control unit 452 temporarily stores the sum as a final evaluation value for the tap structure of interest.

Thereafter, the control unit 452 proceeds from step S517 to step S518. The control unit 452 judges whether evaluation values have been calculated for all the plural candidates of the optimum tap structure determined in step S511.

When it is judged in step S518 that evaluation values have not been calculated for all the plural candidates of the optimum tap structure, the control unit 452 returns to step S512. The control unit 452 determines one of candidates, which have not been set as interest tap structures, among the plural candidates of the optimum tap structure as a tap structure of interest anew. Subsequently, the control unit 452 repeats the same processing.

When it is judged in step S518 that evaluation values have been calculated for all the plural candidates of the optimum tap structure, the control unit 452 proceeds to step S519. The control unit 452 provisionally determines a candidate having a highest evaluation value among the plural candidates of the optimum tap structure as an optimum tap structure for the combination of the present provisional optimum display format, the present provisional optimum pre-processing coefficient set, and the present provisional optimum set of tap coefficients for enlargement anew. The control unit 452 returns to the start of the processing.

Figure 56:
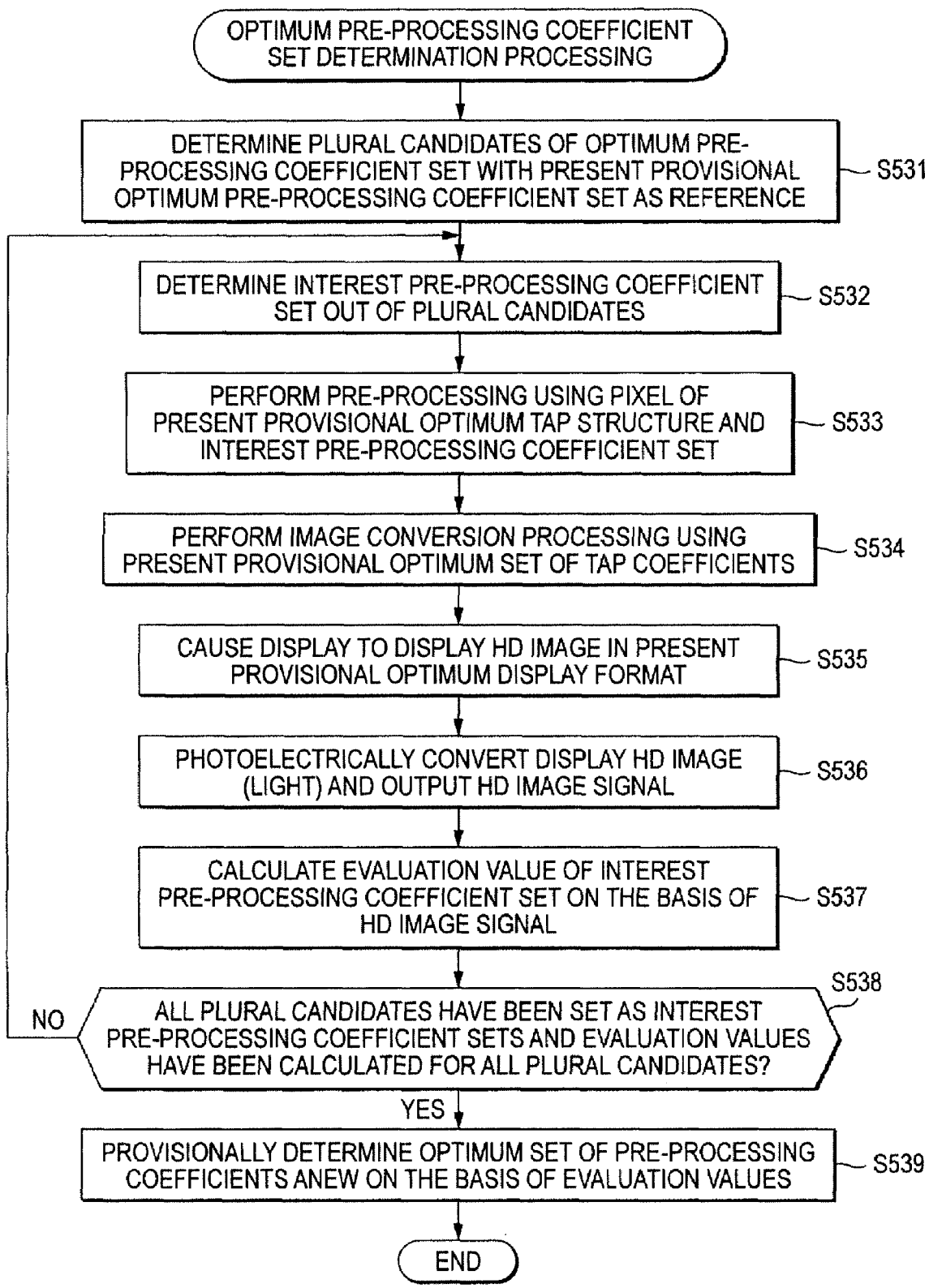
FIG. 56 is a flowchart for explaining details of processing in step S473.

The optimum pre-processing coefficient set determination processing in step S473 in FIG. 53 will be described in detail with reference to a flowchart in FIG. 56.

Figure 43:
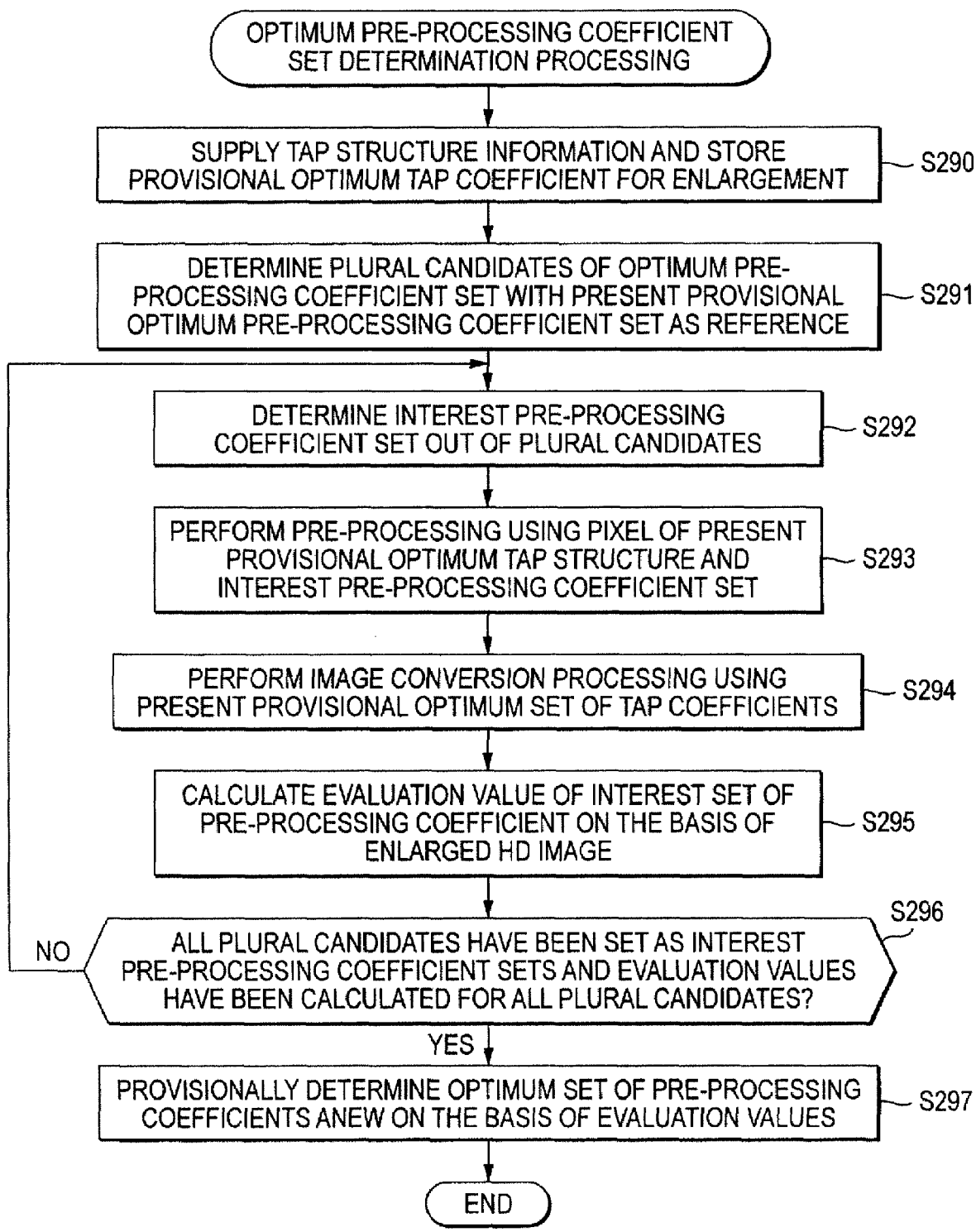
FIG. 43 is a flowchart for explaining details of processing in step S219.

In step S531, as explained in step S291 in FIG. 43, the control unit 452 determines, with the present provisional optimum pre-processing coefficient set as a reference, plural candidates of an optimum pre-processing coefficient set on the basis of a predetermined rule.

After the processing in step S531, the control unit 452 proceeds to step S532. The control unit 452 determines one of candidates, which have not been set as interest pre-processing coefficient sets, among the plural candidates of the optimum pre-processing coefficient set as a pre-processing coefficient set of interest and proceeds to step S533.

In step S533, the control unit 452 controls the pre-processing unit 261 to perform pre-processing based on the present provisional optimum tap structure and the pre-processing coefficient set of interest. Consequently, the pre-processing unit 261 applies, in accordance with the control by the control unit 452, pre-processing to the SD image signal serving as the pseudo photographed image signal supplied from the pseudo-photographed-image generating unit 451 to the learning unit 255. The pre-processing unit 261 supplies an SD image signal after pre-processing obtained as a result of the pre-processing to the image converting unit 262.

The pre-processing unit 261 sequentially sets, as a pixel of interest, pixels forming the SD image signal after pre-processing corresponding to the SD image signal serving as the pseudo photographed image signal supplied from the pseudo-photographed-image generating unit 451. The pre-processing unit 261 extracts, for the pixel of interest, pixel values of plural pixels to be set as pre-processing taps of the present provisional optimum tap structure from the SD image signal serving as the pseudo photographed image signal supplied from the pseudo-photographed-image generating unit 451. The pre-processing unit 261 performs, with the pixel values serving as the pre-processing taps as arguments, an arithmetic operation for a function for pre-processing defined by the pre-processing coefficient set of interest. The pre-processing unit 261 supplies a result of the arithmetic operation for a function for pre-processing to the image converting unit 262 as a pixel value of the pixel of interest of the SD image signal after pre-processing.

In step S534, the image converting unit 262 receives the supply of the present provisional optimum set of tap coefficients for enlargement from the control unit 452. The image converting unit 262 sets the SD image signal after pre-processing supplied from the pre-processing unit 261 as a first image signal and sets an enlarged HD image signal obtained by enlarging the SD image signal before pre-processing as a second image. The image converting unit 262 performs image conversion processing (enlargement conversion processing) for converting the SD image signal after pre-processing into an enlarged HD image signal using the present provisional optimum set of tap coefficients for enlargement from the control unit 452. The image converting unit 262 supplies an enlarged HD image signal obtained by the image conversion processing to the display control unit 68.

After the processing in step S534, the control unit 452 proceeds to step S535. The control unit 452 supplies display format information indicating the present provisional optimum display format to the display control unit 68. The display control unit 68 causes the display 69 to display an enlarged HD image corresponding to the enlarged HD image signal outputted by the image converting unit 262 in the present provisional optimum display format indicated by the display format information from the control unit 452. The display control unit 68 proceeds to step S536.

In step S536, the photo-detector 70 detects (photoelectrically converts) light serving as the enlarged HD image (a display image) displayed on the display 69. The photo-detector 70 outputs a display image signal equivalent to the HD image signal, which is an electric signal corresponding to the light, to the evaluation-value calculating unit 71 and proceeds to step S537.

In step S537, the evaluation-value calculating unit 71 evaluates not only the display image signal from the photo-detector 70 but also the enlarged HD image displayed on the display 69.

The evaluation-value calculating unit 71 reads out, from the learning-data storing unit 61, an SHD image signal corresponding to the display image signal from the photo-detector 70. The evaluation-value calculating unit 71 compares the display image signal and the corresponding SHD image signal to calculate an evaluation value not only as evaluation of the display image signal but also as evaluation of an image quality that the user looking at the HD image displayed on the display 69 feels. The evaluation-value calculating unit 71 supplies the evaluation value to the control unit 452.

The processing in steps S533 to S537 is applied to all frames of the SHD image signal stored in the learning-data storing unit 61. The control unit 452 calculates, for the pre-processing coefficient set of interest, for example, a sum of evaluation values obtained for all the frames of the SHD image signal stored in the learning-data storing unit 61. The control unit 452 temporarily stores the sum as a final evaluation value for the pre-processing coefficient set of interest.

Thereafter, the control unit 452 proceeds from step S537 to step S538. The control unit 452 judges whether evaluation values have been calculated for all the plural candidates of the optimum pre-processing coefficient set determined in step S531.

When it is judged in step S538 that evaluation values have not been calculated for all the plural candidates of the optimum pre-processing coefficient set, the control unit 452 returns to step S532. The control unit 452 determines one of candidates, which have not been set as interest pre-processing coefficient sets, among the plural candidates of the optimum pre-processing coefficient set as a pre-processing coefficient set of interest anew. Subsequently, the control unit 452 repeats the same processing.

When it is judged in step S538 that evaluation values have been calculated for all the plural candidates of the optimum pre-processing coefficient set, the control unit 452 proceeds to step S539. The control unit 452 provisionally determines a candidate having a highest evaluation value among the plural candidates of the optimum pre-processing coefficient set as an optimum pre-processing coefficient set for the combination of the present provisional optimum display format, the present provisional optimum tap structure, and the present provisional optimum set of tap coefficients for enlargement anew. The control unit 452 returns to the start of the processing.

Figure 57:
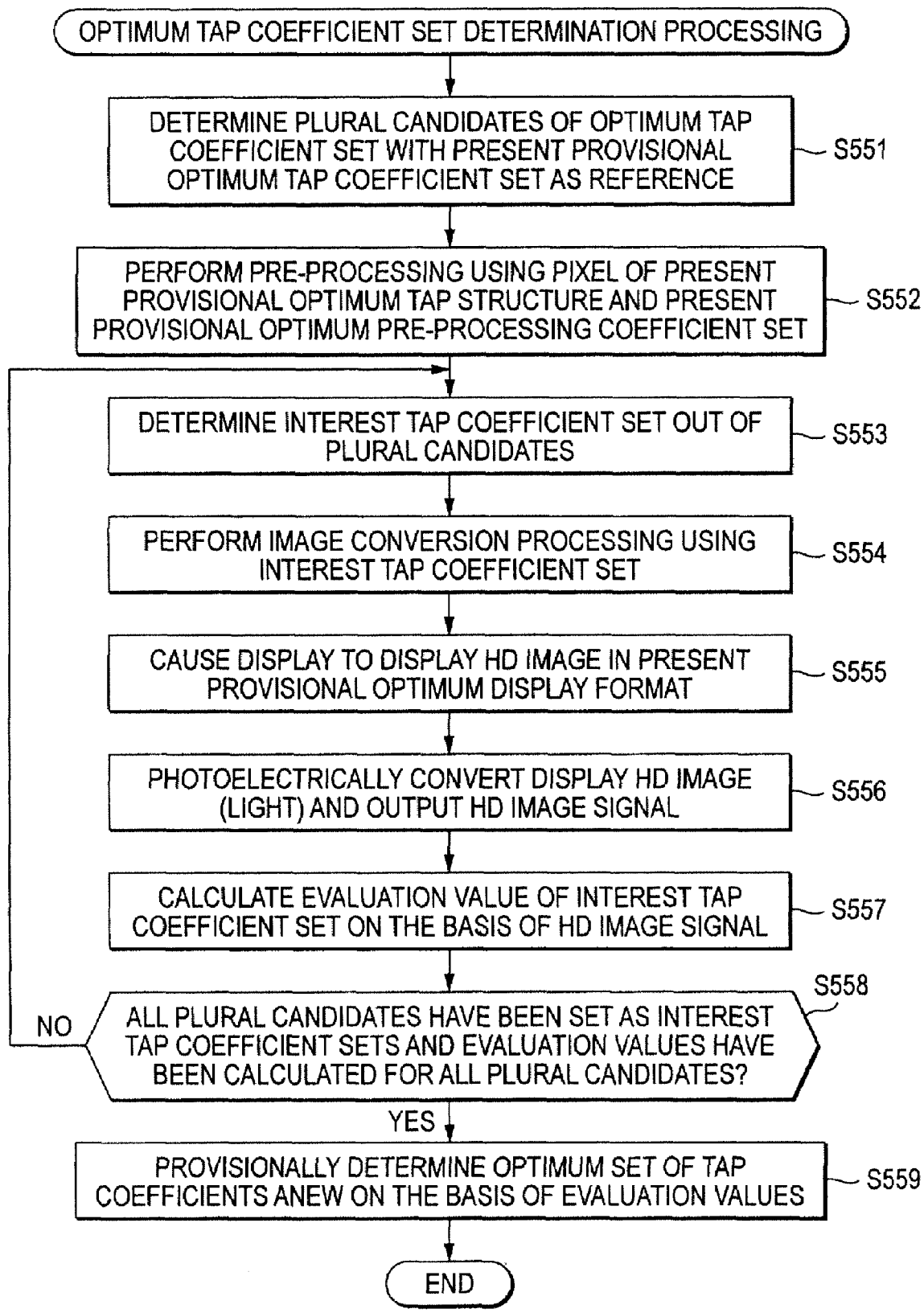
FIG. 57 is a flowchart for explaining details of processing in step S474.

The optimum tap coefficient set determination processing in step S474 in FIG. 53 will be described in detail with reference to a flowchart in FIG. 57.

In step S551, as in step S111 in FIG. 23, the control unit 452 determines, with present provisional optimum set of tap coefficients for enlargement as a reference, plural candidates of an optimum set of tap coefficients for enlargement on the basis of a predetermined rule.

After the processing in step S551, the control unit 452 proceeds to step S552. The control unit 452 controls the pre-processing unit 261 (FIG. 50) to perform pre-processing based on the present provisional optimum tap structure and the present provisional optimum pre-processing coefficient set. Consequently, the pre-processing unit 261 applies, in accordance with the control by the control unit 452, pre-processing to the SD image signal serving as the pseudo photographed image signal supplied from the pseudo-photographed-image generating unit 451 to the learning unit 255. The pre-processing unit 261 supplies an SD image signal after pre-processing obtained as a result of the pre-processing to the image converting unit 262.

The pre-processing unit 261 sequentially sets, as a pixel of interest, pixels forming the SD image signal after pre-processing corresponding to the SD image signal serving as the pseudo photographed image signal supplied from the pseudo-photographed-image generating unit 451. The pre-processing unit 261 extracts, for the pixel of interest, pixel values of plural pixels to be set as pre-processing taps of the present provisional optimum tap structure from the SD image signal serving as the pseudo photographed image signal supplied from the pseudo-photographed-image generating unit 451. The pre-processing unit 261 performs, with the pixel values serving as the pre-processing taps as arguments, an arithmetic operation for a function for pre-processing defined by the present provisional optimum pre-processing coefficient set. The pre-processing unit 261 supplies a result of the arithmetic operation for a function for pre-processing to the image converting unit 262 as a pixel value of the pixel of interest of the SD image signal after pre-processing.

In step S553, the control unit 452 determines one of candidates, which have not been set as interest tap coefficient sets, among the plural candidates of the optimum set of tap coefficients for enlargement as a tap coefficient set of interest. The control unit 452 supplies the tap coefficient set of interest to the image converting unit 262 and proceeds to step S554.

In step S554, the image converting unit 262 sets the SD image signal after pre-processing supplied from the pre-processing unit 261 as a first image signal and sets an enlarged HD image signal obtained by enlarging the SD image signal before pre-processing as a second image signal. The image converting unit 262 performs image conversion processing (enlargement conversion processing) for converting the SD image signal after pre-processing into an enlarged HD image signal using the tap coefficient set of interest supplied from the control unit 452 in the immediately preceding step S553. The image converting unit 262 supplies an enlarged HD image signal obtained by the image conversion processing to the display control unit 68.

After the processing in step S554, the control unit 452 proceeds to step S555. The control unit 452 supplies display format information indicating the present provisional optimum display format to the display control unit 68. Consequently, the display control unit 68 causes the display 69 to display an HD image corresponding to the HD image signal outputted by the learning unit 255 in the display format indicated by the display format information from the control unit 452 and proceeds to step S556.

In step S556, the photo-detector 70 detects (photoelectrically converts) light serving as the HD image (a display image) displayed on the display 69. The photo-detector 70 outputs a display image signal equivalent to the HD image signal, which is an electric signal corresponding to the light, to the evaluation-value calculating unit 71 and proceeds to step S557.

In step S557, the evaluation-value calculating unit 71 evaluates not only the display image signal from the photo-detector 70 but also the HD image displayed on the display 69.

The evaluation-value calculating unit 71 reads out, from the learning-data storing unit 61, an SHD image signal corresponding to the display image signal from the photo-detector 70. The evaluation-value calculating unit 71 compares the display image signal and the corresponding SHD image signal to calculate an evaluation value not only as evaluation of the display image signal but also as evaluation of an image quality that the user looking at the HD image displayed on the display 69 feels. The evaluation-value calculating unit 71 supplies the evaluation value to the control unit 452.

The processing in step S552 and steps S554 to S557 is applied to all frames of the SHD image signal stored in the learning-data storing unit 61. The control unit 452 calculates, for the pre-processing coefficient set of interest, for example, a sum of evaluation values obtained for all the frames of the SHD image signal stored in the learning-data storing unit 61. The control unit 452 temporarily stores the sum as a final evaluation value for the tap coefficient set of interest.

Thereafter, the control unit 452 proceeds from step S557 to step S558. The control unit 452 judges whether evaluation values have been calculated for all the plural candidates of the optimum set of tap coefficients for enlargement.

When it is judged in step S558 that evaluation values have not been calculated for all the plural candidates of the optimum set of tap coefficients for enlargement, the control unit 452 returns to step S553. The control unit 452 determines one of candidates, which have not been set as interest tap coefficient sets, among the plural candidates of the optimum set of tap coefficients for enlargement as a tap coefficient set of interest anew. Subsequently, the control unit 452 repeats the same processing.

When it is judged in step S558 that evaluation values have been calculated for all the plural candidates of the optimum set of tap coefficients for enlargement, the control unit 452 proceeds to step S559. The control unit 452 provisionally determines a candidate having a highest evaluation value among the plural candidates of the optimum set of tap coefficients for enlargement as an optimum set of tap coefficients for enlargement for the combination of the present provisional optimum signal format, the present provisional optimum tap structure, and the present provisional optimum pre-processing coefficient set anew. The control unit 452 returns to the start of the processing.

Figure 54:
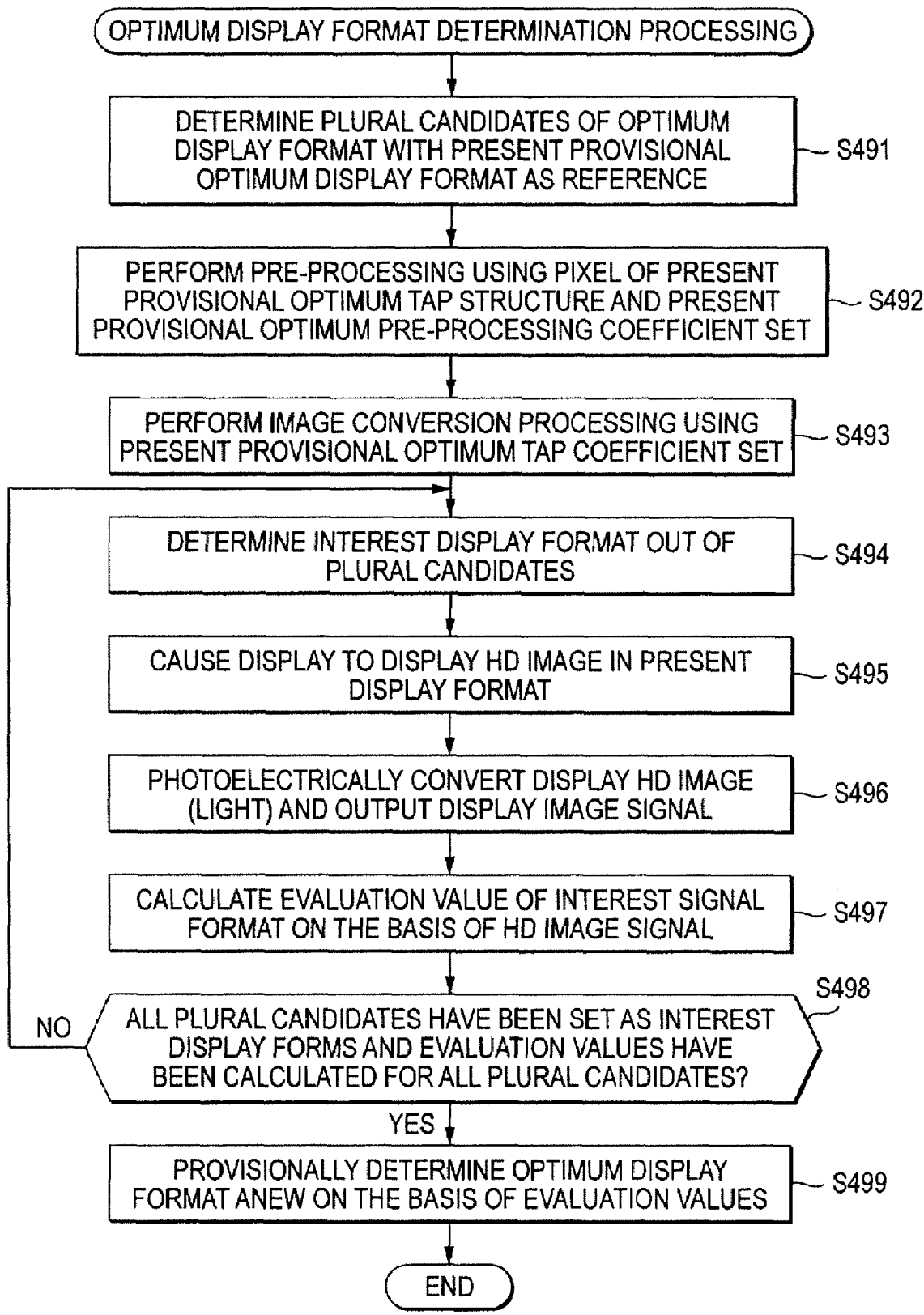
FIG. 54 is a flowchart for explaining details of processing in step S471.

In the optimum display format determination processing in FIG. 54, plural candidates of an optimum display format are determined with the present provisional optimum display format as a reference. In this case, as a method of transforming the present provisional optimum display format, it is possible to adopt a method of, so to speak, substantially transforming the present provisional optimum display format when the number of times of repetition of the optimization processing in step S430 in FIG. 50 is small and gradually reducing the transformation as the number of times of repetition increases. The same holds true for a tap structure of a pre-processing tap, a pre-processing coefficient set, and a set of tap coefficients for enlargement.

In the optimum display format determination processing in FIG. 54, when an evaluation value calculated for a candidate of an optimum display format is not so large and rarely increases, it is possible to substantially transform the present provisional optimum display format to determine plural candidates of the optimum display format. In this case, it is possible to solve a problem of so-called local minimum. The same holds true for a tap structure of a pre-processing tap, a pre-processing coefficient set, and a set of tap coefficients for enlargement.

It is possible to perform the series of processing described above with hardware or with software. In performing the series of processing with software, a program forming the software is installed in a general-purpose computer or the like.

Figure 58:
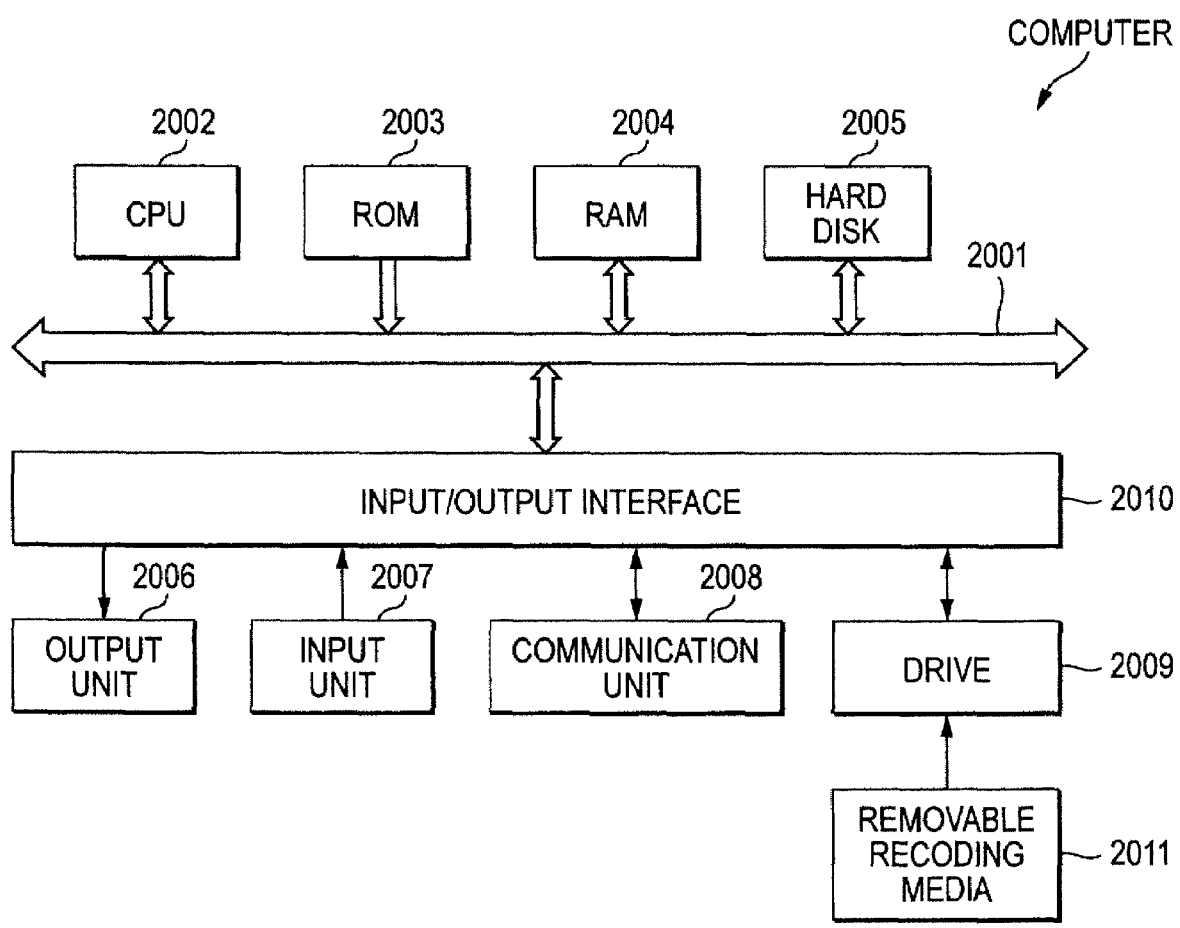
FIG. 58 is a block diagram showing an example of a structure of a computer that executes a program for performing processing of an image.

FIG. 58 is a diagram showing an example of a structure of an embodiment of a computer in which a program for executing the series of processing is installed.

It is possible to record the program in a hard disk 2005 and a ROM 2003 serving as recording medium built in the computer in advance.

Alternatively, it is possible to temporarily or permanently store the program in a removable recording medium 2011 such as a flexible disk, a CD-ROM (Compact Disc Read Only Memory), an MO (Magneto Optical) disk, a DVD (Digital Versatile Disc), a magnetic disk, or a semiconductor memory. It is possible to provide such a removable recording medium 2011 as so-called package software.

Other than installing the program in the computer from the removable recording medium 2011, it is also possible to transfer the program to the computer by radio from a download site via an artificial satellite for digital satellite broadcast or transfer the program to the computer by wire via a network such as a LAN (Local Area Network) or the Internet. The computer can receive the program transferred in that way in a communication unit 2008 and install the program in the hard disk 2005 built therein.

The computer includes a CPU (Central Processing Unit) 2002. An input/output interface 2010 is connected to the CPU 2002 via a bus 2001. When a command is inputted to the CPU 2002 via the input/output interface 2010 according to operation or the like of an input unit 2007 including a keyboard, a mouse, and a microphone by a user, the CPU 2002 executes the program stored in the ROM (Read Only Memory) 2003 in accordance with the command. Alternatively, the CPU 2002 loads the program stored in the hard disk 2005, the program transferred from the satellite or the network, received by the communication unit 2008, and installed in the hard disk 2005, or the program read out from the removable recording medium 2011 inserted in a drive 2009 and installed in the hard disk 2005 into a RAM (Random Access Memory) 2004 and executes the program. Consequently, the CPU 2002 performs the processing complying with the flowcharts or the processing performed by the components shown in the block diagrams. For example, the CPU 2002 outputs a result of the processing from an output unit 2006 including an LCD (Liquid Crystal Display) and a speaker, transmits the result from the communication unit 2008, or records the result in the hard disk 2005 via the input/output interface 2010 depending on the situation.

In this specification, processing steps describing a program for causing the computer to perform various kinds of processing do not always have to be processed in time series in accordance with an order of the processing steps described as the flowcharts. The processing steps include processing executed in parallel or individually (e.g., parallel processing or processing by an object).

The program may be processed by one computer or may be processed by plural computers in a distributed manner. The program may be transferred to a computer in a remote location and executed by the computer.

It should be understood by those skilled in the art that various modifications, combinations, sub-combinations, and alterations may occur depending on design requirements and other factors insofar as they are within the scope of the appended claims or the equivalents thereof.

What is claimed is:

1. A display apparatus that displays an image, comprising:
   image converting means for converting an input image signal into a high-quality image signal higher in quality than the input image signal according to an arithmetic operation between the input image signal and a tap coefficient obtained by learning performed in advance; and
   display control means for causing display means to display an image corresponding to the high-quality image signal in a display format determined by learning performed using a super high-quality image signal higher in quality than the high-quality image signal, wherein
   the display format determined by learning is one of plural display formats.

2. A display apparatus according to claim 1, wherein the image converting means includes:
   prediction tap extracting means for extracting, from the input image signal, prediction taps that are pixel values of plural pixels used for predicting a pixel value of a pixel of interest of the high-quality image signal;
   class tap extracting means for extracting, from the input image signal, class taps that are pixel values of plural pixels used for classification for classifying the pixel of interest into one of plural classes;
   classifying means for classifying the pixel of interest on the basis of the class taps;
   coefficient outputting means for outputting a tap coefficient of the class of the pixel of interest out of tap coefficients for the respective plural classes which tap coefficients are determined by learning in advance; and
   arithmetic operation means for calculating a pixel value of the pixel of interest according to a prediction arithmetic operation applying the tap coefficient of the class of the pixel of interest to the prediction tap.

3. A display apparatus according to claim 1, further comprising:
   signal format acquiring means for acquiring a signal format of the input image signal, wherein
   the image converting means converts the input image signal into the high-quality image signal according to an arithmetic operation between the input image signal and a tap coefficient for an acquired signal format of the input image signal among tap coefficients for respective plural signal formats.

4. A display method of displaying an image, comprising:
   converting an input image signal into a high-quality image signal higher in quality than the input image signal according to an arithmetic operation between the input image signal and a tap coefficient obtained by learning performed in advance; and
   causing display means to display an image corresponding to the high-quality image signal in a display format determined by learning performed using a super-quality image signal higher in quality than the high-quality image signal, wherein
   the display format determined by learning is one of plural display formats.

5. A non-transitory computer readable storage medium having stored thereon a program with instructions that when executed by a computer cause the computer to execute a method of display processing for displaying an image, the method comprising:
   converting an input image signal into a high-quality image signal higher in quality than the input image signal according to an arithmetic operation between the input image signal and a tap coefficient obtained by learning performed in advance; and
   causing display means to display an image corresponding to the high-quality image signal in a display format determined by learning performed using a super high-quality image signal higher in quality than to the high-quality image signal, wherein
   the display format determined by learning is one of plural display formats.

6. A display apparatus that displays an image, comprising:
   an image converting unit configured to convert an input image signal into a high-quality image signal higher in quality than the input image signal according to an arithmetic operation between the input image signal and a tap coefficient obtained by learning performed in advance; and
   a display control unit configured to cause a display to display an image corresponding to the high-quality image signal in a display format determined by learning performed using a super high-quality image signal higher in quality than the high-quality image signal, wherein
   the display format determined by learning is one of plural display formats.

7. A display apparatus that displays an image, comprising:
   an image converter configured to convert an input image signal into a high-quality image signal higher in quality than the input image signal according to an arithmetic operation between the input image signal and a tap coefficient obtained by learning performed in advance; and
   a display controller configured to control a display to display an image corresponding to the high-quality image signal in a display format predetermined by learning performed using a super high-quality image signal higher in quality than the high-quality image signal, wherein the display format predetermined by learning is one of plural display formats.

8. A non-transitory computer readable storage medium having stored thereon a program with instructions that when executed by a computer cause the computer to execute a method of display processing for displaying an image, the method comprising:

converting an input image signal into a high-quality image signal higher in quality than the input image signal according to an arithmetic operation between the input image signal and a tap coefficient obtained by learning performed in advance; and controlling a display to display an image corresponding to the high-quality image signal in a display format predetermined by learning performed using a super high-quality image signal higher in quality than the high-quality image signal, wherein the display format predetermined by learning is one of plural display formats.

* * * * *